March 3, 1959 K. E. SCHREINER 2,875,951
SYNCHRONIZATION OF DISPLAY MEANS TO
SPECIFIC MICROSECOND INTERVAL
Original Filed Nov. 23, 1954 58 Sheets-Sheet 1
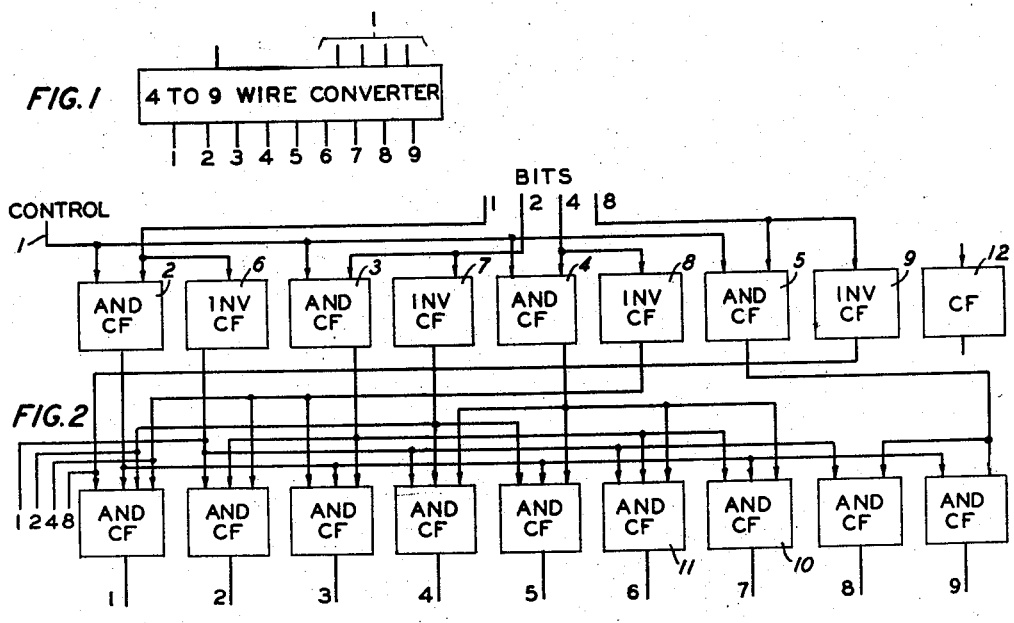
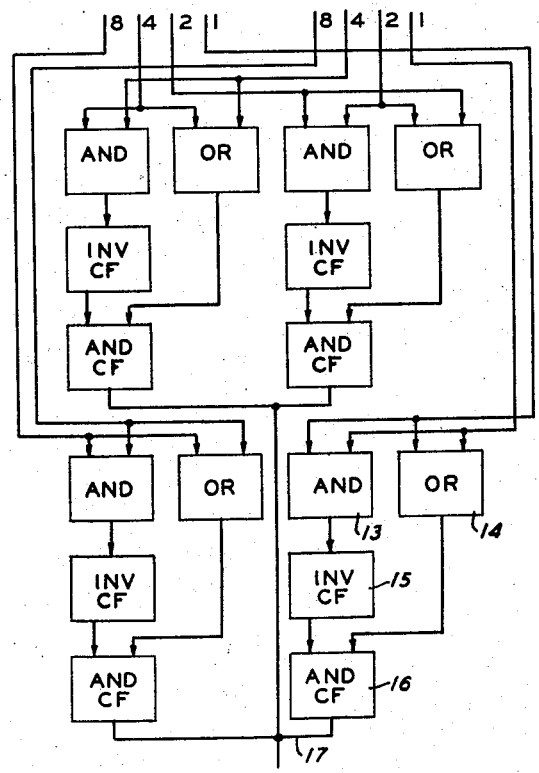
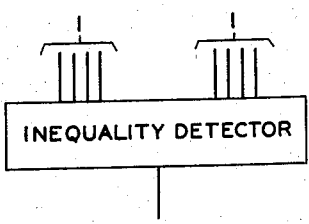
INVENTOR
KENNETH E. SCHREINER
BY
ATTORNEY March 3, 1959     K. E. SCHREINER     2,875,951
SYNCHRONIZATION OF DISPLAY MEANS TO
SPECIFIC MICROSECOND INTERVAL Original Filed Nov. 23, 1954     58 Sheets-Sheet 2

| FIG. 8 | FIG. 9 | FIG. 10 |
| | FIG. 11 | FIG. 12 |
| | FIG. 65 | FIG. 66 |

INVENTOR
KENNETH E. SCHREINER
BY
ATTORNEY

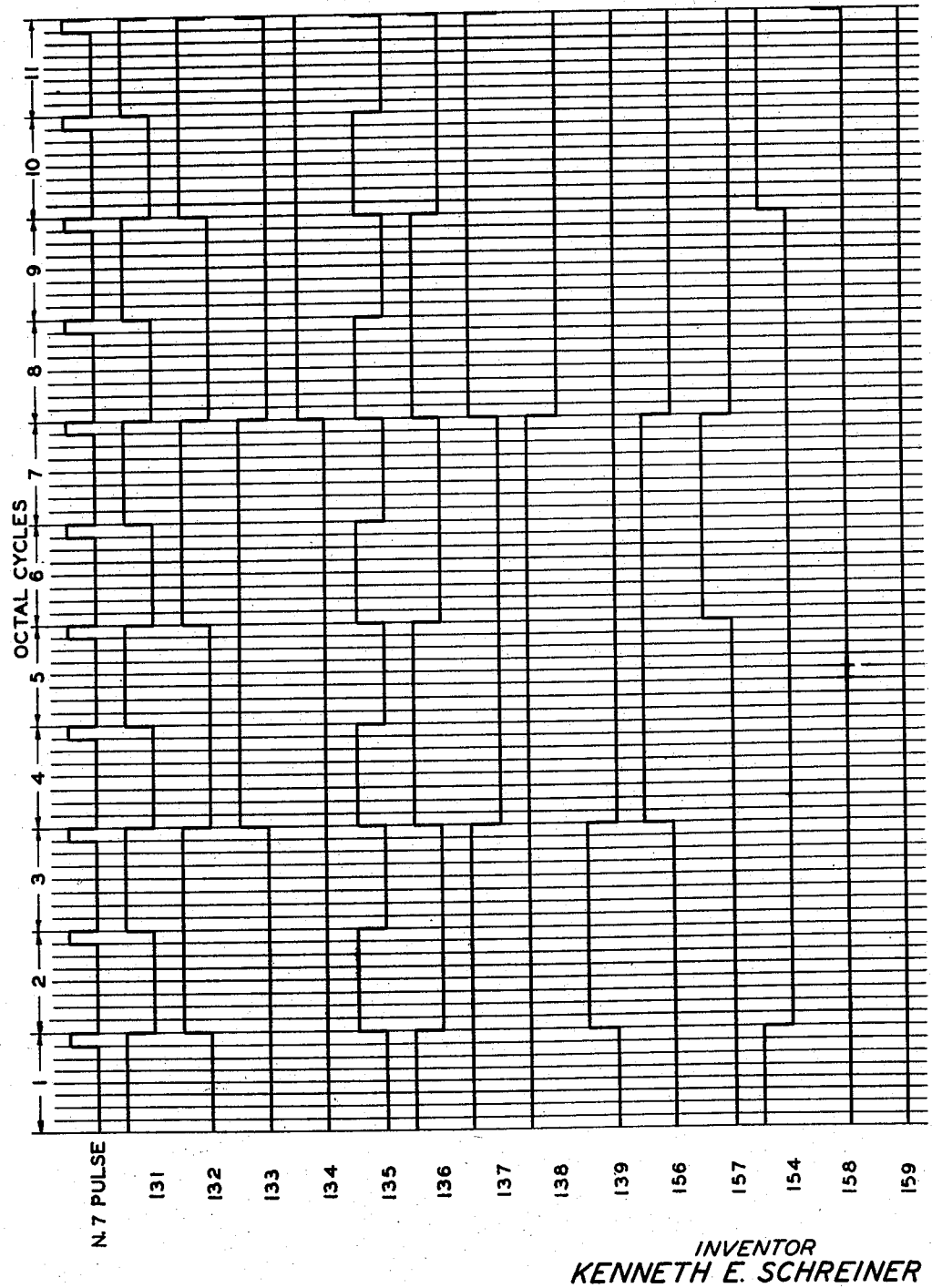

March 3, 1959     K. E. SCHREINER     2,875,951
SYNCHRONIZATION OF DISPLAY MEANS TO
SPECIFIC MICROSECOND INTERVAL
Original Filed Nov. 23, 1954     58 Sheets-Sheet 4

INVENTOR
KENNETH E. SCHREINER
BY
ATTORNEY

March 3, 1959

K. E. SCHREINER 2,875,951

SYNCHRONIZATION OF DISPLAY MEANS TO
SPECIFIC MICROSECOND INTERVAL

Original Filed Nov. 23, 1954

INVENTOR
KENNETH E. SCHREINER
BY
ATTORNEY

March 3, 1959  K. E. SCHREINER  2,875,951
SYNCHRONIZATION OF DISPLAY MEANS TO
SPECIFIC MICROSECOND INTERVAL
Original Filed Nov. 23, 1954  58 Sheets-Sheet 7

INVENTOR
KENNETH E. SCHREINER
BY
ATTORNEY

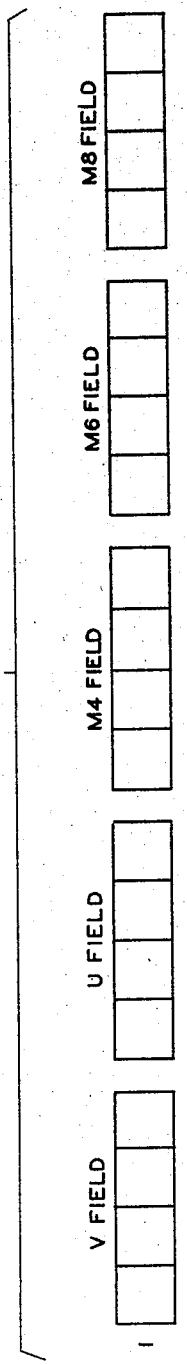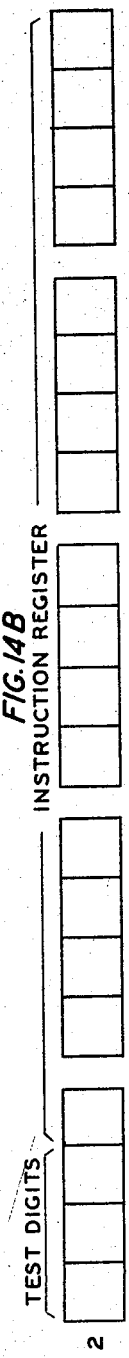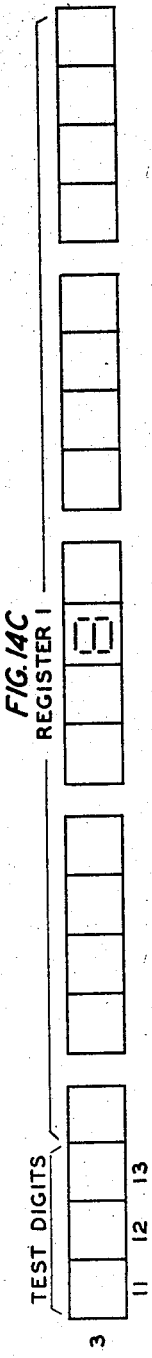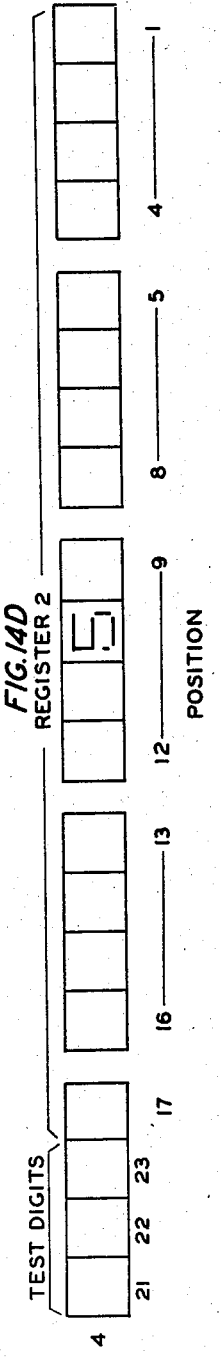

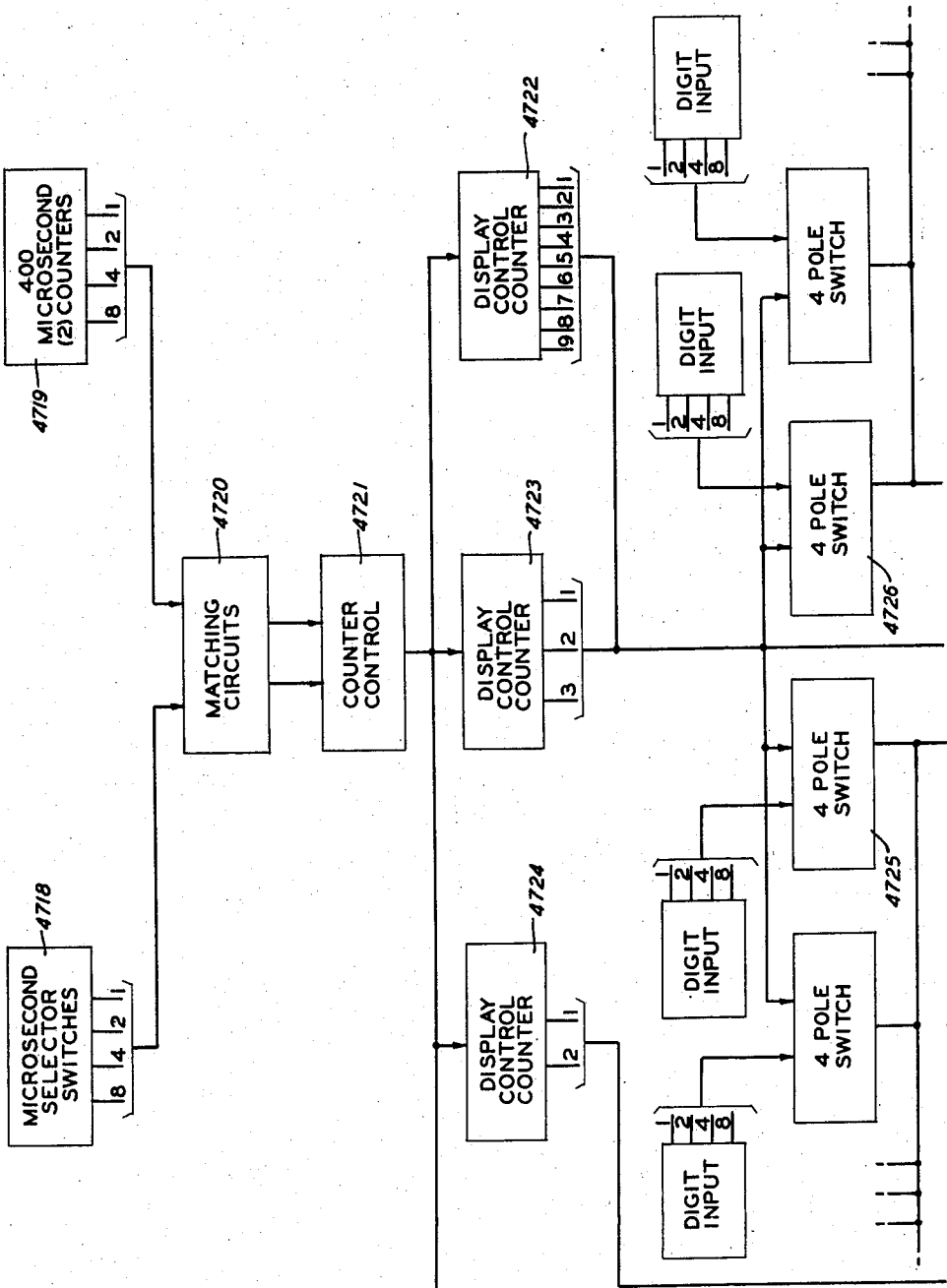

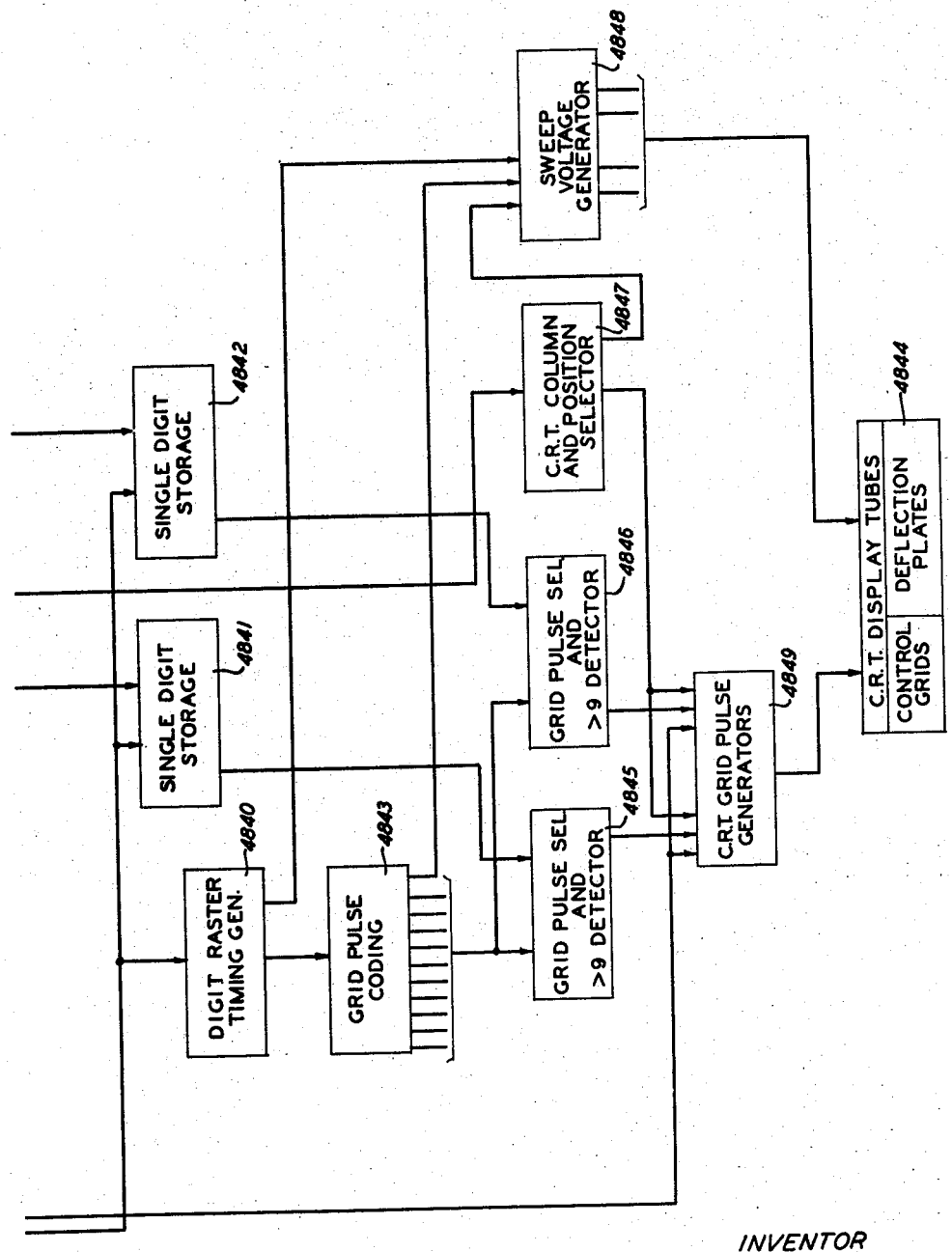

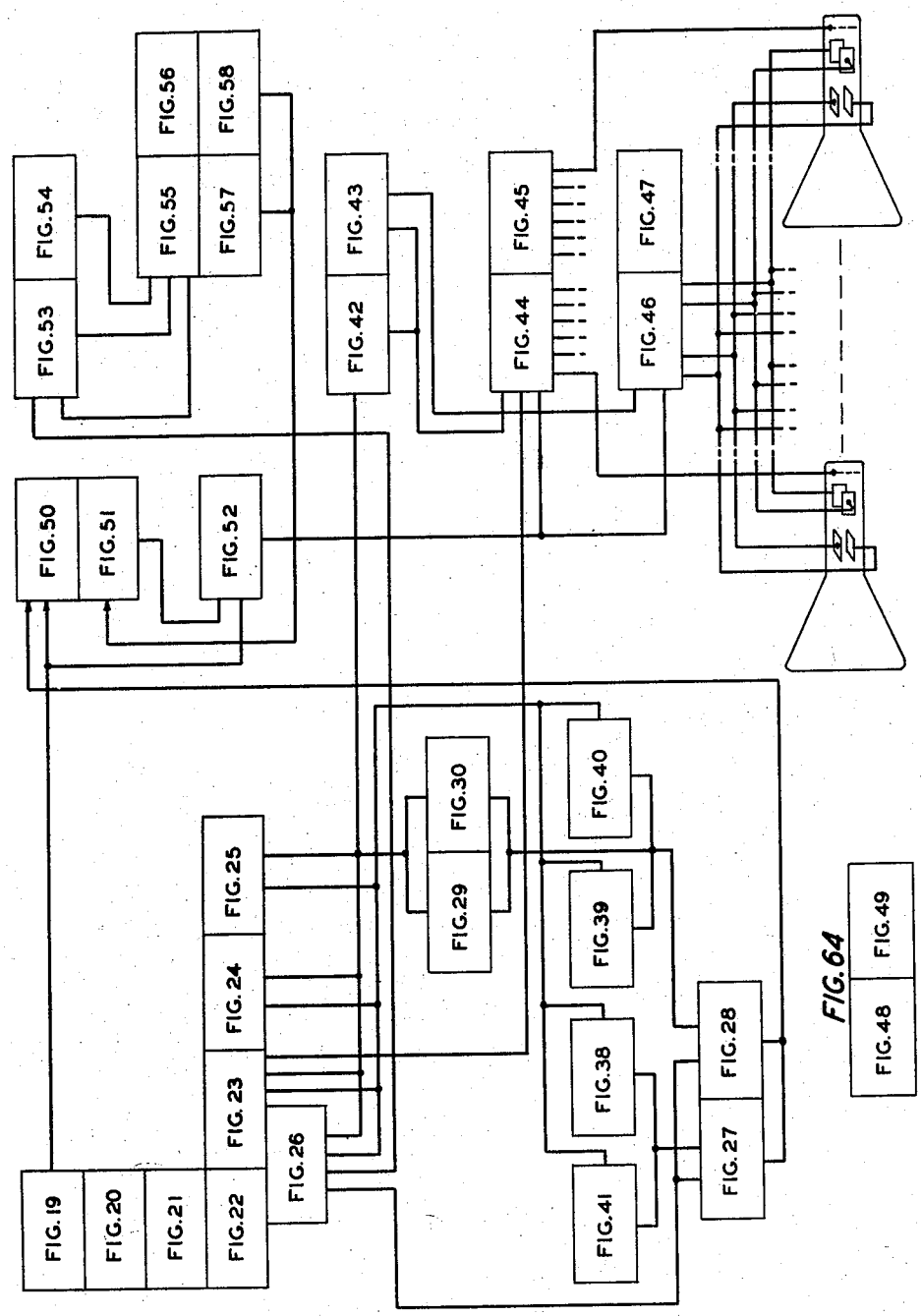

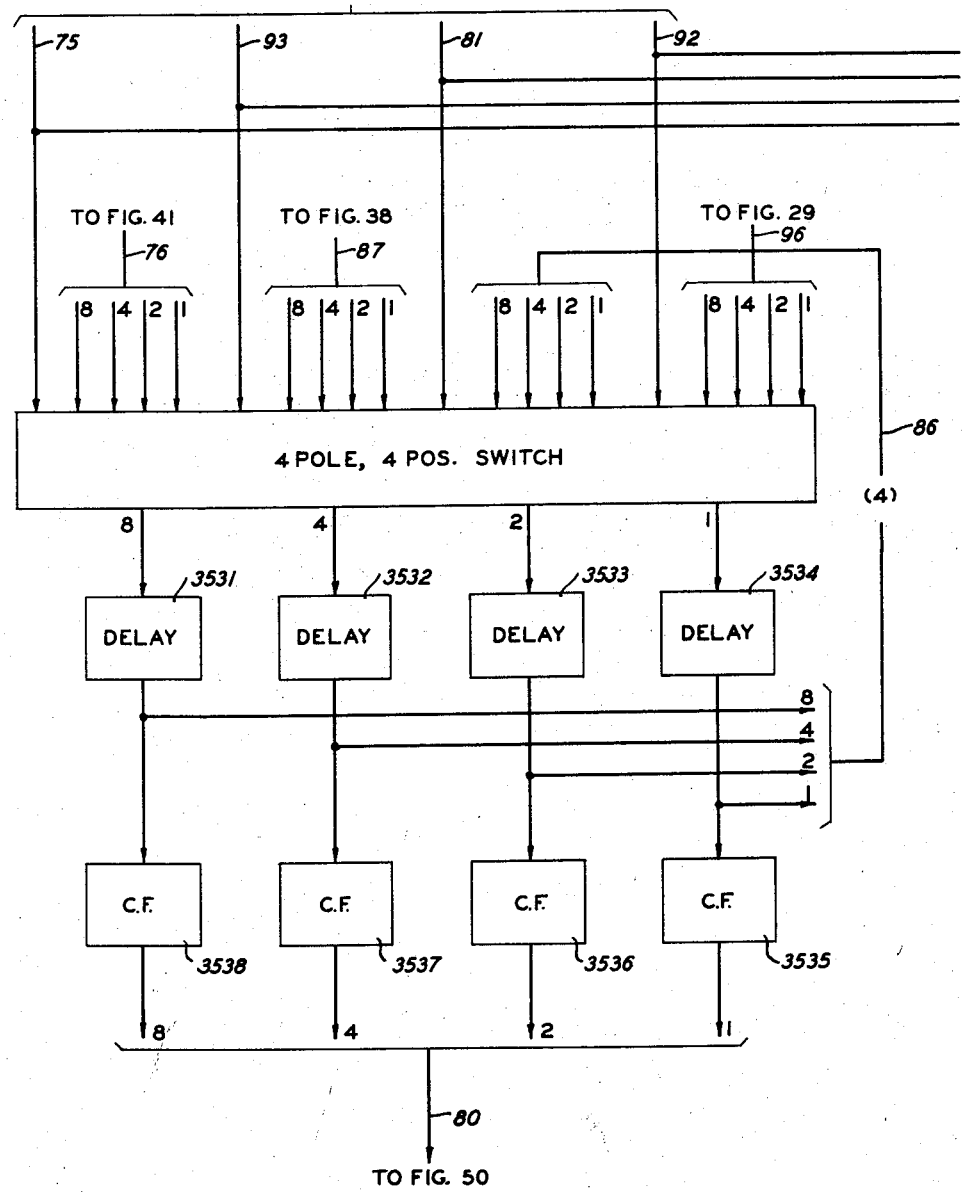

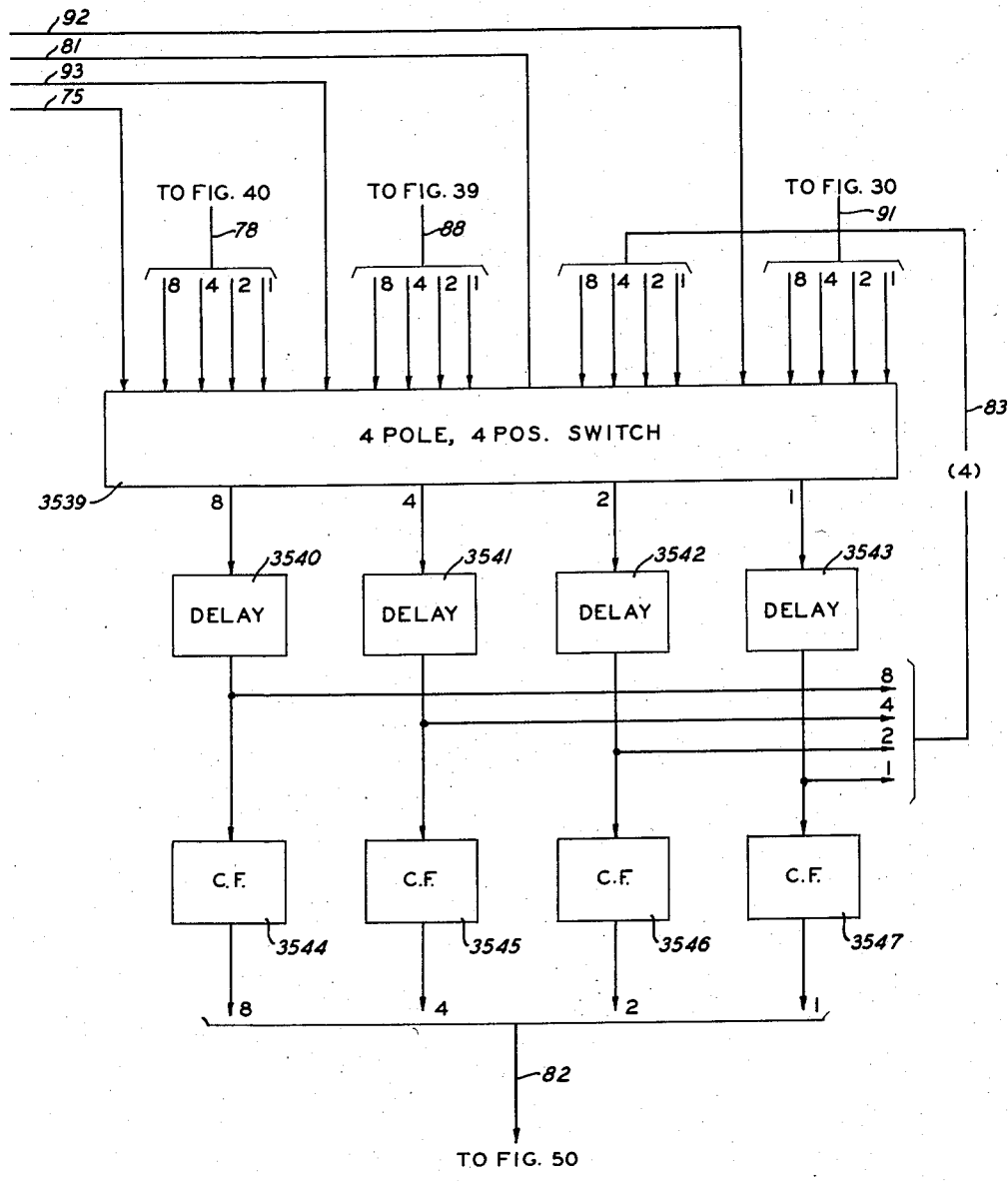

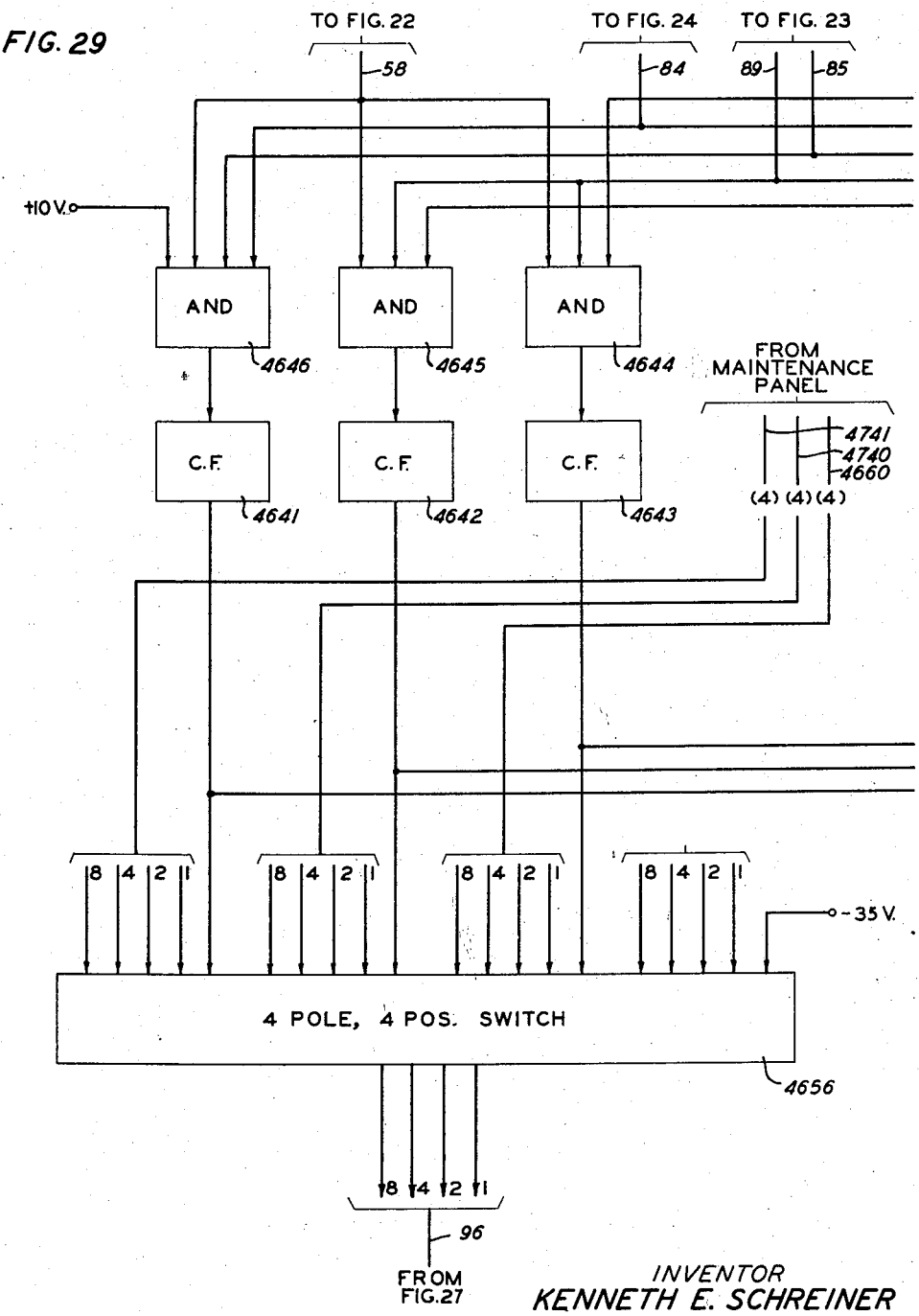

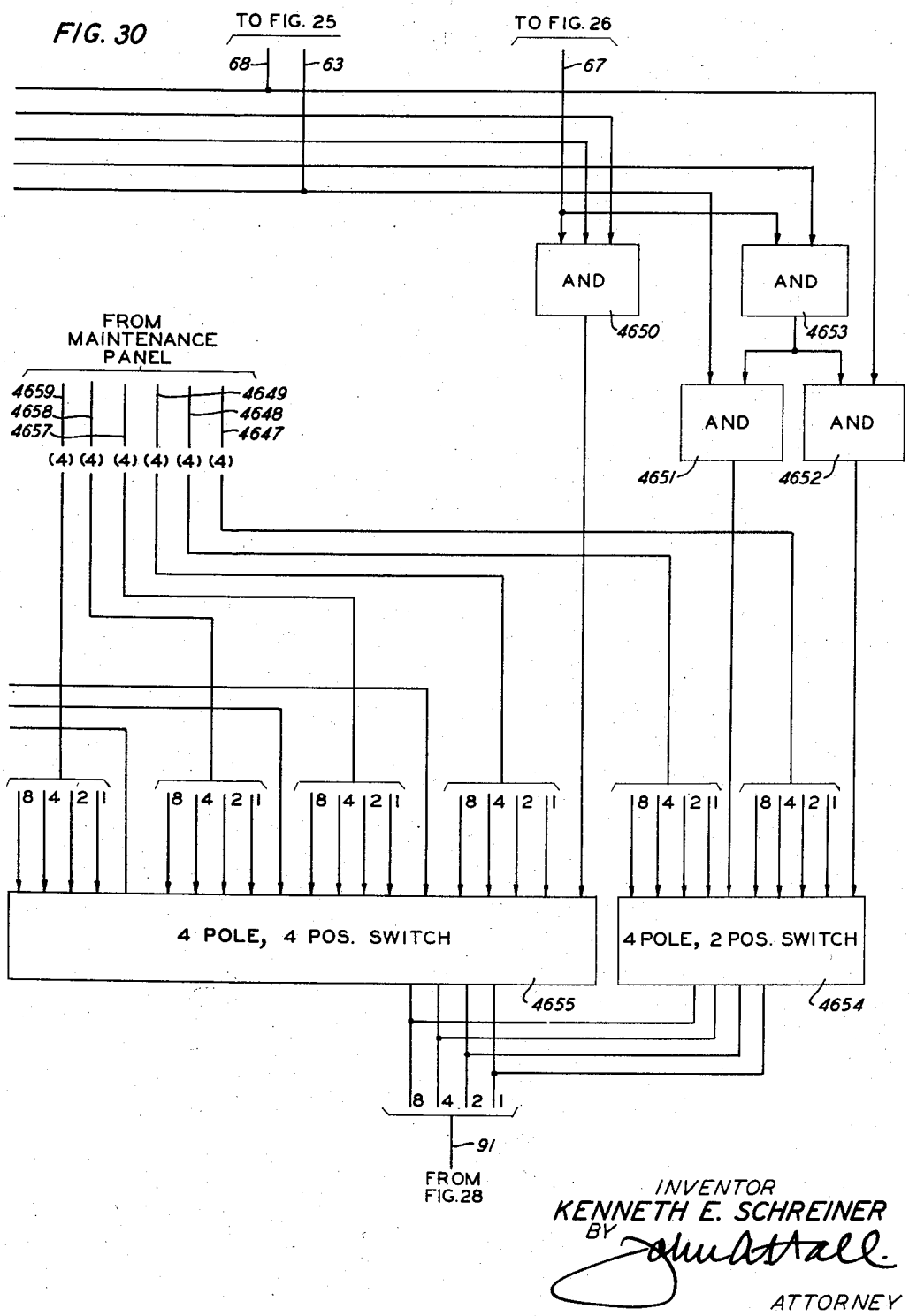

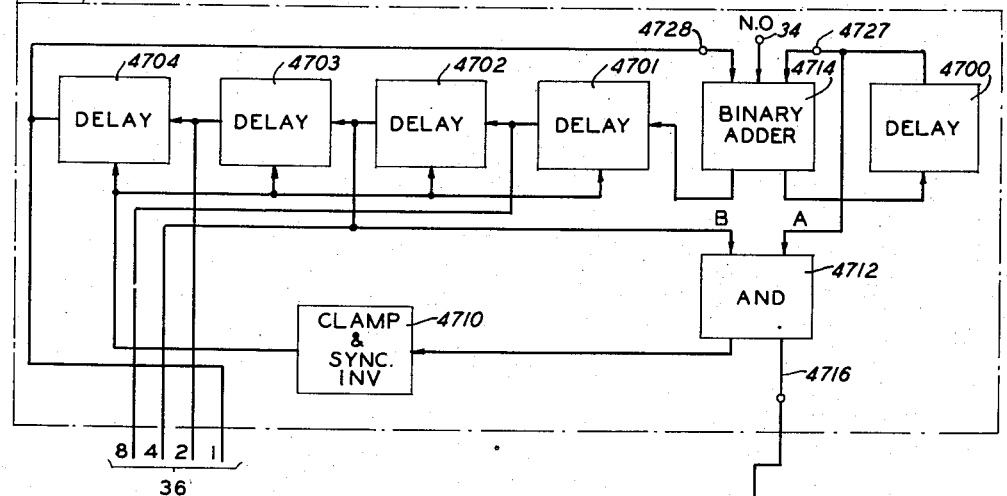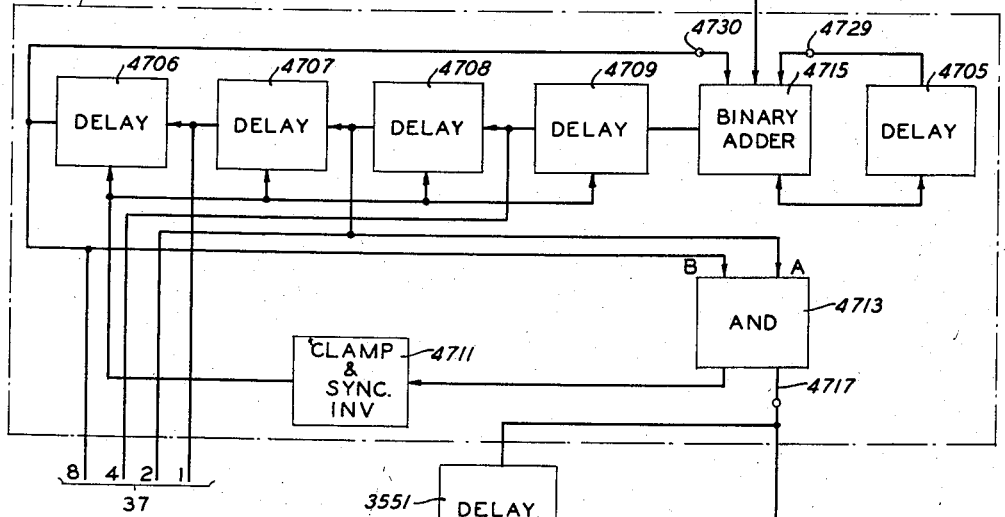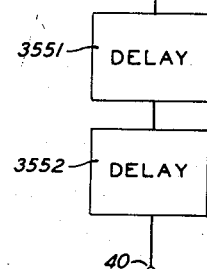

March 3, 1959     K. E. SCHREINER     2,875,951
SYNCHRONIZATION OF DISPLAY MEANS TO
SPECIFIC MICROSECOND INTERVAL
Original Filed Nov. 23, 1954     58 Sheets-Sheet 25

DECADE COUNTER 3559

| TIME | OPER-ATION | TERMINAL POINTS ||||||| READ OUT |
|||8 BIT|4 BIT/B|2 BIT|1 BIT|4716|4727/A|4728||
| N.0 | 1 | 0 | 0 | 0 | 0 | 0 | 0 | 0 | 0 |
| .1 | 0 | 1 | 0 | 0 | 0 | 0 | 0 | 0 | 0 |
| .2 | 0 | 0 | 1 | 0 | 0 | 0 | 0 | 0 | 0 |
| .3 | 0 | 0 | 0 | 1 | 0 | 0 | 0 | 0 | 0 |
| .4 | 0 | 0 | 0 | 0 | 1 | 0 | 0 | 1 | 1 |
| .5 | 0 | 1 | 0 | 0 | 0 | 0 | 0 | 0 | 0 |
| .6 | 0 | 0 | 1 | 0 | 0 | 0 | 0 | 0 | 0 |
| .7 | 0 | 0 | 0 | 1 | 0 | 0 | 0 | 0 | 0 |
| 1.0 | 1 | 0 | 0 | 0 | 1 | 0 | 0 | 1 | 0 |
| 1.1 | 0 | 0 | 0 | 0 | 0 | 0 | 1 | 0 | 0 |
| 1.2 | 0 | 1 | 0 | 0 | 0 | 0 | 0 | 0 | 0 |
| 1.3 | 0 | 0 | 1 | 0 | 0 | 0 | 0 | 0 | 0 |
| 1.4 | 0 | 0 | 0 | 1 | 0 | 0 | 0 | 0 | 1 |
| 1.5 | 0 | 0 | 0 | 0 | 1 | 0 | 0 | 1 | 0 |
| 1.6 | 0 | 1 | 0 | 0 | 0 | 0 | 0 | 0 | 0 |
| 1.7 | 0 | 0 | 1 | 0 | 0 | 0 | 0 | 0 | 0 |
| 2.0 | 1 | 0 | 0 | 1 | 0 | 0 | 0 | 0 | 0 |
| 2.1 | 0 | 1 | 0 | 0 | 1 | 0 | 0 | 1 | 0 |
| 2.2 | 0 | 1 | 1 | 0 | 0 | 0 | 0 | 0 | 0 |
| 2.3 | 0 | 0 | 1 | 1 | 0 | 0 | 0 | 0 | 0 |
| 2.4 | 0 | 0 | 0 | 1 | 1 | 0 | 0 | 1 | 1 |
| 2.5 | 0 | 1 | 0 | 0 | 1 | 0 | 0 | 1 | 0 |
| 2.6 | 0 | 1 | 1 | 0 | 0 | 0 | 0 | 0 | 0 |
| 2.7 | 0 | 0 | 1 | 1 | 0 | 0 | 0 | 0 | 0 |
| 3.0 | 1 | 0 | 0 | 1 | 1 | 0 | 0 | 1 | 0 |
| 3.1 | 0 | 0 | 0 | 0 | 1 | 0 | 1 | 1 | 0 |
| 3.2 | 0 | 0 | 0 | 0 | 0 | 0 | 1 | 0 | 0 |
| 3.3 | 0 | 1 | 0 | 0 | 0 | 0 | 0 | 0 | 0 |
| 3.4 | 0 | 0 | 1 | 0 | 0 | 0 | 0 | 0 | 1 |
| 3.5 | 0 | 0 | 0 | 1 | 0 | 0 | 0 | 0 | 0 |
| 3.6 | 0 | 0 | 0 | 0 | 1 | 0 | 0 | 1 | 0 |
| 3.7 | 0 | 1 | 0 | 0 | 0 | 0 | 0 | 0 | 0 |
| 4.0 | 1 | 0 | 1 | 0 | 0 | 0 | 0 | 0 | 0 |
| 4.1 | 0 | 1 | 0 | 1 | 0 | 0 | 0 | 0 | 0 |
| 4.2 | 0 | 0 | 1 | 0 | 1 | 0 | 0 | 1 | 0 |
| 4.3 | 0 | 1 | 0 | 1 | 0 | 0 | 0 | 0 | 0 |
| 4.4 | 0 | 0 | 1 | 0 | 1 | 0 | 0 | 1 | 1 |
| 4.5 | 0 | 1 | 0 | 1 | 0 | 0 | 0 | 0 | 0 |

INVENTOR
KENNETH E. SCHREINER
BY 
ATTORNEY

| TIME | OPER-ATION | TERMINAL POINTS | | | | | | | READ OUT |
|---|---|---|---|---|---|---|---|---|---|
| | | 8 BIT | 4 BIT/B | 2 BIT | 1 BIT | 4716 | 4727/A | 4728 | |
| N+4.6 | 0 | 0 | 1 | 0 | 1 | 0 | 0 | 1 | 0 |
| 4.7 | 0 | 1 | 0 | 1 | 0 | 0 | 0 | 0 | 0 |
| 5.0 | 1 | 0 | 1 | 0 | 1 | 0 | 0 | 1 | 0 |
| 5.1 | 0 | 0 | 0 | 1 | 0 | 0 | 1 | 0 | 0 |
| 5.2 | 0 | 1 | 0 | 0 | 1 | 0 | 0 | 1 | 0 |
| 5.3 | 0 | 1 | 1 | 0 | 0 | 0 | 0 | 0 | 0 |
| 5.4 | 0 | 0 | 1 | 1 | 0 | 0 | 0 | 0 | 1 |
| 5.5 | 0 | 0 | 0 | 1 | 1 | 0 | 0 | 1 | 0 |
| 5.6 | 0 | 1 | 0 | 0 | 1 | 0 | 0 | 1 | 0 |
| 5.7 | 0 | 1 | 1 | 0 | 0 | 0 | 0 | 0 | 0 |
| 6.0 | 1 | 0 | 1 | 1 | 0 | 0 | 0 | 0 | 0 |
| 6.1 | 0 | 1 | 0 | 1 | 1 | 0 | 0 | 1 | 0 |
| 6.2 | 0 | 1 | 1 | 0 | 1 | 0 | 0 | 1 | 0 |
| 6.3 | 0 | 1 | 1 | 1 | 0 | 0 | 0 | 0 | 0 |
| 6.4 | 0 | 0 | 1 | 1 | 1 | 0 | 0 | 1 | 1 |
| 6.5 | 0 | 1 | 0 | 1 | 1 | 0 | 0 | 1 | 0 |
| 6.4 | 0 | 0 | 1 | 1 | 1 | 0 | 0 | 1 | 1 |
| 6.7 | 0 | 1 | 1 | 1 | 0 | 0 | 0 | 0 | 0 |
| 7.0 | 1 | 0 | 1 | 1 | 1 | 0 | 0 | 1 | 0 |
| 7.1 | 0 | 0 | 0 | 1 | 1 | 0 | 1 | 1 | 0 |
| 7.2 | 0 | 0 | 0 | 0 | 1 | 0 | 1 | 1 | 0 |
| 7.3 | 0 | 0 | 0 | 0 | 0 | 0 | 1 | 0 | 0 |
| 7.4 | 0 | 1 | 0 | 0 | 0 | 0 | 0 | 0 | 1 |
| 7.5 | 0 | 0 | 1 | 0 | 0 | 0 | 0 | 0 | 0 |
| 7.6 | 0 | 0 | 0 | 1 | 0 | 0 | 0 | 0 | 0 |
| 7.7 | 0 | 0 | 0 | 0 | 1 | 0 | 0 | 1 | 0 |
| 8.0 | 1 | 1 | 0 | 0 | 0 | 0 | 0 | 0 | 0 |
| 8.1 | 0 | 1 | 1 | 0 | 0 | 0 | 0 | 0 | 0 |
| 8.2 | 0 | 0 | 1 | 1 | 0 | 0 | 0 | 0 | 0 |
| 8.3 | 0 | 0 | 0 | 1 | 1 | 0 | 0 | 1 | 0 |
| 8.4 | 0 | 1 | 0 | 0 | 1 | 0 | 0 | 1 | 1 |
| 8.5 | 0 | 1 | 1 | 0 | 0 | 0 | 0 | 0 | 0 |
| 8.6 | 0 | 0 | 1 | 1 | 0 | 0 | 0 | 0 | 0 |
| 8.7 | 0 | 0 | 0 | 1 | 1 | 0 | 0 | 1 | 0 |
| 9.0 | 1 | 1 | 0 | 0 | 1 | 0 | 0 | 1 | 0 |
| 9.1 | 0 | 0 | 1 | 0 | 0 | 1 | 1 | 0 | 0 |
| 9.2 | 0 | 0 | 0 | 0 | 0 | 0 | 0 | 0 | 0 |
| 10.0 | 1 | 0 | 0 | 0 | 0 | 0 | 0 | 0 | 0 |

INVENTOR
KENNETH E. SCHREINER
BY

ATTORNEY

March 3, 1959  K. E. SCHREINER  2,875,951
SYNCHRONIZATION OF DISPLAY MEANS TO
SPECIFIC MICROSECOND INTERVAL
Original Filed Nov. 23, 1954  58 Sheets-Sheet 27

DECADE COUNTER 3550

| TIME | OPER-ATION | TERMINAL POINTS | | | | | | | READ OUT |
|---|---|---|---|---|---|---|---|---|---|
| | | 4 BIT | 2 BIT/A | 1 BIT | 8 BIT/B | 4717 | 4729 | 4730 | |
| N+9.1 | 1 | 0 | 0 | 0 | 0 | 0 | 0 | 0 | 0 |
| 9.2 | 0 | 1 | 0 | 0 | 0 | 0 | 0 | 0 | 0 |
| 9.3 | 0 | 0 | 1 | 0 | 0 | 0 | 0 | 0 | 0 |
| 9.4 | 0 | 0 | 0 | 1 | 0 | 0 | 0 | 0 | 1 |
| 9.5 | 0 | 0 | 0 | 0 | 1 | 0 | 0 | 1 | 0 |
| 9.6 | 0 | 1 | 0 | 0 | 0 | 0 | 0 | 0 | 0 |
| 9.7 | 0 | 0 | 1 | 0 | 0 | 0 | 0 | 0 | 0 |
| 10.0 | 0 | 0 | 0 | 1 | 0 | 0 | 0 | 0 | 0 |
| 10.1 | 0 | 0 | 0 | 0 | 1 | 0 | 0 | 1 | 0 |
| 10.2 | 0 | 1 | 0 | 0 | 0 | 0 | 0 | 0 | 0 |
| 10.3 | 0 | 0 | 1 | 0 | 0 | 0 | 0 | 0 | 0 |
| 10.4 | 0 | 0 | 0 | 1 | 0 | 0 | 0 | 0 | 1 |
| 18.4 | 0 | 0 | 0 | 1 | 0 | 0 | 0 | 0 | 1 |
| 18.5 | 0 | 0 | 0 | 0 | 1 | 0 | 0 | 1 | 0 |
| 18.6 | 0 | 1 | 0 | 0 | 0 | 0 | 0 | 0 | 0 |
| 18.7 | 0 | 0 | 1 | 0 | 0 | 0 | 0 | 0 | 0 |
| 19.0 | 0 | 0 | 0 | 1 | 0 | 0 | 0 | 0 | 0 |
| 19.1 | 1 | 0 | 0 | 0 | 1 | 0 | 0 | 1 | 0 |
| 19.2 | 0 | 0 | 0 | 0 | 0 | 0 | 1 | 0 | 0 |
| 19.3 | 0 | 1 | 0 | 0 | 0 | 0 | 0 | 0 | 0 |
| 19.4 | 0 | 0 | 1 | 0 | 0 | 0 | 0 | 0 | 1 |
| 19.5 | 0 | 0 | 0 | 1 | 0 | 0 | 0 | 0 | 0 |
| 19.6 | 0 | 0 | 0 | 0 | 1 | 0 | 0 | 1 | 0 |
| 19.7 | 0 | 1 | 0 | 0 | 0 | 0 | 0 | 0 | 0 |
| 20.0 | 0 | 0 | 1 | 0 | 0 | 0 | 0 | 0 | 0 |
| 20.1 | 0 | 0 | 0 | 1 | 0 | 0 | 0 | 0 | 0 |
| 20.2 | 0 | 0 | 0 | 0 | 1 | 0 | 0 | 1 | 0 |
| 20.3 | 0 | 1 | 0 | 0 | 0 | 0 | 0 | 0 | 0 |
| 20.4 | 0 | 0 | 1 | 0 | 0 | 0 | 0 | 0 | 1 |
| 28.4 | 0 | 0 | 1 | 0 | 0 | 0 | 0 | 0 | 1 |
| 28.5 | 0 | 0 | 0 | 1 | 0 | 0 | 0 | 0 | 0 |
| 28.6 | 0 | 0 | 0 | 0 | 1 | 0 | 0 | 1 | 0 |

INVENTOR
KENNETH E. SCHREINER
BY

ATTORNEY

| TIME | OPER-ATION | TERMINAL POINTS | | | | | | | READ OUT |
|---|---|---|---|---|---|---|---|---|---|
| | | 4 BIT | 2BIT/A | 1 BIT | 8BIT/B | 4717 | 4729 | 4730 | |
| N+28.7 | 0 | 1 | 0 | 0 | 0 | 0 | 0 | 0 | 0 |
| 29.0 | 0 | 0 | 1 | 0 | 0 | 0 | 0 | 0 | 0 |
| 29.1 | 1 | 0 | 0 | 1 | 0 | 0 | 0 | 0 | 0 |
| 29.2 | 0 | 1 | 0 | 0 | 1 | 0 | 0 | 1 | 0 |
| 29.3 | 0 | 1 | 1 | 0 | 0 | 0 | 0 | 0 | 0 |
| 29.4 | 0 | 0 | 1 | 1 | 0 | 0 | 0 | 0 | 1 |
| 29.5 | 0 | 0 | 0 | 1 | 1 | 0 | 0 | 1 | 0 |
| 29.6 | 0 | 1 | 0 | 0 | 1 | 0 | 0 | 1 | 0 |
| 29.7 | 0 | 1 | 1 | 0 | 0 | 0 | 0 | 0 | 0 |
| 30.0 | 0 | 0 | 1 | 1 | 0 | 0 | 0 | 0 | 0 |
| 30.1 | 0 | 0 | 0 | 1 | 1 | 0 | 0 | 1 | 0 |
| 30.2 | 0 | 1 | 0 | 0 | 1 | 0 | 0 | 1 | 0 |
| 30.3 | 0 | 1 | 1 | 0 | 0 | 0 | 0 | 0 | 0 |
| 30.4 | 0 | 0 | 1 | 1 | 0 | 0 | 0 | 0 | 1 |
| 38.4 | 0 | 0 | 1 | 1 | 0 | 0 | 0 | 0 | 1 |
| 38.5 | 0 | 0 | 0 | 1 | 1 | 0 | 0 | 1 | 0 |
| 38.6 | 0 | 1 | 0 | 0 | 1 | 0 | 0 | 1 | 0 |
| 38.7 | 0 | 1 | 1 | 0 | 0 | 0 | 0 | 0 | 0 |
| 39.0 | 0 | 0 | 1 | 1 | 0 | 0 | 0 | 0 | 0 |
| 39.1 | 1 | 0 | 0 | 1 | 1 | 0 | 0 | 1 | 0 |
| 39.2 | 0 | 0 | 0 | 0 | 1 | 0 | 1 | 1 | 0 |
| 39.3 | 0 | 0 | 0 | 0 | 0 | 0 | 1 | 0 | 0 |
| 39.4 | 0 | 1 | 0 | 0 | 0 | 0 | 0 | 0 | 1 |
| 48.4 | 0 | 1 | 0 | 0 | 0 | 0 | 0 | 0 | 1 |
| 48.5 | 0 | 0 | 1 | 0 | 0 | 0 | 0 | 0 | 0 |
| 48.6 | 0 | 0 | 0 | 1 | 0 | 0 | 0 | 0 | 0 |
| 48.7 | 0 | 0 | 0 | 0 | 1 | 0 | 0 | 1 | 0 |
| 49.0 | 0 | 1 | 0 | 0 | 0 | 0 | 0 | 0 | 0 |
| 49.1 | 1 | 0 | 1 | 0 | 0 | 0 | 0 | 0 | 0 |
| 49.2 | 0 | 1 | 0 | 1 | 0 | 0 | 0 | 0 | 0 |
| 49.3 | 0 | 0 | 1 | 0 | 1 | 1 | 0 | 1 | 0 |
| 49.4 | 0 | 0 | 0 | 0 | 0 | 0 | 0 | 0 | 0 |
| 49.5 | 0 | 0 | 0 | 0 | 0 | 0 | 0 | 0 | 0 |
| 49.6 | 0 | 0 | 0 | 0 | 0 | 0 | 0 | 0 | 0 |
| 49.7 | 0 | 0 | 0 | 0 | 0 | 0 | 0 | 0 | 0 |
| 50.0 | 0 | 0 | 0 | 0 | 0 | 0 | 0 | 0 | 0 |

INVENTOR
KENNETH E. SCHREINER
BY 
ATTORNEY

March 3, 1959
K. E. SCHREINER
2,875,951
SYNCHRONIZATION OF DISPLAY MEANS TO
SPECIFIC MICROSECOND INTERVAL
Original Filed Nov. 23, 1954
58 Sheets-Sheet 36
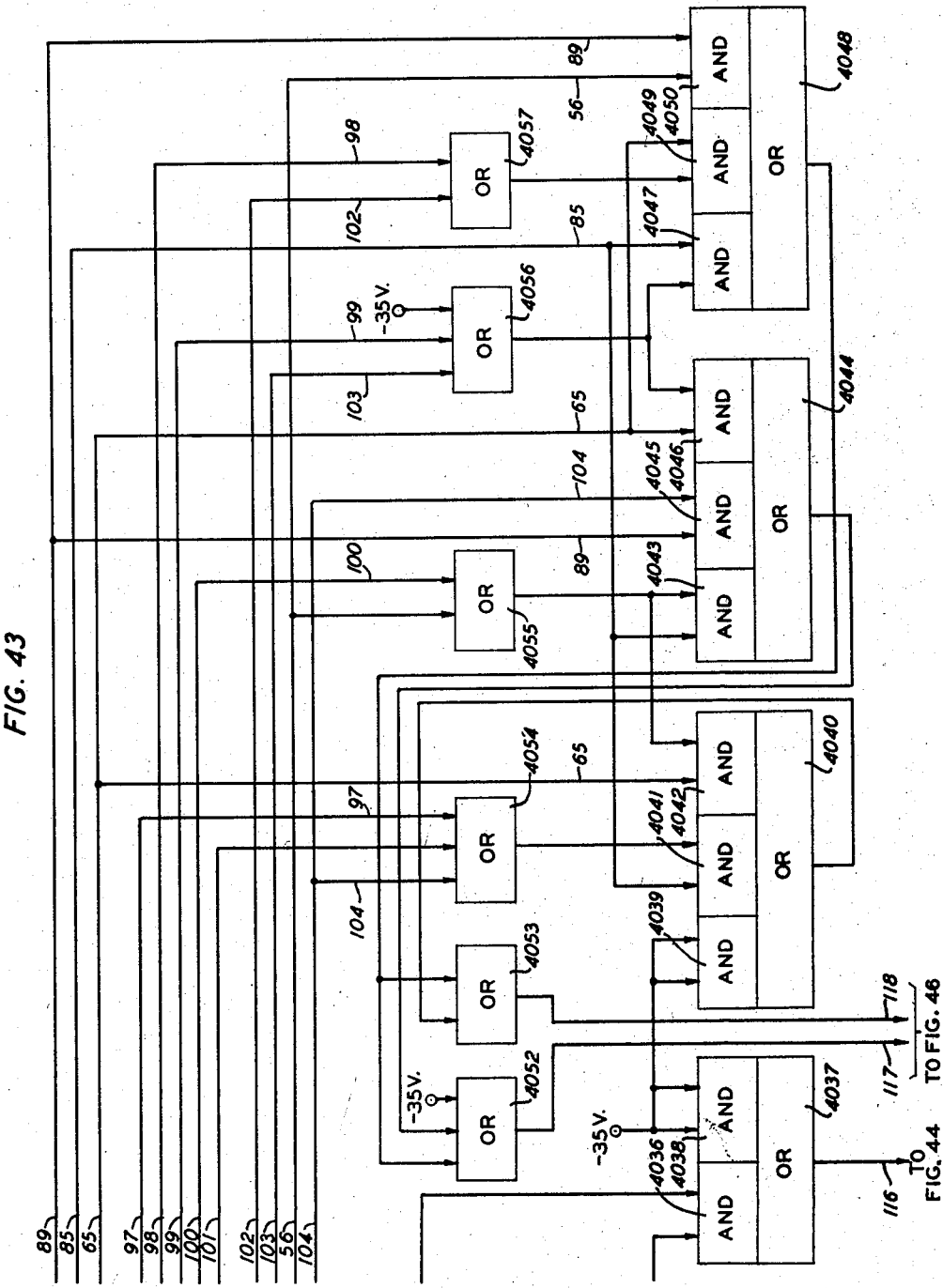
FIG. 43
INVENTOR
KENNETH E. SCHREINER
ATTORNEY March 3, 1959
K. E. SCHREINER
2,875,951
SYNCHRONIZATION OF DISPLAY MEANS TO SPECIFIC MICROSECOND INTERVAL
Original Filed Nov. 23, 1954
58 Sheets-Sheet 51
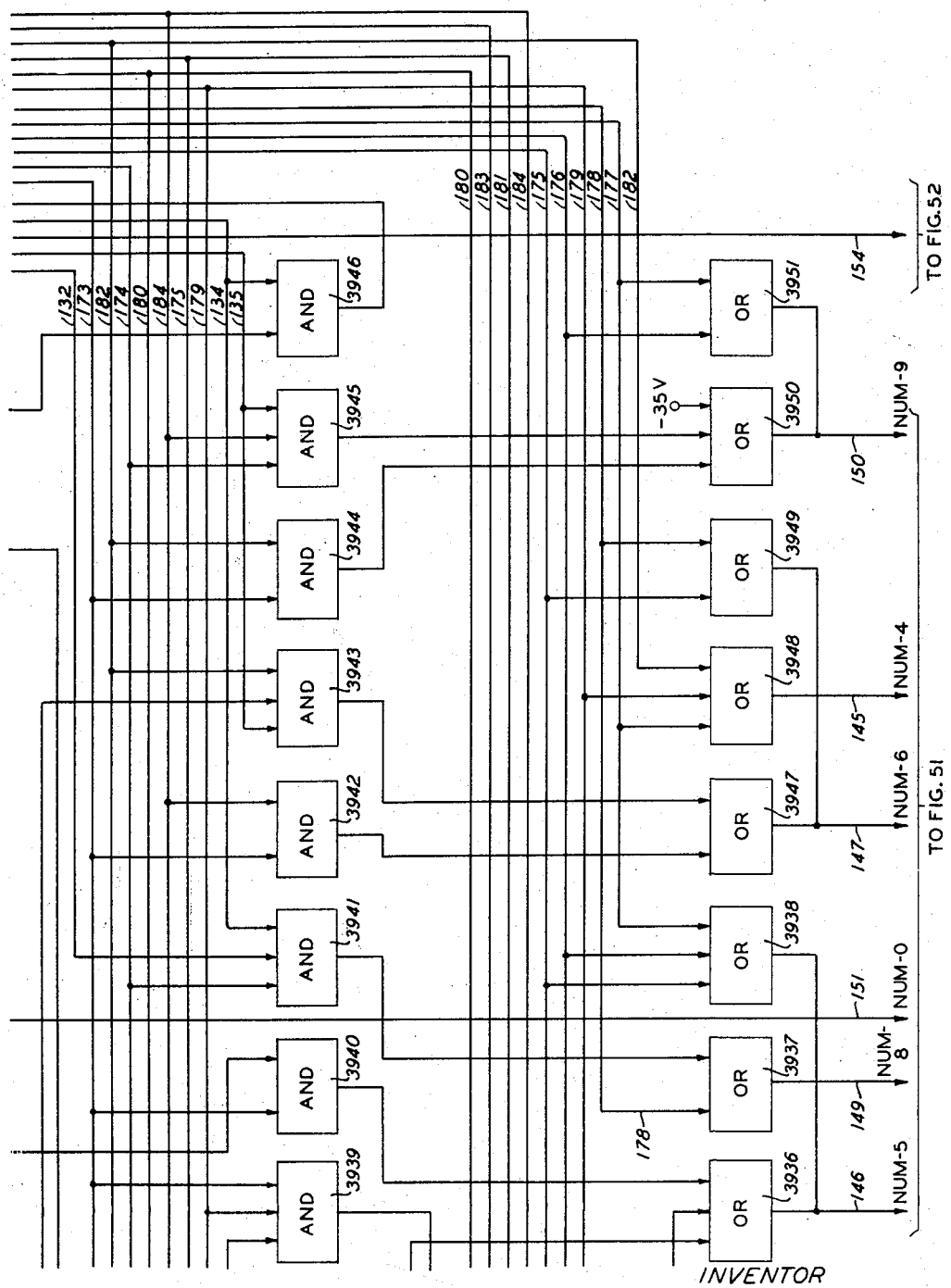
FIG.58
INVENTOR
KENNETH E. SCHREINER
ATTORNEY

INVENTOR
KENNETH E. SCHREINER
BY
ATTORNEY

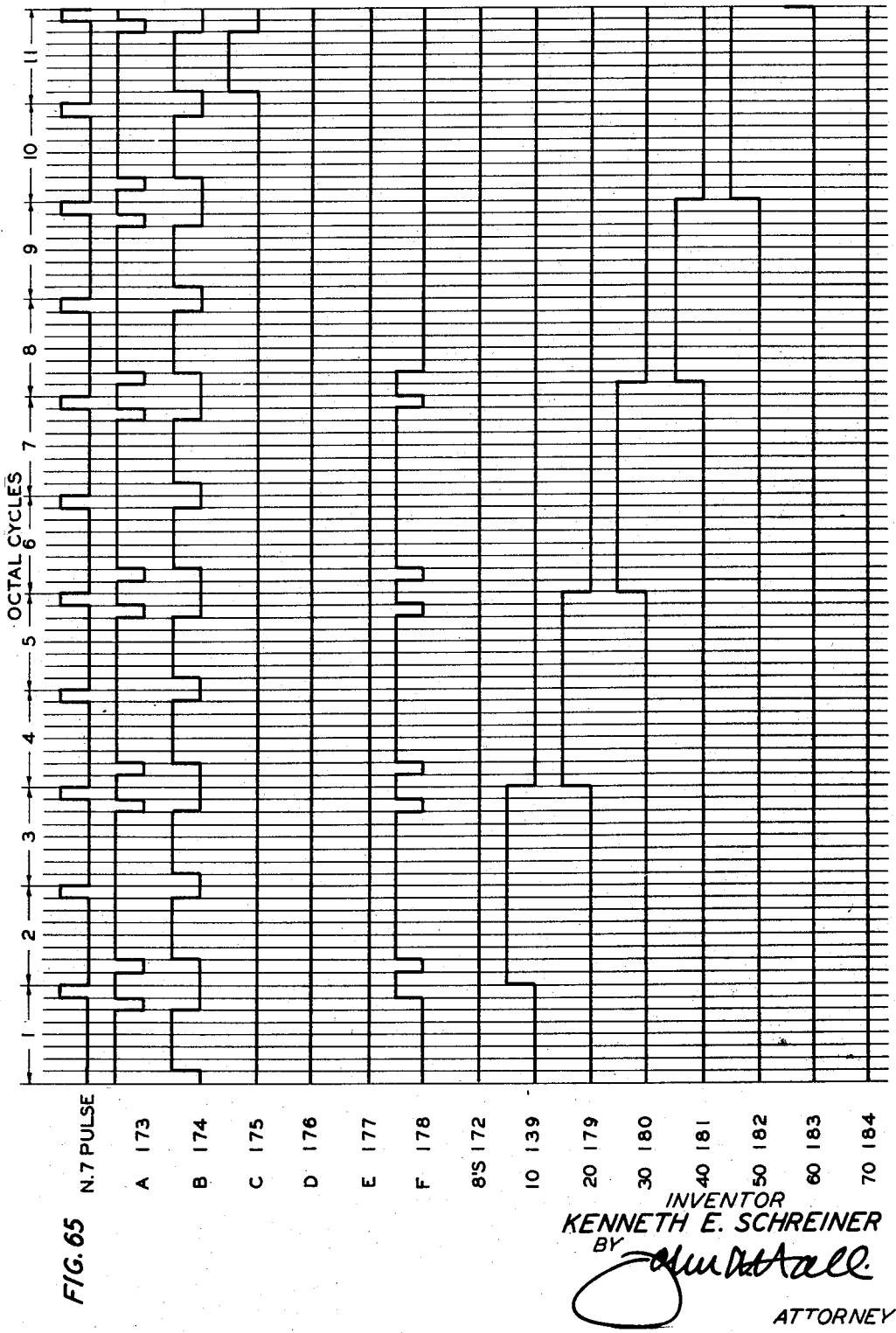

INVENTOR
KENNETH E. SCHREINER
BY
ATTORNEY

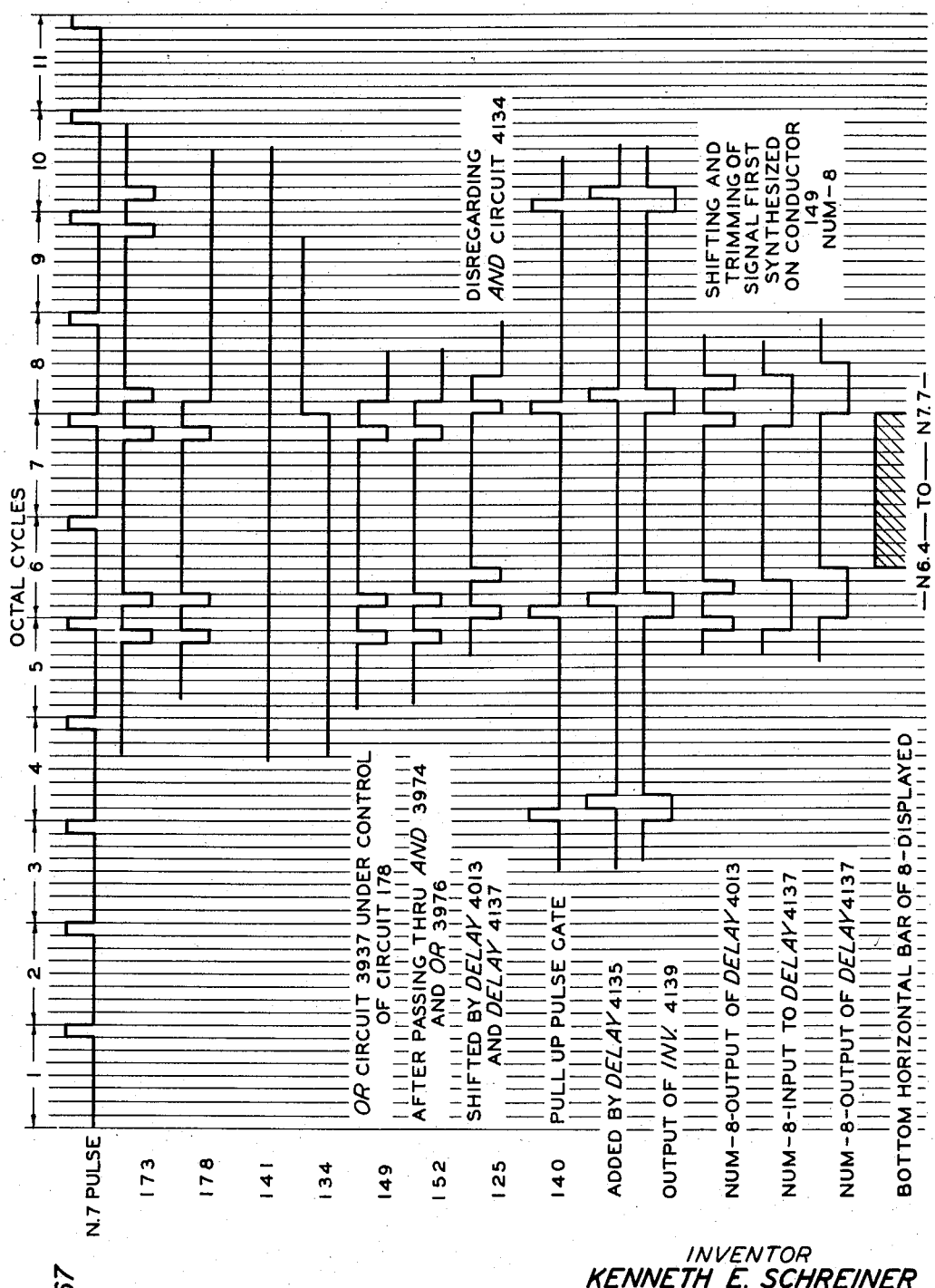

United States Patent Office 2,875,951
Patented Mar. 3, 1959

2,875,951

SYNCHRONIZATION OF DISPLAY MEANS TO SPECIFIC MICROSECOND INTERVAL

Kenneth E. Schreiner, Harrington Park, N. J., assignor to International Business Machines Corporation, New York, N. Y., a corporation of New York Original application November 23, 1954, Serial No. 470,570. Divided and this application May 23, 1955, Serial No. 510,118

7 Claims. (Cl. 235—153)

This is a division of application Serial Number 470,570, filed November 23, 1954.

This invention relates to display devices and particularly to means for producing a visual indication of information contained in various registers of high speed electronically operated digital computers or other like devices. This divisional application relates specifically to the provision of a synchronizing point or terminal which may be controlled to emit a signal at a selected time interval of a given operation of a high speed electronically operated network whereby conditions obtaining in other parts of the network at such precise time may be gated in to a display device for visual examination.

An object of the invention is to provide means whereby an attendant at the control console of a computer may by a simple operation cause the contents of certain registers, at any given point in the operation of such computer and as selected by his knowledge of the programming thereof, to be displayed, to the end that a check on the proper operation of such computer may be made. Such a checking display may be made under various conditions as, by way of example, when the operation of the computer has been automatically halted by the production of a failure signal or when the operation thereof has been brought to a halt by the attendant in an effort to examine some particular suboperation.

It is to be understood that the present device is not an essential element of the computer itself but is a useful adjunct thereto and that it is not limited to use with a computer but may be employed as an adjunct to any like device where information is stored in registers, usually in the form of codes.

Another object of the invention is to provide means for looking into registers where information is stored in coded form and to translate such codes and display such information in the form of Arabic numerals. While, in the preferred embodiment of the invention, disclosed herein, only Arabic numerals are illustrated, it is to be understood that through the principles of the invention any other type of characters may be formed as letters of the alphabet, mathematical signs, representative diagrams, hieroglyphs, and so forth.

In accordance with the present invention, means is provided to "look" at the information contained in certain given fields of a high speed digital calculator or any other like device. In the preferred embodiment of the invention herein disclosed, the calculator chosen for illustration operates on a microsecond basis and is one in which no single complete suboperation takes over four hundred microseconds. Accordingly the device of the present invention is constructed and arranged to perform a plurality of minor operations successively each in a period of four hundred microseconds, it being understood that the invention is not limited to such time interval but may be rearranged within the principles of operation herein set forth to operate in like manner in any convenient time interval. Accordingly a first means is provided in the present device to transmit a signal to the principal calculator to enable it to start the performance of a given suboperation. Counting means is provided to count off elapsed time so that at any given interval in the suboperation of the principal calculator the contents of certain fields therein may be taken off and converted into a visual display in the device of the present invention.

There is provision to display 80 numerals in four rows of 20 each on the faces of four rows of cathode ray tubes. Two numerals, one each in two rows, are displayed simultaneously so that it is necessary to go through the 400 microsecond cycle 40 times, a different pair of the numerals being displayed during each such cycle, after which the operations through these forty minor cycles is repeated in a second major cycle. Thus each major cycle is of 16,000 microseconds or 16 milliseconds' duration and hence each numeral is displayed during each 16 millisecond period so that due to the persistence of the illumination of the cathode ray tube the display appears to be continuous.

By way of explanation let it be assumed that a given suboperation of the principal calculator takes 244 microseconds, that the calculator has come to a halt and a failure signal has been displayed. Since it is known from the programming at just which step in the suboperation a given result might be expected, the device of the present invention is set to look at the given field at such an interval. Accordingly as many as 80 numerals each expressed in a four place (pure binary) code are successively transferred from the said field of the calculator and displayed by the cathode ray tubes of the present invention. These 80 digits are displayed in the form of Arabic numerals on the faces of 20 cathode ray tubes, four numerals on the face of each tube.

At the end of each 400 microsecond period the main calculator is recycled automatically. Therefore if the given information in the given field is stationary, either through the calculator coming to a halt automatically or being halted by the operator, that is, if it is repeated in each recycled suboperation of the principal calculator, it will be repeatedly displayed on the face of the said cathode ray tubes and through the long persistence effect of such tubes will appear as a visual display thereon.

It will be understood that a single display within a single 400 microsecond period would be entirely inadequate for comprehension so that unless the same information is glimpsed by the device on each of the said recycled suboperations of the calculator no comprehensible display will be provided. However, the present device affords a means for examining the contents of fields such as the registers of the arithmetic section and the registers containing the routine and other information pertinent to the suboperation on which the calculator has halted.

A feature of the invention is a means to detect a given step of calculator operation in a series of successive small time interval high speed steps, to thereupon transfer a plurality of bits of information to the device of the present invention, to thereafter successively display the said transferred bits and to thereafter recycle the said operations to produce a periodic display of said information.

Another feature of the invention is the use of cathode ray tubes on the face of which characters such as Arabic numerals are traced repeatedly at high speed to produce a steadily maintained visual indication. As hereinabove set forth, the tracing of a numeral is repeated during each successive sixteeen millisecond period, though it must be understood that this particular period is not critical but may be changed within the spirit of the invention to suit any other adapted form of the device.

In general, the use of cathode ray tubes in this manner and for this purpose is conventional, but applicant's device contains certain specific improvements which will be set forth in detail hereinafter.

Another feature of the invention is a comparatively simple fundamental raster for the cathode ray tubes consisting of seven straight lines, three horizontal, one diagonal, and three vertical. These lines are developed sequentially in a given order and each in a given time interval whereby any character or numeral may be formed by the selected display of certain of these lines or parts thereof.

The beam of each cathode ray tube is then driven continuously and repeatedly over this standard raster but the beam is normally blocked so that no display is produced. In order to achieve the desired result, the beam is then unblocked at selected time intervals during the sweep of the beam over its raster so that given lines and portions of said lines are brightened and made to show as illuminated tracks on the face of the tube, such fragmentary display of said lines combining to form a well defined Arabic numeral.

A feature of the invention is the formation of Arabic numerals from selected lines and portions of a plurality of straight lines.

Another feature of the invention is a means for operating the said cathode ray tubes by coded signals. In accordance with this feature, both the movement of the beam over its raster and the unblocking of the beam while traversing said raster is accomplished by serially coded signals transmitted as irregularly spaced and timed on and off signals.

Another feature of the present invention is a translating means for doubly translating a coded and registered digit, first from a code expressed on a plurality of parallel signal paths to a single signal on a single one of a plurality of signal paths and second from such a single signal to a train of irregularly spaced and timed signals delivered to a circuit leading to the beam of a cathode ray tube for unblocking certain lines and portions thereof of the raster of said tube.

Another feature of the invention is a means consisting of a first high speed electronic commutator for continuously, repeatedly and successively emitting pulses over a plurality of output leads. This device is known as an octal commutator and alone is conventional. However, by its use, counters, latches and other commutators may be driven, first to synthesize trains of regularly spaced on and off signals of different lengths and secondly to synthesize other trains of irregularly spaced on and off signals each characteristic of a given numeral or other desired character. These various trains of signals are strictly synchronized with the coded signals for the raster so that the unblocking of the beam will properly occur at the desired times to synthesize illuminated portions of the raster into the different numerals.

This means may then be stated as means for synthesizing coded trains of signals for driving the deflection circuits of a cathode ray tube as well as for controlling the intensity of the beam in timed relation to the deflection thereof.

The raster hereinbefore described consumes sixteen octal cycles, one for preparation, two for each of the seven lines of the raster and one for termination.

The electronic circuit above noted operates to produce ten various output codes, depicted as numeral graphs, each of which when applied to the grid of a cathode ray tube simultaneously with the application to the deflection plates of the signals to produce the given raster, will operate to unblank selected portions thereof and thus trace a given and corresponding numeral. This given electronic circuit consists of a plurality of counters operating under control of the said octal commutator and therefore fundamentally comprises a commutator which will put out on a plurality of leads varying periodic trains of pulses which may thereafter be combined in any given manner to form, within a given period, non-periodic trains for any given purpose.

Another feature of the invention is a plurality of electronic commutators for generating pulses on a microsecond basis and logical circuits for combining pulses into recurrent intervals of various lengths of on and off conditions whereby given patterns of operational controls may be provided. By such means operational patterns for various numerals or any other characters may be produced and then selectively applied to responsive circuits to cause display of such numerals or characters. By such electronically produced and commutated on and off operational intervals, all built up from microsecond intervals, the sweep circuits of cathode ray tubes may be controlled to produce a given raster successively in a plurality of tubes.

Another feature of the invention is a means for confining the cathode ray tube raster to a small given area of the face of the tube combined with means for changing the position thereof periodically whereby a row of a plurality of numerals may be displayed thereon. Each cathode ray tube then becomes a means for displaying several numerals so that a plurality of tubes may be employed to display a long row of numerals.

Another feature of the invention is a counter, primarily controlled by the octal commutator pulses, operating on the principle of the octal commutator and including a binary adder for interpolating pulses in an otherwise regular succession of pulses to produce a variation in the regularity thereof whereby a characteristic counting operation may be produced.

Another feature of the invention is a time interval selector, consisting of a counting means which will first trigger a given suboperation of the device being examined and then keep pace with the successive time intervals of such device until a given point is reached whereupon the information registered will be transferred and registered in the circuits of the present device. In other words, upon the triggering of a calculator suboperation, both the calculator and the device will step or count off microseconds simultaneously so that as the present device reaches a selected one, say 98, then the calculator will reach the same numbered interval. It may be noted that all delay devices are controlled by a common synchronizing current and a common clamping current so that the counting devices each of which contains delay circuits are kept strictly in step with each other. Therefore, when the present device has counted off this (assumed) 98 intervals the calculator will have accurately reached this same stage so that the information developed at this point may be taken off for display.

Another feature of the invention is a circuit arrangement for detecting and examining an error in which a number greater than nine may be erroneously expressed by the four place binary code. Since all decimal digits in this system are expressed by the 1, 2, 4 and 8 bit, four place code, it is also possible to express the decimal numbers 10, 11, 12, 13, 14 and 15 by this same code. Therefore means is provided responsive to the existence of such a code to detect any one of these greater-than-nine numbers and to prevent any display when such a code is presented for display. By the use of a greater-than-nine detector, a blank display is produced. As an adjunct thereto a greater-than-nine key is put at the disposal of the operator by means of which he may effectively produce the display of the modulo eight value of such greater-than-nine number. Since no number greater than fifteen may be expressed by this four place code, the modulo eight value thereof may be produced by the simple expedient of casting out an eight, thus leaving the modulo eight value still expressed by the code. This, again, is simply done by suppressing the signal on the 8 Bit code wire. Thus, if the code expressed had been 1111 or 15, the suppression of the 8 Bit would have produced 0111 or 7. Hence, if a blank is produced on the face of a display tube at any given position, the operator merely pushes the greater-than-nine button and if thereupon a 7 is displayed he will known at once that 7+8=15 was registered in this position, whereupon he may take steps to search out the reason for this error and to rectify it.

The means of this feature, then consists of two components (1) a greater-than-nine detector for insuring a blank display responsive to a number greater than nine, and (2) a means for temporarily subtracting an eight from this number to produce another number which will be properly displayed.

In a preferred embodiment of the invention there is a scanning means for constantly and regularly testing a large plurality of terminals to detect one, which in orderly arrangement has been previously marked. These terminals are arranged in combinations so that the scanning operation becomes a search for a particular combination, which when found produces an operational signal.

The operative element of the scanning device is an electronic inequality detector, a means into which values from a counter and from the field being scanned are simultaneously entered in each successive time interval until at the predetermined time interval the device reports equality and thereby produces a signal. By such means a signal may be produced at any given stage in an operation. Thus the values stored in various fields and registers at any given stage in a calculator suboperation may be glimpsed, the record found may be taken off and stored temporarily and then processed for display.

Another feature of the invention is a means for successively taking off and storing separate items of information from the selected fields and for then correspondingly displaying such items in different display devices, carrying out these successive operations repeatedly and swiftly enough to produce a seemingly simultaneous and steady display of the entire field being scanned.

Another feature of the invention is a signal shifting and trimming arrangement. While from considerations of ideals it would appear that the synthesis of the trains of irregularly spaced signals for delivery to the grid circuits of the cathode ray tubes for unblocking the selected portions of the selected lines of the raster should be complete and final it has been found that for engineering reasons it is simpler and more economical to introduce an additional operation, that of shifting the signals of the train in time and trimming the signals to size. Thus what might at first glance appear to be a complication, turns out to be a unique arrangement of apparatus and a highly satisfactory operation. In applicant's specific embodiment of the present invention it will appear that each synthesized train of numeral pulses is automatically shifted two microseconds in time, that is each pulse of such a train is delivered two microseconds after synthesis and then delivered to the grid circuit of the tube, and that during the shifting certain unwanted portions of the signal are trimmed off. It will appear hereinafter that the complete raster development period consists of seven periods each of sixteen microseconds, or two octal cycles. However, time must be afforded after the beam has traced one line of the raster for it to move to the position to start the next line. This has been set at the ample time of two microseconds, so that of the sixteen microseconds, only fourteen have been used for the actual tracing of a line. Therefore there is a period of two microseconds between the tracing of each line of the raster during which the grid of the tube is blocked or denied any signal so that a signal previously synthesized and transmitted toward said grid circuit is effectively trimmed by being disabled over these two microseconds. In greater detail it will appear hereinafter that this is a three step process, the signal having been synthesized in its original form is transmitted toward its destination through a delay circuit by which it is shifted one microsecond in time and then presented for further transmission to an And circuit which, however, is under control of certain pulses which later become the pull up pulses of the tube so that during the existence of these pulses and the said And circuit is prevented from forwarding the said signals whereby any part thereof falling within this disabled time of the said And circuit are lost, or rather, effectively trimmed off and lastly the remainder of the synthesized signal, trimmed as above stated is then passed through another delay circuit which again shifts it one microsecond in time. This circuit then shifts, trims and shifts the synthesized signal and since the means for doing this is common to all the many parts of the numerous signals passing therethrough it effects a great saving in the otherwise necessary individual circuit components for each signal of each train.

Other features will appear hereinafter.

The drawings consist of fifty-eight sheets, having sixty-seven figures, as follows.

Fig. 1 is a symbol used to represent in other more extensive logical diagrams a 4 to 9 converter;

Fig. 2 is a logical circuit arrangement of And-CF and INV-CF circuits interconnected to form a 4 to 9 wire converter;

Fig. 3 is a symbol used to represent an inequality detector;

Fig. 4 is a logical circuit arrangement of And, Or, And-CF and INV-CF circuits interconnected to form an inequality detector;

Fig. 8 is a block diagram indicating how Figs. 9, 10, 11, 12, 65 and 66 may be placed to constitute a time chart;

Figure 13:
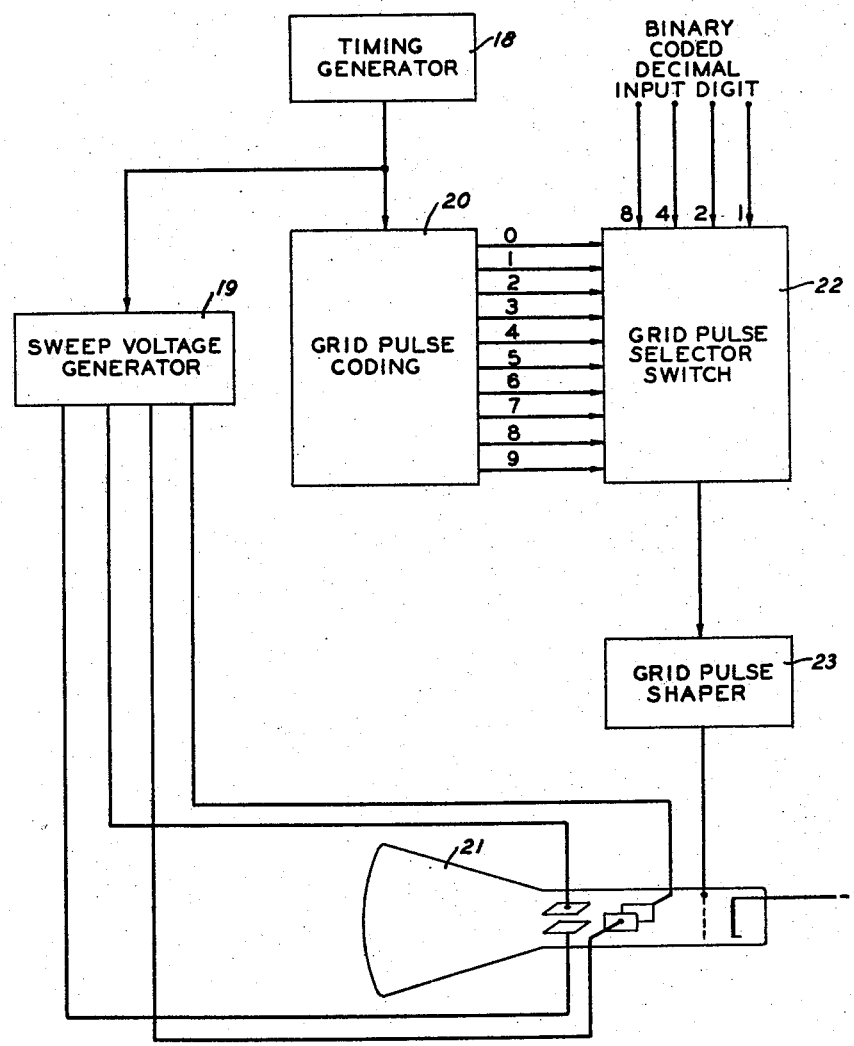
Figure 19:
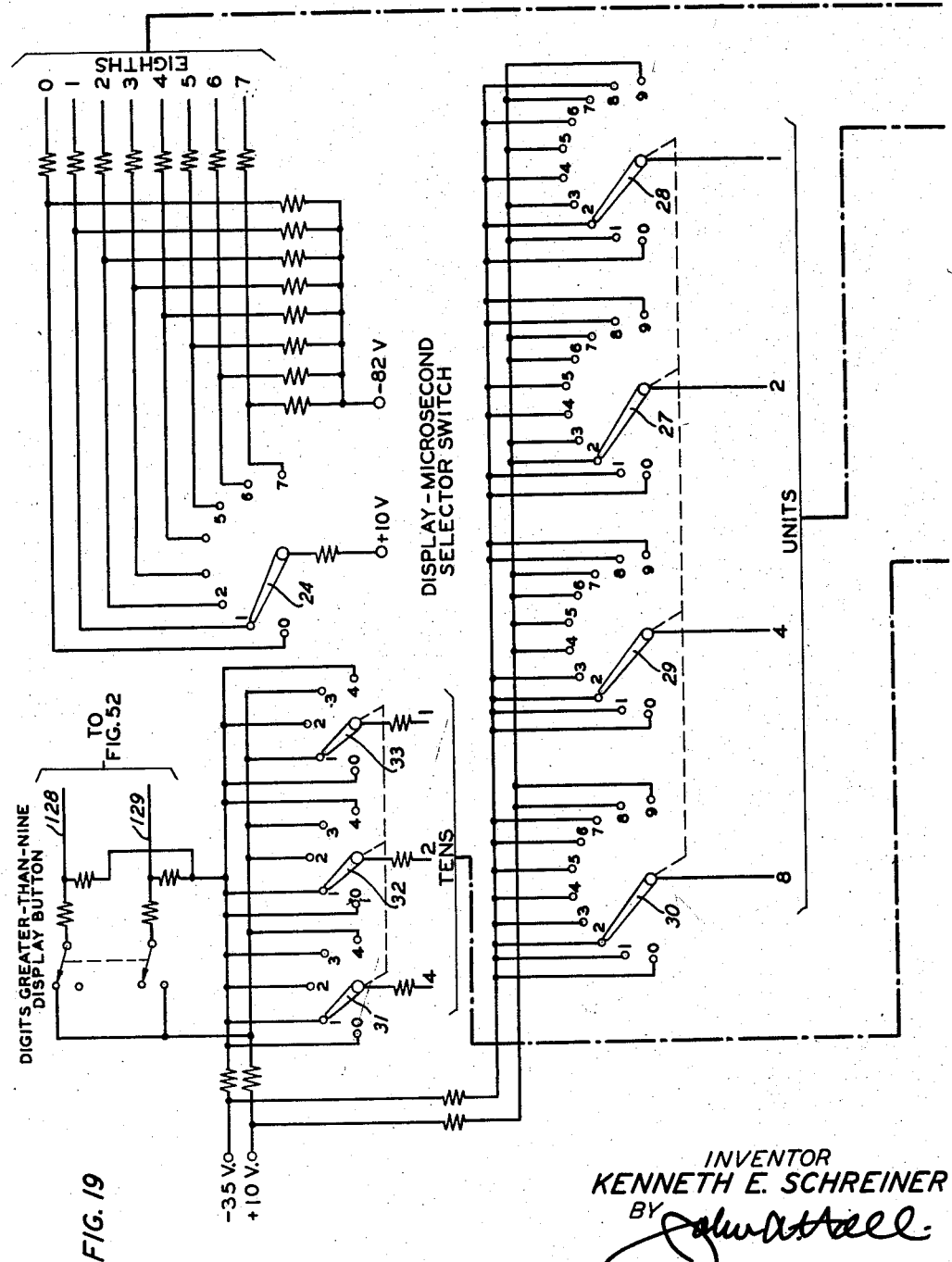
Figure 20:
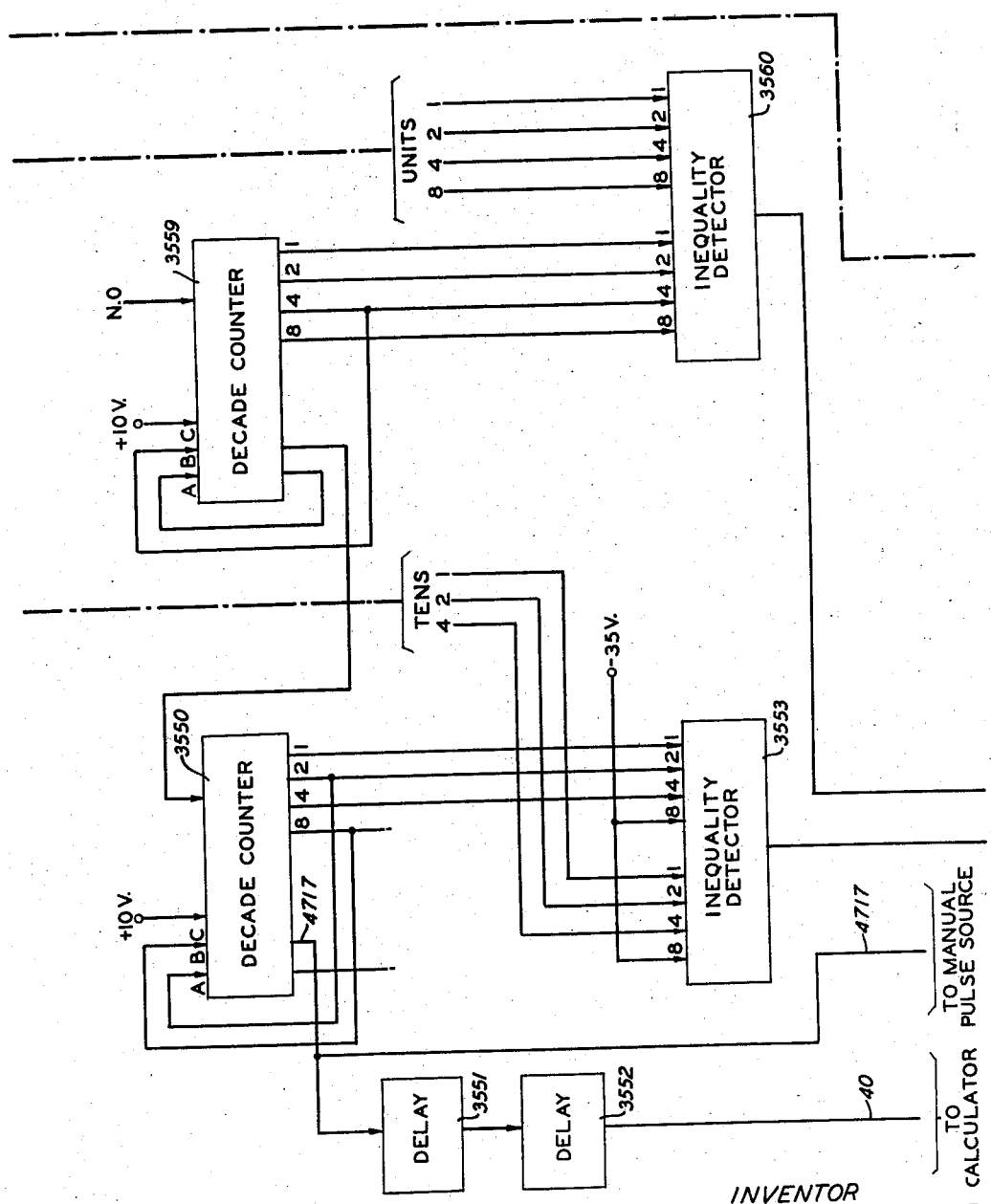

Figs. 9 to 12 inclusive constitute a time chart giving a large number of graphs depicting operations during the first 256 microseconds of the minor cycle of 400 microseconds and during which the numeral is formed and displayed twice in succession;

Fig. 13 is a greatly simplified drawing showing the fundamental aspects of the means employed for translating a digit expressed in pure binary code into an Arabic numeral displayed on the face of a cathode ray tube;

Figs. 14A, 14B, 14C and 14D are block diagrams showing how twenty cathode ray tubes may be placed in four rows of five tubes each to provide for the display of eighty numerals from various fields within the calculator;

Fig. 15 is a block diagram showing how Figs. 16 and 17 may be placed to provide a schematic block diagram to show the cooperative relationship of the various principal components of the device;

Figs. 16 and 17 when placed in the positions indicated in Fig. 15 constitute a schematic diagram of the various principal components of the device by means of which the general plan of operation and the cooperative relationship of these components may be explained;

Fig. 18 is a block diagram showing how Figs. 19 to 30, 38 to 47, and 50 to 58 are to be placed to show the interconnections of various components to provide a complete logical schematic circuit diagram corresponding generally to the matter shown schematically in Figs. 16 and 17;

Fig. 19 shows the Microsecond Selecting Switches indicated in Fig. 16 as the component 4718;

Fig. 20 shows the decade counters indicated in Fig.

Figure 21:
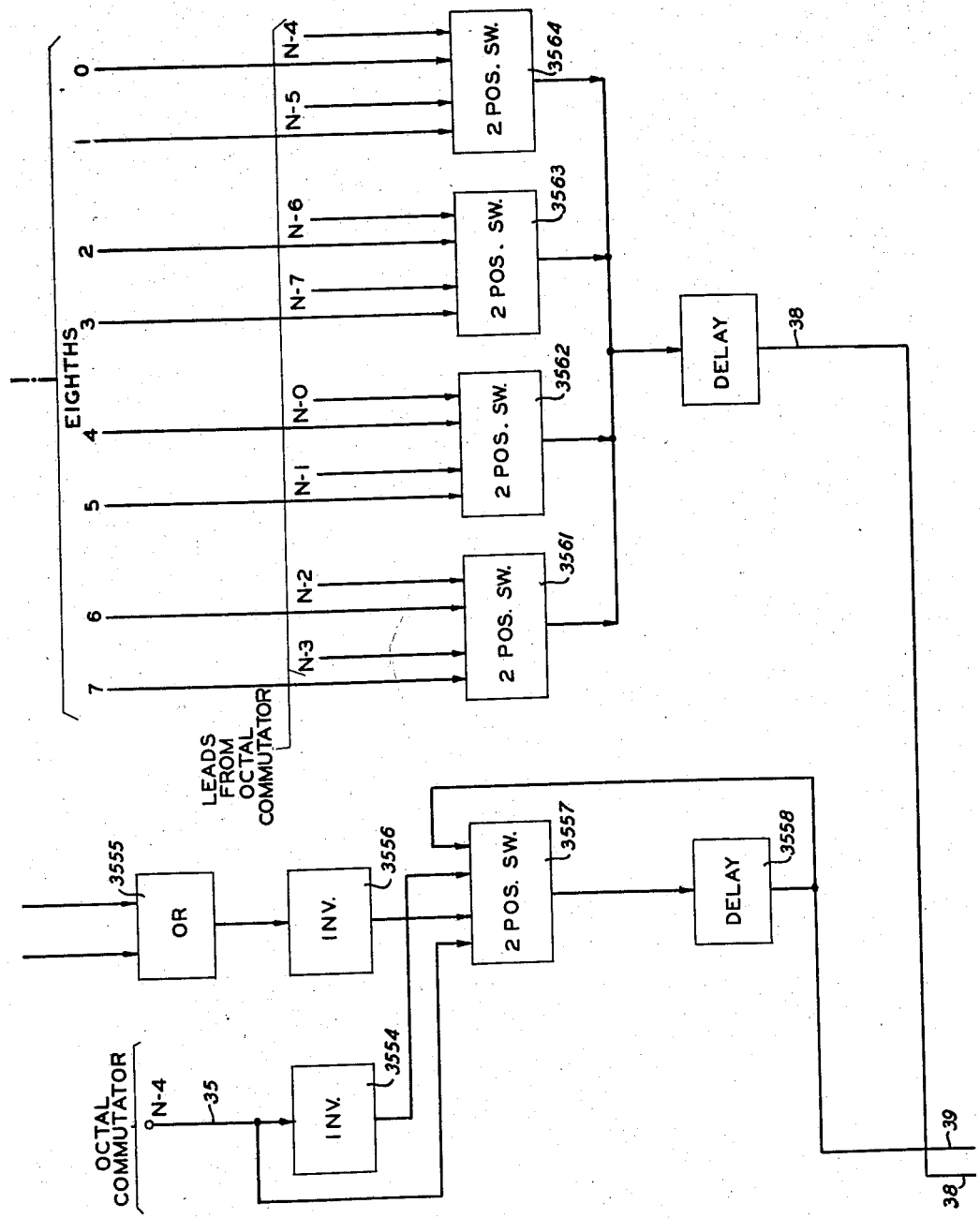
Figure 22:
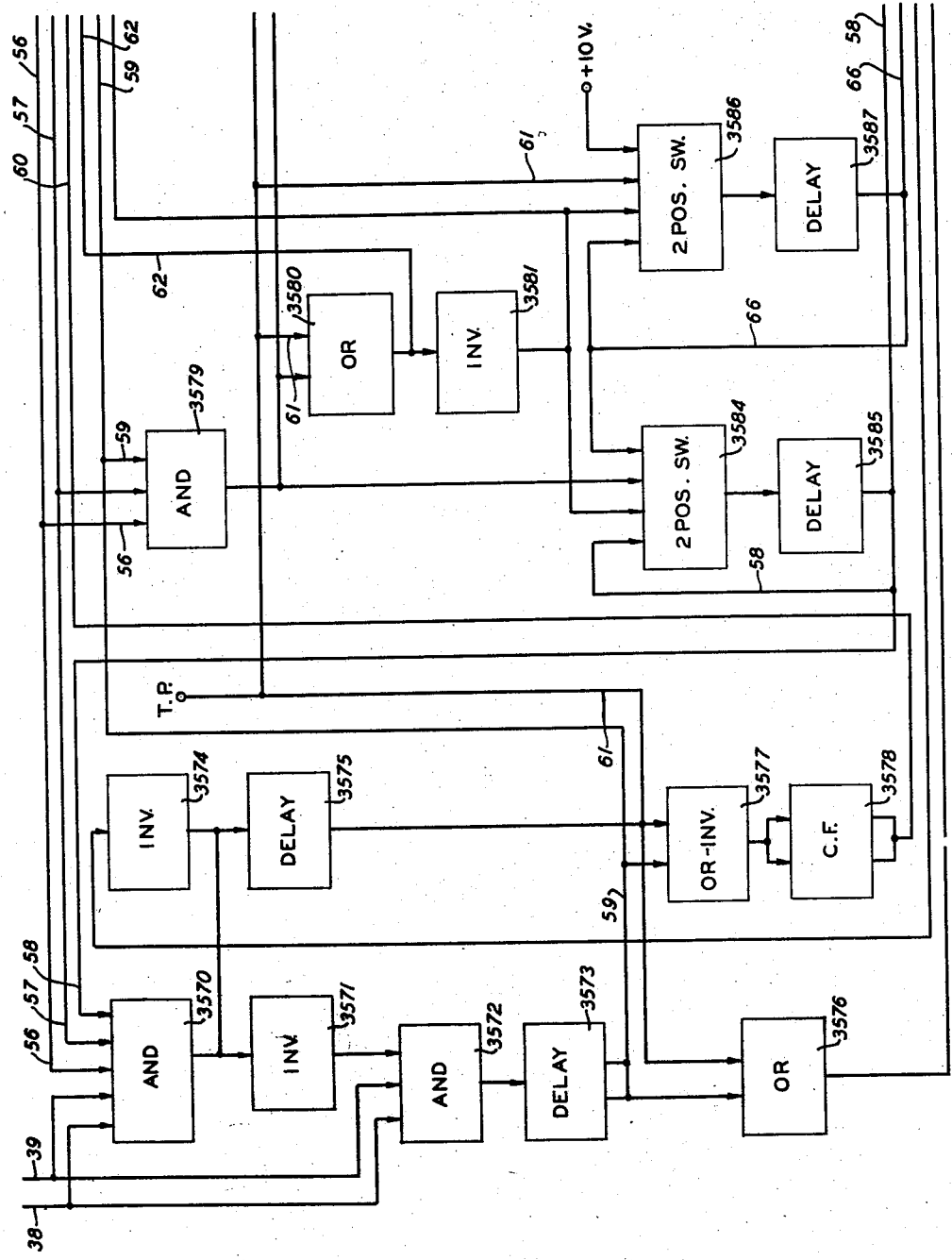
Figure 23:
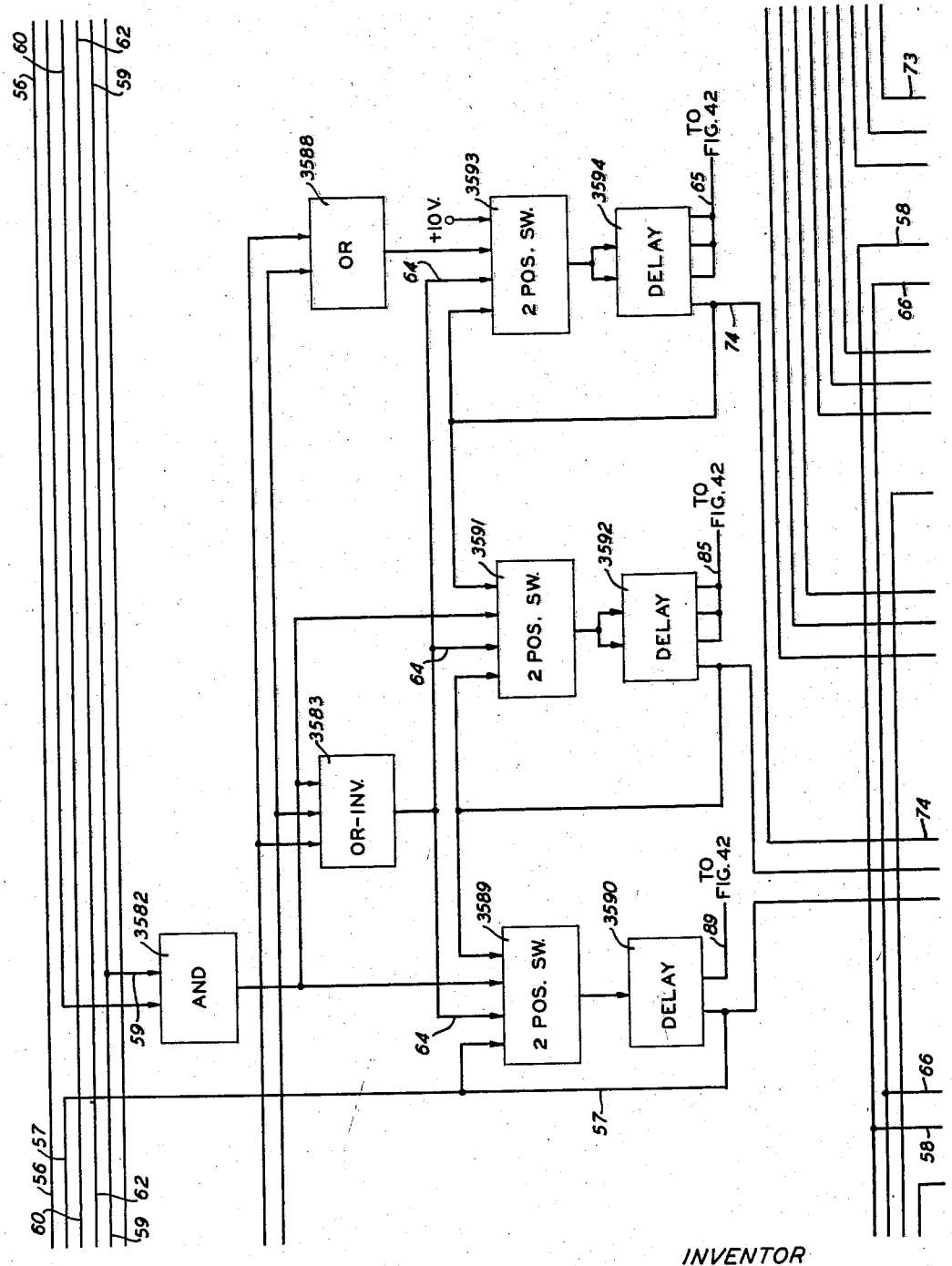
Figure 24:
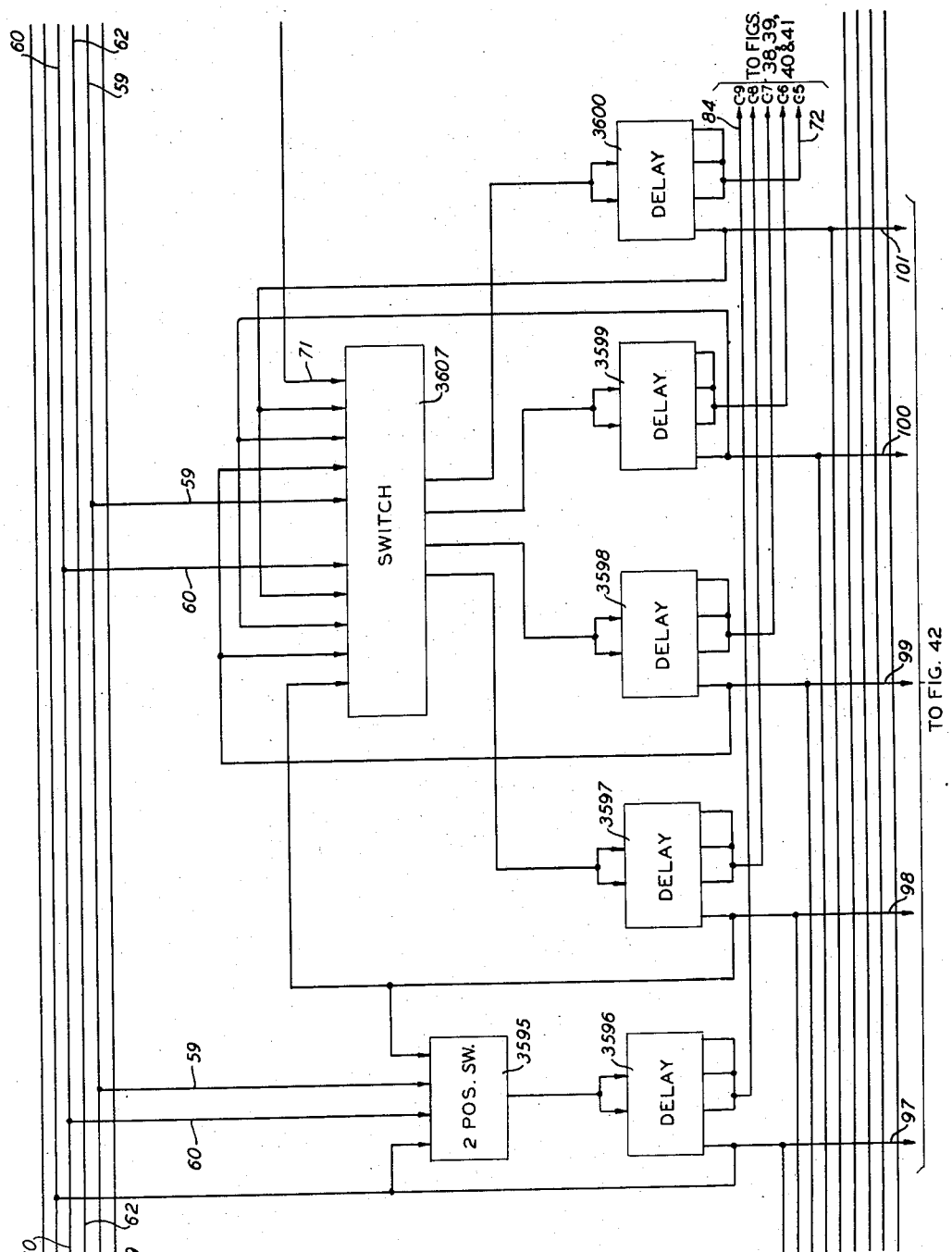
Figure 25:
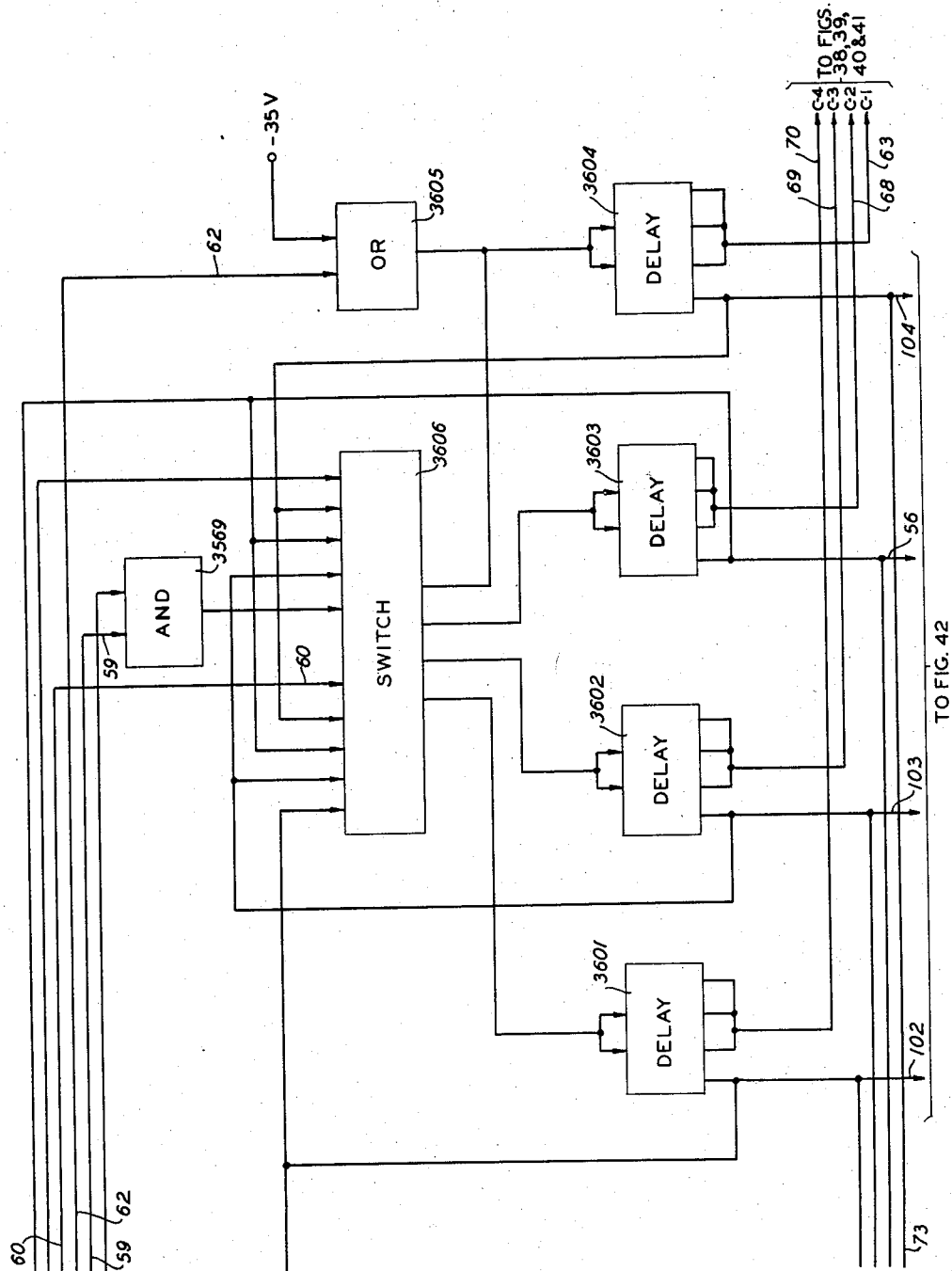
Figure 26:
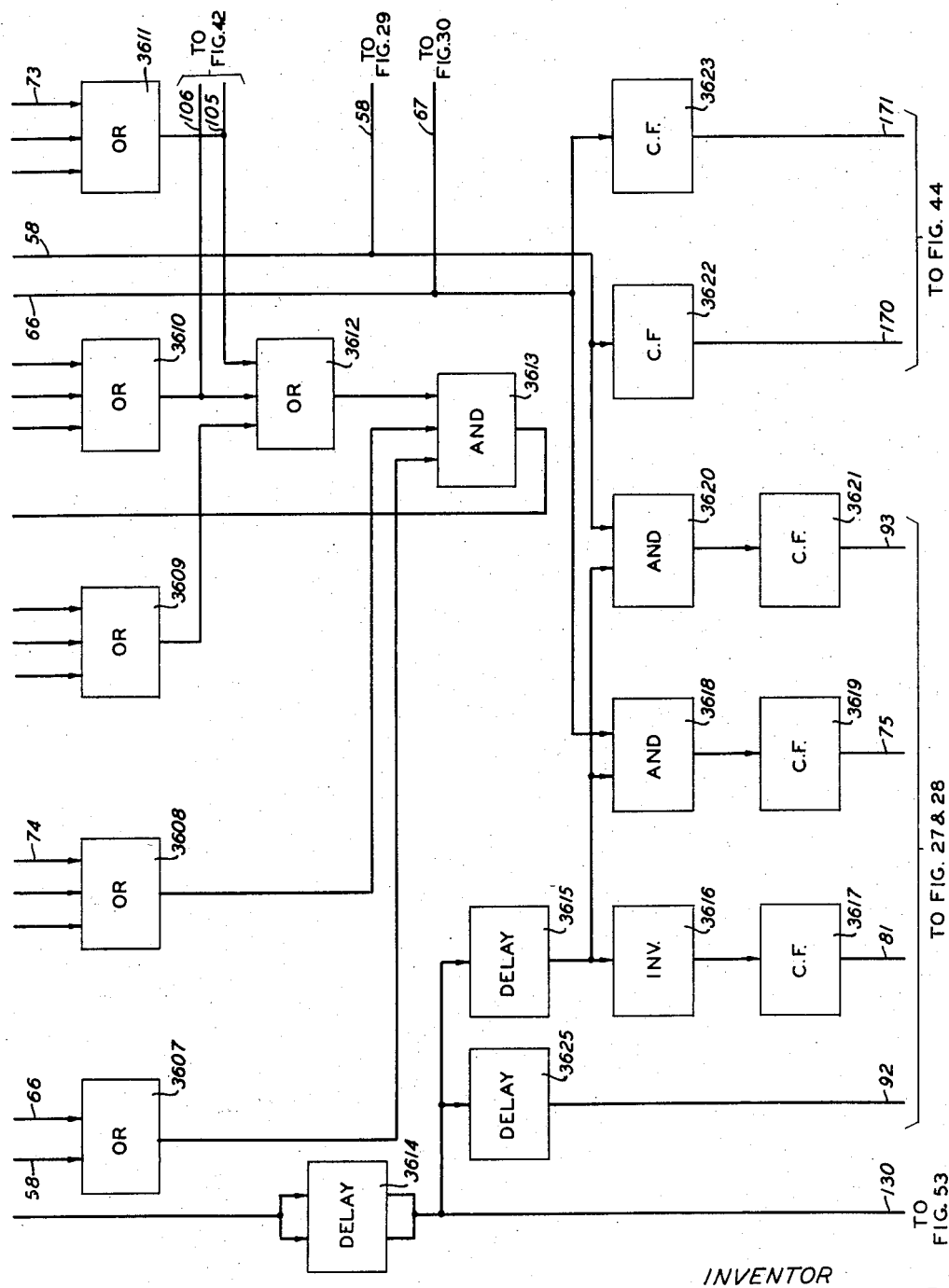
Figure 36:
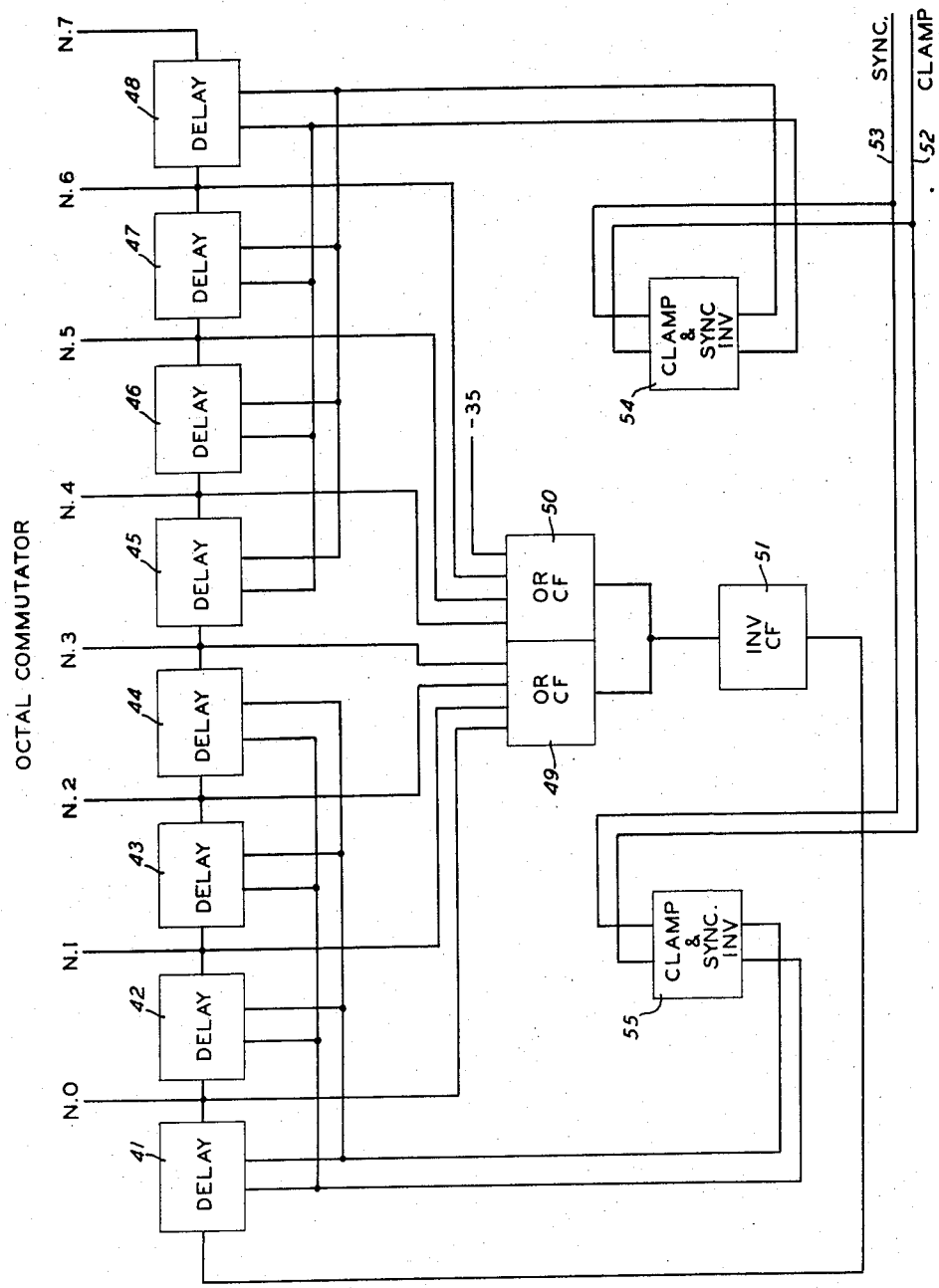
Figure 37:
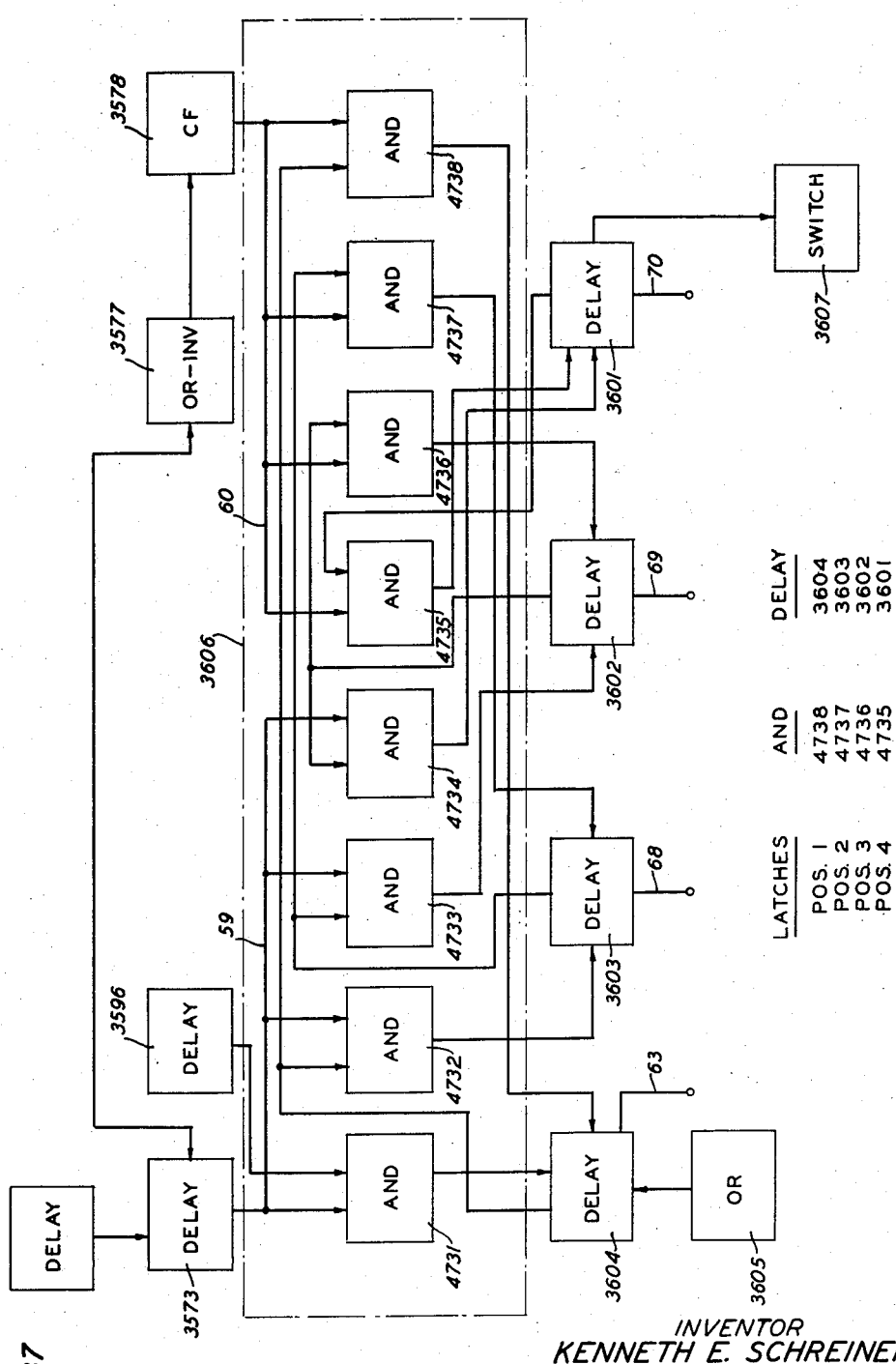
Figure 38:
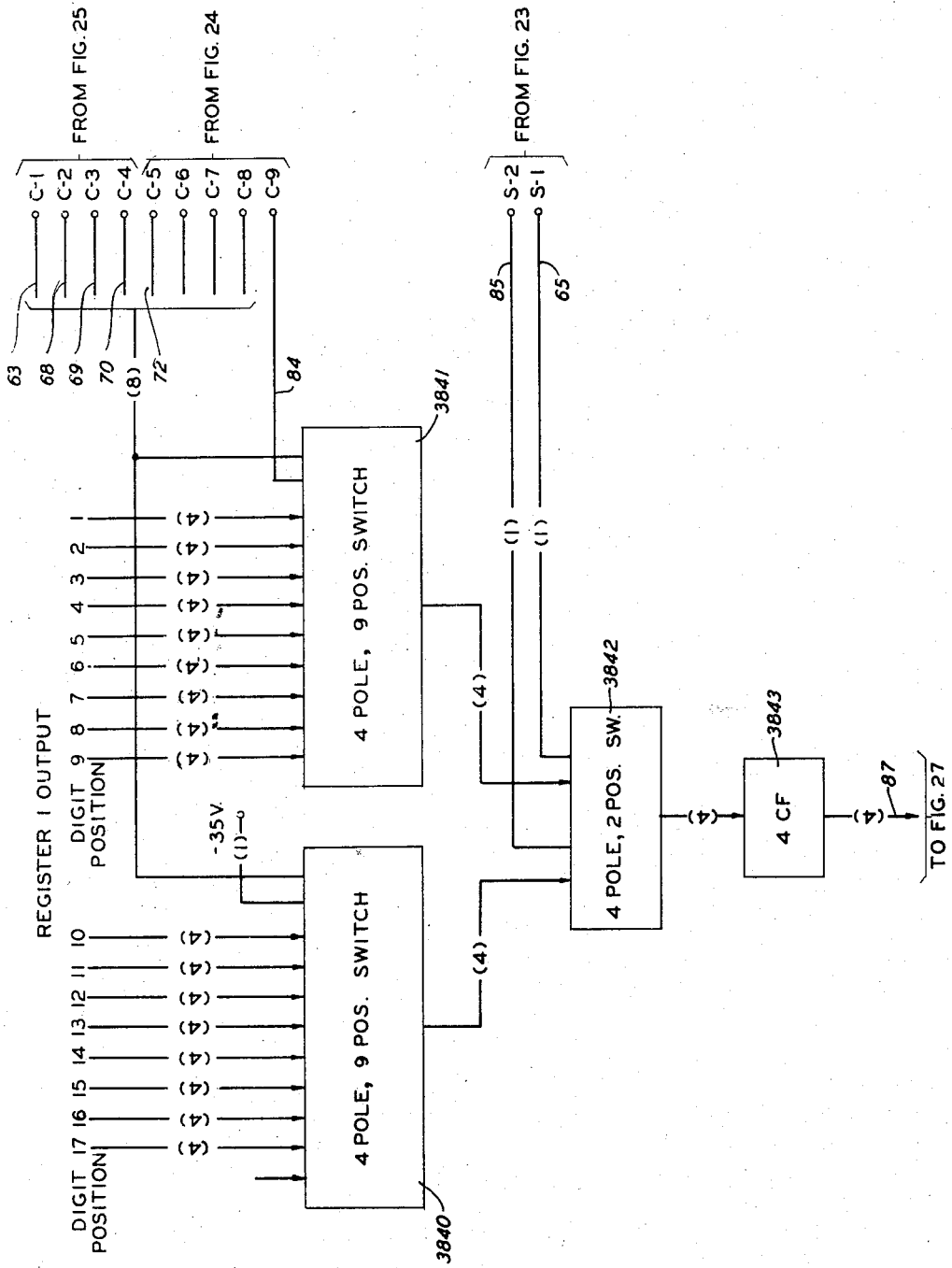
Figure 39:
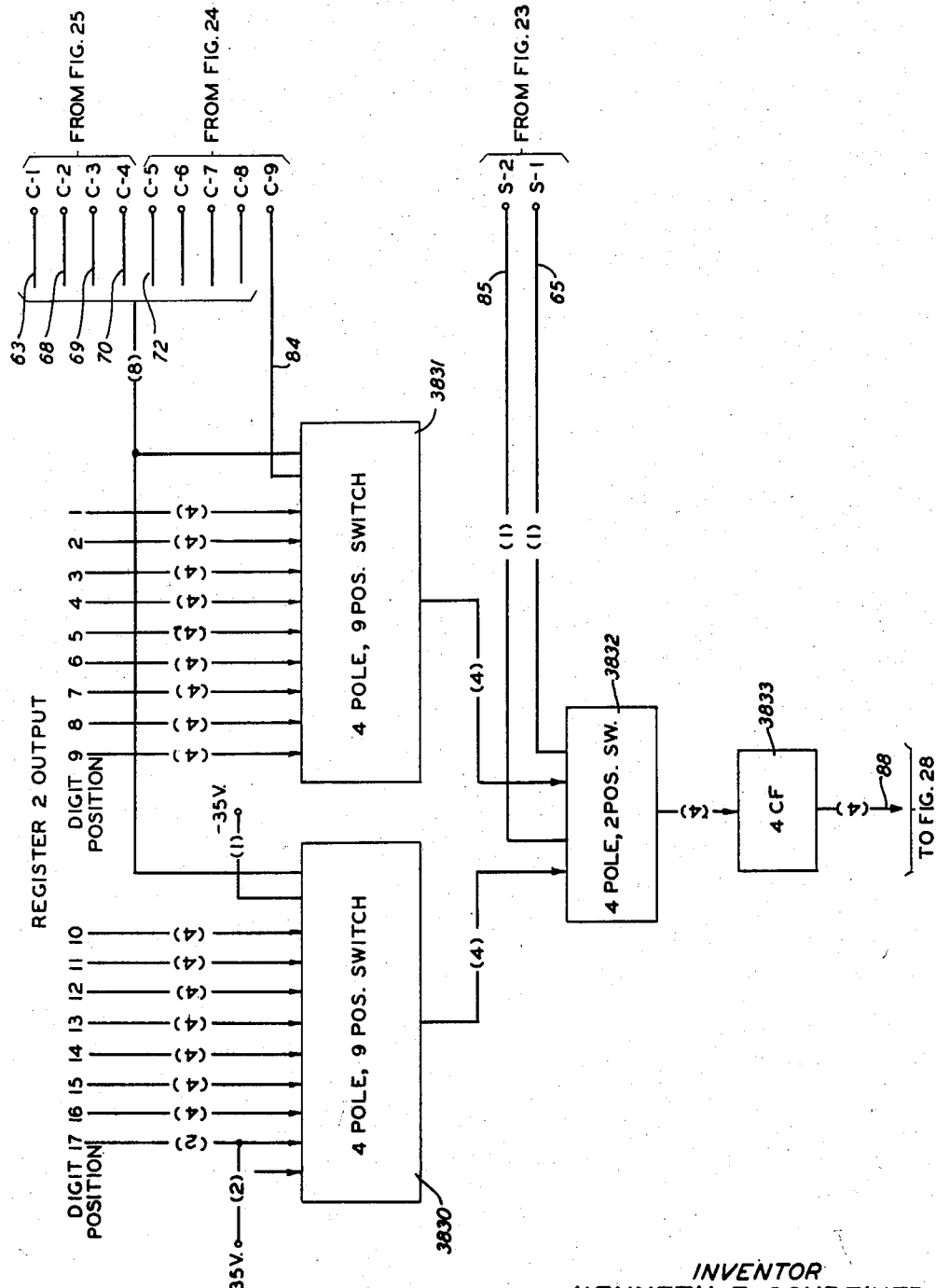
Figure 40:
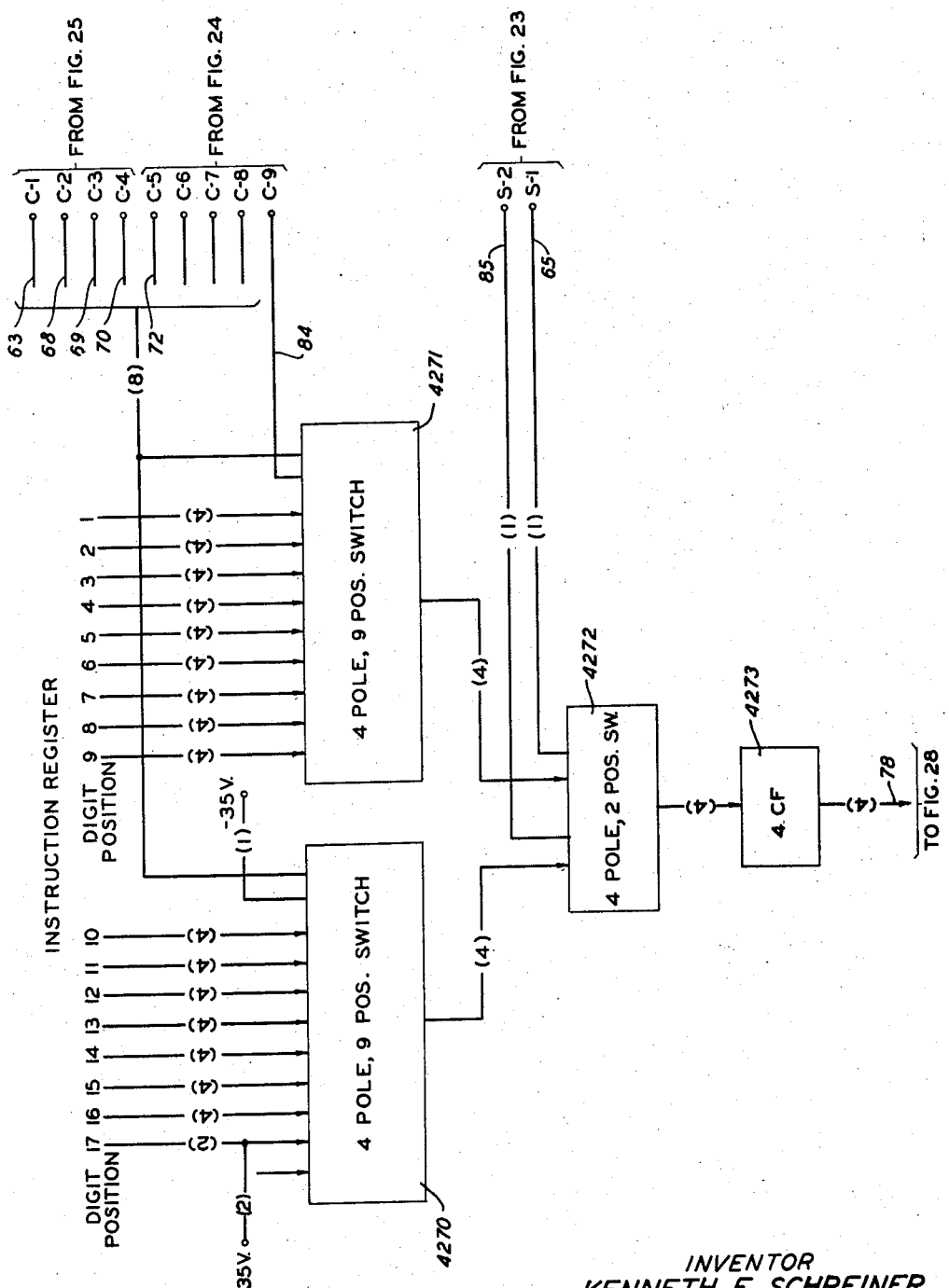
Figure 41:
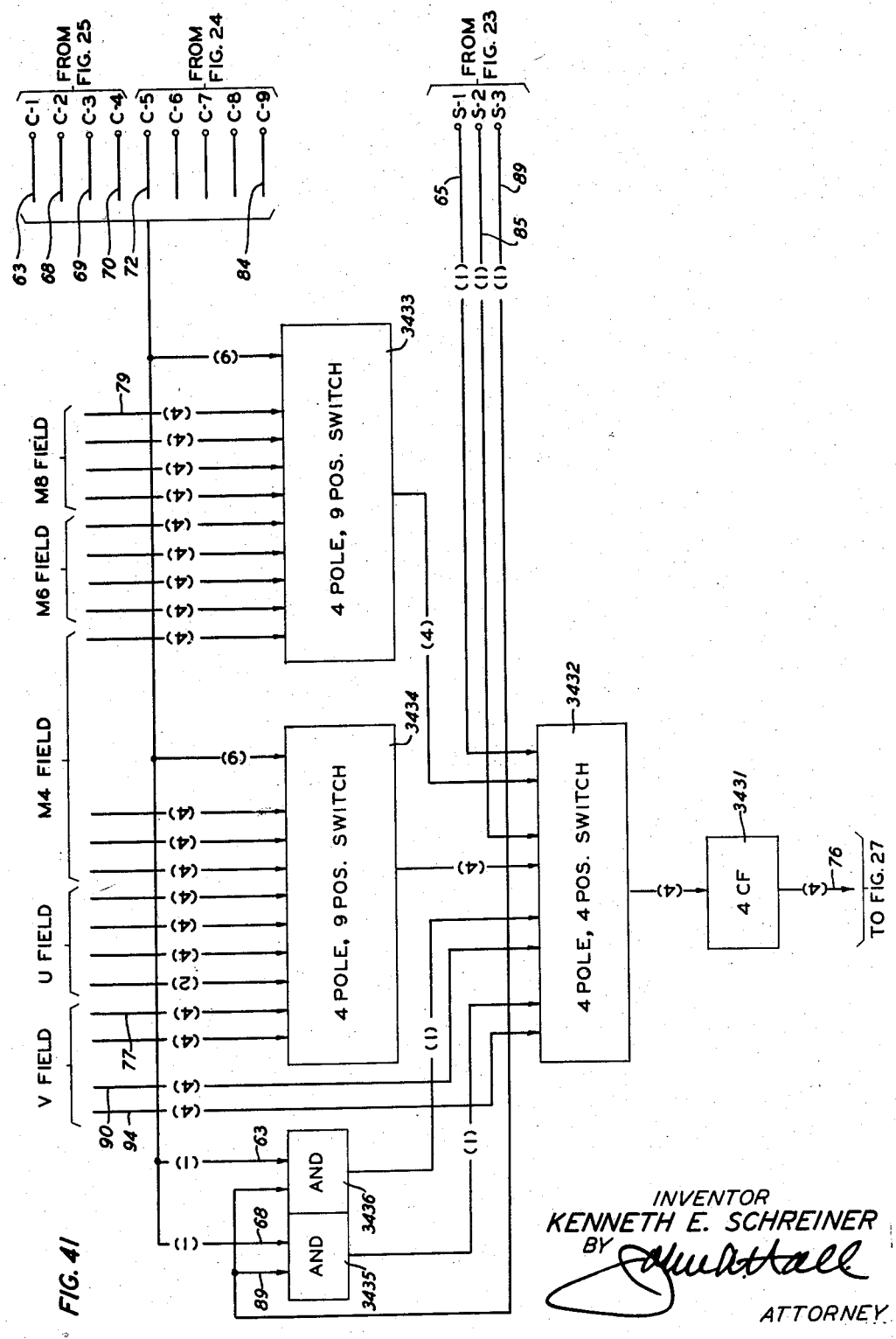
Figure 42:
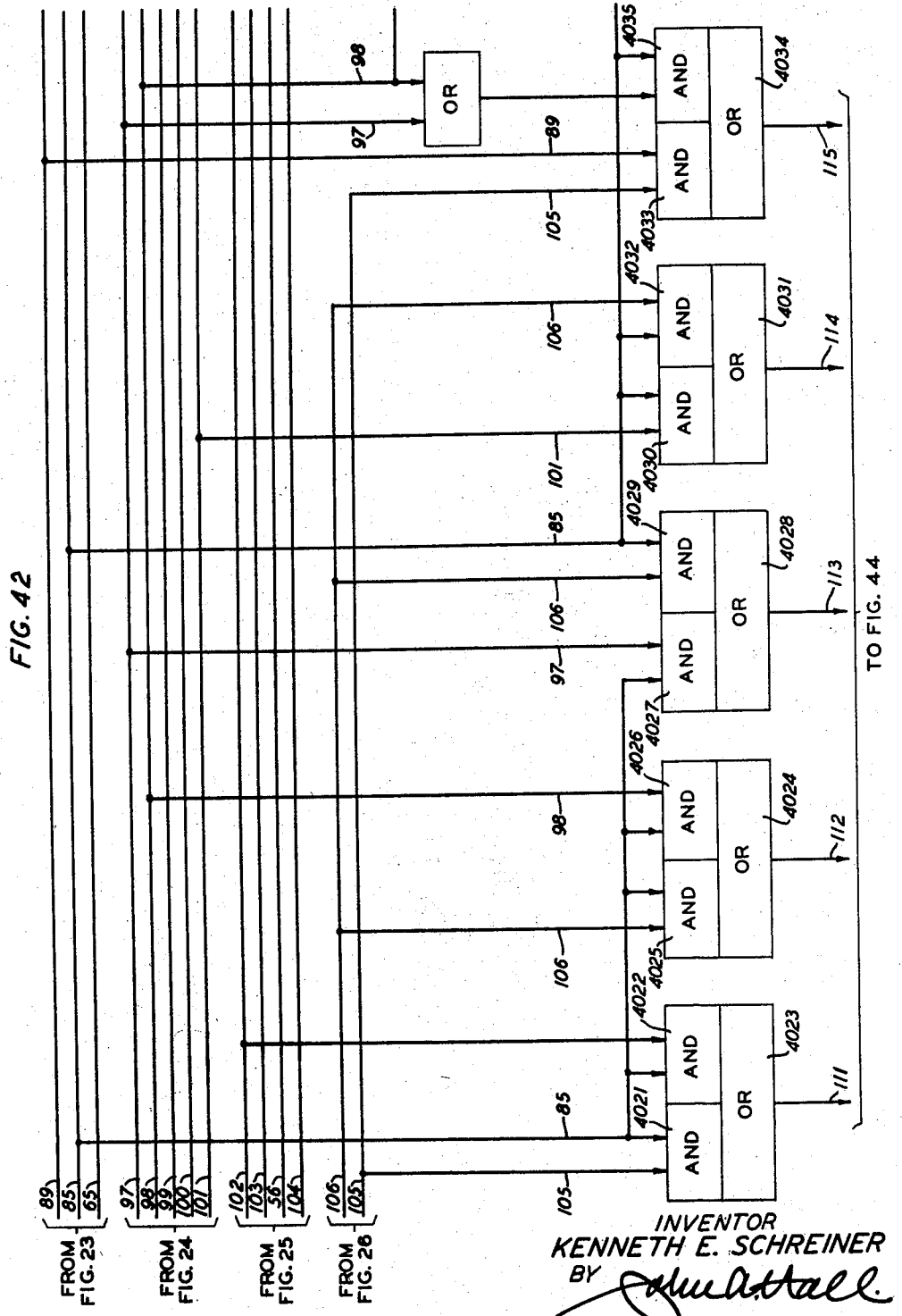
Figure 44:
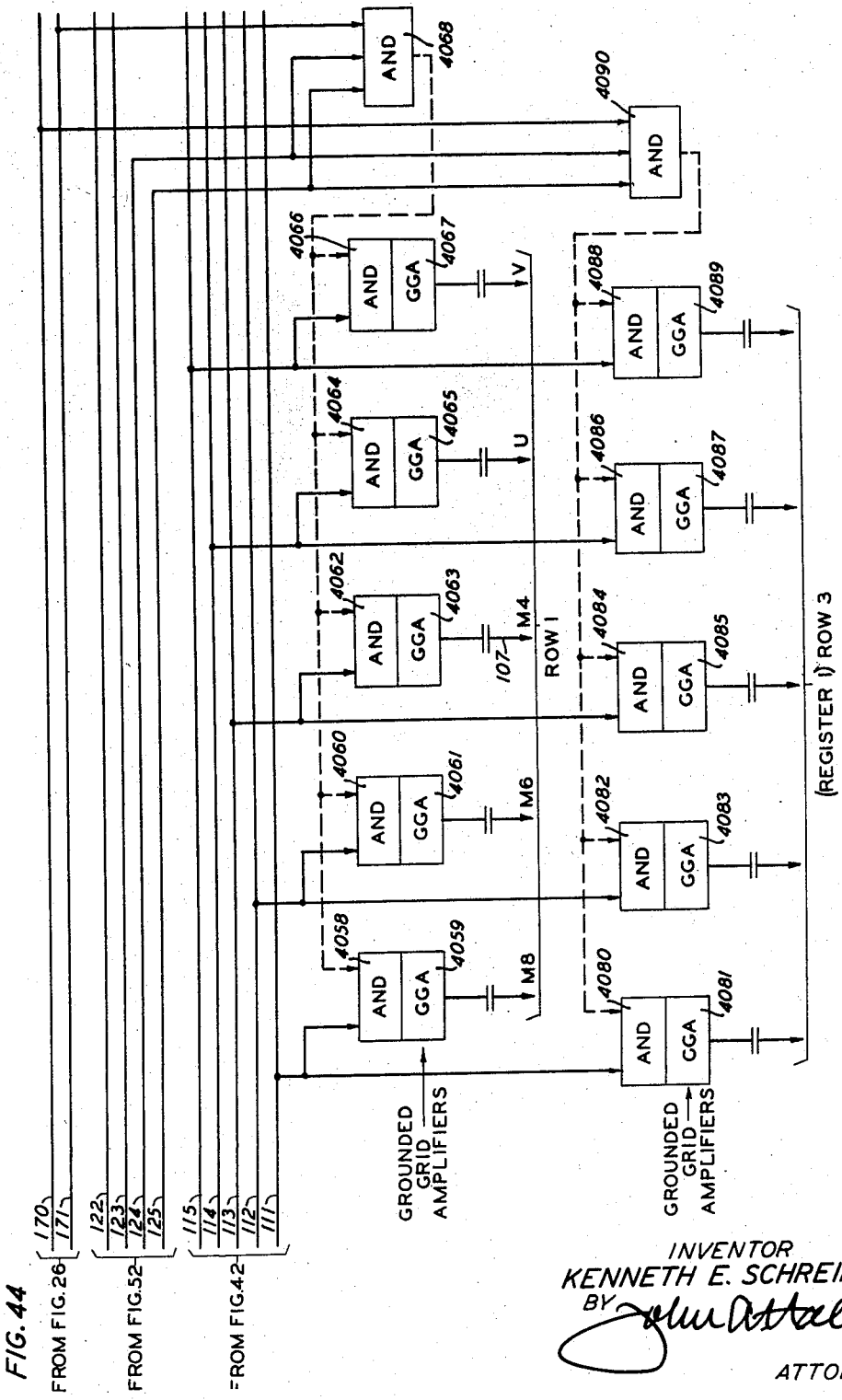
Figure 45:
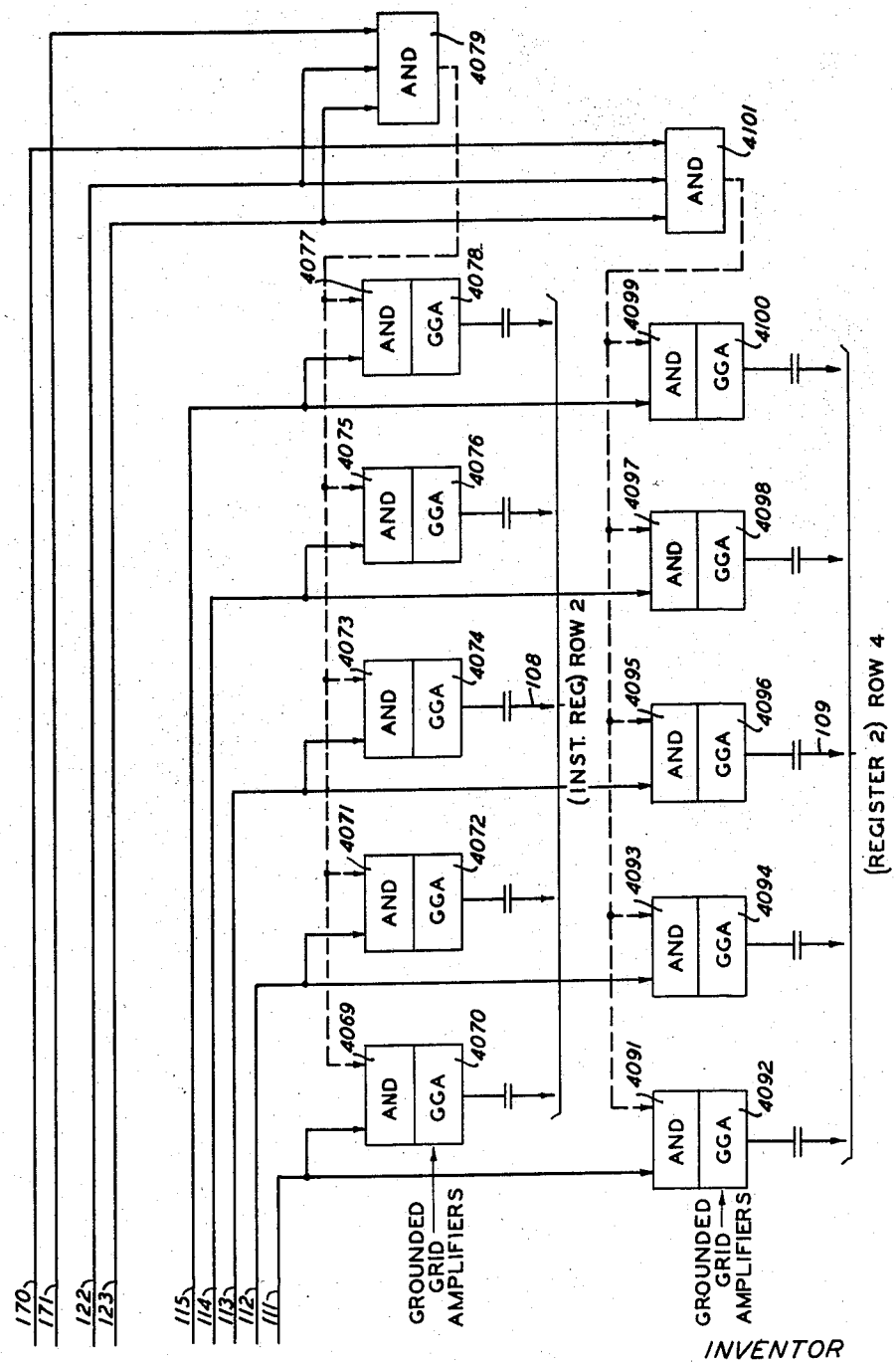
Figure 46:
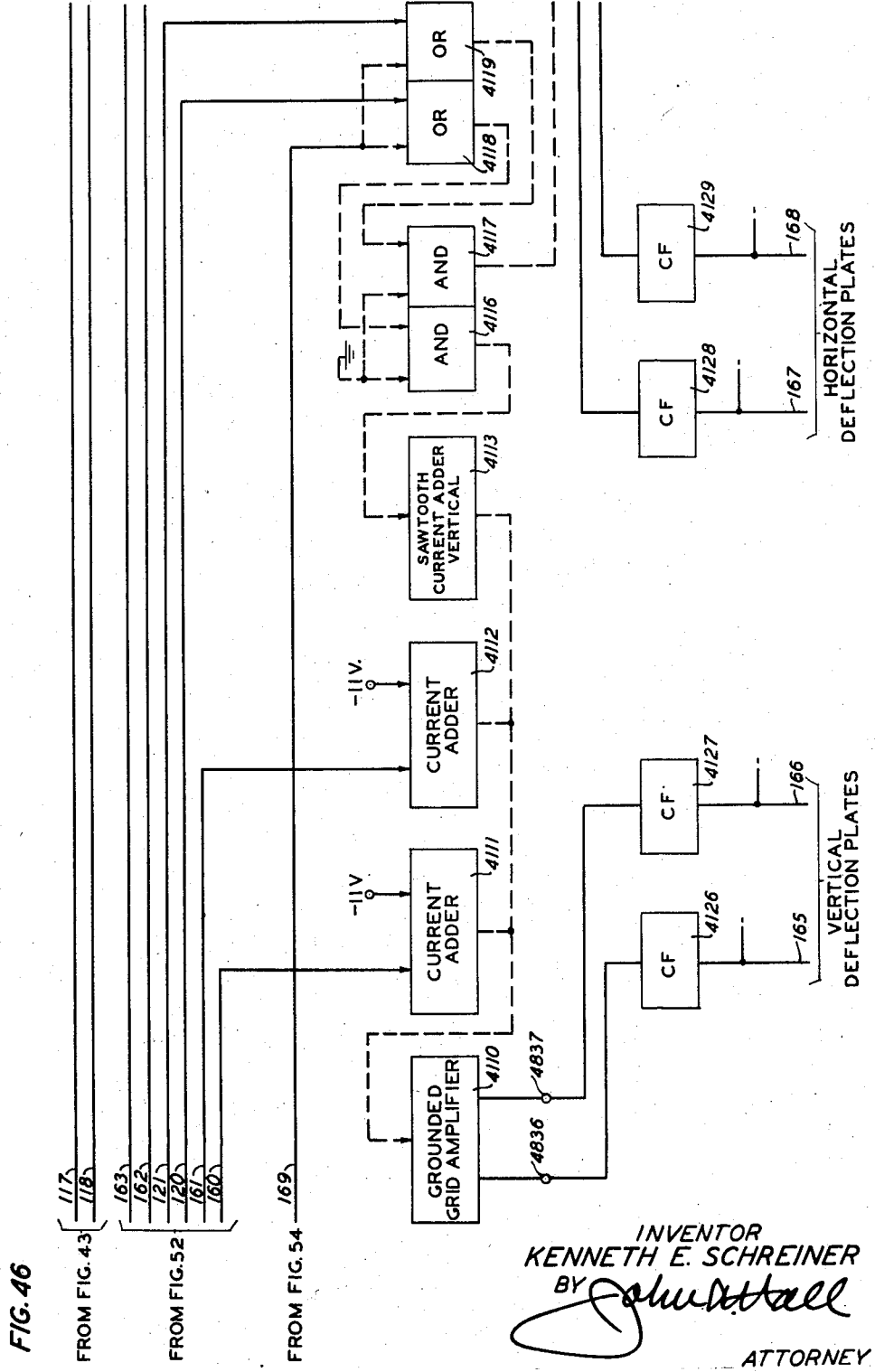
Figure 47:
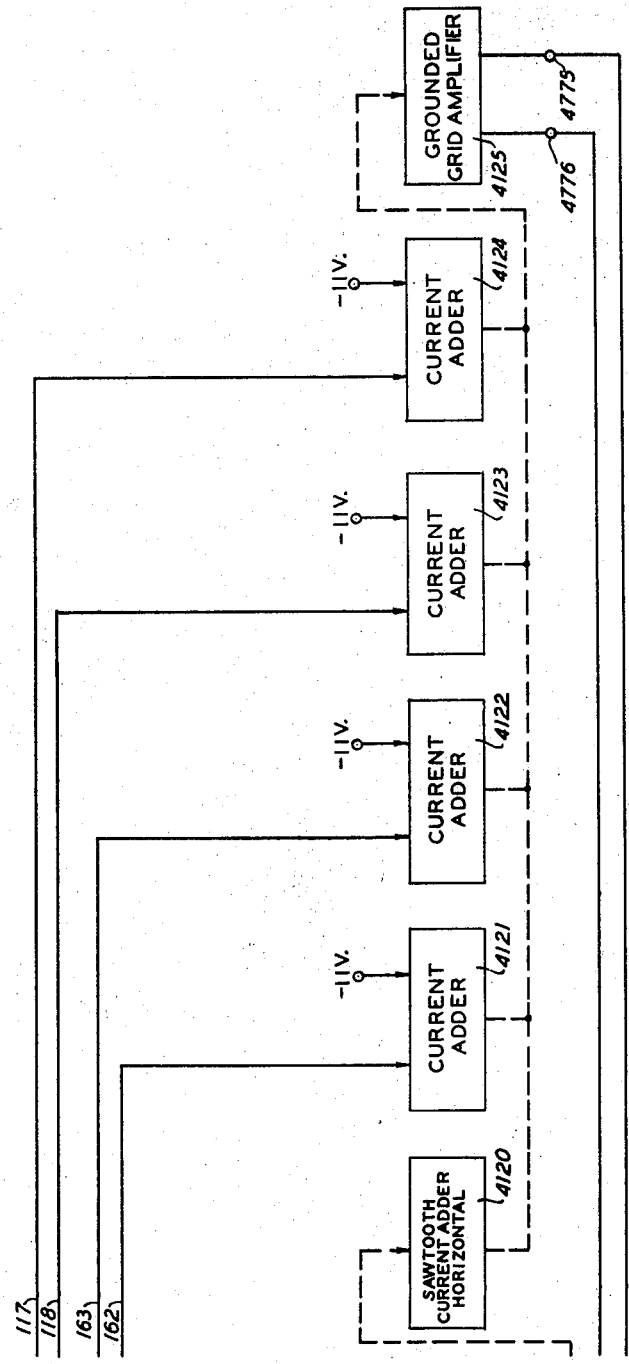
Figure 48:
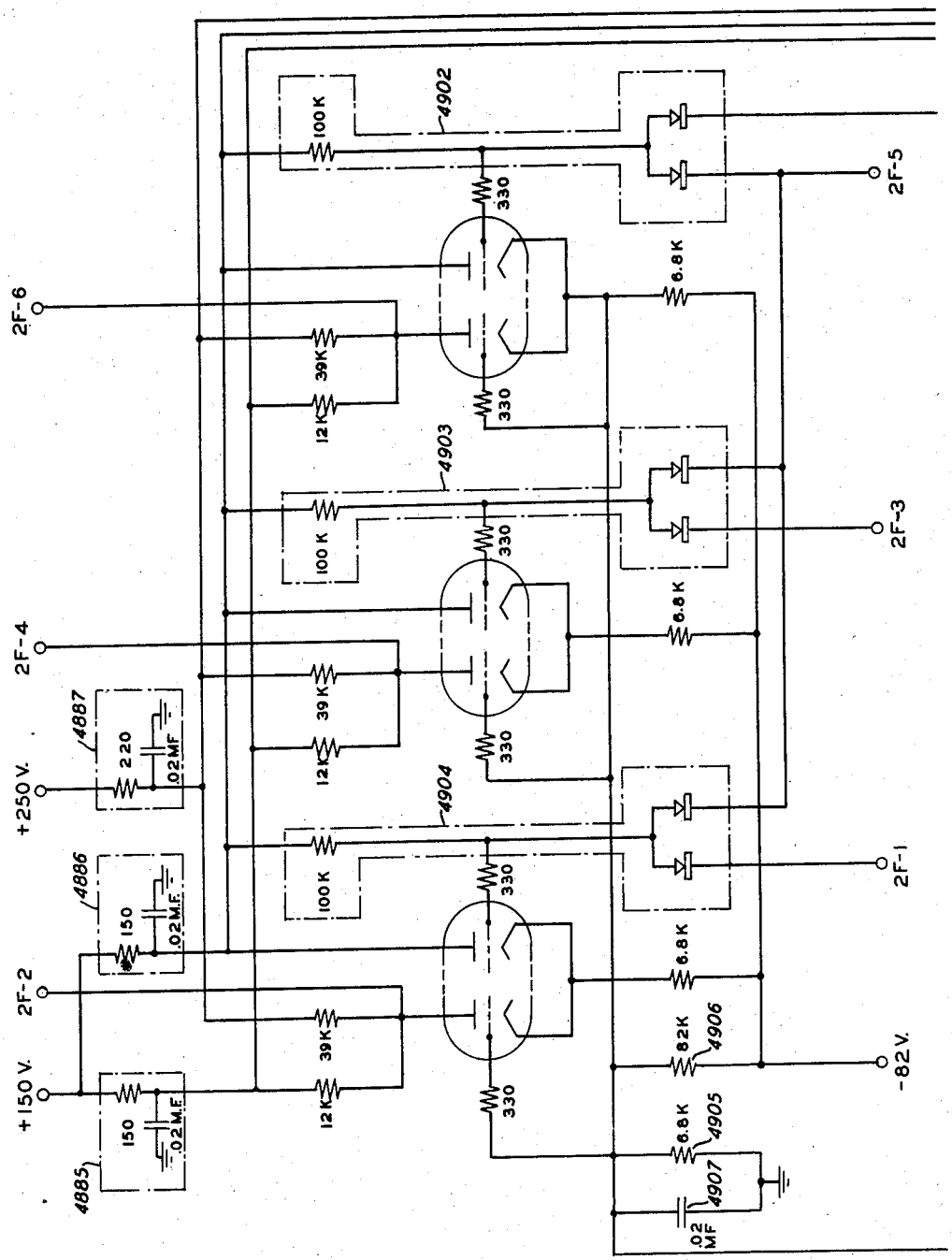
Figure 49:
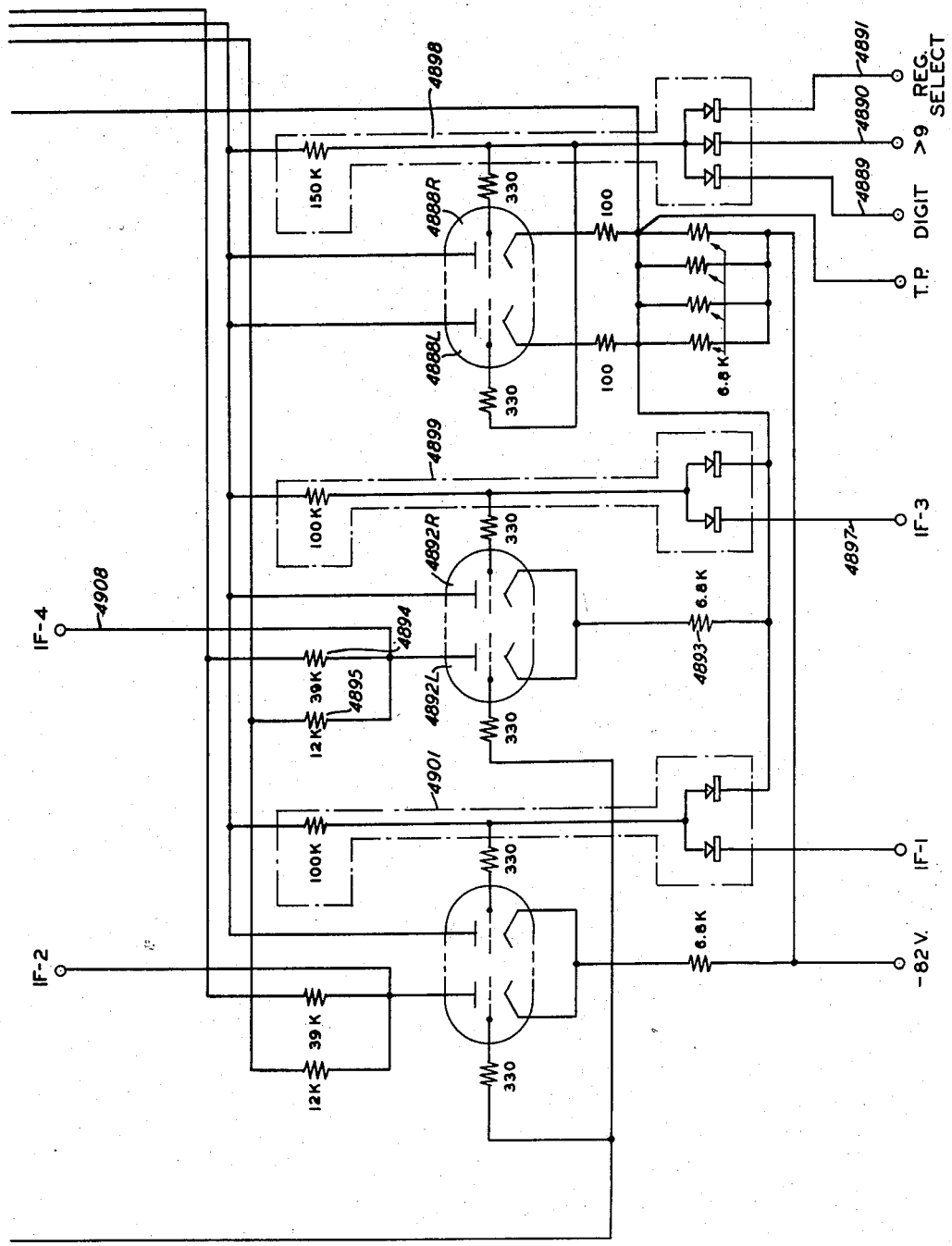
Figure 50:
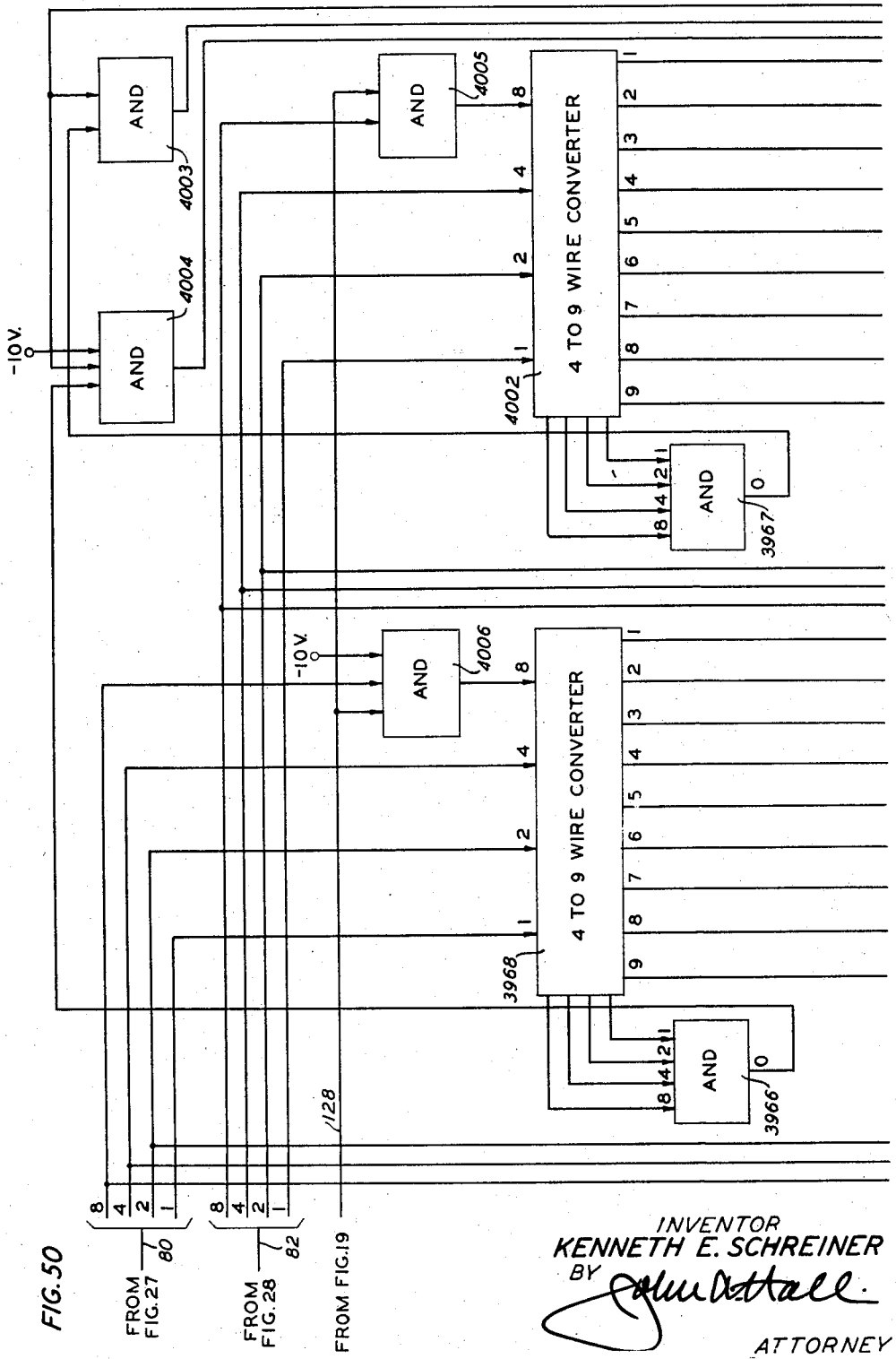
Figure 51:
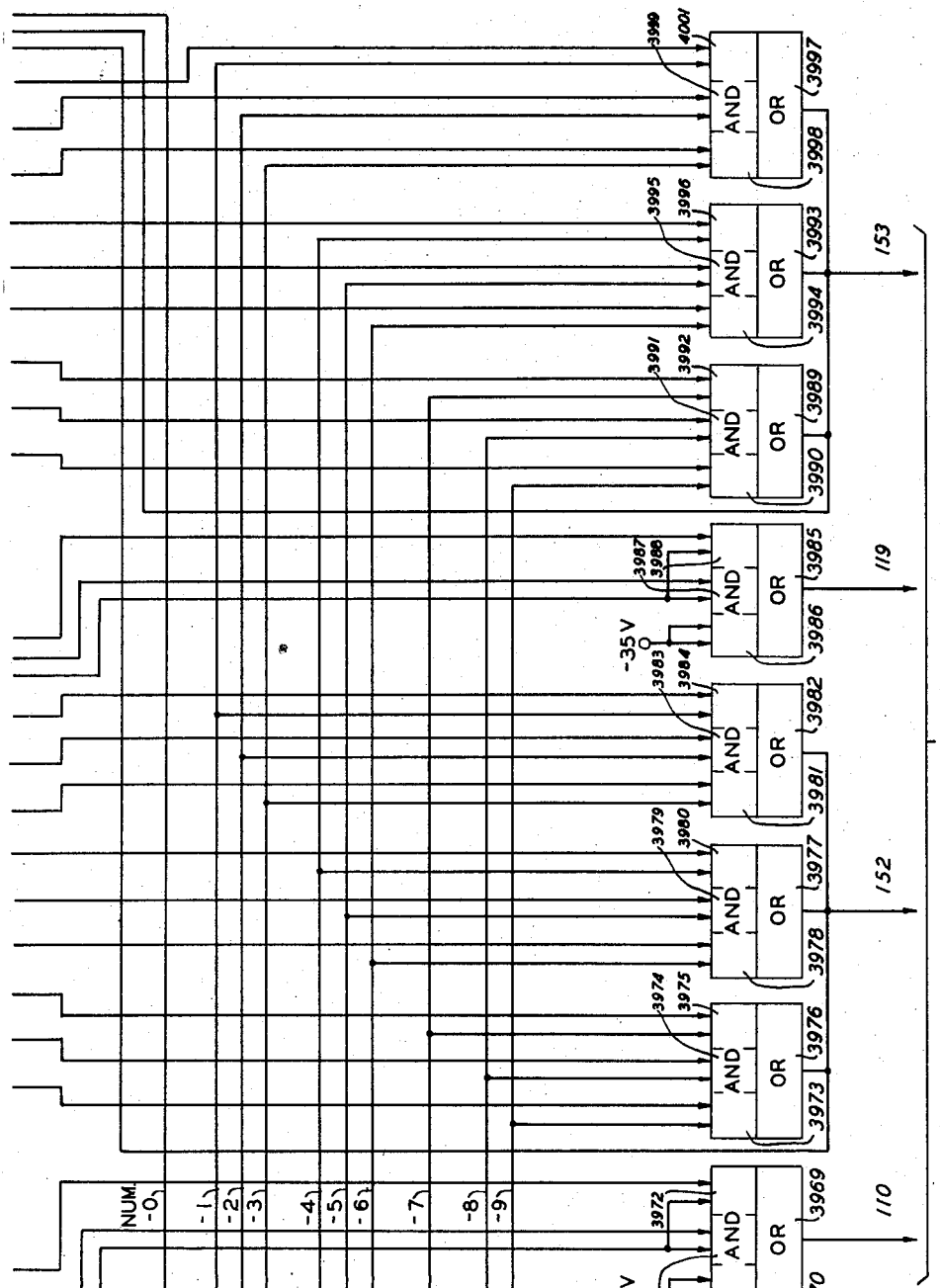
Figure 52:
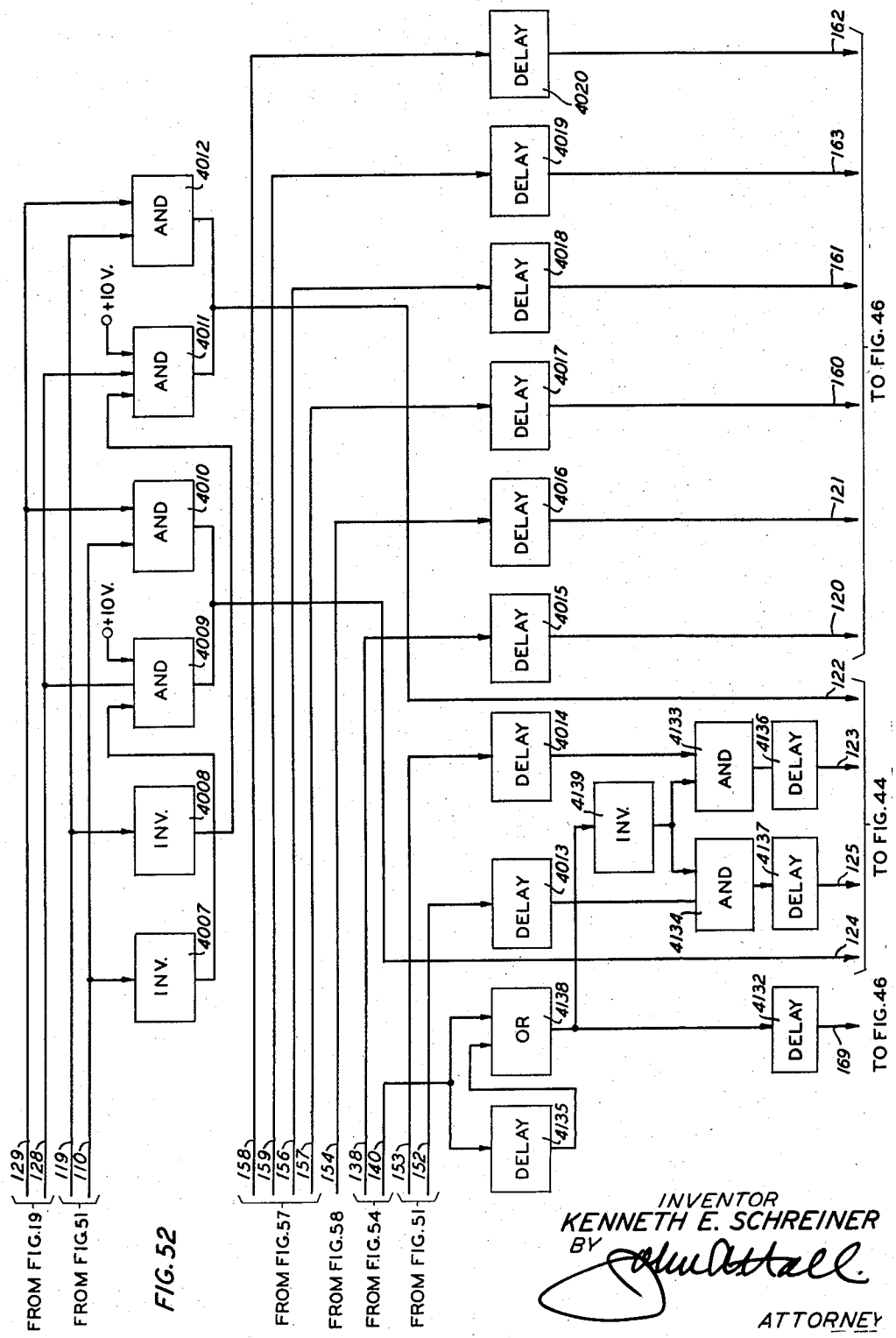
Figure 53:
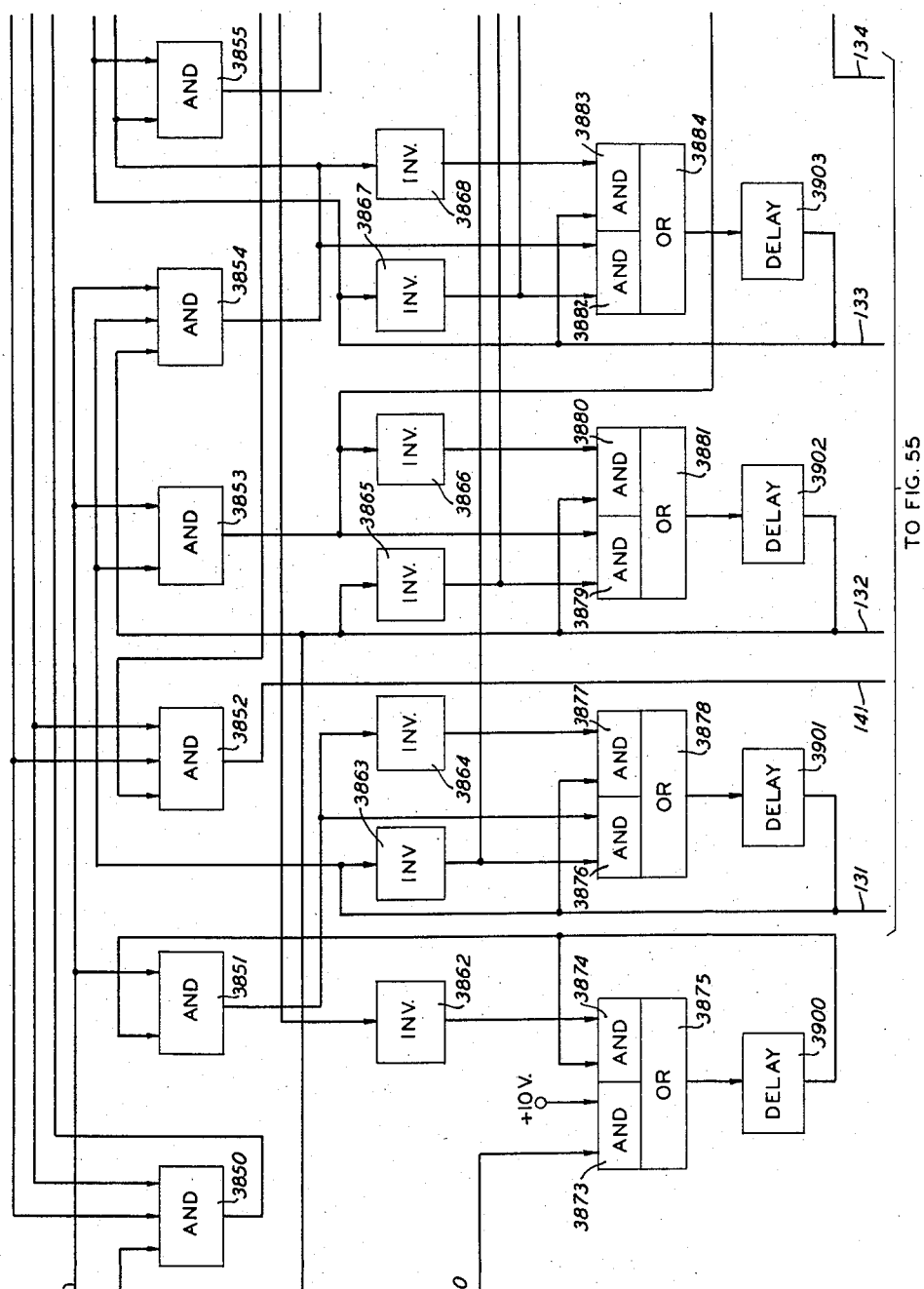
Figure 54:
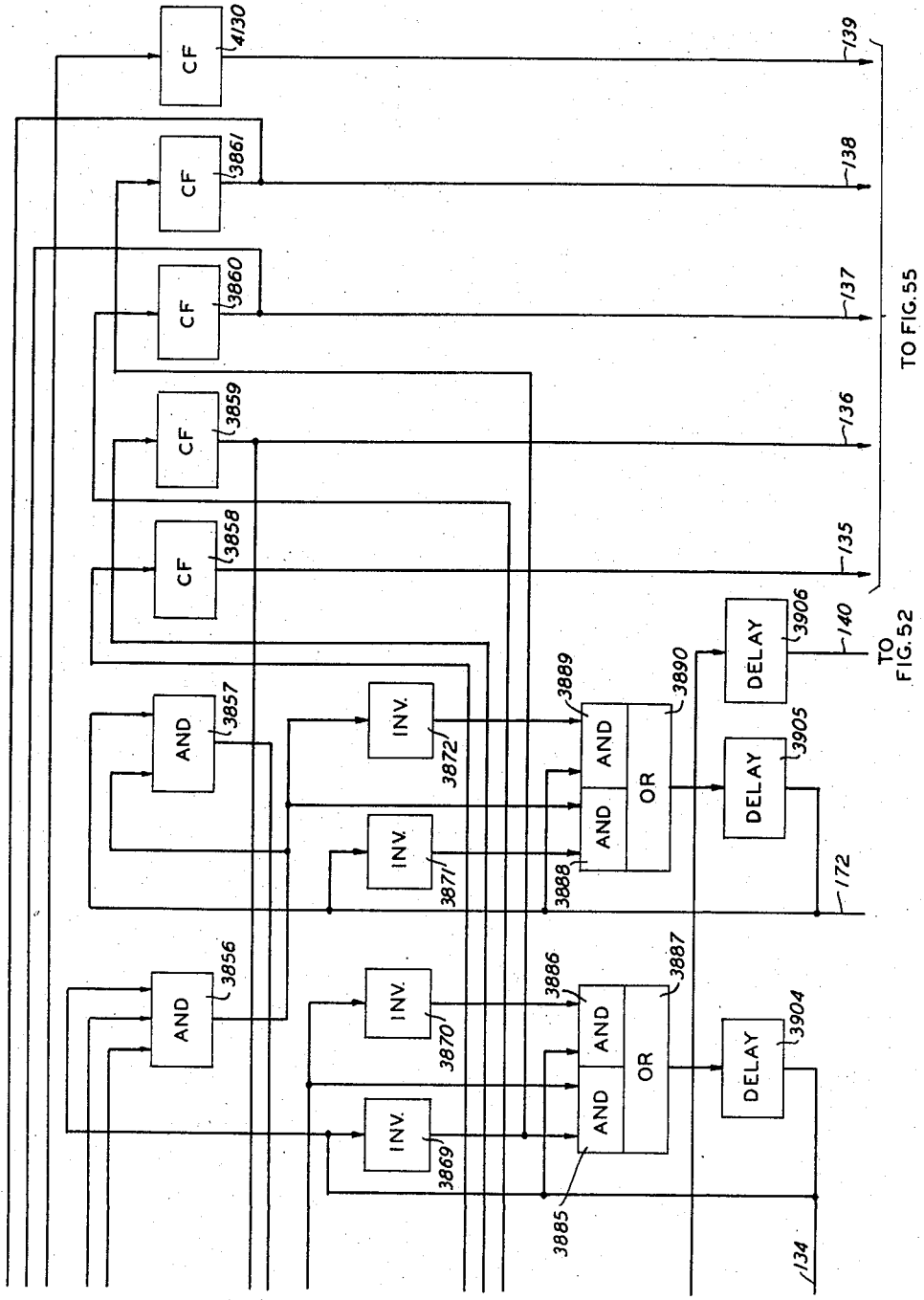
Figure 55:
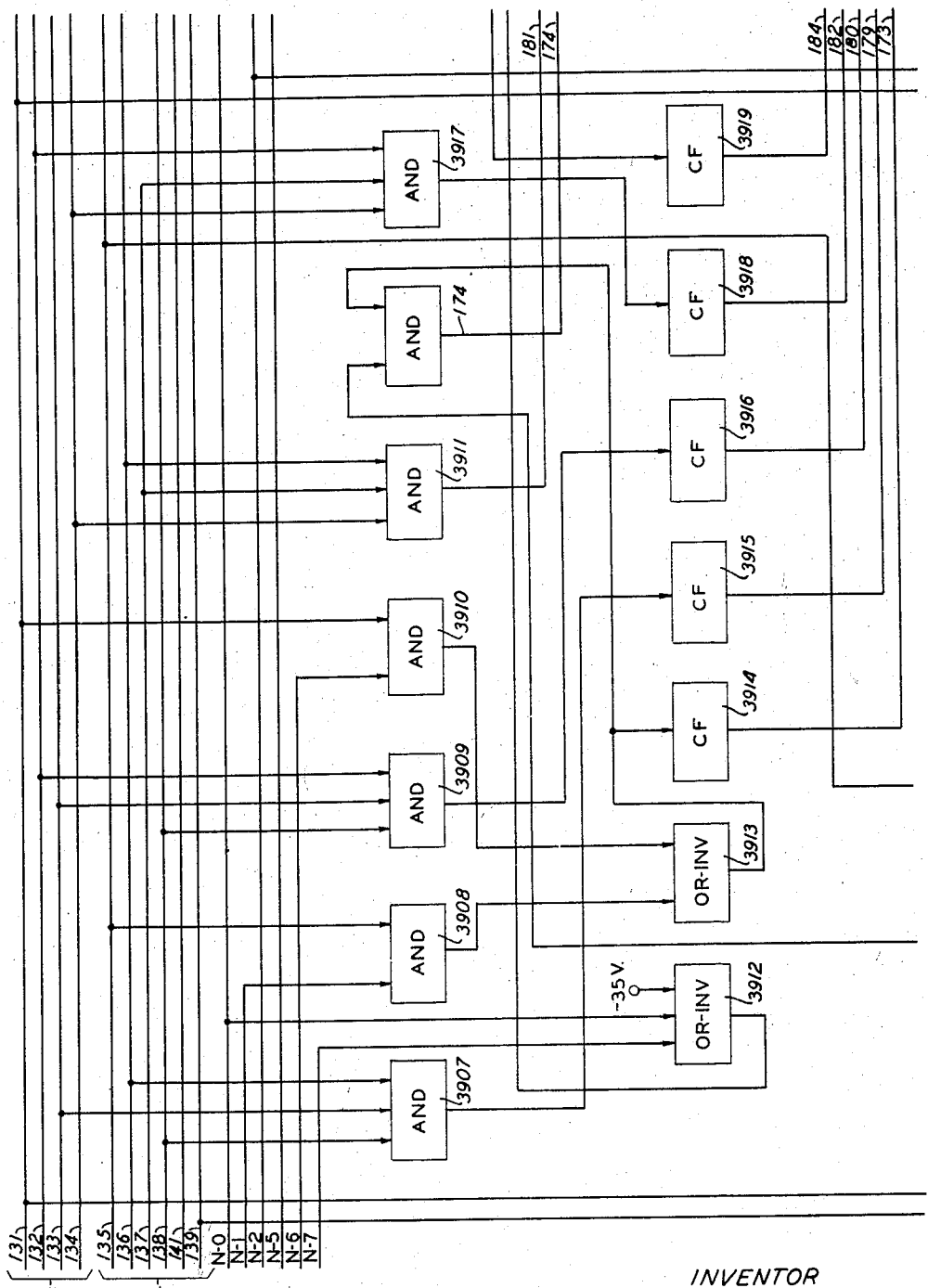
Figure 66:
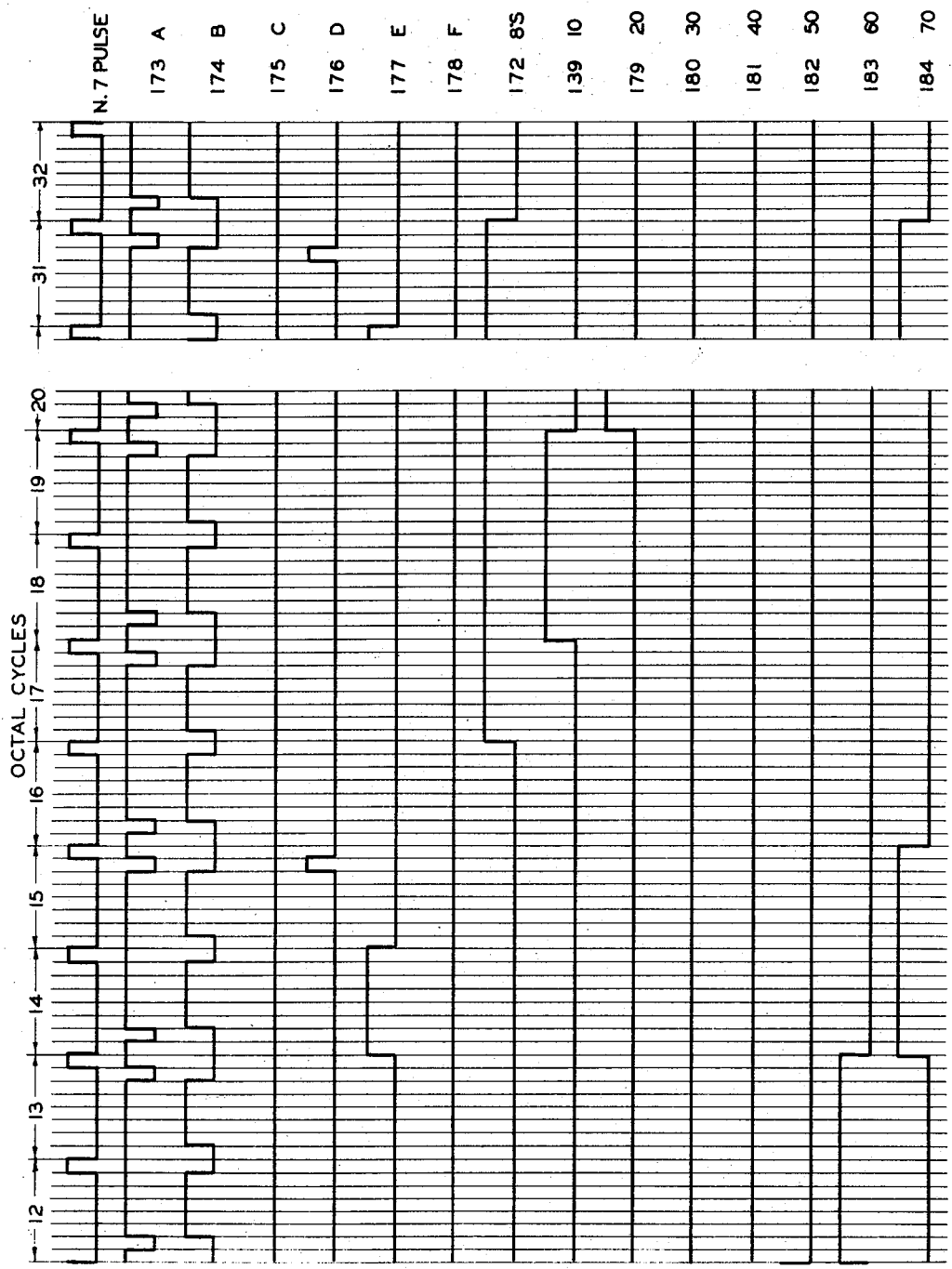

16 as the component 4719 and the matching circuits indicated in Fig. 16 as the component 4720;

Fig. 21 shows certain of the control circuits leading from the decade counters and the matching circuits to the display control circuits;

Fig. 22 shows the counter control circuit 4721 in some detail and the counter 4724;

Fig. 23 shows the counter 4723;

Fig. 24 shows part of the counter 4722;

Fig. 25 shows the remainder of the counter 4722;

Fig. 26 shows certain control circuits operated by the three counters for operating the display means;

Fig. 27 shows a one position storage circuit used for storing the digits taken one at a time from the various fields and Register 1 for display in the first and third rows of the cathode ray tubes;

Fig. 28 shows a like arrangement of a one position storage circuit used for storing the digits taken one at a time from the Instruction Register and Register 2 for display in the second and fourth rows of the cathode ray tubes;

Fig. 29 shows the switches used for gating certain digits derived by maintenance panel temporary connections made for experimental purposes to any desired points within the calculator for display in the 18th, 19th and 20th positions of the cathode ray tubes in the 2nd row;

Fig. 30 shows a similar arrangement for test purpose display in the corresponding cathode ray tubes of the 3rd and 4th rows;

Fig. 31 is a logical circuit diagram of the decade counters 3559 and 3550 employed to count off the 400 microseconds of each minor cycle;

Figs. 32, 33, 34 and 35 are charts setting forth conditions within these decade counters at different periods of a 400 microsecond cycle used for explaining the operation of the counters;

Fig. 36 is a logical circuit diagram of an octal commutator;

Fig. 37 is a logical circuit diagram showing in greater detail the switches and latching arrangement of the first four positions of the 1 to 9 counter 4722 of Fig. 25;

Fig. 38 shows a switching arrangement for gating the various digits of Register 1, one at a time, into the single digit storage device of Fig. 27;

Fig. 39 shows a switching arrangement for gating the various digits of Register 2, one at a time into the single digit storage device of Fig. 28;

Fig. 40 shows a switching arrangement for gating the various digits of the Instruction Register, one at a time into the single digit storage device of Fig. 28;

Fig. 41 shows a switching arrangement for gating the various digits of the U, V, M4, M6 and M8 Fields, one at a time into the single digit storage device of Fig. 27;

Figs. 42 and 43 taken together constitute a logical circuit diagram setting forth the circuits controlled by the counters of Figs. 22 to 25 to select the positions in the rows (known as address selection) of cathode ray tubes at which each numeral corresponding to the positions in which the digits are found will be displayed;

Figs. 44 and 45 show four Grid Pulse Generators for the cathode ray tubes, each of which consists of a set of six And circuits and associated grounded grid amplifiers;

Figs. 46 and 47 show in the form of block diagrams the circuits responsive to coded pulses for developing the horizontal and vertical sweep potentials;

Figs. 48 and 49, with Fig. 48 placed above Fig. 49 as indicated in Fig. 64, show circuit details of the combination And circuits and grounded grid amplifiers shown in block form in Figs. 44 and 45;

Figs. 50 and 51 show the 4 to 9 wire converters and means for gating the various numeral wave forms shown in the time charts Figs. 9 to 12 and developed by the circuits of Figs. 55 to 58 to the grid pulse controls;

Fig. 52 shows the circuit responsive to the Greater Than 9 pushbutton shown in Fig. 19, useful in suppressing the 8 bit of a coded digit offered for display through the single digit storage circuits of Figs. 27 and 28. This figure also shows a group of eight delay circuits inserted in certain of the circuits for developing the signals for operating the grids of the cathode ray tubes;

Figs. 53 and 54 show a five stage counter responsive to the N.7 lead of the Octal Commutator capable of counting 32 octal cycles and employed in forming the wave forms shown in the time charts, Figs. 9–12;

Figs. 55, 56, 57 and 58 show the coding circuits for developing the wave forms of Figs. 9–12 under control of the octal cycle five stage counter of Figs. 53 and 54;

Figs. 59, 60, 61 and 62 show circuit details of the plate deflection circuits for the cathode ray tubes indicated hereinbefore in Figs. 46 and 47;

Fig. 63 is a block diagram showing how Figs. 59, 60, 61 and 62 should be placed in order to properly indicate the interconnections between the various parts of this circuit;

Fig. 64 shows how Figs. 48 and 49 should be placed to show the circuit details of the matter blocked out in Figs. 44 and 45;

Figs. 65 and 66, arranged with Figs. 9–12 as indicated in Fig. 8, constitute additional graphs in the time chart, particularly showing certain intermediate coding and the essential potentials for the deflection circuits in forming the raster; and Fig. 67 is a time chart study showing how a synthesized numeral signal is shifted and trimmed to produce the proper display.

In the following description certain terms are used and many basic circuit components are mentioned. By way of explanation the following prior art disclosures are set forth and reference is made thereto for a complete description of any given circuit and the manner of its operation.

Patent Re. 23,699, August 18, 1953, issued to B. L. Havens for a Pulse Delay Circuit.

Application S. N. 338,122, February 20, 1953, filed by Byron L. Havens and Charles R. Borders for a Serial-Parallel Binary-Decimal Adder.

Application S. N. 470,160, November 22, 1954, filed by Byron L. Havens, for an Electronic Multiplier.

Application S. N. 472,098, November 23, 1954, now Patent No. 2,837,278, filed by John P. Cedarholm and Kenneth E. Schreiner, for a Modulo Nine Computer.

Application S. N. 444,253, July 19, 1954, filed by William J. Deerhake and Byron L. Havens for an Electrostatic Storage System.

Application S. N. 444,251, July 19, 1954, filed by Charles R. Borders, for Regeneration and Octal Counter.

A Bit is a binary item, that is, a signal indicating a 1 in the binary code of 0 and 1. The four consecutive binary orders, reading from right to left, represent the decimal digits 1, 2, 4 and 8 and the sum of these values as represented by the bits expressed in any binary code equals the value of the decimal digit represented thereby. A Bit is therefore a single binary item in a code which is used to express or convey a given amount of information.

The binary-decimal system is one in which the decimal digits of a number are each separately expressed in a pure binary code. Thus a code 1001, having an 8 bit and a 1 bit, expresses the decimal digit 9. It will appear hereinafter that any other number, higher in value than 9 will be expressed by more than one such binary code, that is a separate binary code for each digit, as for example, 0100, 0101, 1001, for the decimal number 459.

A time interval is one microsecond. A time interval may, of course, be of any convenient value but the circuits of the present invention have been constructed and arranged to operate on a megacycle basis. It may particularly be noted that the delay circuit disclosed in both the Havens patent and in the Havens et al. application have been constructed and arranged to receive a pulse on an input terminal during one time interval and to deliver a like pulse on an output terminal during a succeeding time interval one microsecond later.

Throughout the circuitry of this device and the calculator with which it is associated a common source of clamping potential and synchronizing pulses, clearly shown in the said Havens Reissue Patent 23,699, is employed. This serves to pace all the operations described hereinafter.

Up and Down refer to potentials. In this electronic maze, each component, such for instance as a tube circuit, is arranged to be active when the potential on its control conductor is Up and inactive when such potential is Down. Generally, as in a cathode follower circuit, when the potential on an input terminal is Up the potential on the output terminal is Up and likewise when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vacuum tube.

Numerous coincidence circuits are employed herein. An And circuit refers to a circuit which is operable to produce an Up condition on its output terminal only when all of its input terminals are Up. An Or circuit refers to a circuit operable to produce an Up condition on its output terminal when any one or another or more of its input terminals are Up.

In the logical diagram forming the main part of the present disclosure an And circuit is shown as a rectangle about the designation And and having a plurality of input terminals and a single output terminal.

A cathode follower circuit is a tube circuit having its anode firmly tied to a positive potential source or otherwise arranged so that the grid constitutes an input and the cathode or the cathode circuit constitutes an output. When the grid is Up, the cathode will go Up and when the grid is Down the cathode will go down.

The And and Or circuits may be combined with the cathode follower circuits, in which case they are designated And–Cf and Or–Cf respectively.

The invention utilizes numerous dual-type tubes having two sections in a single envelope. Each such section is referred to herein as a tube and designated by a number followed by the letter L or R or simply by the letters L and R to indicate the left-hand or right-hand tube section respectively. A tube so referred to is similarly designated thereafter if employed with the same immediate circuitry and for the same purpose even though it is not shown with its corresponding L or R tube.

Another component of these circuits is an inverter. This generally includes a tube and is so arranged that when the input is Down the output is Up and when the input is Up the output is Down.

Frequently, a logical element is required which comprise a diode Or circuit driving an inverter. Such a circuit is termed an Or–Inv circuit and is so designated in the logical diagram.

The above mentioned components are fully disclosed in the said Cedarholm et al. application and in other of the prior art disclosures hereinbefore set forth.

One of the most important of the circuit components used herein is the delay circuit which will pass a pulse after a delay of one microsecond. Such a device is fully disclosed in the said Havens Reissue Patent 23,699.

Various type switches may be constructed and arranged essentially by combinations of And and Or circuits, one of these known as a two position four pole switch being disclosed in the said Cedarholm et al. application.

A binary adder is one which will add bits in accordance with the principles of binary addition. Such an adder is but one of four used in a complete adder, the four being known as the 1 bit adder, the 2 bit adder, the 4 bit adder and the 8 bit adder respectively. Each has three inputs, two for bringing in the bits to be added and the third for bringing in a carry 1 bit. There are two outputs, one for an output bit and another for an output carry bit. In accordance with the principles of binary addition a single input bit will produce an output bit, two input bits will produce an output carry bit, and three input bits will produce both an output bit and an output carry bit. The internal circuitry of the adder is not shown here since it appears in great detail in the said Havens et al. application.

A latch is a circuit component used to hold or maintain a bit. The circuit is simple and contains essentially only an And circuit and a Delay circuit.

The And circuit has a control input and an input leading from the delay circuit. When, in the course of some operation the control conductor is driven Up and during this period a Bit is transmitted over the input to the delay circuit, the delay circuit will at the next interval drive the input of the And circuit Up and since the control is now Up the output of the And circuit which also constitutes the input to the delay circuit is Up. Consequently this Bit will be constantly regenerated by the delay circuit and will in effect circulate through the And circuit and the delay circuit, appearing constantly on the output terminal from which it may be taken off as desired. When the control input of the And circuit is finally moved Down, then the transmission of the Bit over the input in the time interval following will be ineffective and the circuit will become unlatched.

Such a circuit is disclosed in the Cedarholm et al. application.

Another circuit component is known as a 4 to 9 wire converter, essentially a device for translating any one of the digits 1 to 9 inclusive expressed in the binary code to a decimal indication. Since in the present device al the information registered in the various registers and fields is in the form of a pure binary code and since the numerals to be displayed are the Arabic form they must be translated from the four place binary codes to single place digital representation. Since the apparatus is always set to represent zero in the absence of any other indication it is only necessary to use nine output wires from this 4 to 9 converter.

Fig. 1 shows the symbol for the 4 to 9 wire converter used hereinafter in the more extensive logical diagrams and Fig. 2 shows the arrangement of a plurality of And–CF and INV–CF circuits and the connection therebetween. There is a control wire 1 which is normally Down. When this converter is to be operated, then the control wire 1 is driven Up and one or more of the Bit wires 1, 2, 4 and 8 are driven Up. Let us take as an example the code 0111 representing the decimal digit 7. The And circuits 2, 3 and 4 will be active and their outputs will be Up and the inverter circuits 6, 7 and 8 will be active so that their outputs will be Down. Coincidence will be established for the And circuit 10 by the outputs of And circuit 2, And circuit 3 and And circuit 4. No other output And circuit will be rendered active. By way of example, the And circuit 11 will not be active because one of its inputs comes from INV circuit 6 and since this is active its output is Down. A utility CF circuit 12 is usually associated with such a 4 to 9 wire converter. Provision may be made in the calculator for the use of a cathode follower circuit with a different digital output value (1–9) in nine binary to decimal conversion circuits like this Fig. 2. Thus by placing a jumper between the output terminal of the CF circuit 12 and any one of the digital output terminals and by causing the input terminal of this CF circuit to be Up, any preselected digital value from 1 to 9 may be produced.

The 1, 2, 4 and 8 bit leads connected to the outputs of the inverters whose inputs are connected respectively to the 1, 2, 4 and 8 bit input lead of the 4 to 9 wire converter lead as in Fig. 50 to a four input And circuit for the purpose of providing a normal Up condition on a given lead to express 0 when no other of the ten digits is being represented by a signal on any one or more of the incoming leads.

Another electronic circuit employed herein is an inequality detector (shown in Fig. 4) by which any two binary codes may be compared for equality. There are two sets of 1, 2, 4 and 8 Bit wires incoming to this circuit and a single output wire which is Down when equality exists and Up when inequality exists. This component actually consists of four comparison circuits each like the others. Let us look, by way of example, at the 1 Bit comparison circuit consisting of And circuit 13, Or circuit 14, INV–CF circuit 15 and And–CF circuit 16. Let us first assume that each of the incoming 1 Bit wires is Up. Then it will be found that the outputs of both And circuit 13 and Or circuit 14 are Up. However, the output of And circuit 13 renders the INV–CF circuit active and therefore its output goes Down whereby coincidence cannot be established for the And–CF circuit 16 so that the output 17 is Down (thus signaling equality). Likewise if both 1 Bit wires are Down then the INV–CF circuit 15 will be inactive and its output will be Up. But the output of Or circuit 14 will be Down and hence the And–CF circuit 16 will be inactive and the output 17 will be Down. On the other hand, if one of the 1 Bit wires is Up and the other is Down, then the output of the And circuit 13 will be Down whereby the output of INV–CF circuit 15 will be Up. At the same time the Or circuit 14 will be active and its output will be Up so that coincidence will be established for the And–CF circuit 16 and consequently its output will be Up. When the output wire 17 is Up this constitutes a signal that inequality exists between the two codes simultaneously transmitted over the two sets of input terminals. The use of this inequality signal will appear hereinafter.

Another circuit component of considerable use in these circuits is known as an octal commutator. This is essentially a bundle of eight leads generally designated 0–7 inclusive on each side of which a pulse appears in turn in each succeeding microsecond interval, the cycle being repeated constantly so that there is available a source of eight pulses which may be used for counting or timing in any manner desired. Such an octal commutator is fully disclosed in the said Deerhake and Havens applications as well as being described in its fundamental form herein in connection with Fig. 36. It consists generally of a series arrangement of eight one microsecond delay circuits effectively placed in a ring circuit whereby the operation of each triggers the next. The output circuit of each except the last operates an Or circuit and an inverter circuit to hold the input of the first clear but the output of the last allows this circuit to relax and hence the series is recycled. The circuit operates automatically indefinitely and thus provides a source of pulses recurring on each of the eight leads therefrom each eight microseconds.

One form of Octal Commutator is shown in Fig. 36. Here the eight delay circuits 41 to 48 respectively are shown to be in a series circuit. If none of these are active, as a starting condition, then the output of the Or–CF circuits 49 and 50 will be Down (this is assured by the eighth lead to the Down potential −35) and therefore the output of the INV–CF circuit 51 will be Up. This activates the Delay circuit 41 so that one microsecond later its output will go Up. This output leads to the supply lead N.0 and at the same time operates the Or–CF circuit 49 thus terminating the Up condition at the input of the Delay circuit 41. The pulse at the output of Delay circuit 41 also supplies an input to the next Delay circuit 42. Thus it will be seen that pulses will appear in succeeding microsecond periods on the supply leads N.0 to N.7 respectively. When the last Delay circuit 48 delivers its pulse to the supply lead N.7 and the pulse on lead N.6 has terminated both the Or–CF circuits 49 and 50 go Down whereby the output of INV–CF circuit 51 goes Up so as to effectively introduce a pulse into Delay circuit 41 simultaneously with the transmission of the pulse over the supply lead N.7. Thus the device operates as though it were in a ring circuit where the output of Delay circuit 48 would be connected to the input of the Delay circuit 41.

A point to be noted is that all these delay circuits, as well as all others herein depend for their proper operation, as fully set forth in the said Havens reissue patent, on a common source of clamp and sync. voltages. Here the common sources are indicated by the leads 52 and 43 respectively. These are connected to the clamp and sync. inverters 54 and 55 each of which supplied this essential current to four of the delay circuits. It will thus be seen that the whole operation of the device of the present invention is paced by the rigidly maintained frequency of the common clamp and sync. potentials so that two counters even though they operate independently nevertheless are held rigidly in step one with the other.

Another component used herein is the clamp and sync. inverter used for supplying clamping and synchronizing pulses each 180° out of phase with the input pulses to the delay circuits. Such a component is fully described in the said Deerhake and Havens application.

Other components shown herein, which are in general conventional, include the grounded grid amplifier used as a gating device for unblocking the grid of the cathode ray tube and the cascode amplifier employed for developing the deflection voltages for the tubes.

The cascode amplifier is a series arrangement of two triodes which may be spoken of as the upper triode and the lower triode. The upper triode is essentially a cathode follower having a variable load. The plate of the lower triode maintains an even potential, particularly when as used herein a number of these lower triodes are connected in multiple. The upper triode acts as a constant impedance so that the plate resistor of this combination of triodes may be used to develop potential for the deflection circuits of the C. R. T. These conventional circuits are fully described in the Deerhake et al. application and in the MIT publication "Vacuum Tube Amplifiers," by Valley and Wallam, Radiation Laboratory Series, No. 18, McGraw-Hill 1948.

The principal and outstanding component employed herein is the cathode ray tube and the circuits for controlling it. These consist of the digit raster circuit for moving the beam over a complete and standard path for each operational cycle thereof and the means for selectively intensifying the beam for portions of its travel to form and display the various Arabic numerals.

It will appear hereinafter that the operation of the device is placed on a 400 microsecond cycle basis. During the first 256 microseconds of each such cycle a numeral is displayed twice, whereas during the remaining 144 microseconds nothing happens in which we are at present interested. It will appear hereinafter that there are, in effect, two 400 microsecond cycles which overlap at different times. By manually operable setting means the device is adjusted so that the registers may be examined and the records therein may be taken off at any given count of the first of these 400 microsecond cycles. Thereupon the other of these 400 microsecond cycles starts and the operations in the first 256 microseconds thereof are those with which we are concerned.

Figure 5:
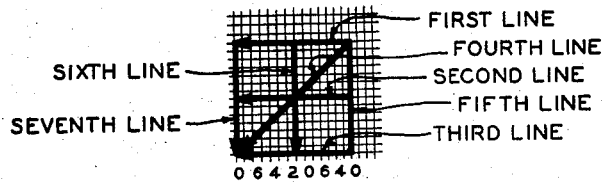
Fig. 5 is a representation of the digit raster.

The raster illustrated in Fig. 5 consists of a sweeping of the beam for a first period over a horizontal line at the top, from right to left, during a second period over a horizontal line in the middle from right to left, during a third period over a horizontal line at the bottom from right to left, during a fourth period over a diagonal line from top right to bottom left, during a fifth period over a vertical line to the right from top to bottom, during a sixth period over a vertical line in the middle from top to bottom and during a seventh period over a vertical line at the left from top to bottom. This basic pattern is shown in Fig. 5. This consumes 112 microseconds. The timing is actually arranged on the basis of 128 microseconds or 16 octal cycles (each of 8 microseconds) and since the raster consumes 14 such octal cycles there is a spacing of one octal cycle before and one after the actual movement of the beam. Thus in a period of 256 microseconds the cathode ray tube may be made to display any single numeral twice. Thus a minor cycle of the device consists of 144 microseconds before the display during which the tube is blank, followed by two 128 microsecond periods during each of which the numeral is displayed. Figs. 9–12, 65 and 66 when placed as indicated in Fig. 8 is a time chart showing the operations taking place in these two 128 microsecond periods.

Figure 6:
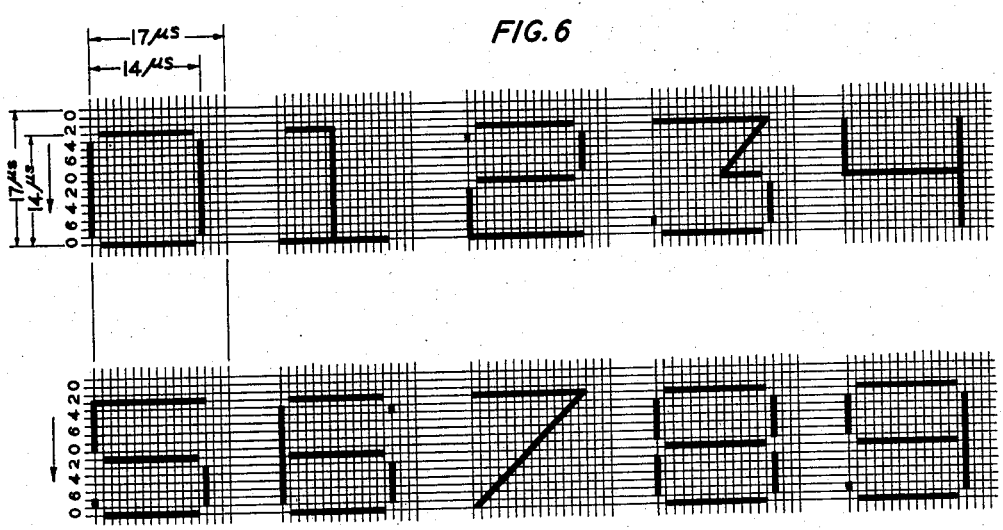
Fig. 6 is a set of ten numerals drawn in cross sectioned spaces showing how the various lines of the raster are selectively brightened to form the ten Arabic numerals.
Figure 7:
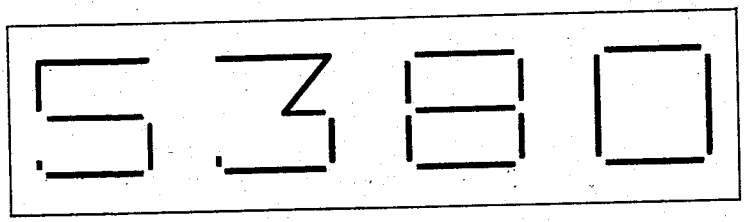
Fig. 7 is a representation of the face of one of the plurality of cathode ray tubes showing the general appearance of a four digit number displayed thereon.

The basic pattern of the trace followed by the beam of the cathode ray tube is shown in Fig. 5. By selectively intensifying various portions of this raster the various numerals as illustrated in Fig. 6 may be formed. Since it will appear hereinafter that four numerals are displayed on the face of each of twenty cathode ray tubes, Fig. 7 is included to give an indication of the appearance of one such tube during the display.

Figure 11:
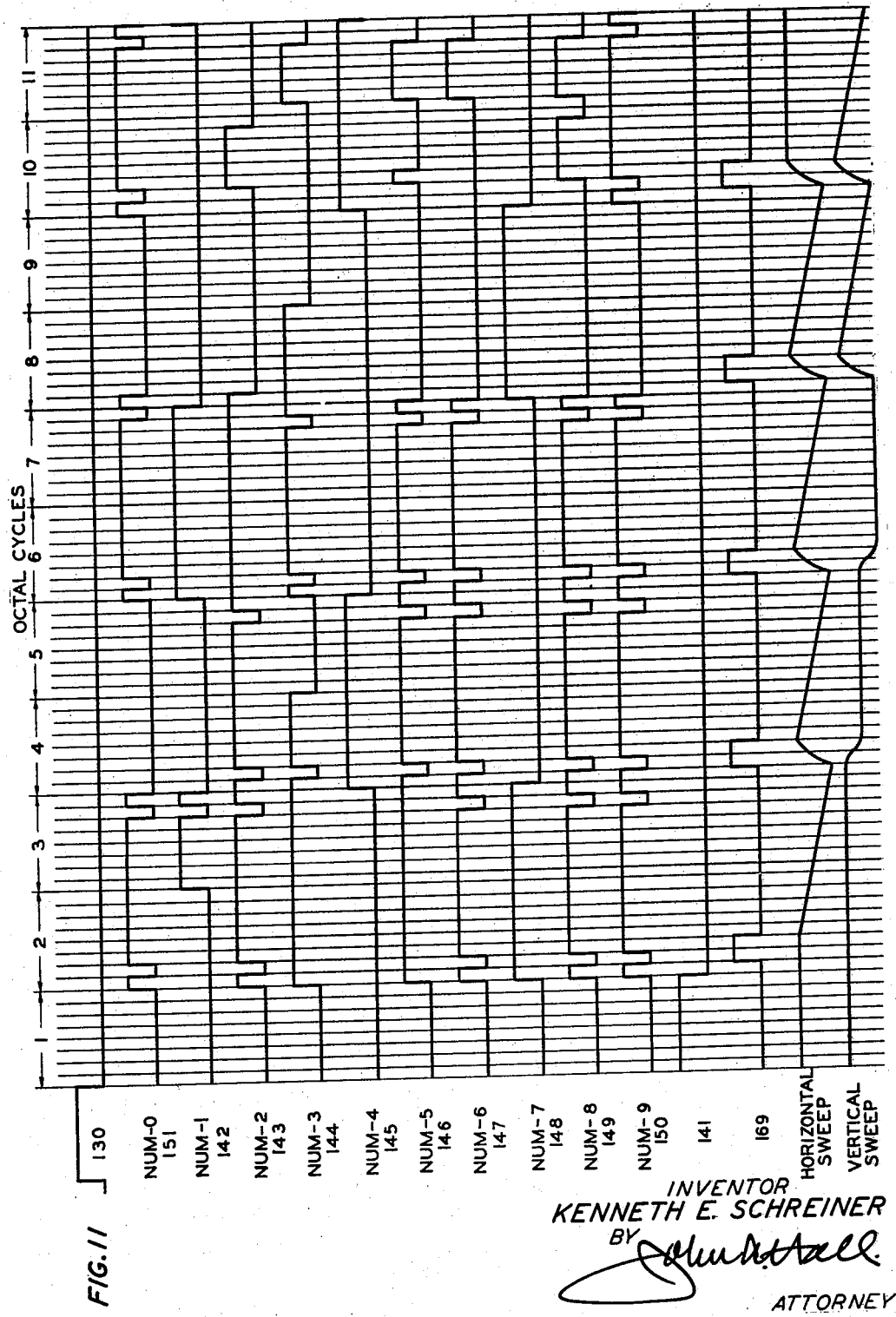
Figure 12:
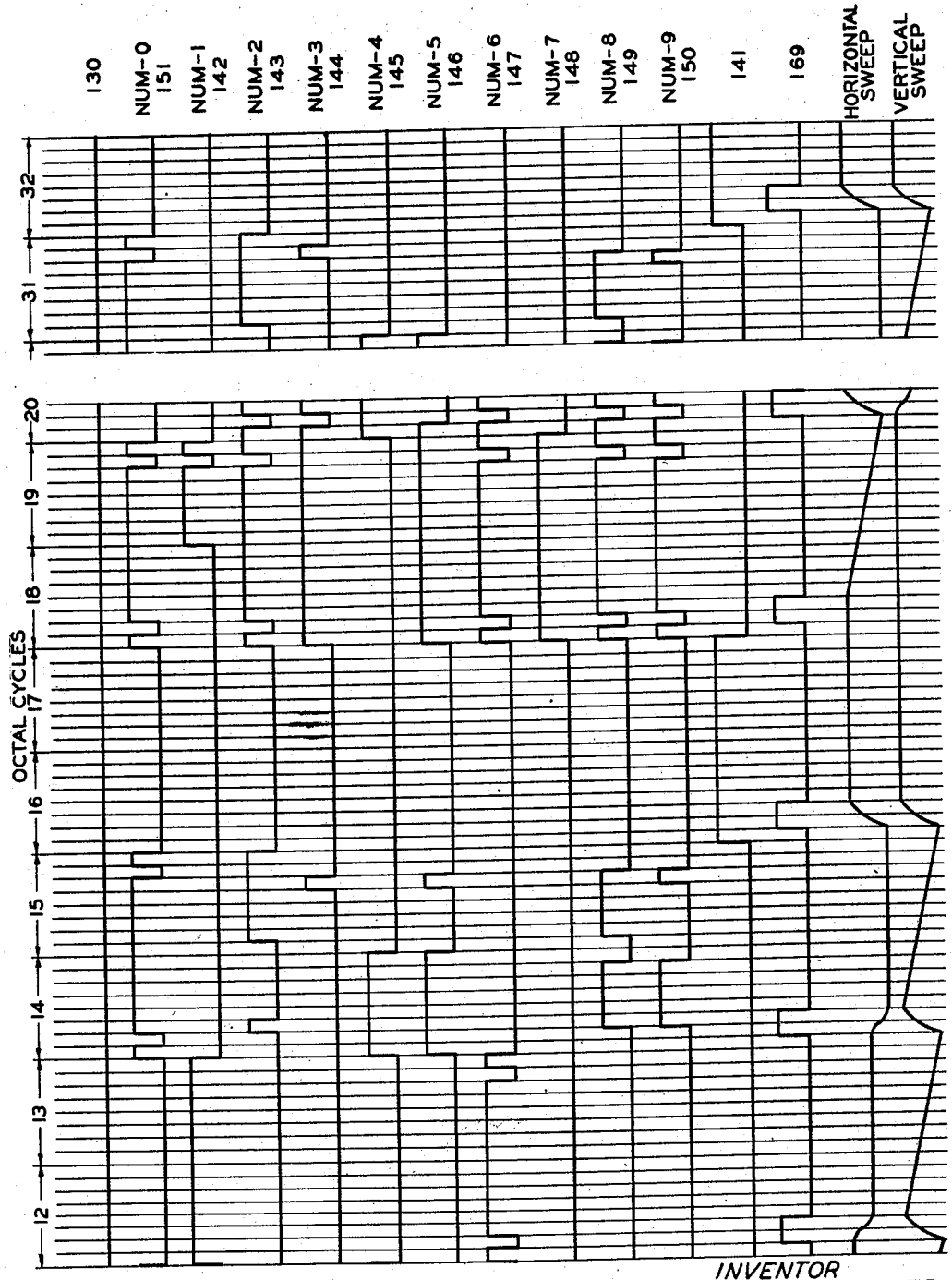

The raster, Fig. 5, and the numerals Fig. 6, have each been shown on a cross sectioned mat 17 x 17 intervals and thus partake of the quality of a time chart. It will be noted in the time charts Figs. 9–12, 65 and 66 that each 128 microsecond period is divided into a plurality of octal cycles each containing the eight intervals N.0 to N.7 inclusive. Therefore the cross sectioned mat is drawn to include the 17 intervals N.0 of a first octal cycle to N.0 of a third octal cycle inclusive, this merely for counting purposes. It will further be noted by looking at Figs. 11 and 12 that the time allotted for the formation of each line of the raster is only of fourteen microseconds' duration, from time N.3 of a first octal cycle to time N.0 of a third octal cycle, the pull up pulse occupying times N.1 and N.2 of the first octal cycle making up the two complete octal cycles actually allotted to each line of the raster. Therefore the synthesized NUM–0 to NUM–9 signals shown in Figs. 11 and 12 are shifted and trimmed in a manner to be fully described hereinafter, particularly by the help of Fig. 67, and will appear as shown in these cross sectioned mats in Fig. 6. The raster, then, and each numeral occupies a square 14 intervals by 14 intervals, but is shown on this 17 x 17 mat for a clear understanding of the timing thereof.

The two 128 microsecond periods are shown in the time chart consisting of Figs. 9–12, 65 and 66 placed as shown in Fig. 8. A number of traces are shown, each of which will be referred to hereinafter. Let us take for example the graph NUM–0. This shows the zero signal pattern used when a zero is to be displayed on the face of one of the cathode ray tubes during one of the forty minor cycles of 400 microseconds. At the beginning of the first 128 microsecond numeral forming period there is an octal cycle of eight microseconds during which this shows the potential applied to the grid of the tube to be Down. Then generally the grid is driven Up during the 2nd and 3rd, the 6th and 7th, the 10th and 11th, and the 14th and 15th octal cycles. However, it will be noted that the first and last single microseconds of each of the line writing periods are blanked so that this top, this bottom, this right hand vertical, and this left hand vertical line, each is of only twelve microseconds duration and the lines do not meet to form sharp corners but actually give a rounded off appearance.

Again, let us assume that the digit 1 is to be written. Looking at the graph NUM–1 it can be readily seen that an unblanking signal occurs for 6 microseconds during the 3rd octal cycle and for 14 microseconds during the 6th and 7th, and the 12th and 13th octal cycles. In the 2nd octal cycle the tube is blank but in the 3rd octal cycle it is unblanked for 6 microseconds, and blank again for a one microsecond interval. Referring to the basic pattern shown in Fig. 5, this means that the right half of the top horizontal line is not written inasmuch as the writing operation takes place from right to left. However, that part of the top horizontal line from time N3.2 to N3.7 inclusive is written. Since the signal is Up for the entire 14 microseconds of the time N6.3 to N8.0 inclusive, this means that the entire bottom horizontal line is written. In the same way since the 14 microsecond signal occurs in time N12.3 to N14.0 inclusive, the center vertical line is written fully so that its top portion connects to the top horizontal line and its bottom portion connects to the bottom horizontal line as shown in the example in Fig. 6.

All the other digits may be similarly developed by referring to time chart Figs. 9–12, 65 and 66. However, it should be understood that the signal patterns discussed merely accomplish the blanking and unblanking of the cathode ray tube. That is to say, they make a beam available at the top right corner of the area in which the digit is to be written. The movement of this beam to accomplish digit formation is brought about by the horizontal and vertical sweep voltages whose waveform is shown at the bottom of this time chart. It can be seen that the first horizontal line is developed by gradually reducing the voltage on the right horizontal plate at the same time that the top vertical deflection plate voltage remains at its upper limit. At the end of the first 14 microsecond interval the horizontal sweep voltage is pulled up to its maximum level as the beam returns to the right edge of the writing area. During the 14 microsecond period the vertical sweep voltage is reduced sufficiently so that the gradual reduction of the horizontal sweep voltage, from its maximum to its minimum points, will cause the beam to develop the second horizontal line in the center of the basic pattern (Fig. 5). The third horizontal or bottom line is developed by gradually reducing voltage on the right horizontal deflection plate, viewing the tube from its face side, as the vertical sweep voltage is reduced by an amount which permits the beam to travel on the lower level. The diagonal line is formed during the fourth 14 microsecond interval by the reduction of the horizontal and vertical sweep voltages from their maximum to their minimum operating levels. The beam developed during the fifth period of unblanking is caused to form the right vertical line by maintaining the horizontal sweep voltage at its maximum level at the same time that the vertical sweep voltage of the top plate is reduced from its maximum to its minimum operating level. The sixth and seventh lines are formed by reducing the horizontal sweep voltage to two lower levels at the same time that the vertical sweep voltage is reduced in sawtooth wave form.

Following this seventh 14 microsecond period there is an 8 microsecond period to round out the 128 microsecond period after which it is repeated and the numeral displayed is repeated a second time.

Fig. 13 is a greatly simplified showing of the fundamental aspects of the present invention. There is a timing generator 18, counting off the octal cycles of 8 microseconds each, or perhaps it might better be said to be counting off the microseconds since there is no particular significance to the groups of eight except that the octal commutator is a convenient arrangement and the numerals are formed, as above stated, by combinations of the seven lines of the raster each of which is traced in two octal cycles. This generator controls the sweep voltage generator 19 and the grid pulse coding device 20. The first supplies the beam directing plates of the tube 21 so as to continuously and repeatedly move the beam in accordance with the raster described. At the same time the timing generator 18 controls the grid pulse coding device 20 to generate the ten different potential codes shown in the time chart Figs. 9–12 such as NUM–0, NUM–1, etc. which are connected in to the grid pulse selector switch 22. Since a digit in pure binary code may be transmitted into this switch 22 over the 1 bit, 2 bit, 4 bit, and 8 bit wires, this will effectively connect a corresponding one of the numeral timing codes from the coding device 20 to the grid pulse shaper 23 and thence to the grid of the tube 21 for the purposes described.

In the present disclosure twenty cathode ray tubes are employed, on which eighty numerals may be displayed. These tubes are arranged as in Fig. 14, in four rows of five tubes each. Each position of each tube is effectively connected to a particular position within the calculator. Thus the first seventeen positions (reading from right to left) of the two bottom rows (rows 3 and 4) connect into the various digital positions of what might be termed Register 1 and Register 2.

The basic function of all the circuits hereinafter described is to display the information present in Register 1, Register 2, the Instruction Register, and the U, V, M4, M6 and M8 Fields on the face of appropriate cathode ray tubes, there being one tube for each four digits displayed. However, it should be understood that the Register Display circuits are not an integral part of the Calculator in the sense that their operation is dependent on the functioning of the other circuits of the calculator. That is to say, once the Register Display circuits are operated, they will display digits made available to it from any source. The display of information on the face of the cathode ray tubes becomes important when it is desirable to observe the contents of the calculator at some specific time interval of a complete suboperation cycle.

The overall structure and function of the Register Display circuits may be seen by examining Figs. 16 and 17 arranged as indicated in Fig. 15. The basic circuits of the Register Display System include the basic counting or timing circuits, the digit switching circuits, the digit raster timing generator, the grid pulse coding circuits, the grid pulse selector circuits, the column and position selector circuits, and the sweep voltage generators.

The basic counting or timing circuits used in the Register Display System are composed of Microsecond Selector switches 4718, the 400 microsecond counter 4719 and matching circuits 4720, as shown in Fig. 16. The Microsecond Selector switches 4718 are shown in Fig. 19 and consist of three manual switches which are settable to display information present in the calculator in any specific time interval of a normal calculator suboperation cycle. That is to say, the three switches may be set from 1 to 400 microseconds.

The 400 microsecond counter 4719 is actually made up of two decade counters and the eight signals of an octal cycle generated by an Octal Commutator. Once the operator has selected the time interval of displaying information during any normal calculator suboperation cycle, the 400 microsecond counter 4719 counts through 400 microseconds until it develops a signal at the particular time interval at which the manual switches have been set. The first decade counter which counts through 80 microseconds before being automatically reset is controlled by an N.0 (time 0 in the 400 microsecond count) signal, in this case, from the Octal Commutator. The second decade counter is controlled by the carry signal developed by the first decade counter at the end of an 80 microsecond cycle. It is reset after it receives the fifth carry signal from the first decade counter. Every 400 microseconds the second decade counter delivers a one microsecond signal to the Calculator in order to recycle the calculator for another display period.

After the 400 microsecond counter 4719 has counted through to the manual setting of the Selector switches 4718, the matching circuits 4720 develop signals which control the operation of all the other circuits that are fed to Counter Control circuit 4721. The Counter Control circuit operates the three Display Control Counters 4722–4724 and clears the single digit storage circuits 4841 and 4842 each 400 microseconds.

The three Display Control Counters 4722–4724 are illustrated in detail in Figs. 22–25. Each position of the 1 to 9 counter 4722 corresponds to 400 microseconds, and therefore one complete cycle of this counter is equivalent to 3.6 milliseconds. The first two positions of the Display Control Counter 4723 correspond to full cycles of counter 4722 and position 3 corresponds to merely two positions of the third cycle of counter 4722. Thus to write 20 digits in any row of the C. R. T. requires that the Display Control Counter 4722 runs through two full cycles and two positions of its third cycle or the equivalent of 20 positions. The 1 to 2 counter 4724 has its first position corresponding to the simultaneous writing of the first two rows of the display and the second position corresponding to the writing of the bottom rows of the display. The positions of the 1 to 9 counter 4722 and the 1 to 3 counter 4723 determine which digits are to be gated through 4-pole switches 4725 and 4726 and control the operation of the C. R. T. column and position selector 4847. The 4 Pole Switch 4725 represents forty such switches which are successively enabled in each succeeding 400 microsecond period to make a digit from a different position in the fields available to the single digit storage 4841.

The various position 4-pole switches 4725 and 4726 actually constitute the Register 1 Display Switch, the Register 2 Display Switch, the Instruction Register Display Switch and the U, V, M4, M6 and M8 Display Switch shown in more detail hereinafter. As many as 80 binary-decimal digits may be made available at the input of the two switches 4725 and 4726 inasmuch as the C. R. T. Display may handle that number of digits. The drawings define the function of these switches in a particular Calculator, but it should be understood that the Register Display circuit may be devised to use equivalent switches for receiving digital inputs from other sources.

The two digits which are gated through the switches 4725 and 4726 are stored for a period of 400 microseconds in single digit storage circuits 4841 and 4842, which are shown in detail hereinafter. At the end of each 400 microsecond interval, the Counter Control circuit 4721 pulls Down the Hold line which erases or clears the digits previously stored in the single digit storage circuits. The two binary-decimal digits stored in the storage circuits 4841 and 4842 are made available statically during a 400 microsecond time interval to the Grid Pulse Selector and Greater-Than-9 Detectors 4845 and 4846 where the binary-decimal digits are converted into decimal form.

The digit raster timing generator 4840 is shown in greater detail hereinafter. This circuit starts its operation at the beginning of each 400 microsecond cycle under the control of a signal developed by the Counter Control circuit 4721. Since the two digits are to be displayed simultaneously within a period of 256 microseconds, the digit raster timing generator 4840 accomplishes one cycle of its operation in that time interval. Actually, it develops two identical sets of signal waveforms, one during the first 128 microseconds (of the first 256 microseconds of this 400 microsecond cycle) and the other during the latter 128 microseconds, inasmuch as the digit is actually written twice during the 256 microsecond display period. Signal waveforms developed on four output lines are delivered to the Grid Pulse Coding circuits 4843, and a pull-up pulse developed for one microsecond each 16 microseconds of the 256 microsecond time interval is delivered to the Sweep Voltage Generator 4848.

The signals delivered to the Grid Pulse Coding circuits 4843 are combined in various ways in order to form the wave pattern corresponding to digits 0 through 9 which are subsequently to be used for unblanking the appropriate display tubes during a writing operation. The Grid Pulse Coding circuits 4843 also develop voltages for the horizontal and vertical deflection circuits illustrated by block 4848 in Fig. 17. The Grid Pulse Coding circuit 4843 is illustrated in detail hereinafter.

The signal waveforms corresponding to the digits 0–9 formed by the Grid Pulse Coding circuits 4843 are delivered to the Grid Pulse Selector and Greater-Than-9 Detector circuits 4845 and 4846. There is a grid pulse selector circuit associated with each single digit storage circuit. The digit in each of the two storage circuits is made available to the Grid Pulse Selector circuit for a time interval of 400 microseconds during which time the binary-decimal value is converted into a decimal value which is then used to select a signal wave form which will permit the digit stored in the Single Digit Storage circuit to be written on the face of an appropriate cathode ray tube. If the digit which is stored happens to be greater-than-9 the modulo 8 value signal pattern is developed provided that a pushbutton on the console designated Greater-Than-9 is depressed. The Greater-Than-9 circuits are shown in detail hereinafter.

It may be shortly noted here that since the digits are stored in pure binary code it may be considered that a possibility exists of an error in which one of the numbers 10 to 15 might be expressed by some combination of the 1, 2, 4 and 8 Bit signals. Should any one of these numbers, each of which is greater than 9, be registered, then when it is transferred to the single digit storage 4841 the result will be that no display is produced. The operator, by depressing a button, may effectively cast out an 8 from the number, by actually suppressing the 8 Bit wire, whereupon if a 7 appears he will know that a number 15 had been erroneously expressed, since 7 is the modulo eight value of 15.

There are four Grid Pulse Generators 4849, each being associated with a row of cathode ray display tubes. Inasmuch as two digits are written simultaneously, two C. R. T. Grid Pulse Generators 4849 are operated simultaneously. Each of the C. R. T. Grid Pulse Generators is composed of five combinations of And circuits and grounded grid amplifiers with each grounded grid amplifier controlling the unblanking of one of five tubes in a row. This it does by causing the control grid of the C. R. T. to be operated to go sufficiently positive to develop a beam for writing the digit. The signal developed by the Display Control Counter 4724 determines whether the top two or bottom two rows of the C. R. T. Display are to be operated, and the C. R. T. column and position selector circuits 4847 select which one of the five combinations of And circuits and grounded grid amplifiers and the selected C. R. T. Grid Pulse Generators is to be operated. Thus the C. R. T. Grid Pulse Generator 4849 determines the tube and row of display.

The control grid of the appropriate C. R. T. having been unblanked, the Sweep Voltage Generator 4848 develops the required horizontal and vertical sweep voltages which move the beam to form the digits 0–9 on the face of the tubes. The Sweep Voltage Generator also determines which one of four positions on each C. R. T. face that the digit is to be displayed. The Sweep Voltage Generator consists essentially of a group of parallel connected current adders operating in conjunction with the stabilizing circuit arranged in a cascode amplifier form.

After the C. R. T. Grid Pulse Generator 4849 has selected a specific tube and the Sweep Voltage Generator 4848 has developed the required voltages to write the desired digit in a specific position of the selected tube, the C. R. T. displays the digit in a 256 microsecond interval of a 400 microsecond cycle. Actually the digit is written twice in this period. As expressed hereinbefore each digit is formed of portions of seven lines, three horizontal, three vertical and one diagonal. The beam is moved from right to left, viewing the C. R. T. from its face, and shows up only during the time that the control grid of the operating tube is unblanked. Each line is of 14 microseconds' duration. Since four digits may be written on the face of any C. R. T., this means that the width of any figure cannot be greater than three-quarter inch, where 3 inch tubes are used. The circuits however are adaptable to any electrostatic deflection C. R. T.

Thus it is seen that the Register Display circuits in the calculator are capable of writing any digit 0 through 9 twice within a 256 microsecond time interval. Since there are 20 tubes and each tube is capable of displaying four digits, it can be seen that as many as 80 digits may be written within a 16 millisecond period. This display of information on the face of the cathode ray tubes becomes important when it is desired to observe the contents of the calculator at some specific time interval of a complete calculator suboperation cycle. Once the manual controls on the calculator are set for the recycling of a particular operation or instruction and the Microsecond Selector switches are set for the desired period of display, the 80 digits will be repeated during each 16 millisecond cycle.

C. R. T. DISPLAY ARRANGEMENT

Reference to Fig. 14 will show that 20 cathode ray tubes are provided in the calculator for the display of information. There are four rows of tubes each row being divided into groups of five tubes. The top row displays the information in the various fields where useful information of value is stored, the second row displays the information in the Instruction Register, the third row displays the information present in Register 1, and the fourth or bottom row displays the information in Register 2. Returning to the first or field row, the first tube (that is in terms of energization) displays the four digits in the M8 Field, the second tube displays the information in the M6 Field, the third tube displays the information in the M4 Field, the fourth tube displays the information in the U Field, and the fifth tube displays the information in the V Field. These may be considered arbitrary designations since the nature of the source from which the information is derived has no bearing on the operations.

One odd and one even row of the C. R. T. Display System are operated simultaneously in this way reducing by half the overall time for displaying all the information. That is to say, during each 400 microsecond cycle operation of the Register Display Control circuit, which will be analyzed in greater detail below, two digits will be presented simultaneously for display. However, the digits are actually displayed for 256 microseconds. For example, during the first 400 microsecond cycle of the Register Display Control circuit operation, the first digit in the M8 Field in row one will appear at the same time that the first digit of the Instruction Register in row two appears. During the second 400 microsecond cycle of the Register Display Control circuit operation, the second digit of the M8 Field in row one makes its appearance at the same time that the second digit in row two occurs. During the fifth 400 microsecond cycle the first digit in the M6 Field of row one is displayed at the same time that the fifth digit of the Instruction Register makes its appearance.

This display is automatic, the process continuing until the first and second rows have had the digits corresponding to the field or register positions displayed. When the 21st 400 microsecond cycle is started by the Register Display Control circuit, the first digit of Register 1 in row 3 and the first digit of Register 2 in row 4 are displayed. The display of the digits in Registers 1 and 2 continues sequentially as in the case of the Instruction Register and the various fields. However, the display of digits of the three registers is distinguished from such a display in the case of the fields by the fact that only 17 digits may exist in Registers 1, 2 and the Instruction Register, thereby permitting only utilization of four C. R. T.'s and part of the fifth in rows two, three, and four. The five fields in row one are each capable of carrying four digits and therefore permit all five tubes to be used for display. The last three tubes of rows two through four, are used for testing purposes only, as will be explained subsequently in this disclosure.

The display of digits on the faces of the various tubes in the C. R. T. display section is automatic once the Register Display Control circuit has begun its operation. During the normal course of calculator operation the display of the digits in the various fields and registers for the 256 microsecond time interval is, of course, insufficient for reading by the operator, assuming that the contents of the registers and fields is being constantly altered. However, in the event that a specific calculator suboperation cycle is repeated, the continuous display each 16 millisecond cycle will permit the operator to read the information present in the various fields and registers at the time that the calculator is stopped. Reference to the table below will show exactly which positions of the various fields and registers are displayed during each minor cycle of 400 microseconds of the complete major cycle of 16 milliseconds. In the table below the counters are designated 1, 2 and 3. Counter 1 is the lowest order and counts 1 to 9 repeatedly. Each time it completes a count of 9 it advances the second order counter which counts 1, 2 and 3. When the second order counter has counted 3 and thereafter the first order counter has counted another 2, the third order counter advances from 1 to 2 and the first and second order counters are automatically returned to their 1 count position. Thus with the counters in positions 6, 2 and 1 respectively the actual count will be 9+6+0=15.

*Table I*

| Minor Cycle | Row | Pos. | Counters 1 2 3 | Minor Cycle | Row | Pos. | Counters 1 2 3 |
|---|---|---|---|---|---|---|---|
| 1 | 1-2 | 1 | 1 1 1 | 21 | 3-4 | 1 | 1 1 2 |
| 2 | 1-2 | 2 | 2 1 1 | 22 | 3-4 | 2 | 2 1 2 |
| 3 | 1-2 | 3 | 3 1 1 | 23 | 3-4 | 3 | 3 1 2 |
| 4 | 1-2 | 4 | 4 1 1 | 24 | 3-4 | 5 | 4 1 2 |
| 5 | 1-2 | 5 | 5 1 1 | 25 | 3-4 | 5 | 5 1 2 |
| 6 | 1-2 | 6 | 6 1 1 | 26 | 3-4 | 6 | 6 1 2 |
| 7 | 1-2 | 7 | 7 1 1 | 27 | 3-4 | 7 | 7 1 2 |
| 8 | 1-2 | 8 | 8 1 1 | 28 | 3-4 | 8 | 8 1 2 |
| 9 | 1-2 | 9 | 9 1 1 | 29 | 3-4 | 9 | 9 1 2 |
| 10 | 1-2 | 10 | 1 2 1 | 30 | 3-4 | 10 | 1 2 2 |
| 11 | 1-2 | 11 | 2 2 1 | 31 | 3-4 | 11 | 2 2 2 |
| 12 | 1-2 | 12 | 3 2 1 | 32 | 3-4 | 12 | 3 2 2 |
| 13 | 1-2 | 13 | 4 2 1 | 33 | 3-4 | 13 | 4 2 2 |
| 14 | 1-2 | 14 | 5 2 1 | 34 | 3-4 | 14 | 5 2 2 |
| 15 | 1-2 | 15 | 6 2 1 | 35 | 3-4 | 15 | 6 2 2 |
| 16 | 1-2 | 16 | 7 2 1 | 36 | 3-4 | 16 | 7 2 2 |
| 17 | 1-2 | 16 | 8 2 1 | 37 | 3-4 | 17 | 8 2 2 |
| 18 | 1-2 | 18 | 9 2 1 | 38 | 3-4 | 18 | 9 2 2 |
| 19 | 1-2 | 19 | 1 3 1 | 39 | 3-4 | 19 | 1 3 2 |
| 20 | 1-2 | 20 | 2 3 1 | 40 | 3-4 | 20 | 2 3 2 |

Reference to the table will show that the group of four digits in each of the fields of row one is displayed in four 400 microsecond time intervals or in other words in 1.6 milliseconds. Such being the case, it will take five times that period or eight milliseconds to display the digits associated with the five fields of row one. Since row two is being displayed at the same time as row one, it too will take eight milliseconds to display all the digits in the Instruction Register despite the fact that the last three tubes in row three are not used for other purposes. During the last three 400 microsecond cycles, that is from 6.8 to 8 milliseconds, the two, four, and eight binary order digits of the V Field are displayed at the same time that no digits of the Instruction Register are displayed. During the second half of the 16 millisecond cycle the last three cathode ray tubes of rows 3 and 4 are operated during the last three 400 microsecond cycles, that is from 14.8 to 16 milliseconds, although Register 1 and Register 2 carry a maximum of 17 digits. However, the last three cathode ray tubes of rows two through four may be connected for use in displaying any information in the calculator which it is desired to check. This check will of course always occur during the last three 400 microsecond periods mentioned above since all the 20 display tubes are controlled by the 16 millisecond cycle of the Register Display Control circuit, as will be explained in detail below.

The first part of this disclosure will cover the control and switch circuits in order to show how the timing cycle is accomplished and how the different digits in the positions of the various fields and registers are selected for display. The second part will deal with the formation of the digits selected for display by the control and switch circuits.

SELECTING THE DISPLAY TIME INTERVAL

Initially it must be understood that a normal calculator suboperation cycle runs up to 400 microseconds. This does not mean that the calculator must always take 400 microseconds in order to go one complete cycle. For example, under certain conditions, with which we are not here concerned, a new suboperation cycle will start as soon as the old cycle has been completed. However, under other conditions a new calculator suboperation cycle can only start 400 microseconds after the previous cycle had been started. That is to say, if the operation called for by the particular operational code is completed in less than 400 microseconds the completion signal will have no effect on the Operation Control circuit until the one microsecond signal appears in Operation Control from the Register Display Control circuit at the 400 microsecond time interval.

During the regular operation of the calculator it may be desirable to display information developed by the calculator during some part of its regular cycle. By adjusting the microsecond selector switches on the console the operator is able to select the information present in the various fields and registers which appear at some point in the regular 400 microsecond calculator cycle.

Reference to Fig. 19 will show that three switches are provided for selecting the desired interval for display. These switches are labelled Eighths, Units and Tens and correspond to the units, tens and hundreds in standard Arithmetic. The arm of the Eighths switch is connected directly to the +10 volt line, whereas the arms of the Units and Tens switches are connected to the output terminals feeding the Register Display Control circuit. The contact terminals of the Units and Tens switches are connected to the +10 volt or the −35 volt lines.

In the case of the Eighths switch only one of its contact terminals may be Up according to the position of the arm 29. The Eighths switch is set on position 1 so that the number 1 outgoing terminal is Up and all the other terminals are Down because of their connection through a resistor such as 26 to the −82 volt line. With the switch in this position output terminal 1 is Up and a signal is fed to the Register Display Control circuit. It will be noticed that the Eighths switch has 8 positions labelled 0 through 7 which correspond to the basic timing cycle, N.0 through N.7 time, of the calculator.

There are four wafers in the Units switch corresponding to the binary 1, 2, 4 and 8 Bits. The contact terminals of the four wafers of the Unit switch are connected to the +10 and −35 volt lines in such a way that the switch settings would develop signals at output terminals Units-1, Units-2, Units-4 and Units-8 corresponding to the desired value. In Fig. 18 the switch is shown in position 2. When in this position output terminal Units-2 which is the binary two bit line is caused to be Up because the second from the right wafer 27 has its arm connected to the +10 volt line. If, for example, the Units switch were set on 7, then the arm of the right wafer 28 would be connected directly to the +10 volt line and output terminal Units-1 would be Up, the arm 27 would be connected to the +10 volt line and output terminal Units-2 would be Up, and the arm 29 would cause output terminal Units-4 to be Up. Thus the binary-decimal 7 would be formed. The arm 30 of the switch has only its 8 and 9 positions Up at any time. If an 8 were the desired Bit, only the left arm 30, corresponding to the binary Bit 8, would be Up and output terminal Units-8 caused to be Up also. Arms 27-30, as indicated, move together.

The Tens microsecond selection switch comprises three sections corresponding to the binary 1, 2 and 4 Bits. Its operation is identical to the four section Units switch. As shown in Fig. 19, the Tens switch has its one Bit output terminal Tens-1 Up because arm 33 of the switch corresponding to the one Bit is directly connected to the +10 volt line. Unlike the Units switch which can be set to any one of ten positions, the Tens switch can be set to any one of 5 positions, assuming that the zero setting is one position. It can be seen that the zero settings of the Units and Tens switches are all connected to the −35 volt line. Only the zero position of the Eighths switch may be connected to the positive line inasmuch as this position constitutes the first microsecond of an 8 microsecond cycle.

It has been stated above that these three switches are adjusted for a desired time interval for information display. In Fig. 19, the Tens switch is shown in position 1, the Units switch is shown in position 2 and the Eighths switch is shown in position 1. Such a setting indicates that the operator desires to look at the information in the various registers and fields at the 98th microsecond interval of a regular calculator suboperation cycle. This is determined in the following manner.

|                | Position | Microseconds Count |
|----------------|----------|--------------------|
| Eighths Switch | 1        | 2                  |
| Units Switch   | 2        | 16  (2× 8)         |
| Tens Switch    | 1        | 80  (1×80)         |
| Total          |          | 98                 |

The maximum setting of the three switches is 400, it being understood that the Eighths switch is capable of handling the lowest 8 digits, the Units switch is capable of handling the tens of the Eighths setting, that is from 8 to 72, and the Tens switch is capable of handling an 80's number, that is from 80 to 320. Once this is understood there is no difficulty in setting the switches to accomplish a display of calculator information at any desired time interval of calculator operation. Fig. 20 will show that when the three switches are set as shown in Fig. 19, the Eighths-2 line in the Eighths section is Up causing the left input terminal of 2-position switch 3564 to be Up also. When the Units setting is as shown in Fig. 19, the Units-2 terminal is caused to be Up and the second from the right set of four input terminals of Inequality Detector 3560 is caused to be Up also. In the same way when the Tens setting is as shown in Fig. 19, the Tens-1 output terminal is Up causing the fourth from the left input terminal of the left group of four input terminals of Inequality Detector 3553 to be Up.

OPERATION OF THE DECADE COUNTERS

The basic timing source for the entire display system is made up of two decade counters 3559 and 3550 shown on Fig. 31. Each of these decade counters comprises a binary adder, five delay circuits and a clamp and sync. inverter. The description of the decade counters used in the Register Display Control circuit is intended to provide an understanding of their operation in the circuit. Reference should be made to Figs. 31-35 for an understanding of the operation of decade counters 3559 and 3550. Fig. 31 illustrates the inter-relationship of the components of these two decade counters, and Fig. 32 through Fig. 35 illustrates the condition, either Up or Down, of the various terminals of these decade counters at different time intervals. In the latter four drawings one complete cycle of operation of both decade counters is examined.

It will be remembered that what might be termed the master timing device of the present arrangement is the the octal commutator which has eight output leads N.0 to N.7 inclusive and over each of which a pulse is successively and repeatedly transmitted. Thus, at what might be termed time zero, a pulse is transmitted over the N.0 lead and eight microseconds thereafter repeatedly. This is repeated so that on each eight microsecond count beginning with time zero a pulse will be transmitted over this lead. It will be noted that the N.0 lead 34 is connected as an input of the adder 4714 in Fig. 31.

The N.0 signal (from the octal commutator) inserted into the binary adder 4714 over the N.0 lead 34 is automatically present at the input of delay circuit 4701. It will be recalled that binary adder operation is such that when one input signal occurs the output will be a sum value. The signal at the input of delay circuit 4701 is such a sum value. After one microsecond the signal is available on the 8 strap at the input of delay circuit 4702. At the end of another microsecond the signal is available on the 4 strap at the input of delay circuit 4703, the process continuing until after a total of four microseconds (or at time N.4) the signal is made available at input terminal 4728 of the binary adder 4714.

Since the read-out of the digits formed by the decade counter 3559 into the other sections of the Register Display Control circuit can only be accomplished at an N.4 time as determined by the signal developed at input terminal 35 (Fig. 21) the first digit read out of decade counter 3559 over output 36 is therefore a 1. This might be seen more clearly by referring to Fig. 32. Since no other signal appears at the input of the binary adder 4714 at time N.4, the output from this adder will again go to delay circuit 4701 and through delay circuits 4702, 4703 and 4704 back to input terminal 4728 of the binary adder. Input terminal 4728 is Up now at N1.0 time which coincides with another signal received at the input of the binary adder over input terminal 34 from the Octal Commutator. When two signals are inserted simultaneously into a binary adder, the output condition is a carry signal which in this case is delivered to delay circuit 4700, rather than to delay circuit 4701. This time, input terminal 4727 of the binary adder is caused to be Up at N1.1 time, which develops a signal that is delivered to delay circuit 4701. At N1.4 time, that is the read-out time, the signal occurs at the output of delay circuit 4703 and at time N1.5 another pulse is delivered over 4728, through the adder 4714 and thence to delay 4701. The read-out over the terminals at time N1.4 will be expressed as binary 2, since a signal appears at this time only at the output of delay 4703.

Figure 32:
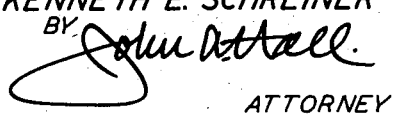
Figure 33:

At N2.4 time signals are present at the output of delay circuit 4703 and 4704 indicating a 3 or the expiration of another octal cycle since N1.4 time. Each succeeding N.0 time a signal is inserted into the binary adder from the Octal Commutator. Reference to Figs. 32 and 33 will show that the decade counter continues its operation with the higher order digit available for read-out at an N.4 time until the decade counter at time N9.1 has counted 73 microseconds since the arrival of the N.0 pulse which initiated the counting operation. At time interval N9.0 a signal is inserted into the binary adder from the Octal Commutator at the same time that a signal appears at the output of delay circuits 4701 and 4704. When input terminal 4728 and the N.0 terminal 34 are Up at the same time, the output of this adder will be a signal to delay circuit 4700. One microsecond later, that is at N9.1 time, a signal will appear at input terminal 4714 of the binary adder at the same time that a signal occurs at the output of delay circuit 4702. These two signals are delivered to And circuit 4712 where they develop coincidence and cause a carry signal to be fed to the next binary adder 4715. Thus five microseconds after a 9 was available for read-out from decade counter 3559, this counter develops a carry which is fed to the decade counter 4715 at the same time that the clamp and sync. inverter 4710 is operated to clear the contents of the decade counter 3559.

Figure 34:
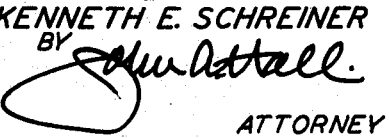

The carry signal fed to the binary adder 4715 of the decade counter 3550 is made available to delay circuit 4709 at the same time interval. At N9.2 time the signal appears at the output of delay circuit 4709. The signal on terminal 37 at this point corresponds to a digit 4. At N9.3 time the signal appears at the output of delay circuit 4708, corresponding to a digit 2. The following microsecond time interval, that is the N9.4 read-out time, a signal is available at the output of delay circuit 4707 corresponding to a digit 1. The condition of decade counter 3550 during the succeeding octal cycles remains the same as the preceding one. That is to say at each N.4 time of its operation the 1 is available for read-out until decade counter 3559 has completed another cycle of its operation, that is until the signal is received from decade counter 3559 at N19.1 time, as indicated in Fig. 34.

Since a signal exists at the output of delay circuit 4706, that is input terminal 4730 of binary adder 4715, at the same time that the carry signal arrives from decade counter 3559 through And circuit 4712, the output of binary adder 4715 will be a signal to delay circuit 4705. After a one microsecond time interval this signal will be delivered through binary adder 4715 to the input of delay circuit 4709. At time N19.3 the signal will appear at the output of delay circuit 4709, and after another microsecond at the output of delay circuit 4708. Thus at N19.4 time the signal which may be read out of decade counter 3550 at terminals 37 corresponds to digit 2, indicating that decade counter 3550 has gone through two cycles of its operation. Each cycle of operation of this decade counter is equivalent to 80 microseconds.

Figure 35:
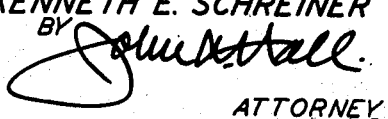

Each N.4 time from N19.4 time a 2 will be available for read-out until the third carry signal arrives at binary adder 4715 from decade counter 3559. Fig. 35 will show that when the carry signal arives at N29.1 time a signal occurs at the output of delay circuit 4707. The following microsecond signals will exist at the output of delay circuits 4709 and 4706. At the succeeding time interval, that is N29.3 time, signals will exist at the outputs of delay circuits 4709 and 4708. At the readout time of N29.4 signals will occur at the output terminals of delay circuits 4708 and 4707, indicating that a digit 3 may be read out.

Each 8 microseconds a 3 is available for readout at an N.4 time of decade counter 3550 until another carry signal arrives from decade counter 3559 at N39.1 time. This signal modifies the conditions in decade counter 3550 such that at N39.4 time a 4 is made available for read-out. Each N.4 time thereafter a 4 is made available for read-out until the fifth carry arrives from decade counter 3559. Fig. 35 will show that at time interval N49.1 when the fifth carry arrives, a signal is present at the output of delay circuit 4708. The next microsecond signals exist at the outputs of delay circuits 4709 and 4707, and at the next time interval, that is N49.3 time, the signals are present at the output terminals of delay circuits 4708 and 4706. Fig. 33 will show that when these signals occur simultaneously coincidence is established at And circuit 4713 and a carry signal is developed by decade counter 3550, indicating that decade counter 3559 has completed one full cycle. The carry signal developed by decade counter 3550 at N49.3 time also serves to operate the clamp and sync. inverter 4711 in a manner to clear the contents of decade counter 3550 in order that a new count might be started.

Thus it is seen that although decade counter 3559 runs through an 80 microsecond period before starting another cycle, it develops a clear and carry condition during the 73rd microsecond of the cycle. Therefore the highest order digit available to Inequality Detector 3560 shown in Fig. 20 is a 9. In the case of decade counter 3550, although the new cycle does not start until after decade counter 3559 has counted through 400 microseconds the clear and carry condition of decade counter 3550 occurs 395 microseconds after the cycle has started. Fig. 35 will show that the highest order digit developed by decade counter 3550 for delivery to Inequality Detector 3553 is a 4. Since each higher order digit developed by decade counter 3559 at N.4 time constitutes an 8 microsecond cycle and because each high order digit developed by decade counter 3550 corresponds to an 80 microsecond cycle of decade counter 3559, it is clear that the highest value which these two decade counters may present to their respective inequality detectors is 392.

Thus, at each N.4 time the numbers expressed at the terminals 37 and 36 will be the number of octal cycles which have passed since the first N.4 signal at the beginning of the operation. Thus at time N5.4 the digit at 37 is 0, the digit at 36 is 6 and 6×8 or 48 microseconds have passed. In the same manner at time N14.4 the digit at 37 is 1, the digit at 36 is 5 and 15×8 or 120 microseconds have passed. Again, at time N48.4 the digit at 37 is 4, the digit at 36 is 9 and 392 microseconds have passed. Fig. 35 shows time N48.4 as the last read out time. Time 49.4 which would be the next read out time finds both clamp and sync. inverters 4710 and 4711 operated and both counters cleared.

Decade counter 3550 corresponds to the Tens Microsecond Selector switch on the console and the decade counter 3559 corresponds to the Units Microsecond Selector switch. That is to say, the maximum operating setting of the Tens and Units switches is 49 which corresponds to a microsecond time interval of 392 microseconds. It will be recalled that the Eighths Microsecond Selector switch permits the selection of the exact microsecond for display. The Register Display Control circuit Fig. 21 matches the setting of the Eighths Microsecond Selector switch with signals developed by the Octal Commutator. Thus it is seen that the Register Display Control circuit develops its maximum 400 microsecond period with the aid of decade counters 3559 and 3550 and the 8 microsecond signals developed by the Octal Commutator. This permits the Register Display Control circuit to match the maximum 400 microsecond setting of the 3 microsecond selector switches on the console, as will be made clear from an analysis of the hypothetical situation discussed below.

It will be recalled that the operator may select the time interval, from 1 to 400 microseconds, for displaying information during a normal calculator sub-operation cycle. Once the switch selection has been made, decade counters 3559 and 3550 and the eight microsecond signals developed by the Octal Commutator go through their 400 microsecond cycle. When the microsecond course which the decade counters run through reaches the settings of the microsecond selector switches, signals are developed at output terminals 38 and 39 of the Register Display Control circuit Fig. 21 which control the selection of information for display.

CONTROLLING THE C. R. T. DISPLAY

Assuming that the operator wishes to display the information present in the calculator during the 98th microsecond of a normal calculator suboperation cycle, the three microsecond selector switches will be set in the following manner,

| Tens | Units | Eighths |
|------|-------|---------|
| 1    | 2     | 1       |

When the Tens switch is set at 1 the right input terminal of the left group of four input terminals of Inequality Detector 3553 Fig. 20 is Up. Setting the Units switch in position 2 causes the second from the right input terminal of the right group of four input terminals of Inequality Detector 3560 Fig. 20 to be Up. In the same way setting the Eighths switch in position 1 causes the left input terminal of the 2-position switch 3564 to be Up. These input terminals will continue to stay Up so long as these switches are in these positions. Operating these switches does not affect the continuous operation of the decade counters which are initially controlled by the signal developed at input terminal N.0 by the Octal Commutator.

To simplify the problem, assume further that the signal from the Octal Commutator at terminal N.0 does not arrive for initiating the decade counter 3559 until after the three Microsecond Selector switches have been set. In accordance with the chart Fig. 32 it will be seen that at N.1 time after the input signal has arrived, the 8 bit line from decade counter 3559 is caused to be Up. At N.2 time the four bit line from this counter is Up. The next microsecond the 2 bit line from decade counter 3559 is Up, causing the output of Inequality Detector 3560 to go Down since the Units-2 lead is also Up. The Inequality Detector operates in such a manner that when any two corresponding bit lines, in this case the 2 bit lines, are Up simultaneously the output of Inequality Detector 3560 is caused to be Down. The description of Fig. 4 should be noted.

There being no output from Inequality Detector 3560 the right input terminal of Or circuit 3555 is caused to be Down. At this time there is no equality between corresponding input lines of Inequality Detector 3553 and therefore the output of this detector continues to stay Up. The signal of Inequality Detector 3553 normally present until equality is detected energizes Or circuit 3555 even though the signal from 3560 may have gone Down and causes the input of inverter 3556 to be Up. This condition is then reversed by the inverter and the right input terminal of the left portion of 2-position switch 3557 is Down. Thus it is seen that although equality may exist between corresponding bit lines to Inequality Detector 3560 the left And circuit of 2-position switch 3557 cannot go Up until equality also exists between corresponding bit input terminals of Inequality Detector 3553.

Reference to Fig. 32 will show that the 2 bit line from decade counter 3559 is next Up at N.7 time and then at N1.4 time. Although the equality exists at the input of Inequality Detector 3560 at N1.4 time which is the readout time as determined by the N.4 signal developed at input terminal N.4 by the Octal Commutator, the left And circuit of 2-position switch 3557 will continue to stay Down until equality is determined by Inequality Detector 3553.

Since the Microsecond Selector switches for Register Display have been set for the 98th microsecond time interval, decade counter 3559 must go through one 80 microsecond cycle before Inequality Detector 3553 has its corresponding bit input terminals Up. Reference to Fig. 34 will show that the 1 bit lines which feed Inequality Detector 3553 are first Up simultaneously at N9.4 time. Although equality occurs at the input of Inequality Detector 3553 at an N.4 time, there is no equality between corresponding bit lines feeding Inequality Detector 3560 at this time. Therefore the right input terminal of the left And circuit of 2-position switch 3557 continues to stay Down. Reference to Fig. 32 will show that the first N.4 time that the 2-bit line from decade counter 3559 is caused to be Up after the first 80 microsecond cycle is at N1.4 time. Since the 1 bit line from decade counter 3550 is also Up at this time, equality exists between corresponding bit input terminals of Inequality Detectors 3553 and 3560. Thus at N11.4 time the output terminals of both Inequality Detectors are Down causing the input to Or circuit 3555 to be Down. This condition is then reversed by inverter 3556 and coincidence is established at the left And circuit of 2-position switch 3557 by the N.4 signal appearing at input terminal 35. Coincidence at this And circuit energizes a latch comprising 2-position switch 3557 and delay circuit 3558 for an octal period. At N11.5 time output terminal 39 is Up However, at this time the decade counters have only counted through 96 microseconds, and so output terminal 38 will be Down.

During the time that the decade counters were trying to establish equality at the input of the Inequality Detectors a signal has been appearing each eight microseconds at output terminal 38. This signal has been developed by the coincidence established at N.5 time at the left And circuit of 2-position switch 3564. The presence of delay circuit 3565 in the line has caused this output terminal to be Up each N.6 time of an octal cycle. Since output terminal 39 is caused to be Up at N11.5 time and stays Up for a duration of eight microseconds, it can be seen that output terminals 39 and 38 are Up simultaneously at N11.6 time.

Output terminals 39 and 38 remain Up simultaneously only for a period of one microsecond. The arrival of the next N.4 pulse at input terminal 35, after the latch comprising 2-position switch 3557 and delay circuit 3558 has been energized, operates inverter 3554 in a manner to cause the left input terminal of the right And circuit of 2-position switch 3557 to be Down. The output of this latch is caused to be Down one microsecond later, or at an N12.5 time. Output terminal 38 is caused to be Up at N12.6 time, and so these output terminals will not be Up together again until 400 microseconds later. When these two output terminals are caused to be Up simultaneously, two digits are caused to be displayed on the face of two cathode ray tubes, as will be subsequently described.

DEVELOPING THE 400 MICROSECOND SIGNAL FOR OPERATION CONTROL

One of the functions which the Register Display Control circuit performs which is unrelated to the display of information on the faces of cathode ray tubes is that of developing a 400 microsecond signal for the Operation Control circuit. The development of such a signal has no relation to the setting of the Microsecond Selector switches for Register Display on the console. That is to say, regardless of the time interval of display selected by the operator by the switching of the Microsecond Selector switches a signal is caused to appear at output terminal 40 Fig. 20 of the Register Display Control circuit each 400 microseconds of decade counter operation. Figs. 31 and 35 will show that at N49.3 time signals will occur at the output of delay circuit 4708 and 4706 and will develop coincidence at And circuit 4713. In this period of time the decade counter 3550 has received five carry signals from decade counter 3559, indicating that the latter has counted through five 80 microsecond time intervals, so that when And circuit 4713 is Up, a signal is delivered over output 4717 through delay circuit 3551 and through this delay circuit to delay circuit 3552 before it is caused to appear at output terminal 40. Thus this output terminal is caused to be Up at N49.5 time 397 microseconds after the decade counters have initially started their operation. However, the next time output terminal 40 will be Up will be 400 microseconds later, and each succeeding 400 microseconds thereafter. Therefore, a given calculator suboperation may be repeatedly triggered each 400 microseconds.

OPERATING THE COUNTERS WHICH CONTROL THE DISPLAY SEQUENCE

It will be recalled from the discussion above that a matching process is used in order to develop signals for accomplishing the display of calculator information at a selected time interval. Once the Microsecond Selector switches have been positioned for the desired time interval of display the signals developed by the counter 3550 and counter 3559 are matched with the setting of the Tens and Units Microsecond Selector switches in Inequality Detectors 3560 and 3553. The lowest level setting, that is the lowest octal cycle, is accomplished by the Eights Microsecond Selector switch and then is matched with the octal signals developed by the Octal Commutator in a group of 2-position switches. When the two decade counters and the octal signals received from the Octal Commutator count through that part of the 400 microsecond cycle which corresponds with the setting of the three Microsecond Selector switches on the console, signals are developed at output terminals 38 and 39. The signals at these output terminals energize the Counter Control circuit 4721 Fig. 16 which in turn operates three counters which determine the sequence of displaying information in the CRT tubes.

It will be recalled from the discussion above that once the operator has selected the time interval of display by positioning the Microsecond Selector switches 4718, the basic timing counters 4719 operate in such a manner as to match the setting of these switches. That is to say, each time that the basic timing counters 4719 count a number of microseconds corresponding to the setting of the Microsecond Selector switches 4718, the matching circuits 4720 are operated and a one microsecond signal is delivered to the Counter Control circuit 4721, which controls the operation of the three Display Control Counters 4722–4724. As these three counters are stepped along, signals are delivered to both the display switching circuits 4725 and 4726 and to the CRT column and position selector circuit 4847. The display switching circuits 4725 and 4726 gate the digits of the various fields and registers into the grid pulse selector and greater-than-nine detectors 4845 and 4846. Together these circuits plus the sweep voltage generator 4848 and the CRT grid pulse generators 4849 develop the selected digits on the faces of two cathode ray tubes simultaneously.

In order to understand the operation of the Display Control Counter shown in Fig. 16, it must be understood that display time of any digit of any row in the CRT display section is 256 microseconds. However, since the digits in the odd and even rows of the cathode ray tube display section are displayed simultaneously, it is possible to display two digits each 400 microsecond interval. After all the digits of the fields and Instruction Register have been displayed in rows 1 and 2 at the end of an 8 millisecond interval, the digits of Register 1 and Register 2 are then displayed in the same manner each 400 microseconds until the 8 millisecond interval elapses, at which time the digits in the fields and Register 1 again will be displayed. Display Control Counters 4722 and 4723 shown in Fig. 16 develop the signals which step the display along to the left once each 400 microseconds, and Display Control Counter 4724 permits a change of rows for display.

The lowest order counter 4722 has nine output positions. Since each of these positions corresponds to a 400 microsecond period, this counter is capable of counting up to 3600 microseconds during each cycle of its operation.

At the start of each cycle of Display Control Counter (Fig. 16) operation the 1 output lines are Up. When the 1's output terminals of the three Display Control Counters are Up, this indicates that the digits to be displayed will be displayed in position 1 of rows 1 and 2 of Fig. 14. The digits are shown displayed from right to left, that is from the lowest order digit as it is found in the field or register to the highest order digit.

Let us return to the hypothetical example used to operate the matching circuits 4720, that is where the Microsecond Selector switches were set for 98 microseconds and the basic timing counters 4719 had counted up to this point. When the basic timing counters 4719 complete their count to 98 microseconds, a signal is developed through matching circuits 4720 which energizes the Counter Control 4721 and causes Display Control Counter 4722 to be stepped up one position. When the basic timing counters again count through 400 microseconds to the 98th microsecond interval, another signal is developed through matching circuits 4720 which energizes the Counter Control circuit 4721 and causes the Display Control Counter 4722 to step up another position. When the Display Control Counter 4722 was in position 1, the digit in position 1 of rows 1 and 2 was displayed. This assumes that the other two Display Control Counters 4723 and 4724 are also in position 1. When Display Control Counter 4722 is moved to position 2, the digits in position 2 of rows 1 and 2 are displayed. At the end of another 400 microsecon interval the digits in position 3 of rows 1 and 2 are displayed. Each 400 microsecond period at each 98th microsecond time interval a Display Control Counter 4722 is stepped up one position until 3600 microseconds have been counted, at which time Display Control Counter 4724 remains undisturbed. When the Display Control Counter 4722 reaches the end of its first cycle of operation and Display Control Counter 4723 is moved up to position 2, the digits being displayed appear in position 9 of rows 1 and 2. That is to say, the lowest order digit of the M4 Field and the 9th lowest order digit of the Instruction Register are displayed.

The Display Control Counter 4722 runs through its second cycle, and each time that it is stepped up, a digit in the succeeding position of the display section is caused to appear on the face of two C. R. T. tubes. When it has counted through nine 400 microsecond periods, Display Control Counter 4723 is again caused to be stepped up one position, from 2 to 3. At this point 18 digits have been displayed in rows 1 and 3 of the C. R. T. Display section. Actually since Register 1 only has 17 digits only these digits can be displayed and therefore only 17 positions in row 3 have been used to display Instruction Register digits during the second 3600 microsecond cycle. The 18th position is used for testing purposes, as will be explained in greater detail subsequently. Thus it is seen that when Display Control Counter 4722 runs through two complete cycles of operation the digits in the M8, M6, M4, U and part of the V Field and the entire Instruction Register have been displayed. When the 19th 400 microsecond cycle arrives from the matching circuits 4720, counter 4722 is set in position 1, counter 4723 is set in position 2, and counter 4724 is set in position 1.

Since only two more 400 microsecond signals are required in order to complete the display of all the digits in row 1 of the C. R. T. Display section, the Display Control Counter 4722 is stepper up only twice during the third cycle of its operation. When it is stepped to position 2, indicating that eight milliseconds have elapsed since initial energization, the Display Control Counters 4722 and 4723 are reset to postion 1 at the same time that the Display Control Counter 4724 is moved up to position 2. When Display Control Counter 4724 is in position 2, the second and fourth rows of the C. R. T. Display section are operated. Another way this may be considered is by thinking of position 1 as corresponding to the top two rows and position 2 as corresponding to the bottom two rows of the C. R. T. Display.

Thus at the end of the first 8 millisecond cycle, Control Counter 4722 is in position 1, Counter 4723 is in position 1, and Counter 4724 is in position 2. This indicates that the digits associated with the lowest order position of Register 1 and Register 2 will be displayed. As the Display Control Counter 4722 again runs through one complete cycle of operation covering 3600 microseconds, the nine lowest order digits of Register 1 and Register 2 are displayed. At the end of this period Counter 4722 is reset at the same time that Counter 4723 is stepped up to position 2. At this time, that is 11.2 milliseconds since the initial display of the digits in position 1 of the bottom rows, Counter 4722 is in position 1, Counter 4723 is in position 2, and Counter 4724 is in position 2. Counter 4722 runs through another complete cycle of its operation at the end of which Counter 4723 is stepped up to position 3. At this time the entire word of Register 1 and Register 2 have been displayed. Position 18 of rows 3 and 4 may also display digits at this time for testing purposes, if properly connected.

The third cycle of the Display Control Counter 4722 is only for a period of 800 microseconds or two positions in order that the final two test digits may be displayed in rows 3 and 4. After the Display Control Counter 4722 has completed its third short cycle, Display Control Counters 4722, 4723 and 4724 are reset to position 1. Having completed the display of information in the bottom two rows of the C. R. T. Display section, the Display Control Counters resume another cycle of operation starting with the lowest order position of rows 1 and 2. Reference to Table I will show the various 400 microsecond time intervals in which the digits of the different positions of the various fields and registers are displayed. It must be understood that the digit actually displayed in any position may be varied by the setting of the Microsecond selector switches on the console.

Returning to Fig. 14 it will be seen that an 8 and 5 are displayed simultaneously in position 10 of rows 3 and 4 respectively. Counting the positions from the right the operator immediately knows that the 8 is the tenth lowest order digit of Register 1 and the 5 is the tenth lowest order digit of Register 2. To accomplish a display of these two digits requires that Display Control Counter 4722 step up counters 4723 and 4724 to position 2. Control Counter 4722 is located in position 1 at this time. To display the digits shown in Fig. 14 the Display Control Counters must count through the equivalent of 11.2 milliseconds. The digits 8 and 5 will be displayed for a period of 256 microseconds each 16 milliseconds of counting. To be able to read these digits it is necessary that the contents of the calculator not be disturbed. This can be done, as already mentioned, by setting a Source of Instruction switch on the console in U or IR position, in which the otherwise orderly progress of the calculator is halted so that a particular suboperation may be repeated at the rate of once every 400 microseconds until the operator has made a sufficiently long examination of the record.

When the Display Control Counter 4722 is in position 1, Counter 4723 is in position 2 and Counter 4724 is likewise in position 2, as assumed above, signals on the output lines corresponding to these positions are delivered to the Display Switching circuits and the C. R. T. Display Deflection circuits simultaneously. The signals delivered to the Display Switching circuits on these lines gate the digits, in this case 8 and 5, present in position 10 of Register 1 and Register 2 into the C. R. T. Display Deflection circuits, where they are combined with the signals directly received from the Display Control Counters 4722-4724 in order to form the correct digits 8 and 5 in the proper position and row of the C. R. T. Display section.

Reference should now be made to Figs. 22-26 for a more detailed explanation of the operation of Counter Control 4721 and the Display Control Counters 4722-4724 shown in Fig. 14. The Counter Control circuit 4721 may be seen in Fig. 22. To the right of this Counter Control circuit is the Display Control Counter circuit 4724 which consists of two latches made up of 2-position switches 3584 and 3586 and delay circuits 3585 and 3587. To the right of Display Control Counter 4724 in Fig. 23 is Display Control Counter 4723, which consists of three latches comprising 2-position switches 3589, 3591 and 3593 and delay circuits 3590, 3592 and 3594. To the right of Display Control Counter 4723 is the Display Control Counter 4722 which comprises two switches 3606 and 3607 with associated delay circuits and a latch comprising 2-position switch 3595 and delay circuit 3596. The switch 3607 and the latch are on Fig. 24 and the remainder of this counter 4722 are on Fig. 25. The outputs of Display Control Counters 4722 and 4723 lead to the Display Switching circuits 4725 and to the C. R. T. Display Deflection circuits as will be more fully described hereinafter. These Display Switching circuits are the means used to make connection to the various registers and fields noted in Fig. 14.

The signals which energize the Counter Control circuit are delivered to the circuit of Fig. 22 over the two leads 38 and 39. They immediately cause the left and center input terminals of And circuit 3572 of the Counter Control circuit to be Up. The right input terminal of this And circuit is also Up at this time due to the operation of inverter 3571 which reverses the normal Down condition of And circuit 3570. Coincidence is established at And circuit 3590 only when the 1 to 9 counter 4722 is in position 2 and lead 56 is Up, the 1 to 3 counter 4723 is in position 3 and lead 57 is Up and the 1 to 2 counter 4724 is in position 2 and its output lead 58 is Up.

It is difficult to say what the position of the three counters would be in any case when the signals arrived at input terminals 38 and 39 during the first 16 millisecond scan of the decade counters. Thus the first 16 milliseconds of operation may be considered to be the period of adjustment. During this period of adjustment, the three counters shown in Figs. 22-25 will be stepped up until the 1 to 9 counter 4722 is in position 2, the 1 to 3 counter 4723 is in position 3, and the 1 to 2 counter 4724 is in position 2. It is assumed that when the signals next arrive at input terminals 38 and 39 the three counters will be set in these positions.

Reference to Figs. 24 and 25 will show that when the 1 to 9 counter is in position 2 a signal is developed at the output 56 of delay circuit 3603. This signal is then fed to the center input terminal of And circuit 3570. When the 1 to 3 counter is in position 3 the latch comprising 2-position switch 3589 and delay circuit 3590 is energized and a signal is caused to appear over input lead 57 at the second from the right input terminal of And circuit 3570. In the same way when the 1 to 2 counter is in position 2, the 2-position switch 3584 and delay circuit 3585 which form a latch deliver a signal over the output lead 58 to the right input terminal of And circuit 3570. When the subsequent one microsecond signal arrives 400 microseconds later (assume this to be the first signal of the cycle under consideration), coincidence is established at And circuit 3570 and a signal is delivered to the input of inverter 3571 and delay circuit 3575. The signal developed by And circuit 3570 serves to reset the three counters to position 1 in the following manner.

The Up condition at the output of inverter 3571 is reversed so that coincidence cannot exist at And circuit 3572. This being the case the input of delay circuit 3573 is Down and as long as the output of delay circuit 3573 is Down the three counters cannot be stepped up. Note that the output circuit 59 commonly leads to the three And circuits 3579, 3582 and 3569.

The signal developed by And circuit 3570 which is sent to delay circuit 3575 actually accomplishes the resetting operation. As delay circuit 3575 is caused to be Up, a signal is delivered to Or-inverter 3577 which operates it in a manner to de-energize cathode follower 3578 and move the lead 60 to the Hold input terminal of 2-position switch and delay circuit 3596 whose operation is equivalent to setting the 1 to 9 counter in position 9. At the same time the signal from delay circuit 3575 is delivered to Or circuit 3605 (by way of lead 61, Or circuit 3580 and lead 62) whose operation energizes delay circuit 3604 and causes a signal to be developed at output terminal 63, indicating that the 1 to 9 counter is in position 1. The 1 to 9 counter is now reset.

The signal developed by delay circuit 3575 is also fed to Or-inverter 3583 and Or circuit 3588 associated with the 1 to 3 counter. Or-inverter 3583 reverses its input condition and causes the Hold input terminals 64 associated with the latches corresponding to the 3 positions of this counter to be Down. That is to say, it causes the Hold input terminals of 2-position switches 3589, 3591 and 3593 to be Down. As Or-inverter 3583 is clearing the contents of the counter the signal delivered to Or circuit 3588 at the same time interval develops coincidence at the right And circuit of 2-position switch 3593 which in turn energizes the latch comprising this 2-position switch and delay circuit 3594, indicating that the 1 to 3 counter is in position 1. Output terminal 65 is thereby caused to be Up. Since the Down condition developed by Or-inverter 3583 for de-energizing the three latches lasts only one microsecond, when a signal exists at the output of delay circuit 3594 of the first position latch of this counter the Hold input terminal associated with this latch is Up at this time. Once energized this latch will continue to stay Up until the 1 to 9 counter has completed one cycle of its operation.

The signal developed by delay circuit 3575 is also fed to Or circuit 3580 and the left input terminal of the right And circuit of 2-position switch 3586. Energization of Or circuit 3580 causes the input of inverter 3581 to go Up. The inverter then causes the Hold input terminals of the two latches of the 1 to 2 counter to be Down. More specifically the Down condition developed by this inverter removes coincidence from the left-hand circuit of 2-position switches 3584 and 3586 thereby deenergizing the latches comprising these switches and delay circuits 3585 and 3587. At the same time that the latch comprising 2-position switch 3584 and delay circuit 3585, corresponding to the second position of the 1 to 2 counter, is deenergized, coincidence is developed at the right And circuit of 2-position switch 3586 in order to energize the latch comprising this switch and delay circuit 3587. Since the output condition of inverter 3581 is Down for a period of only one microsecond, when a signal exists at the output of delay circuit 3587 coincidence is established at the left And circuit of 2-position switch 3586 and the latch is maintained. When this latch is energized, output terminals 66 and 67, indicating that the 1 to 2 counter is in position 1, are caused to be Up.

Once the three latches corresponding to the first position of the three counters are energized, they remain Up for a period of 400 microseconds until the next time interval in which signals appear at input terminals 38 and 39. Actually the 1 to 3 counter is in position 1 for 3.6 milliseconds, and the 1 to 2 counter is in position 1 for 8 milliseconds. The latches representing position 1 of the 1 to 3 and the 1 to 2 counters are straightforward and require no further explanation. The latch corresponding to position 1 of the 1 to 9 counter uses a circuit through the switch 3606 shown in greater detail in Fig. 37.

Since switch 3606 is similar to switch 3607 in operation, the analysis of switch 3606 will apply to the latter.

It will be recalled that when the three counters have gone through their first period of adjustment coincidence was established at And circuit 3570 and delay circuit 3575 was operated in order that a signal might be developed at the input of Or circuit 3605, which is shown in Fig. 37. When Or circuit 3605 is Up, delay circuit 3604 is energized and a signal is developed at output terminal 63 indicating that the 1 to 9 counter is in position 1. Another signal developed by delay circuit 3604 is fed to And circuits 4732 and 4738. These And circuits constitute part of switch 3606. Actually four Or circuits and cathode followers are also included in this switch and these Or and cathode follower circuits are wired between the various And circuits and the four delay circuits shown in this Fig. 37, but to avoid confusion induced by too many lines, the Or and cathode follower circuits are omitted and instead straight lines are shown between the And circuits and the delay circuits. The omission of these Or and CF circuits does not alter the functional operation of this circuit.

Initially it must be understood that during the regular operation of the three counters, delay circuit 3573 is Up for only one microsecond whereas cathode follower 3578 is Up for the remainder of the 400 microseconds. During the stepping up operation of the switch 3606 the one microsecond signal is developed at delay circuit 3573, but during the resetting operation the one microsecond signal is developed at Or circuit 3605, as will become clearer in the course of this examination.

Assume that the three counters have gone through the initial period of adjustment after the calculator has been energized and the 1 to 9 counter is in position 2, the 1 to 3 counter is in position 3, and the 1 to 2 counter is in position 2. In such a circumstance, see Fig. 22, and circuit 3570 is in coincidence and delay circuit 3575 is thereby energized which causes the input of Or circuit 3605 to be Up. A signal from this Or circuit is delivered to delay circuit 3604 where a signal is developed at output terminal 63 indicating that the 1 to 9 counter is in position 1. It has already been mentioned that another signal from this delay circuit is delivered to And circuits 4732 and 4738. And circuit 4732 will not be in coincidence until 400 microseconds later, whereas And circuit 4738 is at coincidence at the time that the signal arrives from delay circuit 3604 and stays Up for a period of 400 microseconds. That is to say, at the end of the one microsecond time interval determined by the input signal, delay circuit 3573 is Up and Or-inverter 3577 is operated in such a manner as to de-energize cathode follower 3578 and cause the right input of And circuit 4738 to be Down. However, since a delay is introduced before the signal arrives at Or circuit 3605, that is to say, the signal developed by delay circuit 3604 for And circuit 4738 does not appear until two microseconds after the proper input conditions have been established coincidence is established at And circuit 4738 at this time. The signal from And circuit 4738 is delivered to delay circuit 3604 in order to establish a latch comprising this And circuit 4738 and delay circuit 3604. The latch is maintained for a period of 400 microseconds.

When the next one microsecond signal arrives at the input of delay circuit 3573, 400 microseconds later, coincidence is established at And circuit 4732 with the signal present at the left input terminal of this And circuit from delay circuit 3604. When this And circuit is Up, delay circuit 3603 is energized and output terminal 68, indicating that the 1 to 9 counters are in position 2, is energized. Another signal from delay circuit 3603 is delivered to And circuits 4733 and 4737. And circuit 4733 is not in coincidence at this time because the output of delay circuit 3573 is Down. However, And circuit 4737 is Up due to the operation of Or-inverter 3577 which reverses the normal Down condition at the output of delay circuit 3573. The output of Or-inverted 3577 will be Up for all except one microsecond of a period of 400 microseconds and cathode follower 3578 will be energized for this period. The signal developed by And circuit 4737 is delivered to delay circuit 3603 which accomplishes a latch consisting of this And circuit and the delay circuit. And circuit 4737 is maintained energized for a full period of 400 microseconds due to the operation of Delay circuit 3603 both by And circuit 4737 and And circuit 4732.

When the next one microsecond signal arrives at the input of delay circuit 3573 coincidence is established one microsecond later at And circuit 4733 which sends a signal to delay circuit 3602 and causes output terminal 69 to be Up, indicating that the 1 to 9 counter is in position. 3. Another signal from delay circuit 3602 is delivered to And circuits 4734 and 4736. The signal at And circuit 4734 will be used 400 microseconds later to develop coincidence at this And circuit in order to step the counter up to position 4. However, the signal delivered to And circuit 4736 develops coincidence at this And circuit immediately due to the normal Up condition at the output of Or-inverter 3577 thereby energizing delay circuit 3602. Thus a latch comprising And circuit 4736 and delay circuit 3602 is energized for a period of 400 microseconds.

The delivery of the subsequent one microsecond signal to delay circuit 3573 develops coincidence at And circuit 4734. The signal from this And circuit is then fed to delay circuit 3601 and output terminal 70, corresponding to position 4 of the 1 to 9 counters, is caused to be Up. At the same time delay circuit 3601 delivers a signal to an And circuit of switch 3607 (Fig. 24) in order that the counter may be set in position 5 when the next one microsecond signal arrives 400 microseconds later.

It must be understood that in all latching arrangements it is first necessary to de-energize the preceding latch at the same time that the succeeding latch is energized. For example, when the 1 to 9 counter was in position 1 and output terminal 63 was Up at the time that a one microsecond signal was received at delay circuit 3573, the Up condition applied at the input of Or-inverter 3577 so that the normal Up condition of its output was reversed, de-energizing cathode follower 3578 and removing coincidence from And circuit 4738. It will be recalled that And circuit 4738 and delay circuit 3604 constitute the latch for position 1. At the same time the signal developed by delay circuit 3573 develops coincidence at And circuit 4732 and energizes delay circuit 3603 which puts the 1 to 9 counter in position 2. When the next microsecond signal arrives 400 microseconds later, Or-inverter 3577 removes coincidence from And circuit 4737 for one microsecond at the same time that delay circuit 3573 is developing coincidence at And circuit 4733 for setting the 1 to 9 counter in position 3. The next one microsecond signal removes coincidence from And circuit 4736 due to the operation of Or-inverter 3577 at the same time that And circuit 4734 is caused to be Up and the counter set in position 4. When the fifth one microsecond signal is received at the input of this switch, Or-inverter 3577 de-energizes the latch corresponding to position 4 of the counter at the same time that a signal from delay circuit 3573 is delivered to an And circuit of switch 3607 in order to cause the 1 to 9 counter to be set in position 5. The connection between delay circuit 3573 and switch 3607 is not shown in Fig. 37.

Now that the operation of switch 3606, which is similar to switch 3607, is understood it is necessary to return to the condition where the counters are set up in a manner preparatory to resetting. It will be recalled that when the counters have gone through the initial cycle of adjustment following immediately the starting up of the calculator, the 1 to 9 counter is set in position 2, the 1 to 3 counter is in position 3, and the 1 to 2 counter is in position 2. The resetting operation will take place when these counters are set in these positions, although it must be understood that the counters may have irregular positions Up during the period of adjustment. However, once the counters have been reset, only position 1 of each of the three counters will be Up.

It has already been pointed out that when the three counters have been set in position for resetting And circuit 3570 will be Up when the next one microsecond signal arrives at input terminals 38 and 39. The signal from this And circuit energizes delay circuit 3575 which feeds a signal to Or circuit 3580 and the left input terminal of the right And circuit of 2-position switch 3586 for resetting the 1 to 2 counter, as has already been explained. The signal from delay circuit 3575 also is fed to Or-inverter 3583 and Or circuit 3588 in order to set up the conditions for resetting the 1 to 3 counter. At the same time the signal from delay circuit 3575 is fed to Or circuit 3605 in order to energize the latch in the 1 to 9 counter corresponding to position 1. The latch comprising 2-position switch 3595 and delay circuit 3596 corresponding to position 9 of the 1 to 9 counter is de-energized by the Down condition developed at the output of cathode follower 3578 by Or-inverter 3577 (Fig. 37). At this time the three counters are in position 1.

When the next one microsecond signal arrives 400 micorseconds later at input terminals 38 and 39, coincidence is established at And circuit 3572. And circuit 3570 is Down when the signal arrives at the end of the 400 microsecond period following the resetting operation and inverter 3571 reverses this condition to cause the right input terminal of And circuit 3572 to be Up. The signal from And circuit 3572 operates delay circuit 3573. The one microsecond signal at the output of delay circuit 3573 is delivered on line 59 to switch 3606 of the 1 to 9 counter. Fig. 37 will show that when this line is Up switch 3606 steps the 1 to 9 counter up one position, that is, from 1 to 2. It will be recalled from the analysis of Fig. 37 that when line 59 is Up, line 60 is always Down. This de-energizes the latch corresponding to position 1 at the same time that the latch corresponding to position 2 is energized. Each succeeding one microsecond signal appearing at input terminals 38 and 39 steps up the 1 to 9 counter through the operation of switch 3606 until the fifth microsecond signal is received.

The fifth microsecond signal developed at the input terminals and fed through And circuit 3572 and delay circuit 3573 to switch 3607 permits the 1 to 9 counter to be set in position 5. When this signal arrives on line 59 at the input of switch 3607 a signal also appears at this switch from the latch comprising delay circuit 3601 and And circuit 4735 over output terminal 71 corresponding to position 4 of the 1 to 9 counter. Since the operation of switch 3607 is identical to that of 3606 the signal appearing on line 59 develops coincidence with the signal from the previous latch at an And circuit which in turn energizes a latch comprising a delay circuit and another And circuit. The latch is kept energized by the signal appearing on line 60 one microsecond later and for a period of 400 microseconds. Delay circuit 3600 is associated with the position 5 latch. The one microsecond signal at the end of the sixth, seventh and eighth 400 microsecond minor cycles causes switch 3607 to move the 1 to 9 counter up one position. Delay circuits 3599, 3598 and 3597 are associated with the latches corresponding to positions 6, 7, and 8 respectively. It should be kept in mind that each time a latch corresponding to a counter position is energized the corresponding output terminal is caused to be Up. Thus when the position 5 latch is energized output terminal 72 is caused to be Up.

When the ninth microsecond signal is received, line 59 is again moved Up for one microsecond and the left input terminal of the right And circuit of 2-position switch 3595 caused to be Up. Since the right input terminal of this And circuit is Up for 400 microseconds during the operation of the position 8 latch, coincidence is established at this And circuit at this time and a latch is energized comprising this 2-position switch 3595 and delay circuit 3596. Although line 60 is Down when coincidence is established at the right And circuit of 2-position switch 3595, it is Up one microsecond later when a signal from delay circuit 3596 appears at the left And circuit of 2-position switch 3595. Thus the position 9 latch of the 1 to 9 counter is energized.

The signal developed by the position 9 latch is also fed to the left input terminal of And circuit 3582 (Fig. 23).

When the tenth microsecond signal is received at input terminals 38 and 39, line 59 is caused to be Up one microsecond later developing coincidence at And circuit 3582 and signals are delivered to Or-inverter 3583 and 2-position switch 3591. Or-inverter 3583 is operated in such a manner as to pull the Hold input terminals of the three latches corresponding to the three positions of the 1 to 3 counter Down. At the same time the signal delivered to the left input terminal of the right And circuit of 2-position switch 3591 develops coincidence at this And circuit operating delay circuit 3592 and causing the position 2 latch of the 1 to 3 counter to be energized. It will be recalled that during the resetting operation the position 1 latch of the 1 to 3 counter had been energized. Since the input of Or-inverter 3583 is Down one microsecond later, that is when the signal from delay circuit 3592 appears at the left input terminal of the left And circuit of 2-position switch 3591, the latch is maintained for a period of 3600 microseconds. That is to say, the 1 to 9 counter must complete another cycle of its operation before the 1 to 3 counter is stepped up another position.

Since line 59 is Up and line 60 is Down for one microsecond when the tenth microsecond signal is received at the input of the Counter Control circuit, the position 9 latch is de-energized and the position 1 latch of the 1 to 9 counter is energized. At this time the position 1 latch is energized by the signal developed by the position 9 latch. During the operation of the position 9 latch, that is for the period of 400 microseconds, a signal is delivered from delay circuit 3596 to And circuit 4931 (Fig. 37) in switch 3606. There it will be seen that the signal from delay circuit 3596 is fed to the right input terminal of And circuit 4731 of switch 3606. Thus when the one microsecond signal is received by delay circuit 3573 coincidence is developed at And circuit 4731 and a signal is delivered to delay circuit 3604. As it has already been explained above, when this delay circuit is energized, a signal is developed at output terminal 63 indicating that the 1 to 9 counter is in position 1. At the same time another signal from delay circuit 3604 is delivered to And circuit 4738 where coincidence is established at that time and the latch comprising this And circuit and delay circuit 3604 is energized. The eleventh through eighteenth microsecond signals received subsequently step the 1 to 9 counter through another cycle of its operation, until the position 9 latch is energized.

When the 19th microsecond signal is received at the input of the Counter Control circuit line 59 is again caused to be Up and line 60 caused to be Down for a period of one microsecond. Since And circuit 3582 is again at coincidence due to the signal on line 59 and the signal received from the position 9 latch of the 1 to 9 counter, conditions are set up in the 1 to 3 counter for moving this counter from position 2 to position 3. The signal from And circuit 3582 is delivered to Or-inverter 3583 which pulls Down the Hold input terminals of the three latches Down for a period of one microsecond. At the same time another signal from And circuit 3582 is delivered through the left input terminal of the right And circuit of 2-position switch 3589 where it develops coincidence and energizes the position 3 latch comprising this 2-position switch and delay circuit 3590. Thus when the signal at the output of delay circuit 3590 is fed back to the left input terminal of the left And circuit of 2-position switch 3589 coincidence is established at this And circuit because And circuit 3582 is Down at this time and the output of Or-inverter 3583 is Up.

As the 1 to 3 counter is being stepped up to position 3, the 1 to 9 counter is being reset to position 1, as already explained. The signal at the output of delay circuit 3596 of the position 9 latch is fed to And circuit 4731 (Fig. 37) where coincidence is established and the position 1 latch comprising And circuit 4738 and delay circuit 3604 is energized. Thus when the 19th microsecond signal is received at the input of the Counter Control circuit the 1 to 9 counter is set in position 1, the 1 to 3 counter is set in position 3, and the 1 to 2 counter is set in position 1. The next microsecond signal steps the 1 to 9 counter one position. At this time a signal from the output of delay circuit 3603 of the position 2 latch is fed to the left input terminal of And circuit 3579 (Fig. 22). The center input terminal of this And circuit is also Up at this time due to the operation of the position 3 latch of the 1 to 3 counter. However, the right input terminal of this And circuit is Down at this time and remains Down for a 400 microsecond interval. However, the right input terminal of this And circuit is Down at this time and remains Down for a 400 microsecond interval. However, when the 21st signal is received at input terminals 38 and 39, coincidence is established at And circuit 3579 and the 1 to 2 counter is stepped up one position. It will be recalled that the 1 to 2 counter has been in position 1 throughout the counting operation, having been reset to this position at the time that the other two counters had been reset. The signal developed by And circuit 3579 is delivered to Or circuit 3580 and the left input terminal of the right And circuit of 2-position switch 3584. The Up condition presented to inverter 3581 is reversed and the Hold input terminals of the two latches are caused to be Down for one microsecond. During this time, coincidence is established at the right And circuit of 2-position switch 3584 and the position 2 latch comprising this 2-position switch and delay circuit 3585 is energized.

The 21st signal which caused the 1 to 2 counter to be stepped up one position also resets the 1 to 3 counter and the 1 to 9 counter to position 1. The signal developed by And circuit 3579 for stepping up the 1 to 2 counter is also delivered to Or-inverter 3583 and Or circuit 3588 in the 1 to 3 counter circuit. The Or-inverter 3583 de-energizes the Hold input terminals of the three latches associated with the 1 to 3 counter at the same time that coincidence is established at the right And circuit of 2-position switch 3593 for setting the 1 to 3 counter in position 1.

The 1 to 9 counter is reset in the following manner. The Hold line 60 is Down at this time due to the operation of Or-inverter 3577. Although the line 59 is Up at this time, the Accept input terminal of switch 3606 is Down due to the absence of coincidence at And circuit 3569 caused by operation of inverter 3581. The signal from And circuit 3579 energizes Or circuit 3605. Hold line 60 is Up after one microsecond. When the next signal arrives 400 microseconds later, And circuit 3569 will be Up to permit the stepping up operation. This And circuit is only Down during a resetting operation.

Thus at the start of the 21st 400 microsecond cycle, the 1 to 9 counter is in position 1, the 1 to 3 counter is in position 1, and the 1 to 2 counter is in position 2. When these counters are in these positions, the first digit of the Register 1 and Register 2 will be displayed in rows 3 and 4. Each time that the 1 to 9 counter is stepped up one position, the next higher order digit of these two registers is displayed in the C. R. T. Display section. Thus the 1 to 9 counter counts through 9, the 1 to 3 counter is moved up to position 2, indicating that the next group of nine higher order digits of these two registers will be displayed. Since there are only 17 digits associated with both registers, only eight digits of these two registers will be displayed during the second 3600 microsecond cycle of the 1 to 9 counter. When the 1 to 9 counter counts through its second complete cycle, the 1 to 3 counter is again moved up one position to position 3. When the fortieth 400 microsecond cycle is received, the 1 to 9 counter will be set in position 2, the 1 to 3 counter will be set in position 3, and the 1 to 2 counter is set in position 2.

When the 41st signal is received at the input terminals 38 and 39, coincidence is established at And circuit 3570 and a signal is delivered to inverter 3571 and delay circuit 3575. Inverter 3571 is caused to become non-conductive and the And circuit 3572 is caused to be Down at this time. When the output of delay circuit 3573 is Down, line 59 is caused to be Down. Line 60 is also caused to be Down because the signal fed to delay circuit 3575 maintains Or-inverter 3577 conductive so that cathode follower 3578 is Down. When these two lines 59 and 60 are Down, all the nine latches of the 1 to 9 counter are de-energized.

At the same time the signals developed by delay circuit 3575 are fed through Or circuit 3580 over line 62 to Or circuit 3605 and delay circuit 3604. Since the line 60 is Down only for a one microsecond period, the signal developed by delay circuit 3604 energizes a latch comprising And circuit 4738 and delay circuit 3604 corresponding to position 1 of the 1 to 9 counter, as may be seen from reference to Fig. 37. The signal developed by delay circuit 3575 is also fed to the 1 to 2 and the 1 to 3 counters. In the case of the 1 to 2 counter, it energizes Or circuit 3580 and causes the output of inverter 3581 to be Down thereby de-energizing the Hold input terminals associated with the two latches of this counter for a period of one microsecond. At the same time the signal is delivered to the left input terminal of the right And circuit of 2-position switch 3586 where it develops coincidence and initiates the position 1 latch of this counter comprising 2-position switch 3586 and delay circuit 3587. The signal from delay circuit 3575 delivered to the 1 to 3 counter operates Or-inverter 3583 in a manner to cause the Hold input terminals of the three latches of this counter to be Down for a period of one microsecond. At the same time Or circuit 3588 is energized causing the left input terminal of the right And circuit of 2-position switch 3593 to be Up. Operation of 2-position switch 3593 energizes the position 1 latch of the 1 to 3 counter. Thus during the receipt of the 41st microsecond signal, corresponding to the first signal of the second 16 millisecond cycle, the three counters are reset to position 1. The digits to be displayed during the receipt of the 41st microsecond signal are in position 1 of rows 1 and 2.

During a normal operation the three counters will be in one of their positions simultaneously. In other words, when the three counters are reset at the termination of the adjustment period after the initial starting up of the calculator, the three counters will be in position 1. During the subsequent receipt of signals at input terminals 38 and 39 the positions of these counters will be stepped up accordingly with each counter having an active position. The signals developed by the three positions of the three counters serve to energize Or circuits at the left of Fig. 22 in order to maintain proper operation of the counters, as will be explained below.

Assume that the operation is normal and that the three counters have been reset to position 1. In such a case the signal developed by the delay circuit 3604 of the position 1 latch of the 1 to 9 counter is delivered over line 73 to Or circuit 3611 (Fig. 23). The signal developed by delay circuit 3594 of the position 1 latch of the 1 to 3 counter is delivered over line 74 to Or circuit 3608, and the signal developed by delay circuit 3587 of the position 1 latch of the 1 to 2 counter is delivered over line 66 to Or circuit 3607. When Or circuit 3611 is energized it operates Or circuit 3612 and causes the right input terminal of And circuit 3613 to be Up at the same time that the other two input terminals are Up. Coincidence having been established at this And circuit 3613 a signal is delivered to the input of inverter 3574 which makes the output of this circuit non-conductive and causes delay circuit 3575 to be de-energized. During normal operation this delay circuit should be de-energized until coincidence is established at And circuit 3570 during a resetting operation.

Assume that somewhere during a normal operation one of the three counters, say the 1 to 2 counter, fails to display a position signal. In this case Or circuit 3607 will be Down and coincidence removed from And circuit 3613. This de-energizes inverter 3574 so that a signal is developed at its output side in order to energize delay circuit 3575. When a signal exists at the output of delay circuit 3575, the three counters are reset to position 1, and the regular counting is resumed. If more than one position of a counter should be Up at any 16 millisecond cycle, this condition is automatically corrected during the resetting operation.

SELECTING THE INFORMATION FOR DISPLAY

It has already been stated that the positions in which the 1 to 9, the 1 to 3 and the 1 to 2 counters are set determines the sequence in which the digits of the various fields and registers are displayed on the face of the cathode ray tubes. During the first 400 microsecond period of a 16 millisecond cycle, the three counters are in position 1 and the lowest order digit in the M8 Field and the Instruction Register, in rows 1 and 2 respectively, is displayed. When the 1 to 9 counter is in postion 2, the 1 to 3 counter is in position 1, and 1 to 2 counter is in position 1, the second position of rows 1 and 2 is displayed. Reference should be made to Table I for a breakdown of all the other counter positions and the corresponding cathode ray tubes which they control. It will now be shown how this display is controlled, position by position by the three display control counters. Assume that calculator operation has been started and that the three display control counters have run through their period of adjustment and have been reset to position 1. In such a case the 1 to 9 counter will develop a 400 microsecond signal at its output terminal 63, the 1 to 3 counter will develop a signal for the same time interval at its output terminal 65, and the 1 to 2 counter develops a signal at output terminal 75. Signals are also developed by the position 1 latch of the 1 to 2 counter at other output terminals, but these will be discussed at a later time.

A signal can only be developed at output terminal 75 when coincidence is established at And circuit 3618. Such coincidence is established only once each 400 microseconds. When signals arrive at input terminals 38 and 39 And circuit 3572 is caused to be Up, operating delay circuit 3573. This signal from this delay circuit energizes Or circuit 3576 and delay circuits 3614 and 3615 before bringing the left input terminal of And circuit 3618 Up. Coincidence having been established at this And circuit, cathode follower 3619 is energized and output terminal 75 is caused to be Up.

Reference to Fig. 27 will show that when terminal 75 is Up for one microsecond, the digits which are derived from the U, V, M4, M6, and M8 Fields are gated through the Register Display Control circuit into the Register Display circuit. Figs. 40 and 41 show how the digits of these various fields and the Instruction Register are gated through the circuit of Figs. 27 and 28.

Referring to Fig. 41, it will be seen that this switch consists of two 4-pole 9-position switches and one 4-pole 4-position switch. It is to be noted that these are effectively separate 4-pole switches so that there is actually provided twenty 4-pole switches. These are grouped as stated merely for equipment reasons and not because there is any functional virtue in a 9-position or a 4-position switch. These are connected in such a manner to permit the digits of the various fields to be gated through to output terminals 76 under control of signals developed by the 1 to 9 and 1 to 3 counters. Signals gated by the switches of Fig. 41 are derived from the various fields mentioned and which will be displayed in the top row of cathode ray tubes. By way of example, the line 77 represents the 1, 2, 4 and 8 bit conductors, from the right hand position in the V Field and which will be displayed in position 17 of row 1 of the cathode ray tubes. The number (4) in brackets in this line 77 indicates the four code wires.

Likewise Fig. 40 shows two 4-pole 9-position switches, arranged in such a manner that signals received from the Instruction Register may be gated through to output terminals 78 under control of signals developed by the 1 to 9 and 1 to 3 counters.

When the 1 to 9 counter and the 1 to 3 counter are in position 1, signals are caused to appear at input terminals 63 and 65 on the Field Display Switch circuit (Fig. 41) and the Instruction Register Display Switch circuit (Fig. 40). In the case of the former switch circuit the signal at input terminal 63 is delivered to 4-pole 9-position switch 3433 where it serves to gate the lowest order digit of the M8 Field appearing at input terminals 79 to 4-pole 4-position switch 3432. The signal developed by the 1 to 2 counter at input terminal 65 then gates this lowest order digit of the M8 Field through 4-pole 4-position switch 3432 and cathode followers 3431 to output terminals 76. This M8 digit is then fed to the Register Display Control circuit (Fig. 27) where it is gated through 4-pole 4-position switch 3530 and four delay circuits and cathode followers to output terminals 80. It will be recalled that the signal is developed at input terminals 75 by the 1 to 2 counter. Delay circuits 3531, 3532, 3533 and 3534 are associated with the 8, 4, 2 and 1 bit lines respectively. The signals developed at the outputs of these delay circuits, corresponding to the input digit value, are stored in this one position register by the signal developed at input terminal 81.

Reference to Fig. 26 shows that input terminal 81 is Down the one microsecond that input terminal 75 is Up, and that it is Up for a 400 microsecond time interval thereafter. Delay circuit 3615 which develops coincidence at And circuit 3618 for bringing output terminal 75 Up for one microsecond also causes the input of inverter 3616 to be Up at the same time. This has the effect of making this inverter nonconductive thereby de-energizing cathode follower 3617 and bringing output terminal 81 Down. If a digit had previously been stored in the one position register shown in Fig. 27, bringing input terminal 81 Down at this time, erases this digit and permits the new digit, in this case the lowest order digit of the M8 Field, to be entered therein. However, one microsecond later when input terminal 75 is caused to be Down, input terminal 81 is caused to be Up and the lowest order digit of the M8 Field is stored in this one position register. For as the output of delay circuit 3615 goes Down at the end of the one microsecond interval developed by the signals at input terminal 38 and 39, inverter 3616 reverses this condition and causes output terminal 81 to be Up until the next one microsecond signal arrives 400 microseconds later.

Returning to the Instruction Register Display Switch circuit Fig. 40, it may be seen that when the input terminal 63 is caused to be Up by the 1 to 9 Display Control Counter, the lowest order digit in the Instruction Register circuit is gated through the first position of the 4-pole 9-position switch 4271 into the 4-pole 2-position switch 4272. The signal developed at input terminal 65 by the 1 to 3 control counter gates the lowest order digit of the Instruction Register through the first position of the 4-pole 2-position switch 4272 and cathode followers 4273 to output terminals 78.

The lowest order digit gated through the Instruction Register Display Switch circuit Fig. 40, is delivered to the input of 4-pole 4-position switch 3539 on Fig. 28. This digit is gated through switch 3539 by the same signal at input terminal 75 used to gate the lowest order digit of the M8 Field through switch 3530. At the end of a one microsecond time interval signals corresponding to the input digit value are developed at the outputs of delay circuits 3540, 3541, 3542 and 3543 corresponding to the binary 8, 4, 2 and 1 bit lines. The signals are delivered through cathode followers 3544–3547 and developed at output terminal 82. Likewise the signals developed at the outputs of delay circuits 3540–3543 are fed back over lines 83 to the input of the 4-pole 4-position switch 3539 where they are gated through again by the signal developed at input terminal 81 which is Up at this time, as already explained. The lowest order digit of the Instruction Register will then be stored in this one position register for a 400 microsecond interval and fed to the Register Display Circuit during this interval.

The development of the second signal by the 1 to 9 counter at its output terminal 68 serves to gate the second lowest order digits of the M8 Field and the Instruction Register through their respective Display Switches (Figs. 41 and 40) and to the input of the two switches 3530 (Fig. 27) and 3539 (Fig. 28). At the time interval that these second lowest order digits are presented to these two switches for entry, input terminal 81 is caused to be Down and therefore the Hold input terminals associated with these two Storage circuits is Down also. At the same one microsecond interval input terminal 75 is Up, permitting the second lowest order digit to be entered into the 4-pole 4-position switches 3530 and 3539 for storage and for delivery to the Register Display circuit for display of the faces of the two tubes in position 2 of rows 1 and 2.

In the same way, the signals developed at output terminals 69 and 70, corresponding to positions 3 and 4 of the 1 to 2 Display Control Counter, permit the remaining digits in the M8 Field and the third and fourth lowest order digits in the Instruction Register to be sent through for storage in the two 4-pole 4-position switches 3530 and 3539 and subsequent delivery to the Register Display circuit for display purposes. Reference to Fig. 41 will show that when the 1 to 9 counter is in position 5 the lowest order digit of the M6 Field is gated through the 4-pole 9-position switch 3433 and then through the 4-pole 4-position switch 3432 by the gating signal developed by the 1 to 3 counter at input terminal 65. The lowest order digit of the M6 Field developed at output terminals 76 is then entered into the 4-pole 4-position switch 3530 (Fig. 27) in a manner already described. As the 1 to 9 counter runs through its sixth, seventh and eighth positions all the digits of the M6 Field are passed through the display switch circuit (Fig. 41) and then stored in the 4-pole 4-position switch 3530 Fig. 27. During the same time intervals of the 1 to 9 counter the fifth, sixth, seventh and eighth lowest order digits of the Instruction Register are run through the Instruction Register Display Switch (Fig. 40) and stored in the one position register comprising 4-pole 4-position switch 3539 and the four delay circuits 3540–3543 (Fig. 28). The digit is displayed on the appropriate tube during the 400 microsecond period of storage.

When the 1 to 9 counter is in position 9 and a signal is developed at its output terminal 84, the lowest order digit of the M4 Field is gated through the 4-pole 9-position switch 3433 shown in the Display Switch circuit (Fig. 41). Since the 1 to 2 counter is still in position 1, a signal is developed at its output terminal 65 which gates the lowest order digit of the M4 Field through the 4-pole 4-position switch 3432 and causes it to be developed at output terminal 76. This digit is also stored and made available for display during a period of 400 microseconds.

However, during the tenth 400 microsecond period of the first eight millisecond cycle the 1 to 9 counter is in position 1 and its output terminal 63 is Up and the 1 to 3 counter is in position 2 and its output terminal 85 is Up. Reference to the Display Switch circuit in Fig. 41 will show that when these conditions prevail the second lowest order digit of the M4 Field is gated through the 4-pole 9-position switch 3434 to the input of 4-pole 4-position switch 3432. It is gated through the latter switch by the signal developed by the 1 to 2 counter at its output terminal 85. The signals corresponding to this digit are then delivered through four cathode followers 3431 to output terminal 76, and from there to the input of 4-pole 4-position switch 3530 (Fig. 27). This digit is stored in this one position register by the latch link 86 and made available for display, as already explained.

Referring to the Instruction Register Display Switch circuit (Fig. 40) it will be seen that the development of signals at output terminal 63 by the 1 to 9 counter and at output terminal 85 by the 1 to 3 counter will gate the tenth lowest order digit of the Instruction Register through 4-pole 9-position switch 4270 and 4-pole 2-position switch 4272 through cathode followers 4273 to output terminals 78. The tenth lowest order digit is then delivered to 4-pole 4-position switch 3539 for storage and C. R. T. display for a 400 microsecond period.

The eleventh and twelfth signals developed at terminals 68 and 69 leading into the Display Switch circuit (Fig. 41) permit the rest of the digits of the M4 Field to be gated through for storage in the one position register shown in Fig. 27. The same signals developed by the 1 to 9 counter also permit the eleventh and twelfth order digits of the Instruction Register to be gated through as shown in Fig. 40 to the one position register shown in Fig. 28.

Reference to Fig. 41 will show that when the 1 to 9 counter is in position 4 and the 1 to 3 counter is in position 2, the lowest order digit in the U Field is gated to 4-pole 9-position switch 3434 and 4-pole 4-position switch 3432 and through the terminals 76 to the one position storage circuit shown in Fig. 27. As the 1 to 9 counter counts through another three 400 microsecond intervals all the digits in the U Field are sent through the Display switch (Fig. 41) and stored in the 1 position storage circuit Fig. 27 before being delivered for a 400 microsecond time interval to the Register Display circuit for display.

When the 1 to 9 counter then steps up to position 8, the lowest order digit of the V Field is gated through 4-pole 9-position switch 3434 and then through 4-pole 4-position switch 3432 under control of the signal developed by the 1 to 3 counter at the input terminal 85. As in the case of the previous digits, this digit is developed at output terminals 76 and subsequently stored in the one position storage circuit shown in Fig. 27. Reference to the Instruction Register Display Switch circuit will show that when the 1 to 9 counter is in position 8 and the 1 to 3 counter is in position 2, the highest order digit of the Instruction Register is gated through the Display Switch (Fig. 40). This is due to the fact that only 17 digits exist in the Instruction Register. Reference to Fig. 40 will also indicate that only two input lines are associated with the eighth position of the 4-pole 9-position switch 4270. This is due to the fact that the highest order digit in this position is a 3.

When the 1 to 9 counter has completed two full cycles of its operation, that is 18-400 microsecond periods, the setting of the 1 to 9 counter is 1, the setting of the 1 to 3 counter is 3, and the setting of the 1 to 2 counter is still 1. In such a case (referring to the Display Switch circuit Fig. 41), the signal developed by position 3 of the 1 to 3 counter at its output terminal 89 develops coincidence at And circuit 3436 with the 400 microsecond signal developed by position 1 of the 1 to 9 counter at its output terminal 63. The signal from And circuit 3436 serves to gate the third lowest order digit of the V Field developed at input terminal 90 through 4-pole 4-position switch 3432 and output terminals 76 to the one position storage circuit shown in Fig. 27. As it has been already stated, the setting of the 1 to 9 and the 1 to 3 counters in these two positions cannot affect the operation of the Register Display Switch circuit shown in Fig. 40 any further.

It has been stated hereinbefore that the last three tubes in row 2 of the C. R. T. Display System are used for test purposes only. Therefore, when the 1 to 9 counter is in position 9 and the 1 to 3 counter is in position 2 and the 1 to 2 counter is in position 1, the first digit to be tested is entered into the C. R. T. Display circuit at this time. How this is accomplished may be seen by referring to Figs. 29 and 30.

It will be seen that when the 1 to 9 counter is in position 9, input terminal 84 is Up and when the 1 to 3 counter is in position 2, input terminal 85 is caused to be Up. Furthermore, input terminal 67 will also be Up at this time since the 1 to 2 counter is in position 1 as may be readily seen by referring to Figs. 22 and 26. With these terminals Up, And circuit 4650 is in coincidence and a gating signal is developed for the 4-pole 4-position 4655 (Fig. 30). This gating signal serves to gate the information present at input terminals 4649 through the switch and to output terminals 91. This digit is then presented at the input of 4-pole 4-position switch 3539 (Fig. 28) and may only be stored in this 400 microsecond storage circuit when a signal is developed at input terminal 92. Reference to Fig. 26 will show that a one microsecond signal is developed at output terminal 92 three microseconds after the signal is received at input terminals 38 and 39. In other words, a signal is developed at this output terminal at the same time that the first data to be tested appears at the input of switch 3539 (Fig. 28). When the signals are received at the input terminals 38 and 39, coincidence is established at And circuit 3572 which energizes delay circuit 3573, Or circuit 3576 and delay circuit 3614. It has been shown previously that this delay circuit energizes delay circuit 3615 in order to develop signals at output terminal 75 and 93. In this case it energizes delay circuit 3625 and causes input terminal 92 to be Up.

The signal developed at input terminal 92 gates the first digit to be tested through 4-pole 4-position switch 3539, delay circuits 3540-3543, cathode followers 3544-3547 to output terminals 82 for transfer to the Register Display circuit. This digit continues to be stored in the storage circuit Fig. 28 for 400 microseconds due to the fact that input terminal 81 goes Up as soon as input terminal 92 goes Down.

When the 1 to 9 counter then resets to position 1, at the same time that the 1 to 3 counter is stepped up to position 3 and the 1 to 2 counter remains in its original first position, signals are developed at input terminals 63, 89 and 67. The signals at input terminal 67 developed by the 1 to 2 counter and at input terminal 84 developed by the 1 to 3 counter cause And circuit 4653 to be Up and coincidence to be established at And circuit 4651. This signal serves to gate the data to be tested at input terminal 4648 through 4-pole 2-position switch 4654 to output terminals 91. As in the case of the previous test digit displayed on the C. R. T. face for a period of 400 microseconds, this digit is also entered into 4-pole 4-position switch 3539, where it is stored and made available for display for the similar time interval.

When the last 400 microsecond cycle signal of the first half of the 16 millisecond cycle is developed, the three counters develop signals at their output terminals 68, 89 and 67. The signals developed at terminals 89 and 68 are fed to the Display Switch circuit where they developed coincidence at And circuit 3435 and serve to gate the highest order digit of the V Field developed at input terminals 94 through 4-pole 4-position switch 3432 and cathode followers 3431 to output terminal 76. The digit developed at this output terminal is then fed to the one position storage circuit Fig. 27 where it is made available for a period of 400 microseconds to the C. R. T. Display circuit.

The signals developed at output terminals 89 and 63 along with the signal developed by the 1 to 2 counter at output terminal 67 develop coincidence at And circuits 4653 (Fig. 30) and 4652 in order to develop a signal which gates the test digit present at input terminals 4647 through 4-pole 2-position switch 4654 to output terminals 91. As in the case of the other test digits, this last digit to be displayed in row 2 is stored in the 1 position register shown in Fig. 28 and made available to the C. R. T. Display circuit.

Thus it is seen that in an eight millisecond cycle the digits of all the five fields plus the 17 digits of the Instruction Register and the three digits which are to be tested are each stored for a period of 400 microseconds in a one position storage circuit. They are stored for a period of 400 microseconds during this eight millisecond cycle and made available to the C. R. T. Display circuit for display purposes for the same time interval. It should be understood that the digits appearing in the five fields are made available to the Display Switch circuit Fig. 41 one microsecond after they have been inserted into their respective field circuits. In the same way the 17 digit word of the Instruction Register is made available to the Instruction Register Display Switch circuit (Fig. 40) one microsecond after this word is inserted into the Instruction Register. In the event that any of these input digits is a zero, the Register Display circuit is so designed so as to display a zero on the face of the appropriate cathode ray tube, as will be explained in greater detail subsequently.

It is shown in Table I that the first signal developed at the end of the first eight millisecond cycle by the decade counters shown in Fig. 20 causes the digits associated with the first position of Registers 1 and 2 to be displayed on the face of the C. R. T. tubes in rows 3 and 4. Each subsequent signal permits the digits associated with the next higher order of the Registers 1 and 2 to be displayed in the same manner for a 400 microsecond period. It will now be shown exactly how this is accomplished.

It will be recalled that at the end of any eight millisecond cycle the three counters shown in Figs. 22 to 25 are reset to position 1. This means that output terminals 63 and 65 are Up for a period of 400 microseconds. Since the 1 to 2 counter is in position 2 during the second eight millisecond cycle, its position 2 latch develops output signals at terminals 93 and 58. A signal at output terminal 93 lasts only one microsecond whereas the signal at output terminal 58 has a duration of 400 microseconds or a time period during which the position 2 latch is energized. Since output terminal 75 is Down during the eight millisecond cycle, the digits which are gated through the display switches shown in Figs. 40 and 41 and occurring at the input terminals 78 and 76 cannot be entered into the one position storage circuit and ultimately displayed on the faces of the cathode ray tubes. Only the digits of Registers 1 and 2 can be sequentially stored in the one position registers because of the gating signal which arrives at input terminal 93.

Reference to Fig. 38 will show that when the 1 to 9 counter develops a signal at its output terminal 63 the lowest order digit of Register 1 is gated through 4-pole 9-position switch 3841 in the Register Display Switch circuit. This digit is then gated through 4-pole 2-position switch 3842 by the signal developed by the 1 to 3 counter at its output terminal 65 and through cathode followers 3843 to output terminals 87. Since the digit is developed at this output terminal at the same time that the gating signal arrives at input terminal 93 (Fig. 27) the digit is entered into the one position storage circuit, comprising the 4-pole 4-position switch 3530 and the four delay circuits 3531–3534. As in the case of the digits received from the field circuits, the lowest order digit of the Register 1 circuit is stored for 400 microseconds and displayed on the first tube of row 3 for a 256 microsecond time interval.

At the same time, the signal developed at output terminal 63 by the 1 to 9 counter is delivered to the Register 2 Display Switch circuit (Fig. 39) where it serves to gate the lowest order digit of Register 2 through 4-pole 9-position switch 3831. This digit is then delivered through 4-pole 2-position switch 3832 by the signal developed by the 1 to 3 counter at its output terminal 65. This digit is then delivered through four cathode followers 3833, output terminal 88 to the input of 4-pole 4-position switch 3539 shown in Fig. 28. As in the case of the lowest order digit of Register 1, this digit is stored for a period of 400 microseconds and made available to the Register Display circuit for display purposes.

As the 1 to 9 counter runs through its first nine positions a signal is developed at its various output terminals which serve to gate succeeding order digits through their respective display switch circuits for storage in the one position storage circuit and for display on the cathode ray tubes.

When the Control Counters run through another 400 microsecond cycle, the 1 to 9 counter is reset to position 1 as the 1 to 3 counter is stepped up to position 2. In such a case output terminals 63 and 85 are caused to be Up. Reference to Fig. 38 will show that when this is the case the tenth lowest order digit of Register 1 is gated through 4-pole 9-position switch 3840 and 4-pole 2-position switch 3842 and cathode followers 3843 to output terminals 87. These digits are then stored for 400 microseconds in the one position storage circuit shown in Fig. 27 at the same time that they are available to the Register Display circuit for display. In the same way the 11th through the 17th digits of Register 1 are gated through the 4-pole 9-position switch 3840 as shown in Fig. 38 by the signal developed by the 1 to 9 counter and through the 4-pole 2-position switch 3842 by the signal developed by the 1 to 3 counter for storage in the one position storage circuit shown in Fig. 27.

In the same way, when the 1 to 9 counter is in position 1 and the 1 to 3 counter is in position 2, the tenth lowest order digit of Register 2 is gated through 4-pole 9-position switch 3830 shown in Fig. 39 and through 4-pole 2-position switch 3832 and cathode followers 3833 to output terminals 88. This digit is then stored in the one position storage circuit shown in Fig. 28. This storage circuit makes the digit available for display for a period of 400 microseconds or during the period of energization of the storage circuit. Thus when the 1 to 9 counter is in position 8, the 1 to 3 counter is in position 2, and the 1 to 2 counter is in position 2, all the digits of Registers 1 and 2 have been displayed. The next three digits of rows 3 and 4 which are to be displayed are test digits.

It will be seen that when the 1 to 9 counter is stepped up to position 9 at the same time that the 1 to 3 counter is in position 2, and the 1 to 2 counter is in position 2, signals are developed at output terminals 84, 85, 58 and 93. Referring to Figs. 29 and 30 the signals developed at terminals 58, 85 and 84 develop coincidence at And circuit 4646 which energizes cathode follower 4641. The signal developed by this cathode follower is then delivered to 4-pole 4-position switches 4656 and 4655. The signal delivered to switch 4656 serves to gate the test digit appearing at input terminals 4741 through the switch to output terminals 96. The signal delivered to switch 4655 gates the test digit available at input terminals 4659 through the switch to output terminals 91.

The digit developed at output terminals 96 is delivered to 4-pole 4-position switch 3530 shown in Fig. 27. It is gated through this switch by the one microsecond signal appearing at input terminal 92. It will be recalled that output terminal 92 is Up for one microsecond each time a signal arrives at input terminals 38 and 39. The test digit is stored for a period of 400 microseconds in the one position storage circuit comprising 4-pole 4-position switch 3530 and delay circuits 3531–3534. It is made available for display during the same time interval at output terminals 80.

The digit developed at output terminal 91 (Fig. 30) is delivered to 4-pole 4-position switch 3539 where it too is gated in for storage for a 400 microsecond period by the one microsecond signal appearing at input terminal 92. The signals corresponding to the stored digit are made available at output terminals 82 to the Register Display circuit.

When the 39th signal of the 16 millisecond cycle arrives at the input of the Counter Control circuit the 1 to 9 counter is reset to position 1, the 1 to 3 counter is stepped up to position 3 and the 1 to 2 counter maintains its former position 2 setting. With the counters in these positions, output terminals 63, 89, 58 and 93 are caused to be Up. Reference to Fig. 29 will shows that when terminals 63, 89 and 58 are Up, coincidence is established at And circuit 4645. The signal developed by this And circuit then energizes cathode follower 4642 which develops two gating signals. One signal gates the test digit appearing at input terminals 4740 through 4-pole 4-position switch 4656 to output terminal 90 and the other signal from cathode follower 4642 gates the test digit appearing at input terminals 4658 through 4-pole 4-position switch 4655 to output terminal 91. These digits are then stored in the one position registers shown in Figs. 27 and 28 at the same time that the previous test digits stored therein are erased.

When the 1 to 9 counter then steps up to position 2 after the 40th one microsecond signal is received at the input of the Counter Control circuit, the signals now developed at output terminals 68, 89 and 58 develop coincidence at And circuit 4644 shown in Fig. 29. The signal from this And circuit energizes cathode follower 4643 and develops two gating signals. One of these signals gates the test digit appearing at input terminals 4660 through 4-pole 4-position switch 4656 to output terminals 96 and the other signal gates the test digit appearing at input terminals 4657 through 4-pole 4-position switch 4655 to output terminals 91. Those last test digits developed are also sent to the one position storage circuits shown in Figs. 27 and 28 for a 400 microsecond storage and display. At the end of this 400 microsecond period all the field, register and test digits have been displayed and the three counters are reset to position 1 so that the lowest order digit of the M8 Field and the Instruction Register might be displayed and another 16 millisecond cycle initiated.

DEVELOPING THE POSITIONING SIGNALS IN THE REGISTER DISPLAY CIRCUIT

It will be recalled that in the previous discussion it had been stated that the position in which the 1 to 3 counter and the 1 to 9 counter is set during any 400 microsecond cycle of operation determines the position for displaying the digits associated with the various fields, registers and test sections of the calculator in the C. R. T. Display System. That is to say, when the 1 to 9 and the 1 to 3 counters are in position 1 the lowest order digit of the M8 Field and the three registers is displayed. If the 1 to 2 counter is set in position 1 at this time, the lowest order digit of the M8 Field and the Instruction Register is displayed simultaneously. On the other hand, if the 1 to 2 counter is set in position 2, the lowest order digits of Registers 1 and 2 are displayed simultaneously on the face of the tube. This may be seen more clearly by referring to Table I. It will now be shown how the Register Display circuit uses the setting of the 1 to 9 counter and the 1 to 3 counter in order to develop positioning signals.

Referring now to Figs. 42 and 43 it will be seen that the signals developed by the 1 to 9 counter and the 1 to 3 counter are made available at the top left corner of the circuits. The three input terminals 89, 85 and 65, it will be recalled, are developed by the 1 to 3 counter. In other words, when this counter is in position 1 a signal is made to appear at input terminal 65; in position 2 a signal appears at input terminal 85; and in position 3 a signal appears at input terminal 89. The nine input terminals 97–104 and 56 correspond to the nine positions of the 1 to 9 counter.

Input terminals 105 and 106 are controlled by the operation of the 1 to 9 counter. Reference should be made to Figs. 23, 24 and 25 to see how this is accomplished. When the 1 to 9 counter is in position 1, 2 or 3 the signal developed by one of these three position latches energizes Or circuit 3611 which causes output terminal 105 to be Up. In the same way if the 1 to 9 counter is in position 5, 6 or 7, the signal developed by one of these position latches energizes Or circuit 3610 and causes output terminal 106 to be Up. Thus it is seen that terminal 105 is associated with the lowest three positions of the 1 to 9 counter, and the output terminal 106 is associated with positions 5 through 7 of the same counter.

Assume a reset condition when the three counters are in position 1. In such a case output terminal 104, associated with position 1 of the 1 to 9 counter, and output terminal 65, associated with position 1 of the 1 to 3 counter, are caused to be Up. At the same time output terminal 105 will also be Up. Referring to Fig. 42, it will be seen that when terminals 65 and 105 are Up, And circuit 4021 is in coincidence energizing Or circuit 4023 and causing output terminal 111 to be Up. The signal appearing at this output terminal indicates that the first tube, reading from right to left on the console, is to have a digit displayed on it.

Since four digits are displayed on any single tube, it is now necessary to develop a signal for positioning the digit on the face of the tube. Reference should be made to Fig. 7. There it will be seen that each tube is laid out in four sections with the lowest order digit being inserted from the right, the next higher order digit being inserted in an equal area to the left, and so on until the fourth digit occupies the left-most section of the tube. The signals appearing at output terminals 111 through 115 in Fig. 42 select one of the five columns of tubes, and the signals developed at output terminals 118 and 117 determine the position which the digit will take on the selected tube.

Returning to the original example where the 1 to 9 counter was in position 1 and the output terminal 104 was Up and the 1 to 3 counter was in position 1 and the output terminal 65 was Up, it can be seen that in such a case output terminals 117 and 118 will be Down. When these two output terminals are Down simultaneously, the digit is displayed in the right-most position of the selected cathode ray tube. Since two rows of tubes are written simultaneously, the condition of these two output terminals determines the positioning of two digits for display, It will subsequently be shown how the signal developed by the 1 to 2 counter selects the two rows for display.

Assume that 400 microseconds have elapsed since the previous signals were developed at the input of the Register Display circuit and the 1 to 9 counter has stepped up one position. In such a case input terminals 65, 56 and 105 will be Up. The signals developed at input terminals 65 and 105 develop coincidence at And circuit 4021 and cause output terminal 111 to be Up, indicating that the display is to be in tube 1. The signal developed at input terminal 65 is also delivered to the left input terminal of And circuit 4042. At the same time the signal developed at input terminal 56 energizes Or circuit 4055 and causes the right input terminal of And circuit 4042 to be Up. Coincidence at this And circuit energizes Or circuit 4040 and 4053 in order to cause output terminal 118 to be Up. When this output terminal is Up, the second position of the two tubes in the selected column is displayed.

When the 1 to 9 counter is then stepped up another position, it will develop signals at its output terminals 103 and 105. The signal at the latter terminal combines with the signal developed by the 1 to 2 counter at its output terminal 65 to energize And circuit 4021 and Or circuit 4023 in order to cause output terminal 111 to be Up again. At the same time the signal developed at input terminal 103 energizes Or circuit 4056 and causes the right input terminal of And circuit 4046 to be Up. The left input terminal is caused to be Up at this time by the signal developed at input terminal 65. Coincidence having been established, Or circuit 4044 is energized operating Or circuit 4052 and causing output terminal 117 to be Up. When this output terminal 117 is Up and output terminal 118 is Down, the digit is made to assume the third position of the two tubes in the selected column.

When the 1 to 9 counter steps to position 4, only input terminals 65 and 102 will be energized. These two signals develop coincidence at And circuit 4022 and cause output terminal 111 to be Up again. The signal at terminal 102 is also fed to Or circuit 4057 in order to cause the left input terminal of And circuit 4049 to be Up. The right input terminal of this And circuit being connected to input terminal 65 is also Up developing coincidence in And circuit 4049 and operating Or circuit 4048. The signal from this Or circuit then energizes Or circuits 4052 and 4053 which develop signals at output terminals 117 and 118 respectively. When both these terminals are Up simultaneously, the digit is in position 4 of the selected tubes.

When the 1 to 9 counter is in position 5, signals are developed at its output terminals 101 and 106. The signal at the latter terminal combines with the signal developed by the 1 to 2 counter at input terminal 65 to develop coincidence at And circuit 4025 which energizes Or circuit 4024 and causes output terminal 112 to be Up for 400 microseconds. However, since these signals do not cause output terminals 117 or 118 to be Up, the digit is positioned in the first position of the selected two tubes of the desired column.

When the 1 to 9 counter is in position 6, the signals are developed at its output terminals 100 and 106. The signal at the latter terminal again develops coincidence at And circuit 4025 and causes output terminal 112 to be Up. The signal developed at input terminal 100 energizes Or circuit 4055 and causes the right input terminal of And circuit 4042 to be Up. The left input terminal of this And circuit is also Up because of the signal appearing at input terminal 65. Coincidence being established at this And circuit 4042, Or circuit 4040 is operated energizing Or circuit 4053 and causing output terminal 118 to be Up. Two digits are displayed in position 2 of the column two tubes.

When the 1 to 9 counter steps up to position 7, its output terminals 99 and 106 are Up. The signal at input terminal 106 develops coincidence at And circuit 4025 thereby causing output terminal 112 to be Up for another 400 microseconds. The signal developed at input terminal 99 energizes Or circuit 4056, developing coincidence at And circuit 4046 with the signal from input terminal 65. This operates Or circuit 4044 and 4052 and causes output terminal 117 to be Up for 400 microseconds. When this output terminal is Up, the digit is in position 3 of the selected tubes.

When the 1 to 9 counter steps up to position 8, only input terminals 98 and 65 are caused to be Up. The signal at input terminal 98 develops coincidence at And circuit 4026 and again output terminal 112 is caused to be Up for 400 microseconds. Thus it is seen that this output terminal, like output terminal 111, is Up for four periods of 400 microseconds each whereby the writing of 20 digits in a row is accomplished. The signal at input terminal 98 is also fed to Or circuit 4057 which causes the left input terminal of And circuit 4049 to be Up. This And circuit energizes Or circuit 4048 which in turn operates Or circuits 4052 and 4053 in order to cause output terminals 117 and 118 to be Up respectively. These two output terminals being Up simultaneously, the display digits are in position 4 of the selected columnar tubes.

When the 1 to 9 counter is in position 9, the 1 to 3 counter will still be in position 1 and signals will be developed at input terminals 65 and 97. The signal at input terminal 97 develops coincidence at And circuit 4027 thereby energizing Or circuit 4028 and causing output terminal 113 to be Up, which indicates that the display is to occur in column 3, that is to say, the third from the right cathode ray tube. Since these two input signals cannot bring output terminals 117 and 118 Up, the digit will be displayed in position 1 of the selected tubes in the third column.

When the 1 to 9 counter resets to position 1 for the first time, the 1 to 3 counter is stepped up to position 2. In such a case signals will be developed at terminals 85, 104 and 105. The signals at input terminals 85 and 105 develop coincidence at And circuit 4029 operating Or circuit 4028 and causing output terminal 113 to be Up. At the same time the signal from input terminal 104 energizes Or circuit 4054 and causes the right input terminal of And circuit 4041 to be Up. The left input terminal is Up at this time because of the signal at input terminal 85. Coincidence having been established, Or circuits 4040 and 4053 are energized and a signal is caused to appear at output terminal 118. This causes the digit to be displayed in position 2 of the selected tubes in column 3.

When the 1 to 9 counter is again stepped up one position, again output terminal 113 is caused to be Up for another 400 microseconds. At the same time the signal at input terminal 56 energizes Or circuit 4055 which operates And circuit 4043 and Or circuit 4044. Or circuit 4052 is then energized and output terminal 117 is caused to be Up. In this condition, the digit is made to appear in the third position of the selected tubes of column 3.

Reference to Table II will show that each subsequent 400 microsecond count of the 1 to 9 counter will affect digit positioning and will in effect cause the digits to be positioned in sequence. Thus, when the 1 to 9 counter is in position 2 and the 1 to 3 counter is in position 3, signals are developed at output terminals 115, 118 and 117 indicating that the next digits to be displayed are those in positions 4 of column 5. Table II following will quickly show under what circumstances one or more of these three output terminals are Up. However, it must be kept in mind that which two rows of the column happen to be simultaneously displayed is governed by the setting of the 1 to 2 counter, as will be explained.

Table II

| 1 to 9 Counter | 1 to 3 Counter | Tube | Position | Terminals | | | | | | | |
|---|---|---|---|---|---|---|---|---|---|---|---|
| | | | | 111 | 112 | 113 | 114 | 115 | 116 | 117 | 118 |
| 1 | 1 | 1 | 1 | Up | | | | | | Up | |
| 2 | 1 | 1 | 2 | Up | | | | | | | Up |
| 3 | 1 | 1 | 3 | Up | | | | | | Up | Up |
| 4 | 1 | 1 | 4 | Up | | | | | | | |
| 5 | 1 | 2 | 1 | | Up | | | | | Up | |
| 6 | 1 | 2 | 2 | | Up | | | | | | Up |
| 7 | 1 | 2 | 3 | | Up | | | | | Up | Up |
| 8 | 1 | 2 | 4 | | Up | | | | | | |
| 9 | 1 | 3 | 1 | | | Up | | | | Up | |
| 1 | 2 | 3 | 2 | | | Up | | | | | Up |
| 2 | 2 | 3 | 3 | | | Up | | | | Up | Up |
| 3 | 2 | 3 | 4 | | | Up | | | | | |
| 4 | 2 | 4 | 1 | | | | Up | | | Up | |
| 5 | 2 | 4 | 2 | | | | Up | | | | Up |
| 6 | 2 | 4 | 3 | | | | Up | | | Up | Up |
| 7 | 2 | 4 | 4 | | | | Up | | | | |
| 8 | 2 | 5 | 1 | | | | | Up | | Up | |
| 9 | 2 | 5 | 2 | | | | | Up | | | Up |
| 1 | 3 | 5 | 3 | | | | | Up | | Up | Up |
| 2 | 3 | 5 | 4 | | | | | Up | | | |

ENERGIZING THE DESIRED C. R. T. GRID PULSE GENERATORS

The column and position determining signals developed above are then transmitted to Figs. 44 and 45 where they serve to energize the C. R. T. Grid Pulse Generator associated with the cathode ray tube upon whose face it is desired to write a digit. Four such C. R. T. Grid Pulse Generators are shown, each of which has six And circuits and five grounded grid amplifiers as illustrated by the blocks shown. The signals developed by two of the simultaneously operating grounded grid amplifiers are delivered through a capacitor to the control grids of their respective cathode ray tubes. The four C. R. T. Grid Pulse Generators shown in these figures each control the operation of a row, that is five tubes, of the C. R. T. Display System. The C. R. T. Grid Pulse Generator comprising And circuits 4058, 4060, 4062, 4064, 4066 and 4068, and grounded grid amplifiers 4059, 4061, 4063, 4065 and 4067 controls the formation of the pulse delivered to the control grids of the cathode ray tubes which display the field data. This may be tabulated in the following manner.

| Field | And | GGA |
|---|---|---|
| M8 | 4058 | 4059 |
| M6 | 4060 | 4061 |
| M4 | 4062 | 4063 |
| U | 4064 | 4065 |
| V | 4066 | 4067 |

And circuit 4068 develops the signal which controls the operation of the above mentioned five And circuits, such that when one of the columnar signals arrives at input terminals 111–115 coincidence is established at one of the five And circuits of the C. R. T. Grid Pulse Generator as the control grid of the desired cathode ray tube is caused to go Up.

The next C. R. T. Grid Pulse Generator shown below the one mentioned above in Fig. 44 is identical in operation and structure. However, it serves to control the formation of control grid pulses for the cathode ray tubes which display the Register 1 information. Once And circuit 4090 is caused to be Up, as will be shortly explained, one of five And circuits and grounded grid amplifiers shown in block form is operated and a pulse developed at the control grid of a desired cathode ray tube. This may be tabulated in the following manner.

| Position | And | GGA |
|---|---|---|
| 1-4 | 4080 | 4081 |
| 5-8 | 4082 | 4083 |
| 9-12 | 4084 | 4085 |
| 13-16 | 4086 | 4087 |
| 17-20 | 4088 | 4089 |

The C. R. T. Grid Pulse Generator shown at the top right of Fig. 45 is identical to the other two mentioned above and serves to control the formation of control grid pulses for the desired cathode ray tubes which display the digits of the Instruction Register. It will be recalled that the Instruction Register digits are displayed in the second row of five cathode ray tubes of the C. R. T. Display System. Once And circuit 4079, shown to the right, is in coincidence, one of five And circuits and grounded grid amplifiers is caused to be operated by a columnar signal appearing at one of the input terminals 111 through 115. Each of the And circuits and grounded grid amplifiers of this C. R. T. Grid Generator controls the formation of a pulse on the control grid of the five tubes in row two, as may be tabulated in the following manner.

| Position | And | GGA |
|---|---|---|
| 1-4 | 4069 | 4070 |
| 5-8 | 4071 | 4072 |
| 9-12 | 4073 | 4074 |
| 13-16 | 4075 | 4076 |
| 17-20 | 4077 | 4078 |

The first 17 positions affect the display of the digits in the Instruction Register, and the last three, that is 18–20, affect the display of the test digits.

The C. R. T. Grid Pulse Generator which controls the formation of the control grid pulse of the cathode ray tubes in row four of the C. R. T. Display System is identical to the other three generators discussed above. Once And circuit 4101 is caused to be Up, one of five And circuits and grounded grid amplifiers, shown in block form in Fig. 44, is energized and the control grid of the selected cathode ray tube goes Up. The five And circuits and grounded grid amplifiers develop control grid pulses and cathode ray tubes which display the 17 digits of Register 2 and three test digits. This may be tabulated in the following manner.

| Position | And | GGA |
|---|---|---|
| 1-4 | 4091 | 4092 |
| 5-8 | 4093 | 4094 |
| 9-12 | 4095 | 4096 |
| 13-16 | 4097 | 4098 |
| 17-20 | 4099 | 4100 |

As in the case of the other three C. R. T. Grid Pulse Generators, a signal developed by one of these combinations of And and grounded grid amplifier circuits is delivered through a capacitor to the grid of the selected cathode ray tube. It will be recalled that the first 17 digits affect the display of the digits of Register 2 and the last three positions affect the display of the three test digits.

Referring to the input terminals shown at the top left of Fig. 44, it may be seen that the signals developed at input terminals 120 to 125 inclusive control the operation of And circuits 4068, 4079, 4090 and 4101 and thereby determine which one of the four rows of tubes is to be displayed. Input terminals 121 and 120 are associated with the operation of the 1 to 2 counter shown in Fig. 26, the former terminal indicating that the top two rows are to be simultaneously displayed and the latter terminal, that is input terminal 170, being energized only when the bottom two rows of the C. R. T. Display System are to be operated. Input terminals 124 and 122 are Up when the two digits which are to be simultaneously displayed are less than 9 or greater than 9 when the Display Greater Than 9 pushbutton is depressed. It will be recalled that the two digits to be displayed are stored for a 400 microsecond period in the one position storage circuits shown in Figs. 27 and 28. Terminals 124 and 123 carry the coded pulses representing digits which are gated by the digits stored in the two one position storage circuits. The development of the signals appearing at these input terminals will be covered in greater detail under their appropriate sections below.

To operate the C. R. T. Grid Pulse Generator associated with row one of the C. R. T. Display System, it is necessary that the 1 to 2 counter be in position 1, that the digit to be displayed be smaller than 9 (or if greater-than-9, that the Display Greater Than 9 pushbutton be depressed) and an appropriate coded digital pulse be developed by the Register Display circuits, and that a columnar signal be received at one of the five And circuits of the C. R. T. Grid Pulse Generator. When the 1 to 2 counter is in the first position, a signal is developed at its output terminal 171 for a period of eight milliseconds. Looking at Fig. 26, it will be seen that this output terminal is connected through cathode follower 3623 to the output of the position 1 latch comprising 2-position switch 3586 and delay circuit 3587. So long as this latch is energized the right input terminal of And circuit 4068 of the row one Grid Pulse Generator shown in Fig. 44 will be Up. When the Display Greater Than 9 pushbutton is not depressed or if it is greater-than-9 when this pushbutton is depressed, input terminal 124 will be Up, and will cause the center input terminal of And circuit 4068 to be Up. If at this time a coded digital pulse appears at input terminal 125, coincidence will be established at And circuit 4068 and the right input terminal of all And circuits 4058, 4061, 4062, 4065 and 4066 will be Up. Which one of these And circuits will be in coincidence will depend entirely on the positions of the 1 to 9 counter and the 1 to 3 counter. It will be recalled from the discussion above on the development of the positioning signals in the Register Display circuit that the setting of these two counters determine the presence of signals at output terminls 111 through 115 shown in Figs. 42 and 43. It will be seen from Figs. 44 and 45 that the signal at input terminal 111 develops coincidence at And circuit 4058, the signal at input terminal 112 develops coincidence at And circuit 4060, the signal at input terminal 113 develops coincidence at And circuit 4062, the signal at input terminal 114 develops coincidence at And circuit 4064 and the signal developed at input terminal 115 develops coincidence at And circuit 4066. It will be recalled also that these input terminals are Up for a 1.6 millisecond period during each eight millisecond cycle.

Assuming that And circuit 4068 is energized at the same time that a signal appears at input terminal 113, coincidence is established at And circuit 4062. The signal developed by this And circuit operates a combination cathode follower-grounded grid amplifier circuit, illustrated by block 4063, in order to produce a signal at output terminal 107. The grounded grid amplifier is a conventional electronic component whose operation is clearly described in the said Havens and Deerhake application. The signal developed at this output terminal is delivered through a capacitor to the control grid of the third cathode ray tube of the first row. This cathode ray tube is thus unblanked.

The circuit for a C. R. T. Grid Pulse Generator is shown in Figs. 48 and 49. When input terminals 4889, 4890 and 4891 are Up simultaneously, coincidence is established at And circuit 4898 which causes the grids of cathode follower 4888L and 4888R to be Up. When cathode followers 4888L and 4888R are conductive, the right input terminal of And circuits 4899, 4901, 4902, 4903 and 4904 are Up. Thus when a signal is received at any one of these And circuits after coincidence is established at the three input And circuit 4898 and the cathode followers are made conductive, the cathode follower associated with the energized two input And circuit such as the And circuit 4899 is caused to be operating.

Assuming that a signal arrives at input terminal 4897 at the time that the right input terminal of And circuit 4899 is Up, the control grid of the right triode 4892R is made conductive. Since tube 4892R is operating as a cathode follower, its cathode will be Up, thereby cutting off the operation of grounded grid amplifier 4892R. The grid of the grounded grid amplifier is biased at a fixed potential provided by voltage dividing resistors 4905 and 4906. This bias is maintained at a level such that when the triode 4892R is nonconducting, the grounded grid amplifier 4892L is conducting and when the triode 4892R is conducting, the tube 4892L is not conducting.

As the cathode of the grounded grid amplifier 4892L becomes more positive, the tube fails to conduct and its plate potential rises. When the plate potential becomes slightly greater than +150 volts, diode 4896 becomes conductive and returns the plate potential to +150 volts. Resistor 4895 is used to protect the diode 4896 against the possibility of applying voltage thereacross in a reverse direction which is in excess of its rate of breakdown voltage. Since the plate of tube 4892L is prevented from going more positive than +150 volts, that is, it is clamped at that potential, output terminal 4908, which is connected through a capacitor to the grid of a C. R. T., is maintained at a relatively fixed potential.

Assume, on the other hand, that input terminal 4897 is Down. In such a case And circuit 4899 will not be operated and the grid of the triode 4892R will be Down. Since the left triode 4892L has its control grid at a fixed potential, triode 4892L will become conductive and some current will flow in common cathode resistor 4893. When tube 4892L is conductive, its anode is Down due to the voltage drop across load resistors 4894 and 4895. In such a case output terminal 4908 is also Down and the grid of the associated C. R. T. remains blanked.

The other four pulse shaping circuits in the C. R. T. Grid Pulse Generator are like the one discussed above, the operation of each controlling the voltage applied to its respective cathode ray tube. Circuits 4885, 4886 and 4887 constitute decoupling networks for all the pulse shaping circuits, and capacitor 4907, shown in the left bottom corner of the circuit Fig. 48, is merely a bypass capacitor.

At the same time that And circuit 4068 of the row one grid pulse generator is at coincidence, And circuit 4079 of the row two grid pulse generator is also in coincidence. The latter And circuit is caused to be Up when input terminal 121 (1 to 2 counter in position 1), 122 (digit to be displayed is less than 9 and the Display Greater Than 9 pushbutton is not depressed or the digit to be displayed is greater than 9 and the Display Greater Than 9 pushbutton is depressed), and input terminal 124 (appropriate coded digital pulse) are Up. The signal from And circuit 4079 causes the right input terminal of the five And circuits 4069, 4071, 4073, 4075 and 4077 to be Up. Assuming a condition where the input terminal 113 is Up coincidence is established at And circuit 4073 which operates the cathode follower grounded grid amplifier 4074 to produce a signal at output terminal 108 which serves to unblank the third tube in row two.

To unblank the cathode ray tubes in row three, it is necessary to energize And circuit 4090. This is accomplished in the same manner that And circuit 4068 of the row one grid pulse generator is energized, with the exception that the 1 to 2 counter is in position 2 and therefore input terminal 170 is Up. Once this And circuit is Up, the right input terminal of the five And circuits of this Grid Pulse Generator are caused to be Up. The left input terminal of one of these And circuits will be Up and coincidence established if the signal appears at one of the input terminals 111 to 115 as already explained. The signal developed at one of the output terminals of the grounded grid amplifiers 4081, 4083, 4085 and 4087 is fed through a capacitor to the control grid of the selected cathode ray tube.

The cathode ray tubes in row four are successfully unblanked when coincidence is established at And circuit 4101. Energization of this And circuit differs from And circuit 4079, explained above, only to the extent that the 1 to 2 counter is now in position 2 and therefore input terminal 170 is Up. The signal from And circuit 4101 is delivered to the right input terminal of the five And circuits of the row four Grid Pulse Generator. For example, to unblank the third cathode ray tube of row four, coincidence must be established at And circuit 4095 by the signals from And circuit 4101 and from input terminal 113. Energization of this And circuit operates the cathode follower grounded grid amplifier combination 4096 and causes output terminal 109 to be Up. The signal at this output terminal is then delivered through a capacitor to the control grid of the third tube of row four in order to unblank this tube.

In summary, it may be said that unblanking of the twenty cathode ray tubes in the C. R. T. Display System is accomplished by four grid pulse generators of the type shown in Figs. 48 and 49. Two of these grid pulse generators are operated simultaneously according to the position of the 1 to 2 counter. When the 1 to 2 counter is in position 1, coincidence is established at And circuits 4068 and 4079 which permits the tubes in rows 1 and 2 respectively to be unblanked. When the 1 to 2 counter is in position 2, And circuits 4090 and 4101 are operated and the cathode ray tubes in rows three and four respectively are permitted to be unblanked. Selection of the one of five tubes in any row for unblanking is determined by signals developed by the 1 to 9 counter and the 1 to 3 counter.

Reference has been made above to the fact that the four C. R. T. Grid Pulse Generators can only be operated when the digit to be displayed is less than 10 when the Display Greater Than 9 pushbutton is not depressed or greater-than-9 if the Display Greater Than 9 pushbutton is depressed and when appropriate coded digital pulses are received from the Timing and Coding circuits of the Register Display circuit. It will now be shown how these conditions are developed and, therefore, how input terminals 124, 122, 125 and 123 shown in the upper left corner of Fig. 44 are caused to be Up.

MAKING THE GREATER-THAN-9 CHECK

It will be recalled from the previous discussion that the two digits which are to be displayed in the C. R. T. Display System are stored for a 400 microsecond time interval in the one position storage circuits shown in Figs. 27 and 28. The storage circuit in Fig. 27 is capable of storing a digit of the various fields and Register 1, and it can store one of three test digits which are to be subsequently displayed in the last three cathode ray tubes of row three. The digits so stored sequentially are made available at output terminals 80, it being understood that the digits 1 and 8 in the terminal numbers correspond to the bit lines. In the same way the digits of the Instruction Register and Register 2 and the three test digits are stored in the circuit in Fig. 28. These digits so stored are each made available at output terminals 82.

The signals corresponding to these two digits are delivered to the circuit shown in Figs. 50 and 51. If the 8 and 2 bit lines or the 8 and 4 bit lines are Up simultaneously at this time And circuits 3972 and 3971 respectively are energized operating Or circuit 3969 and causing output terminal 110 to be Up. This output terminal is always Up when a greater-than-9 condition exists in the first storage circuit, that is the one position storage circuit which handles the field and Register 1 digits. If at this time and regardless of the condition of the digit in the first storage circuit, input terminals 82—8 bit and 88—4 bit or 88—8 bit and 88—2 bit are Up, indicating that a 12 or 10 is present in the second storage circuit which handles the digits of the Instruction Register and Register 2, coincidence is established at And circuit 3987 and 3988 respectively thereby operating Or circuit 3985 and causing output terminal 119 to be Up. This output terminal is always Up when the digit stored in the second storage circuit is greater-than-9.

The signal or signals developed at either or both output terminals 110 and 119, indicating that a greater-than-9 digit is made available from the two storage circuits for display, are then delivered to the circuit shown in Fig. 52. The signal at input terminal 110 is delivered to the left input terminal of And circuit 4010 and to inverter 4007. Since inverter 4007 reverses its input condition, the left input terminal of And circuit 4009 is caused to be Down and no coincidence is established. On the other hand the signal delivered to And circuit 4010 develops coincidence at this And circuit if the Display Greater Than 9 pushbutton on the console is turned On. If such is the case, the signal developed by And circuit 4010 is delivered to output terminal 124 and from there to the input of the four C. R. T. Grid Pulse Generators Fig. 44 discussed above. If the Display Greater Than 9 pushbutton is not depressed however, there can not be coincidence at And circuit 4010 and output terminal 124 can not go Up.

The same situation prevails when the greater-than-9 line associated with the second storage circuit is energized and input terminal 119, Fig. 51, is Up. Signals are again delivered to an inverter 4008 and an And circuit 4012. This inverter is made conductive and so output terminal 122 cannot be energized through And circuit 4011. However, the signal delivered to And circuit 4012 develops coincidence there if the Display Greater Than 9 pushbutton is On at this time. Coincidence at this And circuit causes output terminal 122 to go Up and the C. R. T. Grid Pulse Generators associated with rows two and four are permitted to be energized.

It should be understood that energizing output terminals 124 and 122 shown in Fig. 52 when the digit available for display is greater-than-9 does not mean that this digit will be displayed. Actually depressing the Display Greater Than 9 pushbutton on the console permits only the modulo 8 of this number to be displayed by suppressing the 8 bit line. In other words, if a 12 is erroneously made available for display by the first storage circuit, the 8 bit line (terminals 80) is pulled Down and the 4 bit line alone is energized and its signal made available to the cathode ray tube circuits. This may be seen by referring to Fig. 50. When the Display Greater Than 9 pushbutton (shown in Fig. 19) is turned On, input terminal 128 is caused to be Down. The switch is normally kept in the Off position and this input terminal would therefore be Up. However, since it is desired to display the modulo 8 of the number greater than 9, this input terminal is pulled Down and the left input terminal of And circuits 4006 and 4005 are caused to be Down. The right input terminal of And circuit 4006 is connected to the 8 bit line (terminals 80) of the first storage circuit, whereas the And circuit 4005 is connected to the 8 bit line (terminals 82) of the second storage circuit. With these two And circuits Down, it is impossible for the 8 bit input terminals of the 4 to 9 wire converters 3968 and 4002 (Fig. 50) to be energized.

In the above discussion an abnormal situation has been assumed where the one or both digits to be displayed are greater-than-9. However, the normal case is one where the digits are not greater-than-9. In such a case, referring now to Fig. 50, the 8 and 4 and 2 bit lines leading from the two Single Digit Storage circuits shown in Figs. 27 and 28 will not be Up simultaneously. In such a case coincidence will not be established at any of the And circuits 3971, 3972, 3987 and 3988 of Fig. 51 and output terminals 110 and 119 will be Down.

Looking at Fig. 52 it will be seen that when input terminal 110 is Down inverter 4007 is made conductive and the left input terminal of And circuit 4009 is Up. The right input terminal of this And circuit will also be Up at this time if the Display Greater Than 9 pushbutton on the console is Off. Coincidence having been established at this And circuit, a signal is developed at output terminal 124 which is then delivered in Fig. 44 to the input And circuits 4068 and 4090 of the rows one and three Grid Pulse Generator circuits respectively.

The Down condition presented by input terminal 119 (from Fig. 51) is reversed by inverter 4008 in Fig. 52 and coincidence is established at And circuit 4011 if the Display Greater Than 9 pushbutton on the console is Off (whereby terminal 128 is Up). The signal developed by this And circuit is delivered to output terminal 122 and from there fed to the input And circuits 4079 and 4101 (Fig. 45) of the rows two and four Grid Pulse Generator circuits.

It will be recalled from the discussion above on the energization of the C. R. T. Grid Pulse Generators that the signals developed at output terminals 122 and 124 in the circuit shown in Fig. 52 operate the four C. R. T. Grid Pulse Generators which accomplish the unblanking of the cathode ray tubes in the C. R. T. Display System. If both of these terminals are Down, control grid voltage for all 20 tubes cannot be developed and therefore none will be unblanked. If one of these terminals is Down and the other is Up, control grid voltage for two rows of cathode ray tubes, that is ten tubes, cannot be developed and so the corresponding ten cathode ray tubes cannot be unblanked. For example, if terminal 122 is Down and terminal 124 is Up, only the cathode ray tubes in rows 2 and 4 can be unblanked. On the other hand, if output terminal 124 is Down and terminal 122 is Up, only the cathode ray tubes in rows 1 and 3 can be unblanked. These terminals are in turn controlled by the operation of the Display Greater Than 9 pushbutton on the console (Fig. 19) in the following manner.

| Greater Than 9 Pushbutton | 122 | 124 | Digit |
| --- | --- | --- | --- |
| Off | Up | Up | Less Than 9. |
| Off | Down | Down | Greater Than 9. |
| On | Down | Down | Less than 9. |
| On | Up | Up | Greater Than 9. |

DEVELOPING THE CODED DIGITAL PULSES

It will be recalled from the discussion above on the energization of the C. R. T. Grid Pulse Generators that coded digital pulses must be developed at input terminals 125 and 123 as shown in Fig. 44 to energize the four C. R. T. Grid Pulse Generators and enable the cathode ray tubes associated with them to be unblanked in preparation for a writing operation. If both of these terminals are Down, there can be no unblanking of any of the twenty cathode ray tubes in the Cathode Ray Tube Display System. If either one of these terminals is Down, the ten tubes in the two rows associated with the two C. R. T. Grid Pulse Generators controlled by the terminal which is Down cannot be unblanked. Thus it was shown that both these terminals must be Up in order that two digits might be normally displayed on the basis of two cathode ray tubes. It will now be shown how these two terminals are caused to be Up.

Reference should now be made to Figs. 53 and 54. Each 400 microseconds that a signal is developed at output terminal 130 by the Counter Control circuit, shown in Fig. 26, coincidence is established at And circuit 3873 and the first latch comprising And circuit 3874 and delay circuit 3900 is energized. Reference should be made to Fig. 26 in order to see how the signal is developed at terminal 130. During each 400 microseconds that the decade counters shown in Fig. 20 match the setting of the three microsecond selector switches, signals are developed at their output terminals 38 and 39. These signals are delivered to the Counter Control circuit shown at the top left corner of Fig. 22. There they develop coincidence at And circuit 3572 operating delay circuit 3573, Or circuit 3576 and delay circuit 3614 in order to cause output terminal 130 to be Up for one microsecond after a time interval of two microseconds since the signals were received at the input terminals. It must be understood that each time a signal does appear at output terminal 130, the 1 to 9 counter is stepped up one position. Actually because of the presence of delay circuit 3614 the 1 to 9 counter is in its stepped up position, that is a signal appears at the output of the succeeding position latch, at the time that a signal is developed at output terminal 130.

Returning to Fig. 53 it is seen that this signal energizes the first latch in the series of the digit raster timing generator. The sustained signal developed by the latch comprising And circuit 3874 and delay circuit 3900 is delivered to the left input terminal of And circuit 3851, where it establishes coincidence when the next N.7 signal arrives from the Octal Commutator. Because of the presence of inverter 3862, this latch will be maintained until And circuit 3857 is energized by a succeeding latch.

The signal developed by And circuit 3851 causes the right input terminal of And circuit 3876 to be Up. Since inverter 3863 is connected to the feedback line of the latch which And circuit 3876 controls, it is conductive at this time and coincidence is established at And circuit 3876. The signal from this And circuit energizes Or circuit 3878 and delay circuit 3901 in order to form a latch comprising this Or circuit and And circuit 3877. The signal is made available by this latch at output terminal 131. When the next N.7 signal arrives from the Octal Commutator, inverter 3864 is made nonconductive and the second latch is de-energized. Thus the second latch comprising And circuit 3877, Or circuit 3878 and delay circuit 3901 is Up for a period of eight microseconds, or until the next N.7 pulse arrives from the Octal Commutator.

The signal developed by the second latch type counter and applied to terminal 131, is fed to the left input terminal of And circuit 3853 where it establishes coincidence at the second N.7 time. The signal developed by this And circuit is then fed to And circuit 3879 where it develops coincidence because of the operation of inverter 3865. Once And circuit 3879 is caused to be Up the third latch comprising Or circuit 3881, delay circuit 3902 and And circuit 3880 is energized. Thus at an N.0 time, that is as output terminal 131 goes Down, output terminal 132 goes Up. When the next N.7 pulse arrives, coincidence cannot be established at And circuit 3853 and inverter 3866 permits the third latch to continue energized for another eight microseconds.

The third N.7 signal received in the circuit of Fig. 53 also energizes the second latch and causes output terminal 131 to be Up for another eight microseconds. It does this by developing coincidence at And circuit 3851 which in turn operates And circuit 3876 with the signal developed by inverter 3863 to initiate the second latch, comprising Or circuit 3878, delay circuit 3901 and And circuit 3877. This latch will again be de-energized when the 4th N.7 pulse arrives since the coincidence at And circuit 3851 will make inverter 3864 nonconductive thereby pulling the Hold input terminal of the second latch Down.

The 4th N.7 signal received from the Octal Commutator de-energizes the second and third latches at the same time that it operates the fourth latch. The energization of the second latch has already been explained. In the case of the third latch coincidence is established at And circuit 3853 which makes inverter 3866 nonconductive thereby pulling Down the Hold input terminal of And circuit 3880 of the third latch. This causes output terminal 132 to be Down one microsecond later or at an N.0 time. Thus it is seen that although output terminal 131 is Up for eight microseconds, output terminal 132 is Up for 16 microseconds.

The fourth N.7 pulse is delivered to the right input terminal of And circuit 3254 where it develops coincidence with the second and third latch signals. When this And circuit is Up, the right input terminal of And circuit 3882 is caused to be Up thereby developing coincidence because inverter 3867 is conductive at this time. Operation of And circuit 3882 energizes Or circuit 3884, delay circuit 3902 and And circuit 3883 and thereby operates the fourth latch in sequence.

The fourth latch type counter will stay Up for a period of 32 microseconds, that is from the fourth N.7 signal to the eighth N.7 signal. And circuit 3854, which controls operation of the fourth latch, is in coincidence at the time that the fourth N.7 pulse arrives from the Octal Commutator even though this same pulse causes the second and third latches to go Down. A one microsecond signal developed by the second and third latches after the third N.7 pulse arrives, is sufficient to energize And circuit 3854 and start the operation of the fourth latch. The presence of inverter 3868 in the Hold input line of the fourth latch also indicates that coincidence must be established at And circuit 3854 in order to de-energize the fourth latch. Since the first latch is Up every other N.7 signal and the second latch is Up every other two N.7 signals, coincidence can be established at And circuit 3854 at the interval when the N.7 signal causes the second and third latches to be de-energized simultaneously. This may be seen more clearly by referring to the timing charts Figs. 9–12. There it can be seen that the second and third latches go Down simultaneously at the time that the fourth N.7 pulse arrives from the Octal Commutator. However, due to the one microsecond time interval present in both latches, And circuit 3854 will be at coincidence for one microsecond when the eighth one microsecond signal is received. Thus the fourth latch is Up for four N.7 cycles and Down for the same time interval.

The signal developed by the fourth latch is delivered to the right input terminal of And circuit 3855. The left input terminal of this And circuit is connected to And circuit 3854, and therefore may only be in coincidence when the second, third and fourth latches are energized at the time that an N.7 signal arrives. The second, third and fourth latches are in operation when the eighth N.7 signal and the sixteenth N.7 signal arrive at the circuit of Figs. 53 and 54. When And circuit 3855 is caused to be Up the first time, that is when the eighth N.7 signal arrives, it develops coincidence at And circuit 3885. The left input terminal of this And circuit is Up at this time due to the presence of inverter 3869. Once the And circuit is energized, Or circuit 3887, delay circuit 3904 and And circuit 3886 are operated thereby initiating the fifth latch. Although And circuit 3855 goes Down one microsecond later, the presence of inverter 3870 keeps the Hold input terminal of And circuit 3886 Up until And circuit 3855 is again energized, that is to say, until the next N.7 pulse arrives at the time that the second, third, and fourth latches are in operation. When this occurs at the sixteenth N.7 cycle, inverter 3870 is made nonconductive and the fifth latch is de-energized. Inverter 3869 prevents the latch from being energized through And circuit 3885 at this time. Thus it is seen that output terminal 134 is Up for a period of eight octal cycles or the equivalent of 64 microseconds.

During the operation of the fifth latch a signal is delivered to And circuit 3856 in order that coincidence might be established at this And circuit at the time that the received N.7 signal finds the second, third, fourth and fifth latches in operation. An N.7 signal finds these four latches in operation the sixteenth octal cycle, and the 32nd octal cycle. The first time it finds these latches in operation, it energizes the sixth latch, and the second time it finds the second through fifth latches in operation it de-energizes the sixth latch so that this latch is Up and Down for a 16 octal cycle duration.

As coincidence is established at And circuit 3856 at the time of the 16th octal cycle, a signal is developed which develops coincidence at And circuit 3888 due to the operation of inverter 3871 at this time. This And circuit in turn energizes Or circuit 3890, delay circuit 3905 and And circuit 3889 and thereby initiates the sixth latch.

The N.7 signal will find all six latches Up simultaneously during the 32nd octal cycle. Therefore it is at this time that And circuit 3857 will be in coincidence and a signal developed at the input of inverter 3862 which will make the output of this inverter go Down. In this way the Hold input terminal of the first latch is caused to be Down and the latch de-energized until the next one microsecond signal arrives from the Counter Control circuit, 400 microseconds later.

Thus it is seen that the five stage counter shown in Figs. 53 and 54 is capable of counting through 32 octal cycles. During this period the second latch is energized every other octal cycle for a period of eight octal cycles, the third latch is energized every two octal cycles for a period of 16 cycles, the fourth latch is energized every four octal cycles for a period of 32 octal cycles, and the fifth latch is energized every eight octal cycles also for a period of 64 octal cycles. Waveforms corresponding to the signals developed by these latches are shown in the time chart Figs. 9–12.

At the same time that the counter is developing signals at output terminals 131, 132, 133 and 134, as shown in the time chart, it is also developing the inverse of these signals at output terminals 135, 136, 137 and 139. Each of these latter output terminals is connected through a cathode follower to the output of an inverter of one of the latches so that when this latch is in operation at any time in developing a signal at one of the former output terminals, it is also causing one of the latter output terminals to be Down, as will be shown below.

It will be seen that when the second latch comprising And circuit 3877, Or circuit 3878 and delay circuit 3901 is energized output terminal 131 is Up. During the time this latch is energized a signal is made to appear at the input of inverter 3863 thereby causing its output to be Down and cathode follower 3858 to be de-energized. In this case output terminal 135 is Down. It will be recalled that at the end of an octal cycle the second latch is caused to be de-energized, in which event the input of inverter 3863 will be Down and its output will be Up, thereby energizing cathode follower 3858 which brings output terminal 135 Up.

It may be seen from the circuit that the third latch comprising And circuit 3880, Or circuit 3881, and delay circuit 3902 develops a signal at output terminal 132. During the operation of this latch the input of inverter 3865 is Up making its output Down and thereby de-energizing cathode follower 3859. In this case output terminal 136 is brought Down. It will be recalled that this latch is deenergized at the end of two octal cycles at which time inverter 3865 is made conductive and output terminal 136 caused to be Up for two octal cycles.

The fourth latch, comprising And circuit 3883, Or circuit 3884 and delay circuit 3903, is Up four octal cycles each eight octal cycles and causes output terminal 133 to be Up during this period. As long as this latch is energized, inverter 3876 is made nonconductive thereby de-energizing cathode follower 3860 and causing output terminal 137 to be Down. On the other hand during the four octal cycles in which this latch is de-energized inverter 3865 is made conductive and a signal is caused to be developed through cathode follower 3860 at output terminal 137.

Output terminal 134 is caused to be Up by the operation of the fifth latch comprising And circuit 3886, Or circuit 3887 and delay circuit 3904. When this output terminal is Up, inverter 3869 is made nonconductive thereby de-energizing cathode follower 3861 and causing output terminal 138 to be Down. During the period that the latch is de-energized, however, inverter 3869 is made conductive and a signal is caused to appear at output terminal 138. Thus it is seen that by the use of an inverter circuit the reverse condition is obtained from that existing at output terminals 131, 132, 133 and 134.

Three other signals are developed by the counter shown in Figs. 53 and 54. The signal which occurs at output terminal 140 is of one microsecond duration and occurs once each 16 microseconds (or two octal cycles). Each time And circuit 3853 is at coincidence to energize or de-energize the third latch, delay circuit 3906 is operated and a signal made to appear at N.0 time at output terminal 140. The purpose of this pulse will become clearer later on.

A signal is developed at output terminal 141, shown at the left center of Fig. 53, whenever And circuit 3852 is at coincidence. This occurs when output terminals 136, 137 and 138 are Up simultaneously. Reference to the time chart Figs. 9–12 will show that this occurs during the first, sixteenth, seventeenth and thirty-second octal cycles. Output terminal 141 is Down during all the other octal cycles.

Output terminal 139 is Up when coincidence is established at And circuit 3850. This occurs whenever output terminals 132, 138 and 137 are Up simultaneously. It will be seen from the time chart that output terminal 139 is Up the second, third, eighteenth, and nineteenth octal cycles during the 32 octal cycles that the counter shown in Figs. 53 and 54 is operating.

Reference should now be made to Figs. 55–58 in order to follow further the formation of the coded digital pulses which are used to operate the C. R. T. Grid Pulse Generators, as explained above. The signals which were developed in the circuit of Figs. 53 and 54 and whose waveforms are illustrated in the time chart are delivered to the top left corner of Fig. 55. In addition, it will be seen that N.0, N.1, N.2, N.5, N.6 and N.7 signals are also made available at the input of the circuit shown in Figs. 55–58. The output signals which are developed by this circuit are illustrated in Figs. 11 and 12. It will now be shown how the various input signals are combined to produce the various outputs which constitute the second stage of the development of the coded signals.

Figure 56:
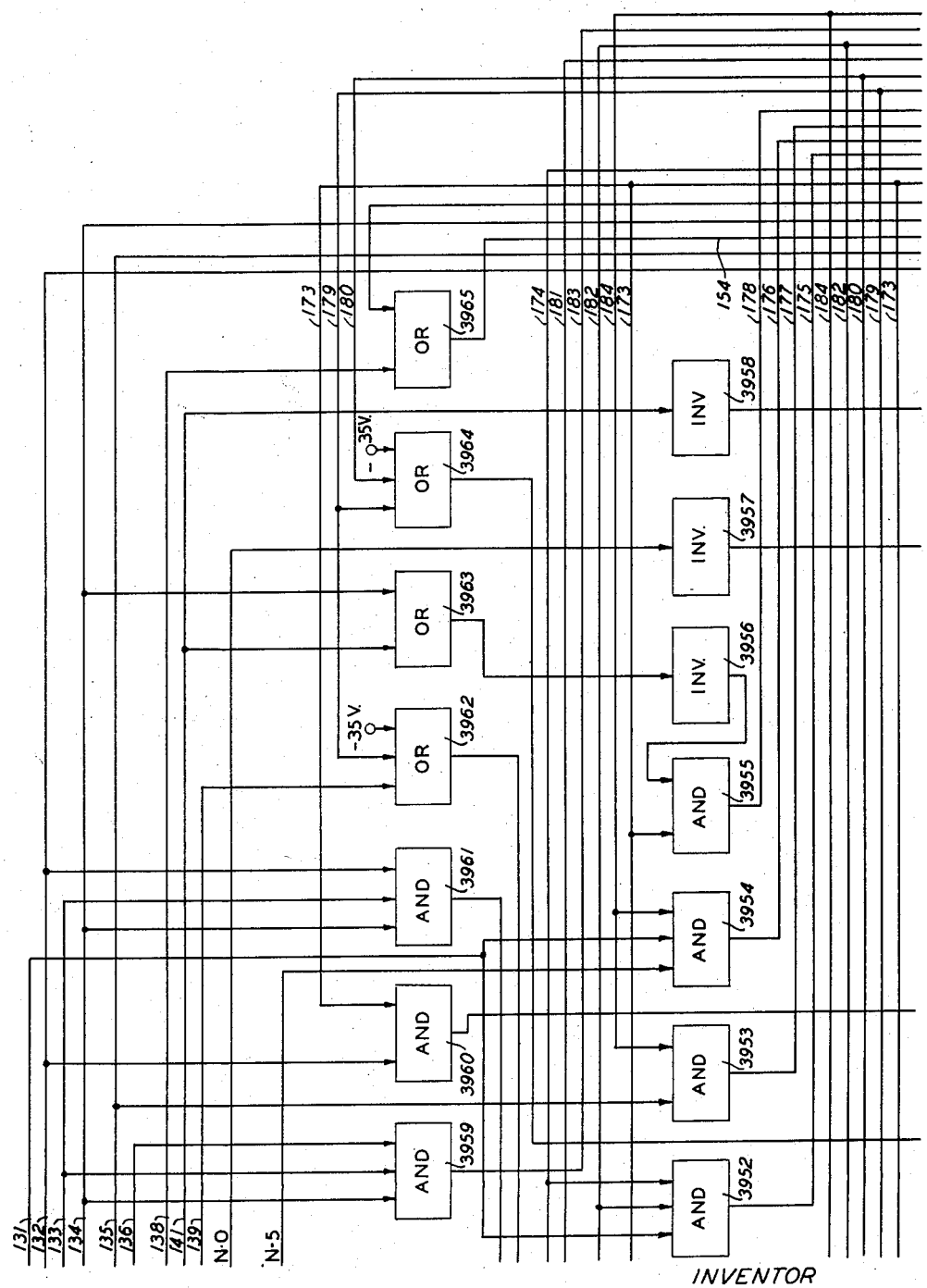
Figure 57:
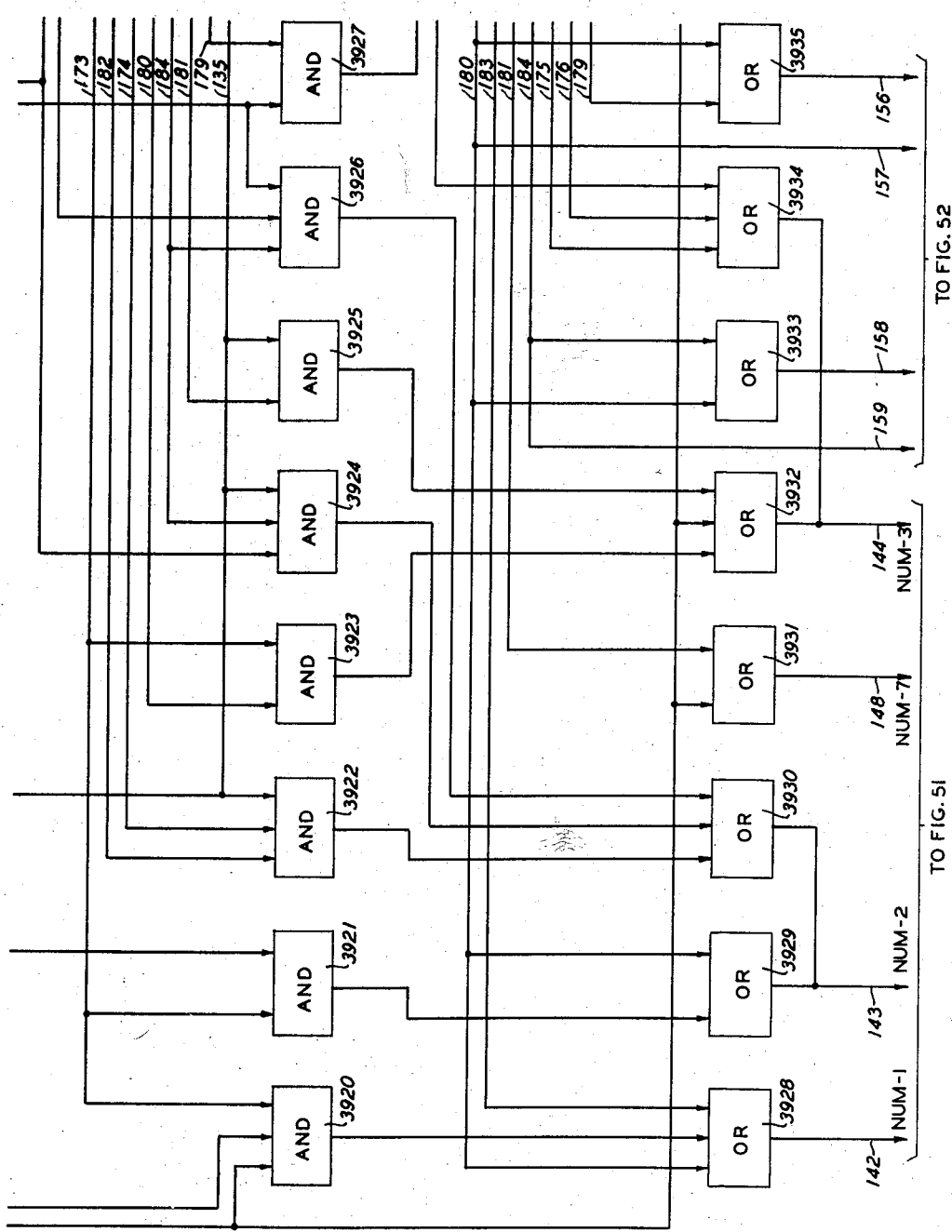
Figure 59:
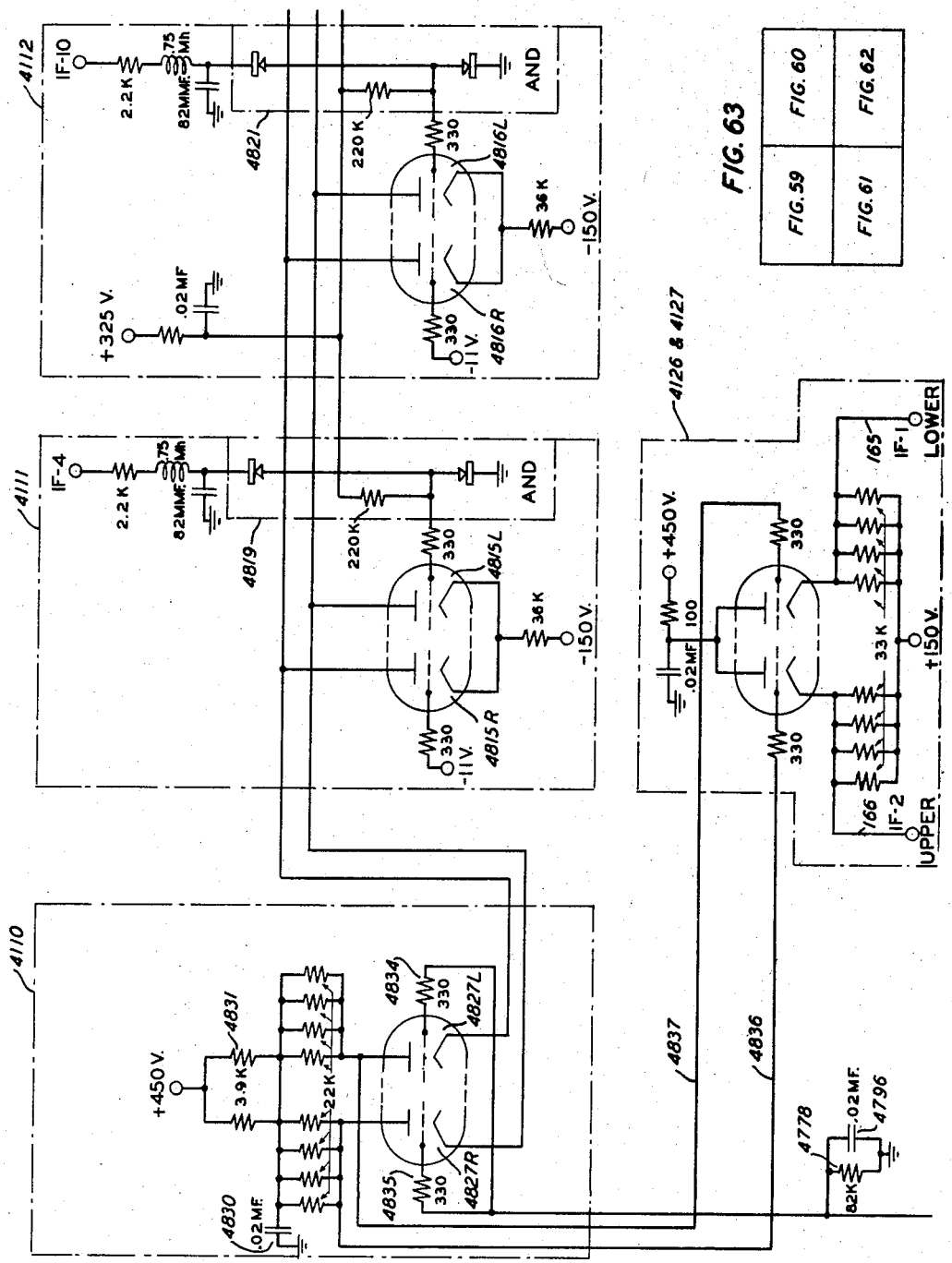
Figure 60:
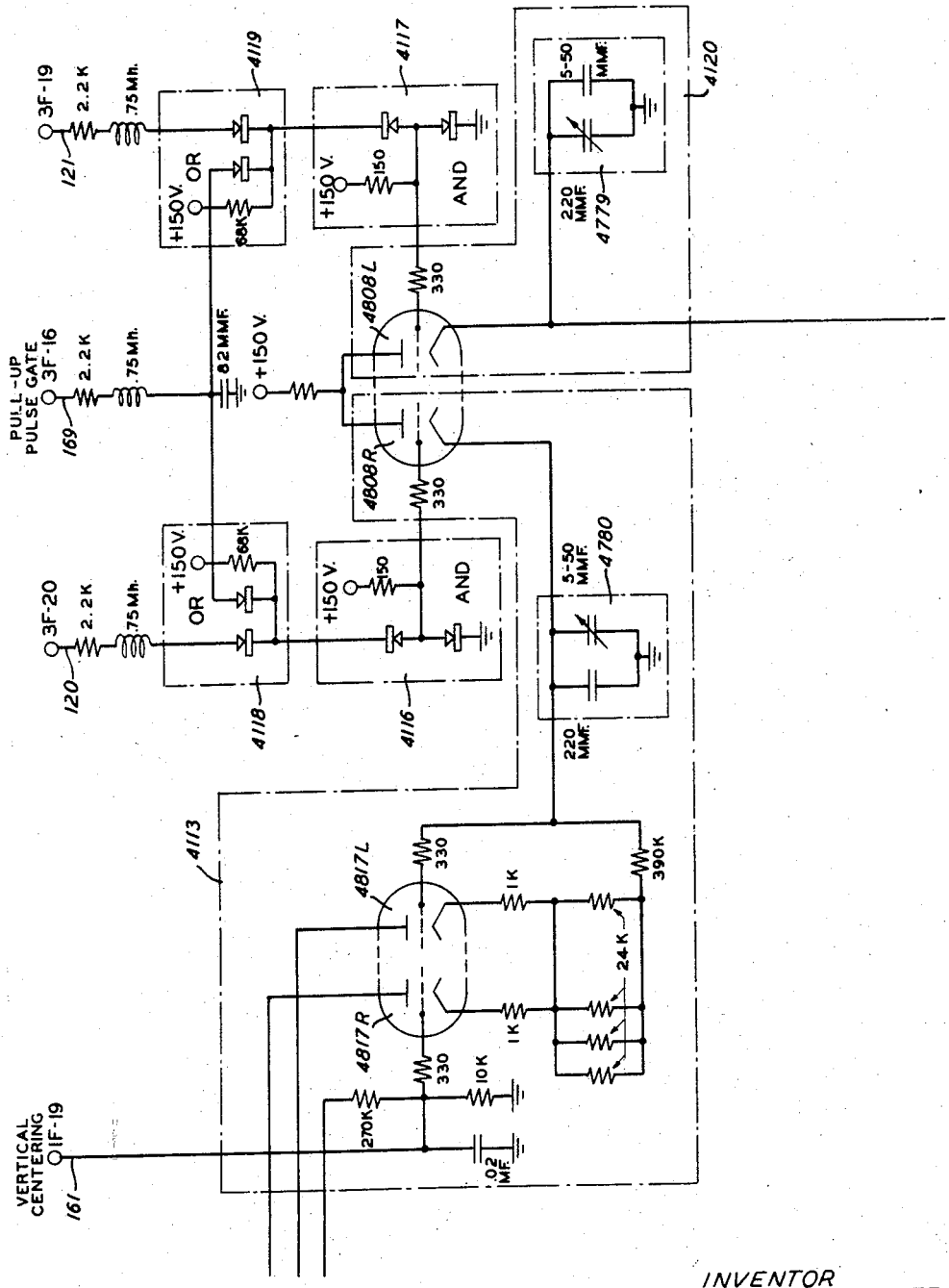

A signal is developed at output terminal 142 and shown at the bottom left of Fig. 57 when input terminals 139 and 131 are Up at the same time that no N.6 signal arrives from the Octal Commutator. Referring to Figs. 55–58, it will be seen that when input terminals 131 and 139 are Up two input terminals of And circuit 3920 are also Up. The right input terminal of this And circuit is connected through cathode follower 3914 to Or-inverter 3913 whose output side is Down under the condition mentioned above. If the N.6 signal has not arrived from the Octal Commutator at the time that input terminal 131 is Up, And circuit 3910 is caused to be Down and the output of Or-inverter 3913 is brought Up. In the same way if either input terminal 135 is Down, which is the case when 131 is Up, there cannot be coincidence at And circuit 3908 regardless whether the N.1 signal arrives from the Octal Commutator. Thus the output of Or-inverter 3913 is Up and coincidence is established at And circuit 3920. Coincidence at this And circuit energizes Or circuit 3928 and causes output terminal 142 to be Up.

Or circuit 3928 which develops the signal at output terminal 142 can also be energized in two other ways. This Or circuit may also be energized when input terminals 132, 133 and 138 are Up simultaneously. In such an event And circuit 3909 is energized operating cathode follower 3916. A signal from this cathode follower then operates Or circuit 3928 and causes output terminal 142 to be Up.

In the event that input terminals 133, 134 and 136 are Up simultaneously, coincidence is established at And circuit 3959 which energizes Or circuit 3928 and permits output terminal 142 to go Up. Thus it is seen that three sets of conditions determine the type of wave pattern developed at output terminal 142. These three sets of conditions constitute combinations of the waveforms shown on time chart Figs. 9 and 10 and the four octal signals made available at the input of the circuit shown in Fig. 55.

It will be seen from the time chart that the waveform associated with the first 16 octal cycles is repeated the next 16 octal cycles. In fact time chart Figs. 9 and 10 must be analyzed in conjunction with Figs. 55–58 in order to understand exactly how the waveform is developed. The N3.0–N3.5 and N3.7 signals developed at output terminal 142 result from coincidence established at And circuit 3920. The left and center input terminals are caused to be Up by signals developed at input terminals 139 and 131 respectively. Reference to the time chart will show that these two input terminals are Up simultaneously from N3.0 time through N3.7 time, or for a one octal cycle. However, the third input terminals of And circuit 3920 is connected to cathode follower 3914 and is Down at an N.6 time that input terminal 131 is Up, according to coincidence established at And circuit 3910. This means that coincidence can only be established for seven microseconds, that is, from N3.0 time through N3.5 and at N3.7 time, at And circuit 3920 during the third octal cycle. This And circuit will be Up again at N19.0 through N19.5 and at N19.7 time.

The N6–N8 signal developed at output terminal 142 is created by the signals appearing simultaneously at input terminals 132, 133 and 138, as described above. These input terminals are Up simultaneously at N6–N8 time and N22–N24 time. When these input terminals are up simultaneously, And circuit 3909 (Fig. 55) is at coincidence energizing cathode follower 3916 and Or circuit 3928.

Output terminal 142 is caused to be Up from N12 through N13 time and from N28 through N29 time when input terminals 133, 134 and 136 are Up simultaneously. This occurs throughout the 12th, 13th, 28th and 29th cycles. At these times coincidence is established at And circuit 3959 which energizes Or circuit 3928 and causes output terminal 142 to be Up for the appropriate length of time. Thus the coded waveform NUM–1 is developed for writing digit 1.

It should be noted at this point that the coded waveform NUM–1 on conductor 142 and shown in Figs. 11 and 12 is the primary waveform for delivery to the grid of one of the cathode ray tubes. However, this waveform is shifted and trimmed by the circuit of Fig. 52. It may be noted that the output lead 142 enters the And circuit 3984 whereupon the operation of the 4 to 9 wire converter 3968 to enable the numeral 1, a signal will be passed by Or circuit 3982 so that this NUM–1 waveform will be transmitted over conductor 152 to Fig. 52 where it is first shifted by one microsecond by Delay circuit 4013, then trimmed by the pull up gate pulse coming in over conductor 140 at time N.0 and lengthened over time N.1 by Delay circuit 4135, thus rendering And circuit 4134 nonconductive over periods N.0 and N.1. After being so trimmed, the NUM–1 waveform is again shifted one microsecond by Delay circuit 4137 and delivered over conductor 125 to the And circuit 4068 for application to one of the cathode ray grid circuits. This final result may be noted as follows:

NUMERAL 1

| Waveform on conductor 142 | Waveform shifted and trimmed on conductor 125 |
| --- | --- |
| 3.0 to 3.5 and 3.7 | 3.2 to 3.7 |
| 6.0 to 7.7 | 6.3 to 8.0 |
| 12.0 to 13.7 | 12.3 to 14.0 |
| 19.0 to 19.5 and 19.7 | 19.2 to 19.7 |
| 22.0 to 23.7 | 22.3 to 24.0 |
| 28.0 to 29.7 | 28.3 to 30.0 |

NUMERAL 2

The signal pattern developed at output terminal 143 takes the form NUM–2 shown on the time chart and is developed through the Or circuits 3929 and 3930 shown in Fig. 57. A signal is developed at N2.0, N2.2 to N3.5 and at N3.7 times when input terminal 139 is Up. This energizes Or circuit 3962 and causes the right input terminal of And circuit 3921 to be Up. The left input terminal of And circuit 3921, which is connected through cathode follower 3914 to Or-inverter 3913, is Down at N.1 time when a signal appears on input terminal 135 or at N.6 time when a signal appears at input terminal 131. This means that output terminal 143 will be Up at N.0 time, Down at N.1 time, Up at N2.2 time through N3.5 time, Down at N3.6 time and Up again at N3.7 time.

A similar signal is developed at output terminal 143 at N5.5 and at N5.7 time when input terminals 133, 136 and 138 go Up simultaneously. This occurs during the 4th, 5th, 20th and 21st octal cycles. When these input terminals are Up, And circuit 3907 is at coincidence operating cathode follower 3915 and Or circuit 3962 in order to cause the right input terminal of And circuit 3921 to go Up. The left input terminal of this And circuit being connected through cathode follower 3914 to Or-inverter 3913 causes coincidence to occur at And circuit 3921 at N4.0, N4.2 to N5.5 and at N5.7 times and at N20.0, N20.2 to N21.5 and at N21.7 times.

The N6.0–N7.7 signal is developed at output terminal 143 when input terminals 132, 133 and 138 are Up simultaneously. This occurs from N6.0 time through N7.7 time. In such a case coincidence is established at And circuit 3909 shown in Fig. 55 which energizes cathode follower 3916 and Or circuit 3929.

The N10.2–N10.6 signal is developed at output terminal 143 whenever input terminal 135, 132, 134 and 137 are Up. In such a case coincidence is established at And circuit 3917 which energizes cathode follower 3918 which develops coincidence at And circuit 3922. The signal from this And circuit operates Or circuit 3930 and causes output terminal 143 to be Up for the desired period of time. The center input terminal of And circuit 3922 is connected over conductor 174 through Or-inverter 3912 to the input terminals which receive the N.0 and N.7 signals from the Octal Commutator. Since the Or-inverter is made nonconductive during these two time intervals, And circuit 3922 is out of coincidence at N10.0 and N10.7 time. Through And circuit 3908, the And circuit is also out of coincidence at N10.1 time. Thus the output signal is developed from N10.2 time through N10.6 time.

Output terminal 143 is caused to be Up for one microsecond at N14.2 time when input terminals 135, 132, 133 and 134 are Up simultaneously at the same time that an N.2 signal is received from the Octal Commutator. The N.2 signal is delivered directly to the left input terminal of And circuit 3924. When input terminals 132, 133 and 134 are Up simultaneously coincidence is established at And circuit 3961 which operates cathode follower 3919 and causes the center input terminal of And circuit 3924 to be Up. The right input terminal of this And circuit is Up as soon as input terminal 135 is Up. Reference to the time chart will show that the four input terminals are Up simultaneously during the 14th octal cycle. Thus when the N.2 pulse arrives from the Octal Commutator during this octal cycle, output terminal 143 will be Up at N14.2 time.

Output terminal 143 is caused to be Up at N15.1–N15.7 time when input terminals 131, 132, 133 and 134 are Up. These four input terminals are Up simultaneously during the 15th and 31st octal cycles. However, since the center input terminal of And circuit 3926 is connected through inverter 3957 to the input terminal bearing the N.0 signal from the Octal Commutator, And circuit 3926 will be at coincidence only from N15.1 time through N15.7 time. When And circuit 3926 is Up, Or circuit 3930 is operated and output terminal 143 is caused to be Up for the desired length of time. Thus the signal pattern NUM–2 for digit 2 is developed. It must be understood throughout this analysis that since the digits are written twice during each 400 microsecond display cycle, the waveform shown in the first 16 octal cycles will be identical to the waveform of the latter 16 octal cycles of the time chart.

Here, again, it is to be noted that the NUM–2 waveform developed on output terminal 143 must be shifted and trimmed as before so that the waveform finally delivered over conductor 125 may be derived as follows:

| Num-2 waveform Figs. 11 and 12 on Conductor 143 | Waveform on conductor 125 shifted and trimmed |
| --- | --- |
| N 2.0, N 2.2 to N 3.5 × N 3.7 | N 2.4 to N 3.7 |
| N 4.0, N 4.2 to N 5.5 × N 5.7 | N 4.4 to N 5.7 |
| N 6.0 to N 7.7 | N 6.3 to N 8.0 |
| N10.2 to N10.6 | N10.4 to N11.0 |
| N14.2 | N14.4 |
| N15.1 to N15.7 | N15.3 to N16.0 |
| N18.0, N18.2 to N19.5 × N19.7 | N18.4 to N19.7 |
| N20.0, N20.2 to N21.5 × N21.7 | N20.4 to N21.7 |
| N22.0 to N23.7 | N22.3 to N24.0 |
| N26.2 to N26.6 | N26.4 to N27.0 |
| N30.2 | N30.4 |
| N31.1 to N31.7 | N31.3 to N32.0 |

NUMERAL 3

A signal pattern is developed at output terminal 144 through the energization of Or circuits 3932 and 3934. Output terminal 144 is caused to be Up at N2.0–N3.7 time according to the signal appearing at input terminal 139. This signal will energize Or circuit 3932 and cause output terminal 144 to be Up for the time interval shown on the time chart (the extension of this signal over the period N4.0 comes from another source).

The N4.0, N4.2 to N4.7 signal is developed at output terminal 144 when input terminals 133, 135, 136 and 138 are Up simultaneously. This occurs during the fourth octal cycle. When input terminal 135 is Up, the left input terminal of And circuit 3939 is Up automatically. When the other three input terminals are Up, coincidence is established at And circuit 3907 which operates cathode follower 3915 and causes the center input terminal of And circuit 3939 to be Up. The right input terminal of And circuit 3939 is connected from cathode follower 3914 to Or-inverter 3913 which is made non-conductive at an N.1 time. This being the case coincidence will occur at And circuit 3939 at N4.0 and N4.2 time to N4.7 time. When And circuit 3939 is Up, Or circuit 3934 is energized and output terminal 144 is Up for the desired length of time.

The N6.0, N6.2 to N7.5 and N7.7 signals are developed at output terminal 144 when input terminals 132, 133 and 138 are caused to be Up. When these three input terminals are Up, And circuit 3909 is at coincidence operating cathode follower 3916 and causing the left input terminal of And circuit 3923 to be Up. These three input terminals are Up simultaneously during the 6th, 7th, 22nd and 23rd octal cycles. The right input terminal of And circuit 3923 is Down at N.1 time when input terminal 135 is Up and at N.6 time when input terminal 131 is Up. This means that coincidence can only be established at And circuit 3923 over the periods N6.0, N6.2 to N7.5 and N7.7. This signal energizes Or circuit 3932 and appears at output terminal 144.

The N8.0–N8.7 signal is developed at output terminal 144 when input terminals 135, 134, 136 and 137 are Up simultaneously. This occurs during the 8th and 24th octal cycles. When the input terminals are Up simultaneously, And circuit 3925 is at coincidence operating Or circuit 3932 and causing output terminal 144 to develop the appropriate signal pattern.

The output terminal 144 is caused to be Up at N11.1–N11.5 time during the first 16 octal cycles and at N27.1–N27.5 time during the second 16 octal cycles when input terminals 131, 132, 134 and 137 are Up simultaneously. This occurs during the 11th and 27th octal cycles. When these input terminals are Up, the left and center input terminals of And circuit 3952 are caused to be Up. However, since the right input terminal of this And circuit is connected through Or-inverter 3912 to input terminals which receive the N.1 and N.6 and N.7 signals from the Octal Commutator hence, And circuit 3952 is out of coincidence during the N11.1 and N11.6 and N11.7 microseconds of the 11th octal cycle. The signal from And circuit 3952 energizes Or circuit 3934 and causes output terminal 144 to be Up.

Output terminal 144 is finally caused to be Up during the first and second writing operations at N15.5 and N31.5 times. This one microsecond signal is developed when input terminals 131, 132, 133 and 134 are Up simultaneously. These input terminals are Up simultaneously during the 15th and 31st octal cycles. However, since the left input terminal of And circuit 3954 shown in Fig. 56 is only Up at N.5 time, this means that And circuit 3952 can only be at coincidence at N15.5 time and N31.5 time.

The waveform on conductor 144 is then transmitted through the shifting and trimming circuit so that it comes out as charted in Fig. 6. The timing is as follows:

| NUM-3 waveform Conductor 144 | Waveform on conductor 125 Shifted and trimmed |
| --- | --- |
| N 2.0 to N 3.7 | N 2.4 to N 3.7 |
| N 4.0, N 4.2 to N 4.7 | N 4.4 to N 5.1 |
| N 6.0, N 6.2 to N 7.5 and N 7.7 | N 6.4 to N 8.0 |
| N 8.0 to N 8.7 | N 8.3 to N 9.0 |
| N11.1 to N11.5 | N11.3 to N11.7 |
| N15.5 | N15.7 |
| N18.0 to N19.3 | N18.4 to N19.7 |
| N20.0, N20.2 to N20.7 | N20.4 to N21.1 |
| N22.0, N22.2 to N23.5 and N23.7 | N22.4 to N24.0 |
| N24.0 to N24.7 | N24.3 to N25.0 |
| N27.1 to N27.5 | N27.3 to N27.7 |
| N31.5 | N31.7 |

It has been shown above how the various signal patterns are developed at output terminals 142, 143, and 144 in Figs. 55–58. A signal developed at output terminal 142 subsequently causes the digit 1 to be written on the appropriate cathode ray tube, the signal developed at output terminal 143 enables the digit 2 to be written on an appropriate cathode ray tube, the signal pattern developed at output terminal 144 permits the digit 3 to be written on the face of a cathode ray tube. The other seven digits, including the 0, are developed in essentially the same manner as described above. That is to say, various ones of the signals shown on the time chart are combined with individual octal signals shown in Figs. 55–58 to develop the signal patterns, corresponding to the digits which are to be written, shown on the time chart.

The following table gives only the timing within the first 16 octal cycles since the timing in the last 16 may be derived by merely adding 16 to any one of the values noted.

| Waveforms delivered from circuits of Figs. 55–58 | Waveforms as shifted and trimmed |
| --- | --- |
| NUM-0 | |
| N 2.0, N 2.2 to N 3.5 and N 3.7 | N 2.4 to N 3.7 |
| N 6.0, N 6.2 to N 7.5 and N 7.7 | N 6.4 to N 7.7 |
| N10.0, N10.2 to N11.5 and N11.7 | N10.4 to N11.7 |
| N14.0, N14.2 to N15.5 and N15.7 | N14.4 to N15.7 |
| NUM-1 | |
| N 3.0 to N 3.5 and N 3.7 | N 3.2 to N 3.7 |
| N 6.0 to N 7.7 | N 6.3 to N 8.0 |
| N12.0 to N13.7 | N12.3 to N14.0 |
| NUM-2 | |
| N 2.0, N 2.2 to N 3.5 and N 3.7 | N 2.4 to N 3.7 |
| N 4.0, N 4.2 to N 5.5 and N 5.7 | N 4.4 to N 5.7 |
| N 6.0 to N 7.7 | N 6.3 to N 8.0 |
| N10.2 to N10.6 | N10.4 to N11.0 |
| N14.2 | N14.4 |
| N15.1 to N15.7 | N15.3 to N16.0 |
| NUM-3 | |
| N 2.0 to N 3.7 | N 2.4 to N 3.7 |
| N 4.0, N 4.2 to N 4.7 | N 4.4 to N 5.1 |
| N 6.0, N 6.2 to N 7.5 and N 7.7 | N 6.4 to N 8.0 |
| N 8.0 to N 8.7 | N 8.3 to N 9.0 |
| N11.1 to N11.5 | N11.3 to N11.7 |
| N15.5 | N15.7 |
| NUM-4 | |
| N 4.0 to N 5.7 | N 4.3 to N 6.0 |
| N10.0 to N11.7 | N10.3 to N11.0 |
| N14.0 to N14.7 | N14.3 to N15.1 |
| NUM-5 | |
| N 2.0 to N 3.7 | N 2.2 to N 4.0 |
| N 4.0, N 4.2 to N 5.5 and N 5.7 | N 4.4 to N 5.7 |
| N 6.0, N 6.2 to N 7.5 and N 7.7 | N 6.4 to N 7.7 |
| N10.2 | N10.4 |
| N11.1 to N11.5 | N11.3 to N11.7 |
| N14.0 to N14.7 | N14.3 to N15.1 |
| N15.5 | N15.7 |
| NUM-6 | |
| N 2.0, N 2.2 to N 3.5 and N 3.7 | N 2.4 to N 3.7 |
| N 4.0, N 4.2 to N 5.5 and N 5.7 | N 4.4 to N 5.7 |
| N 6.0, N 6.2 to N 7.5 and N 7.7 | N 6.4 to N 7.7 |
| N11.1 to N11.5 | N11.3 to N11.7 |
| N12.0, N12.2 to N13.5 and N13.7 | N12.4 to N13.7 |
| NUM-7 | |
| N 2.0 to N 3.7 | N 2.3 to N 4.0 |
| N 8.0 to N 9.7 | N 8.3 to N10.0 |
| NUM-8 | |
| N 2.0, N 2.2 to N 3.5 and N 3.7 | N 2.4 to N 3.7 |
| N 4.0, N 4.2 to N 5.5 and N 5.7 | N 4.4 to N 5.7 |
| N 6.0, N 6.2 to N 7.5 and N 7.7 | N 6.4 to N 7.7 |
| N10.2 to N10.6 | N10.4 to N11.0 |
| N11.1 to N11.5 | N11.3 to N11.7 |
| N14.2 to N14.6 | N14.4 to N15.0 |
| N15.1 to N15.5 | N15.3 to N15.7 |
| NUM-9 | |
| N 2.0, N 2.2 to N 3.5 and N 3.7 | N 2.4 to N 3.7 |
| N 4.0, N 4.2 to N 5.5 and N 5.7 | N 4.4 to N 5.7 |
| N 6.0, N 6.2 to N 7.5 and N 7.7 | N 6.4 to N 7.7 |
| N10.0, N10.2 to N11.5 and N11.7 | N10.4 to N11.7 |
| N14.2 to N14.7 | N14.4 to N15.0 |
| N15.5 | N15.7 |

SHIFTING AND TRIMMING

Reference may be made to Fig. 67 for a more detailed exposition of the shifting and trimming circuit. Here a single example is shown, the formation of the bottom bar of the numeral 8 which occurs during the 6th and 7th octal cycles. The waveform is formed by the control of And circuit 3955. The left hand input to this circuit comes from the CF circuit 3914 which has a one microsecond Down period at N.6 time of every odd numbered octal cycle under control of And circuit 3910 and another one microsecond Down period at N.1 time of every even numbered octal cycle as depicted by the waveform 173. It may then be noted that both terminal 141 and terminal 134 are Down throughout the 6th and 7th octal cycles, whereby the Or circuit 3963 is Down so that the output of the INV 3956 is Up. This output is the right hand terminal of And circuit 3955. Therefore the signal on terminal 178 is a combination of the signal on terminal 173 and the inverse of the signals on terminals 134 and 141. The numeral waveform is therefore as shown on conductor 149. This has two unwanted portions, one at time N6.0 and one at time N7.7. These are eliminated by trimming. Referring to Fig. 52, it will be seen that the pull up pulse gate 140, which has an Up interval every N.0 time of the even numbered cycles, passes through Or circuit 4138 and also through Delay circuit 4135 so that at the output of Or circuit 4138 this pull up pulse is broadened to a period covering N.0 and N.1 times of each even numbered octal cycle. This is then fed to inverter 4139 which normally holds the And circuit 4134 ready to respond to any incoming signal from Delay circuit 4013, but prevents such operation over times N.0 and N.1 of each even numbered octal cycle. Returning to the signal on conductor 149, this passes through And circuit 3974 and Or circuit 3976 (Fig. 51) and is then forwarded over terminal 152 where each part thereof is shifted one microsecond by Delay circuit 4013. As it passes through And circuit 4134, the unwanted portions are trimmed so that after another delay of one microsecond imposed by Delay circuit 4137 the signal comes out as shown. Thus the signal originally coded as N6.0, N6.2 to N7.5 and N7.7 is shifted and trimmed to

N6.4 to N7.7

TRANSMISSION OF DEVELOPED WAVEFORMS

Reference should now be made to Figs. 50 and 51 in order to see how one of the ten signal patterns examined above, corresponding to digits 0 through 9, are selected by the two digits stored in the one position registers shown in Figs. 27 and 28. It will be recalled that the digit is stored for a period of 400 microseconds in each of the two storage circuits. The digits are made available at the input terminal shown at the top left of Fig. 50 one microsecond after they are entered into the one position storage circuit.

The first function performed by the circuit shown in Fig. 50 and Fig. 51 is to convert the binary-decimal digits developed at the input terminals at the top left of the figure into decimal digits. This is accomplished through two 4-to-9 wire converters, such as that described in connection with Fig. 2. Signals appearing on four inputs to such a converter, representing a binary-decimal form, are converted into a single signal appearing at one of the nine output terminals corresponding to the decimal digit. Assuming that a binary-decimal 4 is stored in the one position storage circuit, comprising 4-pole 4-position switch 3530, Fig. 27, and delay circuits 3531-3534, then the 4 bit of input terminal 80 will be Up. The signal developed at this input terminal is fed to the 4-to-9 wire converter 3968 which changes the binary-decimal 4 into a decimal 4 by energizing the output terminal corresponding to this value. The signal developed by the 4-to-9 wire converter is then fed to the right input terminal of And circuit 3980, shown directly below the 4-to-9 wire converter in Fig. 51. The signal pattern corresponding to the decimal 4 is made available at input terminal 145 and the left input terminal of And circuit 3980. Since the right input terminal of this And circuit, that is the decimal 4 signal, is Up for 400 microseconds, the entire signal pattern developed at input terminal 145 is gated through And circuit 3980 and Or circuit 3977 to output terminal 152. In the same way all the other binary-decimal values are converted to decimal values which then serve to gate a signal pattern corresponding to the digit to be written through other And and Or circuits before being developed at output terminal 152. The signal pattern developed at output terminal 152 is then fed through a delay circuit 4013 shown in Fig. 52 for a pulse shaping operation before being trimmed and shifted again and then delivered to the rows 1 and 3 C. R. T. Pulse Grid Generators. It will be recalled that input terminal 125 in Fig. 44 was assumed to be Up during the discussion of the C. R. T. Grid Pulse Generators. However, it may now be seen that this terminal may be Up or Down according to the signal pattern developed by the digit to be displayed.

Assuming that a binary-decimal 7 is stored in the one position storage circuit, comprising 4-pole 4-position switch 3539 and delay circuits 3540–3543, shown in Fig. 28, input terminals 82, 4 bit, 2 bit and 1 bit are Up. As in the case of the first storage circuit discussed above, the binary-decimal value is made available to the circuit shown in Figs. 50 and 51 one microsecond after it is entered into the 4-pole 4-position switch 3539 for storage. The signals at these input terminals are delivered directly to the 4-to-9 wire converter 4002 shown at the right of Fig. 50. The 4-to-9 wire converter changes the binary-decimal value appearing on the three input lines to a decimal value corresponding to decimal 7. The signal appearing at this output terminal is then fed to the right input terminal of And circuit 3992 where it serves to gate the signal pattern corresponding to the decimal 7 available at the input terminal 148. The signal gated through And circuit 3992 goes through Or circuit 3989 before being developed at output terminal 153. From this output terminal the signal is fed through a pulse shaping delay circuit 4014 shown in Fig. 52 before being trimmed and again shifted and made available at input terminal 123 of the rows 2 and 4 C. R. T. Pulse Grid Generators shown in Fig. 44.

Provision is also included in the Register Display circuit for writing a zero on the face of the cathode ray tubes. It has been shown on time chart Figs. 9–12 that a zero signal pattern is developed along with all the other 9 digits by the circuit shown in Figs. 55–58. Thus in every case when all the bit output lines associated with one or both single digit storage circuits shown in Figs. 27 and 28 are Down simultaneously, the zero signal pattern will be automatically selected by the circuit shown in Figs. 50 and 51. Assuming that no fault occurs in the circuit shown, the zero will be written when no positive digits exist in the single digit storage circuits and the operator is thereby put on notice that the cathode ray tube is operating normally. The absence of a zero on the face of a cathode ray tube may therefore serve to indicate the presence of trouble in the tube or circuit.

In the case where a non-zero digit does not exist in the first storage circuit shown in Figs. 27 and 28, input terminals 80 (all four bit leads) shown in Fig. 50, are all Down. This means that the four input terminals of the 4-to-9 wire converter 3968 are also Down. The operation of the 4-to-9 wire converter is such that when the four input lines are Down simultaneously, indicating a zero condition, an inverter associated with each of these inputs is made conductive and develops output signals. In this case the four inverters associated with the 4-to-9 wire converter 3978 develop signals at the input of And circuit 3966. When this And circuit is Up, the left input terminal of And circuit 4004 is also Up. This gates the signal pattern corresponding to zero appearing at input terminal 151 through And circuit 4004 to output terminal 152. This signal is then sent through a pulse shaping delay circuit 4013 shown in Fig. 52 before being made available to the rows 1 and 3 C. R. T. Grid Pulse Generators shown in Figs. 44–47.

Assume a condition where the zero digit is present in the second storage circuit shown in Fig. 28. In such a case the output terminals 88 (all four bit leads) associated with this storage circuit are Down simultaneously. This means that the four input terminals of the 4-to-9 wire converter 4002 are Down. The four inverters associated with these inputs develop signals at the inputs of And circuit 3967. When this And circuit is Up, the left input terminal of And circuit 4003 is also caused to be Up for a period of 400 microseconds. In this way the signal pattern developed at input terminal 151 corresponding to the zero digit is gated through to output terminal 153. The pulse shaping operation then takes place in delay circuit 4014 in Fig. 52 before the signal is made available at the input of the rows 2 and 4 Pulse Grid Generators shown in Figs. 44–47.

Thus it is seen that the circuit shown in Figs. 50 and 51 serves as a switching means wherein the decimal values 0 through 9, corresponding to the binary-decimal digits stored in the two storage circuits shown in Figs. 27 and 28 select and gate the signal pattern appearing at one of the ten input terminals 142–151, corresponding to that decimal value, to four C. R. T. Grid Pulse Generators shown in Figs. 44–47, in order to accomplish the blanking or unblanking of the selected cathode ray tubes for writing the decimal value. For example, assuming that the digit 1 is to be written and that the signal pattern corresponding to this digit is made available at input terminal 122 in Fig. 44, coincidence can occur at the input And circuits 4089 and 4101 of rows 2 and 4 C. R. T. Pulse Grid Generators respectively only at the time intervals shown on time chart Figs. 9–12. Either one of these And circuits may be Up only at time intervals N3.2–N3.7, N6.3 to N8.0 and N12.3 to N14.0 time during the first writing operation and at time intervals N19.3 to N19.7, N22.3 to N24.0 and N28.3 to N30.0 during the second writing operation, it being understood that the digit is written twice on the face of a single tube during any 400 cycle, and that one writing operation takes 16 octal cycles or 128 microseconds.

It has thus been shown how coded pulses are formed for accomplishing the blanking and unblanking of the cathode ray tubes upon which the digits are to be written. However, it is necessary to develop the proper sweep signals in order to move the beam developed by the control grid of the operating cathode ray tube to form the digit which is to be written. Therefore, the problem of getting the correct voltages to the horizontal and vertical deflection plates of the operating cathode ray tube will next be discussed.

It has been shown hereinbefore that when a number greater than nine is offered for display either the And circuit 3969, Figs. 50 and 51, or And circuit 3972 is employed to create a signal over conductor 110 which thereupon energizes the INV-circuit 4008 in Fig. 52 so that even with the normal Up condition on terminal 128, the otherwise normal Up condition on terminal 124 of the And circuit 4009 is prevented whereby the And circuit 4068, Fig. 44, is rendered unresponsive to any of the other normal incoming signals. Therefore the common signal normally supplied to And circuits 4058, 4060, 4062, 4064 and 4066 is denied and since none of these can respond to their otherwise normal signals none can operate and therefore no display on a cathode ray tube will be produced. It has also been shown that when the Greater Than 9 pushbutton is operated the signal on terminal 128 is transferred to terminal 129 so that the And circuit 4010 is enabled and thus the signal is restored to terminal 124 so that there can be a display.

Since the normal Up condition on terminal 128 is removed And circuits 4006 and 4005 in Fig. 50 are disabled and the 8 bit cannot affect the 4 to 9 wire converter 3968 in Fig. 50. Therefore if the digit offered for display had been 15 (1111) its 8 bit would be suppressed and 7 (0111) instead would be displayed.

DEVELOPING THE HORIZONTAL AND VERTICAL SWEEP

The C. R. T. deflection plate and sweep voltages constitute a series of coded pulses like the coded pulses used to unblank the grids of the cathode ray tubes described above. The coded pulses which are developed by the circuits shown in Figs. 55–58, as will be explained below, are then delivered to a Sweep Voltage Generator before being applied to the horizontal and vertical deflection plates for controlling the movement of the beam on the face of the operating cathode ray tube.

A circuit diagram of the Sweep Voltage Generator is shown in Figs. 59–62 arranged as indicated in Fig. 63.

Reference should be made to Figs. 55–58 in order to understand how the coded pulses shown on time chart Figs. 9–12 are formed for the Sweep Voltage Generator. Coded pulses are developed at output terminals 156 and 157 for controlling the vertical sweep, and coded pulses are developed at output terminals 154, 158 and 159 for controlling the horizontal sweep.

Figure 10:
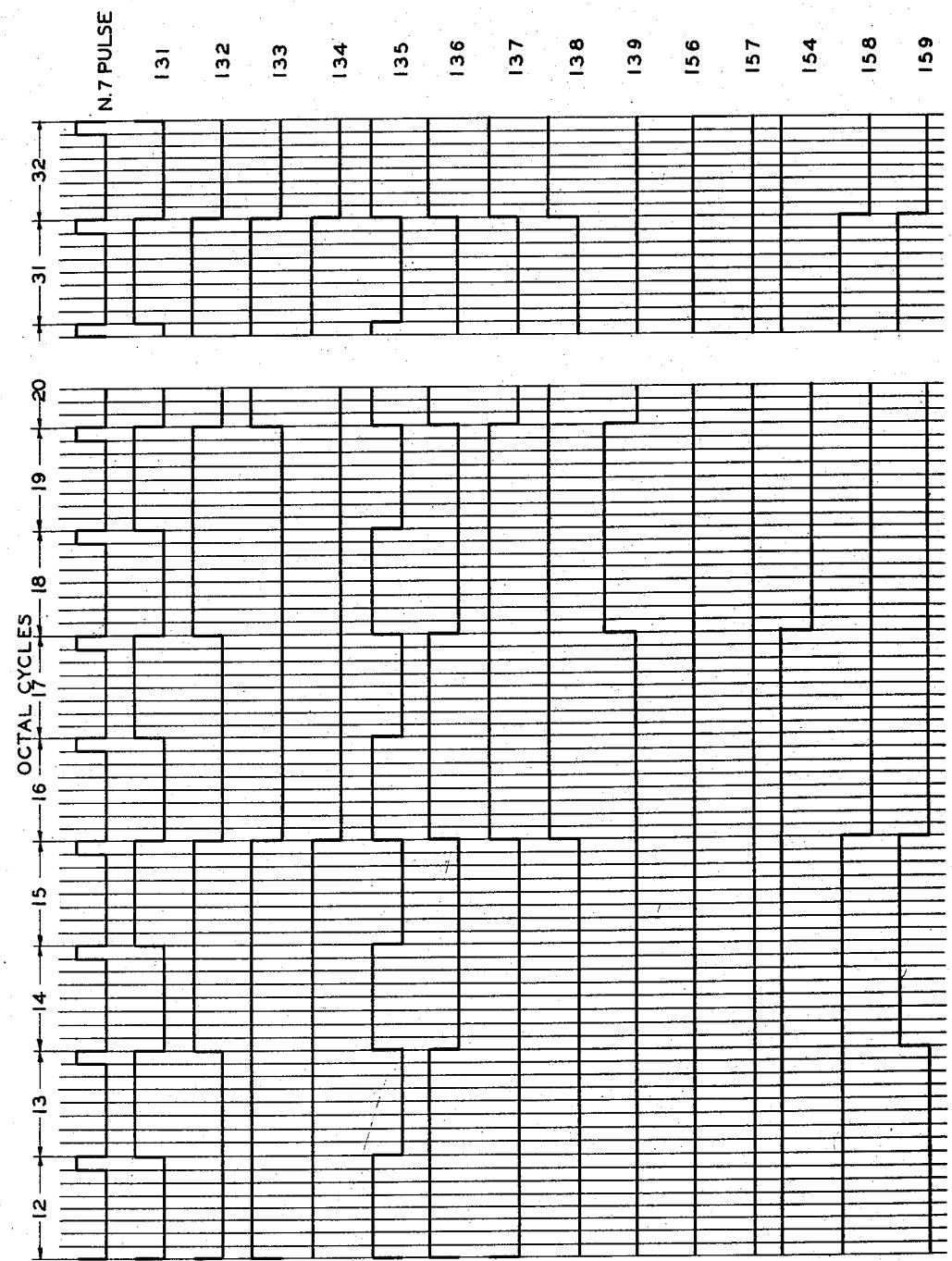

Output terminal 156 is caused to go Up or Down to form the signal pattern shown on time chart Figs. 9 and 10 under control of Or circuit 3935 shown in Fig. 57 which is operated under two separate sets of conditions. When input terminals 133, 136 and 138 are Up simultaneously And circuit 3907 is energized which operates cathode follower 3915 and causes the left input terminal of Or circuit 3935 to be Up. Reference to time chart Figs. 9 and 10 shows that And circuit 3907 is at coincidence from N4.0 time through N5.7 time. Thus Or circuit 3935 is operated during this time interval and output terminal 156 caused to go Up. When input terminals 132, 133 and 138 are Up simultaneously And circuit 3909 is in coincidence energizing cathode follower 3916 and causing the right input terminal of Or circuit 3935 to go Up. Figs. 9 and 10 show that these input terminals are Up simultaneously from N6.0 time to N7.7 time. This output terminal will be Up during the same time interval of the second 16 octal cycle period or writing operation.

A coded pulse is developed at output terminal 157 when input terminals 132, 133 and 138 are Up simultaneously. This occurs from N6.0 time through N7.7 time during the first writing operation and from N22.0 time through N23.7 time during the second writing operation.

The third signal required by the vertical side of the Sweep Voltage Generator shown in Figs. 59–62 is of eight octal cycles duration and occurs during the latter half of each writing operation. Conveniently such a signal is available at output terminal 134 of the circuit shown in Figs. 53–54. The signal pattern is illustrated on time chart Figs. 9–10. The signals developed at output terminals 156, 157 and 134 are all delivered to the Sweep Voltage Generator in order to form the required voltages for the vertical plates of the operating cathode ray tube.

The three coded signal patterns for the horizontal side of the Sweep Voltage Generator are developed by the circuit shown in Figs. 55–58. A horizontal sweep signal is developed at output terminal 154 when either input terminal 138 is Up or input terminal 134 is Up and input terminal 141 is Down. In either one of the two sets of input conditions, Or circuit 3965 is energized. When the right input terminal of And circuit 3946 is Up and input terminal 141 is Down so that inverter 3598 is made nonconductive and the left input terminal of And circuit 3946 is Up, then And circuit 3946 is Up, thereby developing a signal on terminal 154. The signal pattern developed at output terminal 154 may be seen in Figs. 9 and 10.

Another coded horizontal signal is developed at output terminal 158 in the circuit shown in Figs. 55–58. This signal takes the form shown on time chart Figs. 9 and 10 and is produced when input terminals 133, 134 and 136 are Up simultaneously and when input terminals 132, 133 and 134 are also Up simultaneously. Both of these input conditions energize Or circuit 3933 and cause output terminal 158 to be Up. It is seen that output terminal 158 is Up from N12.0 time through N15.7 time during the first 16 octal cycles or the first writing operation and from N28.0 time through N31.7 time during the second writing operation.

The third horizontal signal developed by the coding circuit occurs at output terminal 159. This output terminal is Up from N14.0 time through N15.7 time during the first writing of a digit and from N30.0 time through N31.7 time during the second writing operation when input terminals 132, 133 and 134 are Up simultaneously. The horizontal and vertical deflection circuits which govern digit display are located in Figs. 59–62. In general these two circuits comprise a group of parallel-connected cathode followers and stabilizing circuits connected in a cascode amplifier arrangement.

The prime control in the deflection circuits is the pull up pulse. It will be remembered that an N.7 pulse is delivered just prior to the beginning of each even numbered octal cycle to the Delay circuit 3906 so that it appears at each time N.0 of each even numbered octal cycle on terminal 140 (Fig. 54). This terminal is then connected to Or crcuit 4138 and to Delay circuit 4135 (Fig. 52) also leading in to Or circuit 4138 so that this signal as delivered by this Or circuit has been lengthened to a time interval N.0 and N.1. However, the output of Or circuit leads through Delay circuit 4132 to the pull up pulse lead 169 whereby it is shifted in time to the period N.1 and N.2. This pulse is shown on Figs. 11 and 12 and its function will be shortly described.

Figs. 46 and 47 show the deflection circuits in block form and Figs. 59 to 62 show them in detail. Here it may be seen that the pull up pulse lead enters two Or circuits 4118 and 4119. Operation of Or circuit 4118 causes a signal to be developed which creates coincidence at And circuit 4116. The signal from this And circuit in turn operates a cathode follower (4808R) for a two microsecond interval in order to charge up the sawtooth wave forming capacitors 4780 in the vertical deflection circuit. Likewise the pull up pulse passes through Or circuit 4119, operates And circuit 4117 and enables triode 4808L to charge up the sawtooth wave forming capacitors 4779 in the horizontal deflection circuit.

It may be mentioned here, by way of example, that the terminal 169 enters the Or circuits 4118 and 4119 by way of a CRL circuit made up of a resistor of 2.2K, and inductance of .75 mh. and a capacitor of 82 mf. which acts to remove the gliches from the signal. An identical filtering technique is associated with input terminals 120 and 121.

Referring now to the deflection circuits it can be seen that five groups of current adders of the cathode follower type make up the horizontal deflection circuit. A dual triode constitutes one such group, with the plates connected to different cathodes of the stabilizing circuit which is also a dual triode. The current adders function in such a manner that one of the triodes, either the left or the right one, is always conducting. This can be seen readily from an examination of a typical circuit.

Figure 62:
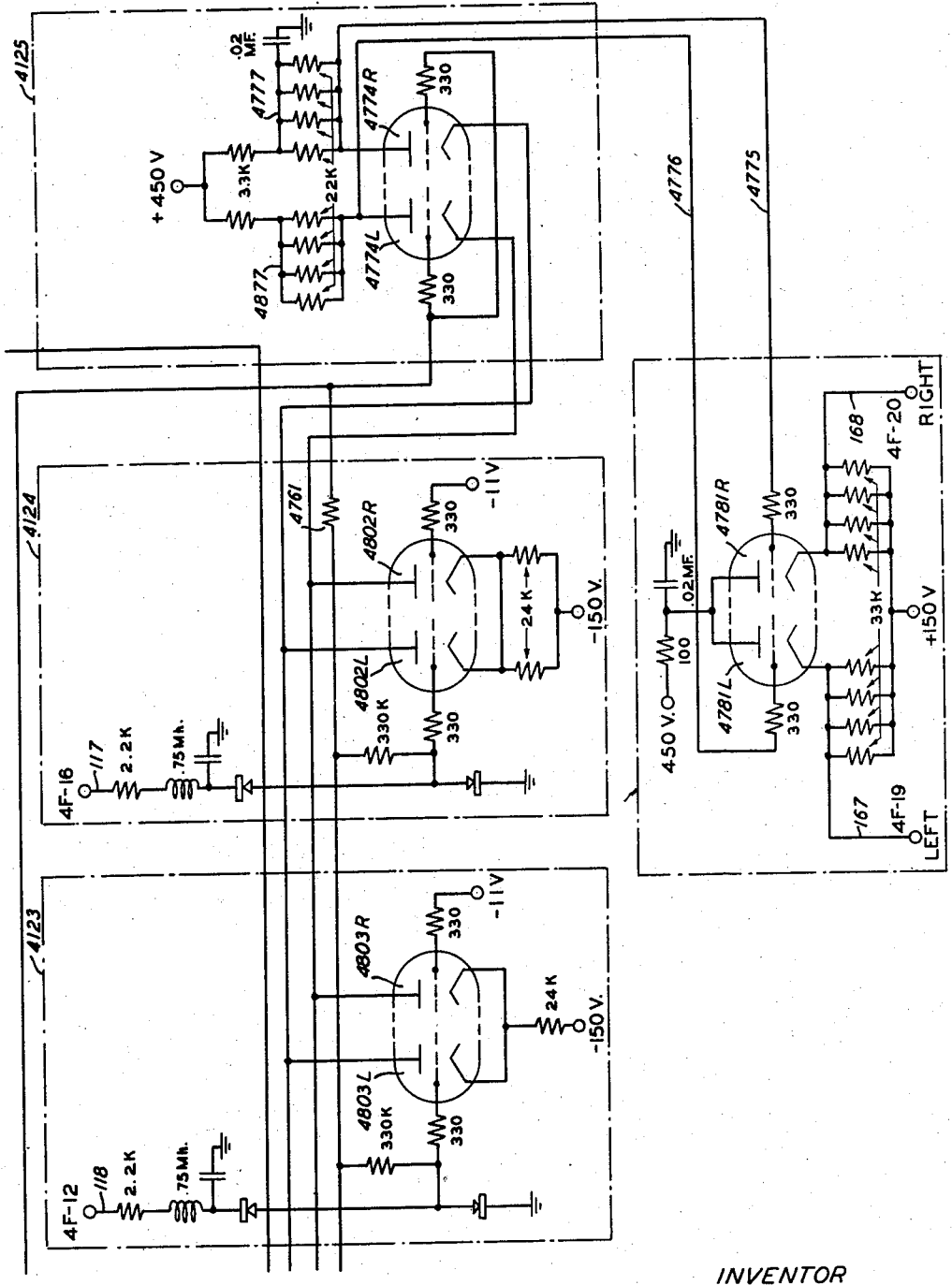

Such a cathode follower current adding circuit designated 4122 is found at the bottom of Fig. 62 whose left triode 4760L is connected to the cathode of the right triode 4774R of the stabilizing circuit 4125 and the right triode 4760R is connected to the left triode of the stabilizing circuit. Initially it must be understood that when input terminal 163 is Up, the input terminal of the triode 4760R is Down because the grid of tube 4760R is permanently tied to a Down potential source. This is clearly indicated in Figs. 46–47. There the two inputs to the current adder 4122 are shown as terminal 163 and a −11 volt source. Thus, if input terminal 163 (from Fig. 52) is Up at any time, the input terminal to triode 4760R is Down (relatively). If this condition is reversed, then the input to 4760L is Down and the input to 4760R is Up (relatively).

Assume that a +10 volt signal appears at input terminal 163 for a specific time interval, the And circuit 4876 is operated and cathode follower 4760L is caused to be conductive. Current flows through the common cathode resistor 4762 to the cathode of the right triode 4774R in the stabilizing circuit. The latter triode becomes conductive and a voltage drop is developed across resistor 4777 which lowers the potential at output terminal 4775 and the right horizontal deflection plate reached over cathode follower 4781R and terminal 168. Resistor 4770 in the grid input of the triode 4760R serves as a parasitic suppressor. Cathode follower 4760L will continue to conduct so long as a signal is available at input terminal 4771.

When input terminal 163 then goes Down to an approximately −25 volt level, then the triode 4760L ceases to conduct and triode 4760R becomes conductive. Again current will flow through the common cathode resistor 4762 but this time through the right triode 4760R and to the cathode to the left triode 4774L in the stabilizing circuit. Current flow through triode 4774L develops a voltage drop in resistor 4877 whose swing is reflected in the voltage developed at output terminal 4776 for the left horizontal deflection plate. It should be understood that the amount of current flow through the cathode follower and the stabilizing triode and therefore the amount of current flow through the plate resistor of the stabilizing triode is governed by the size of the common cathode resistor of the cathode follower.

The stabilizing triodes operate in such a manner that current variations in the cathode circuit of the cathode followers 4760L and 4760R are reflected in a voltage swing in the plate resistor of one of the stabilizing triodes. The subject of cascode amplifiers, represented here by the cathode followers 4760R and 4760L and stabilizing triodes 4774L and 4774R, has been covered in detail in the said Deerhake and Havens application. Resistors 4761 and 4778 supply the fixed bias for the grids of triodes 4774L and 4774R. Resistor 4773 and capacitor 4797 and resistor 4878 and capacitor 4795 constitute decoupling networks. Capacitor 4796 is a bypass capacitor.

Now considering the four current adders in the horizontal deflection circuit in conjunction with the signal patterns associated with the various input terminals shown on the time chart, it can be seen how the current adding operation actually takes place. Current adder tubes 4760, 4800, 4801, 4802 and 4803 are in the horizontal deflection circuit. Triodes 4760 and 4800 controlled by coded pulses developed from the signals produced by the counter shown in Figs. 53 and 54 and synthesized by the logical circuits of Figs. 55 and 58. Triodes 4802 and 4803 are controlled by signals developed in the Address Selection circuits shown in Figs. 42 and 43 whose function is to cause the digit to be displayed in one of four areas or positions of any cathode ray tube. Triode 4801 is a slightly different current adder which serves to provide the sawtooth waveform for the output horizontal voltages, as will be explained in detail below.

Reference to the time charts Figs. 9 and 10 shows that during the first writing operation, that is to say the writing of the first digit in the first position of row one, a signal is not developed at terminals 158 and 159. It should be understood that a signal developed at these two terminals, form vertical lines 6 and 7 of the raster (Fig. 5). The beam for writing these two vertical lines originates from the top center and left edge of the writing area, whereas in all other cases of line formation under the control of the horizontal deflection plates the beam originates in the top right corner of the writing area and travels either left, down, or diagonally, viewing the tube from the front panel.

The current which is developed across each of the plate resistors of the stabilizing triodes may be determined by adding the currents developed by the current adders.

The current flowing through any current adder may be determined by taking the voltage across the cathode resistor and dividing it by the cathode resistance. Since 150 volts exist across the common cathode resistor, in the case where the cathode resistor is 60K, the current flowing through the triode will be 2.5 ma. Thus the value of the current flowing through triodes 4760 and 4800 is 2.5 ma. Where the cathode resistor is 21K, the current flowing during the conductivity of the triode is approximately 7 ma. With an approximately 10 volt fixed bias, the current flow will be about 3.8 ma. and cathode resistors of 10K and 20K develop 15 ma. and 7.5 ma. respectively. Since triodes 4801, unlike the other current adders in the horizontal deflection circuit, are both conducting initially the current developed in their plate circuits will be half the current flowing through their common cathode resistors, that is, approximately 3.8 ma. in both plate circuits. Thus at any time the maximum current which will flow through either plate resistor of the stabilizing triodes is about 35 ma. This is due to the fact that with the exception of current adder 4801 all the other tubes are either in a conductive or nonconductive state at any time. Thus a maximum current flow through resistor 4877 in the stabilizing circuit causes output terminal 4776 to be at its minimum potential or approximately 240 volts, and the minimum current flow through resistor 4777 in the plate circuit of the right stabilizing adder causes output terminal 4775 to be at its maximum level or approximately 363 volts. If, on the other hand, maximum current flow should take place through the right stabilizing triode 4774R output terminal 4775 would be at its minimum voltage level or about 240 volts. Thus the potential difference between these two output terminals connected to the horizontal deflection plates would appear to be approximately 123 volts. However, due to the fact that the left and right current adders are not Up and Down simultaneously, the voltage swing will not be exactly this magnitude. This will be seen more clearly when the input conditions to the current adders are examined in detail. Since the current at point 4806 is always approximately 35 ma., the voltage at this point is always considered to be +380 when the stabilizing circuit is operated.

The sawtooth waveform is developed in the following manner. A signal incoming over terminal 121 operates Or circuit 4119 and And circuit 4117 which energizes cathode follower 4808L. During the energization of this cathode follower, capacitors 4779 are charged to their maximum level and will only be discharged when cathode follower 4808L is deenergized by removing coincidence at the input And circuit. Capacitors 4779 are charged to approximately a +10 volt level or about the fixed level of the grid bias of the left triode 4801L. In such a case triodes 4801L and 4801R have about the same current flow in their plate circuits. Approximately 3.8 ma. is present in the plate circuits of both triodes. As capacitors 4779 discharge at a rate determined by the RC ratio established by these capacitors and resistor 4804, the current through the left triode 4801L decreases as the current through the right triode 4801R increases at rates which are almost the same. Thus the current flowing through the left triode 4801L goes Down in a sawtooth waveform similarly causing the voltage drop in the plate resistor 4877 of the left stabilizing triode 4774L to go Down also thereby developing a sawtooth voltage at output terminal 4776 for the left horizontal deflection plate, viewing the cathode ray tube from its face.

As the discharge of capacitors 4779 causes the left triode 4801L to go Down in sawtooth waveform, the right triode 4801R rises at almost the same rate so that the voltage drop across plate resistor 4777 of the right triode 4774R gradually rises. This causes the voltage at output terminal 4775, which is connected through cathode follower 4781R to the right horizontal deflection plate, again viewing the C. R. T. and its face side, to go Down in a reverse sawtooth form as that indicated for output terminal 4776. That is to say, during the discharge of capacitors 4779, the voltage at output terminal 4776 goes Up at a gradual rate at the same time that the voltage at output terminal 4775 goes Down. This will become clearer when the current adders 4801L and 4801R, which produce the sawtooth waveform, are considered in conjunction with the other adders of the horizontal deflection circuit.

Consider the horizontal deflection circuit in conjunction with time charts Figs. 9–12 and digit raster Fig. 5. Referring to Fig. 5 it will be seen that the first line which must be drawn during the formation of any digit is the top horizontal line. It will be recalled that the beam forming this line is moved from right to left. Initially it should be understood that the seven lines which eventually go to form one complete digit are developed during the second through the fifteenth octal cycle, as indicated in Figs. 9–12. Referring to these drawings it can be seen that the only signal available at the input of the horizontal deflection circuit during the 16 microsecond interval corresponding to the second and third octal cycles is a two microsecond signal at input terminal 169 at N1.0 and N2.0 times and the signal at input terminal 154. However, the signal on terminal 154 is Down at this time. When the input terminals of the horizontal deflection circuit are Down, the other current adder is caused to be Up. Since input terminals 117 and 118 are Down simultaneously when the first digit of position 1 is written, the current adder tubes 4802R and 4803R will be conductive. Furthermore, since input terminals 162 and 163 are Down during the time that the first line associated with the writing of any digit is being written, current adder tubes 4800R and 4760R will be conductive. In terms of the current adders shown in Figs. 61 and 62 the time that the first line is written to form the first digit in position 1 of any of the twenty tubes, triodes 4803R, 4802R, 4800R, 4760R and 4801L, which forms the sawtooth waveform, are conducting and triodes 4803L, 4802L, 4800L and 4760L are not conducting. Since capacitors 4779 will discharge thereby initally causing a maximum current flow through triode 4801L, this current plus the constant currents developed by the other adders mentioned above are made available through stabilizing triode 4774L at the plate resistor 4877 where they cause a voltage drop of sufficient magnitude to make output terminal 4776, which is connected through a cathode follower to the left horizontal deflection plate, take its minimum level of approximately +240 volts. Also at the time that the capacitors 4779 have been charged to their maximum level and the two current adders associated therewith have been conducting about the same amount of current, the current which is delivered through triode 4774R in the stabilizing circuit to plate resistor 4777 is approximately 3.8 ma. Since the voltage at point 4806 is assumed to be constant at −380 volts during the normal operation of the horizontal deflection circuit, the 17 volt drop across resistor 4777 is reflected at output terminal 4775 which is now at its maximum level of −363 volts. Thus the voltage difference between the horizontal deflection plates is approximately +123 volts when the beam is at the right top corner of the writing area. If the full discharge of capacitors 4779 could cut off triode 4801L and thereby make triode 4801R conduct a full current, output terminal 4776 would be brought Up to +256 volts and output terminal 4775 would be reduced to +346 volts during the 14th microsecond of operation or, in other words, at the time that the succeeding two microsecond pull-up pulse is entered at input terminal 169. Actually this does not occur because the triodes 4801L and 4801R are operating class A and the discharge of capacitors 4779 to approximately −2 volts need not cut off triode 4801L. Therefore output terminal 4776, which is directly connected to the left horizontal deflection plate, will attain a value somewhat smaller than +256 volts and output terminal 4775, which is directly connected to the right horizontal deflection plate, will attain some level above +346 volts. Therefore, when the beam is in its left extreme writing position at the end of the first 14 microseconds of writing, the potential difference between the two horizontal deflection plates will be a value somewhat greater than +90 volts. It is therefore seen that a gradual increase of voltage in a sawtooth waveform at output terminal 4776 and a gradual decrease in voltage at output terminal 4775 also in a sawtooth waveform, controlled by the discharge of capacitors 4779, will move the beam from the right top corner of the writing area to the left top corner to form the first line of the digit raster Fig. 5. It may be seen in Figs. 11 and 12 how the horizontal sweep voltage waveform appears during the writing of the first line of a digit. It should be understood that no fraction of the first line may be written in the absence of control grid voltage on the cathode ray tube because in such a case no beam is available for moving under the control of the horizontal deflection plates.

The potentials on the vertical deflection plates must also be correct at this time in order that the beam might be moved across the top writing area and not lower down somewhere. The only difference between the vertical deflection circuit and the horizontal deflection circuit is that the former contains two less combinations of current adders. It will be recalled that triodes 4802 and 4803 are used to control the position, that is either 1, 2, 3 or 4, of any of the C. R. T.'s for writing. Since digits are not written one above the other but rather side by side, these two combinations of current adders are not required in the vertical deflection circuit. Except for the current adders 4817L and 4817R (Fig. 59) which develop the sawtooth waveform in the vertical deflection circuit, one current adder of each current adder combination of tubes, for example triodes 4816L and 4816R, is always Up at the time that the other adder in the group is Down, as explained above in the case of the current adders in the horizontal deflection circuit. These tubes are operating class C. However, in the case of the class A operating triodes 4817L and 4817R, both tubes will always be conducting some amount of current during normal operation.

The vertical sawtooth waveform is developed in exactly the same manner that the horizontal sweep voltage sawtooth waveform is developed. The two microsecond signal developed at input terminals 169 once each 16 microseconds develops coincidence at the And circuit 4116 and causes capacitors 4780 to be charged Up to the maximum level. Discharge of the capacitors 4780 is accomplished through resistor 4805. During the time that the capacitors are charged, current adder 4817L and current adder 4817R will be conducting about the same amount of current, as in the case of the sawtooth forming current adders in the horizontal deflection circuit. The current flowing through each triode at this time will be about 7 ma., the voltage across the cathode resistors being 150 volts. As capacitors 4780 discharge, the positive voltage at the grid of the tube 4817L decreases thereby lowering current flow through this triode at the same time that the current flow through the right triode 4817R increases. The grid voltage of triode 4817R is kept relatively constant at both a +10 volt level due to the operation of bleeder resistors 4823 and 4822. Capacitor 4824 is merely a bypass capacitor.

The current developed by triode 4817L is delivered through stabilizing triode 4827L to plate resistor 4828. The current flowing through this resistor determines the level of potential at output terminal 4836, which is connected through a cathode follower to the lower vertical deflection plate. On the other hand, the current developed by triode 4817R is delivered through stabilizing triode 4872R of the cascode amplifier circuit to the plate resistor 4892. The voltage swing across this resistor in turn determines the actual potential appearing at output terminal 4837 and the upper vertical deflection plate to which it is connected. Constant bias for the grids of the two stabilizing triodes 4827L and 4827R is provided by the voltage dividing resistors 4778 and 4761. Although the voltage drop across the plate resistors associated with the two triodes varies with the current developed by the various current adders, the voltage drop across resistor 4830 remains relatively constant during the normal operation of the vertical deflection circuit. Decoupling networks are provided by resistor 4830 and capacitor 4831 and resistor 4833 and capacitor 4832. Resistors 4834 and 4835 serve merely as parasitic suppressors for the control grids of the stabilizing triodes.

It has been stated above that the current flowing through each of the two triodes 4817L and 4817R at the time that capacitors 4780 are fully charged is about 7 ma. Assuming that signals do occur at input terminals 161 and 160, then triodes 4815L and 4816L will become conductive and cause cathode follower 4815L to conduct 2.5 ma. to the cathode of the right stabilizing triode 4827R. In the same way triode 4816L produces a current of 2.5 ma. to the cathode of the right stabilizing triode 4827R. Thus the 7, 2.5 and 2.5 ma. currents developed are added and a voltage drop is developed across plate resistor 4829 of the stabilizing circuit. Thus the voltage drop across resistor 4829 is approximately 51 volts, which makes the voltage level at output terminal 4837 to be about +293 volts since the voltage at point 4838 is always approximately 344 volts during the normal operation of the vertical deflection circuit. At this time the voltage drop across resistor 3828 is approximately 30 volts, thereby making the potential at output terminal 4836, +314 volts. The above voltage levels are predicated on the fact that the sawtooth current adders 4817L and 4817R are each developing approximately the same amount of current, that is 7 ma. However, during the discharge of capacitors 4780, the current flowing through triode 4817L will be reduced at about the same rate that the current flowing through triode 4817R is increased. This will cause the voltage developed at the upper deflection plate to go Down and that developed at the lower deflection plate to go Up. Reference should now be made to time chart Figs. 11 and 12 in order to understand the operation of the vertical deflection circuit during the writing of the top horizontal line shown in the basic pattern of Fig. 5. During the first 14 microseconds of the writing operation (octal cycles 2 and 3) terminals 160 and 161 are Down and terminal 121 is Up during the entire first 14 microseconds of writing. The pull-up gate pulse developed at terminal 169 is made available each 16 microseconds for operating both the horizontal and vertical sawtooth-forming current adders.

Returning to Figs. 59–62, input terminals 161 and 160 are Down and current adders 4815L and 4816L are conducting during this time. Input terminal 169 is Up and an And circuit 4118 operates in order to cause capacitors 4780 to be charged Up during a two microsecond time interval.

Terminal 120 is Up during the first line writing operation and Or circuit 4118 is operated which develops coincidence at And circuit 4116, energizing cathode follower 4808R. Operation of this cathode follower 4808R causes capacitors 4780 to be charged Up to the maximum level. Since input terminal 120 is Up during the first 16 microseconds of writing, capacitors 4780 maintain their charge through this period thereby causing a relatively equal current flow through triodes 4817L and 4817R. Thus during the writing of the top horizontal line of the digit raster, the current adders 4817L, 4816R and 4815R together develop 12 ma. which appears at plate resistor 4828. The current adders 4817R, 4816L and 4815L together develop 7 ma. which appears at resistor 4829 in the plate circuit of the right stabilizing triode 4827R.

Thus the writing of the top horizontal line of any digit is accomplished with about +293 volts on the lower vertical deflection plate and about +314 volts on the upper deflection plate. Reference to the time chart will show that the vertical sweep voltage waveform developed during the first 16 microseconds of writing operation is a straight line at the maximum potential level of operation. Thus the first line of the basic pattern shown in Fig. 5 has been written.

At the end of the first 16 microseconds of writing, another two microsecond signal is developed at input terminal 169 of the deflection circuit. Therefore the pullup pulse at the start of the second line writing operation causes capacitors 4779 of the horizontal deflection circuit to be charged Up for two microseconds. Since input terminals 162, 163, 118 and 117 are all Down during the second 16 microseconds of writing, the voltage swing at the horizontal deflection plates will be the same as that indicted above in the case of writing the top horizontal line described above. The right horizontal deflection plate will be reduced, according to the discharge of capacitors 4779, from a maximum potential of approximately 363 volts to a level somewhat above 346 volts. At the same time the left deflection plate will have its potential increased in about the same inverse ratio from a low of about 239 to a high somewhat below 256 volts.

In the case of the vertical deflection circuit operation, capacitors 4780 continue to remain charged during the second 16 microseconds of writing due to the fact that input terminal 130 remains Down for this additional time interval. This means that for an additional 16 microseconds no sawtooth waveform will be developed by the sawtooth forming current adders 4817L and 4817R.

During the second 16 microseconds of writing input terminal 161 goes Up and input terminal 160 remains Down. The second 16 microseconds are included in octal cycles 4 and 5. It will be seen that when input terminal 161 is Up, triode 4816L is conductive and triode 4816R is nonconductive.

The above mentioned input conditions mean that current adders 4816L and 4815R will be conducting along with the sawtooth forming current adders 4817L and 4817R. This means that approximately 9.5 ma. is delivered through the two stabilizing triodes 4827L and 4827R to their respective plate resistors. In other words, the potential existing at output terminals 4836 and 4837 is the same or approximately 304 volts. The vertical deflection plate voltages must be at the same potential during the second line forming operation, that is, the writing of the middle horizontal line in the basic pattern. Actually the second line will be written, if at all, only if the C. R. T. is unblanked during some part of the time interval from N4.0 through N5.7. For example, the digit 1 pattern developed at terminal 142 at the top is Down during the second line forming period, that is the fourth and fifth octal cycles and therefore no control grid voltage will be made available to any of the display C. R. T.'s by the C. R. T. Pulse Grid Generators. Control grid voltage is made available for 12 microseconds of the 14 microsecond writing period when the digit to be displayed is a 2 as may be seen by referring to Figs. 11 and 12. The other digit signal patterns may be similarly examined to determine their effect on the unblanking of the operating C. R. T. and the extent of the possible 14 microsecond line which may be written.

It may be seen what form the horizontal and vertical sweep voltages take during the writing of the second or middle horizontal line. The voltage on the upper horizontal deflection plate is progressively reduced from an approximate 363 volts to 346 volts in a sawtooth waveform determined by the discharge of capacitors 4779 of the horizontal deflection circuit. On the other hand, the voltage of the top vertical deflection plate is reduced from an approximate 314 volts to 304 volts or a value sufficient to permit a writing of the middle line. For as the upper vertical deflection plate has been lowered by approximately ten volts, the lower vertical deflection plate is raised an additional ten volts. Thus the potential difference between the vertical plates is zero at this time.

Various deflection plate voltages for developing the remaining five lines which go to form the basic pattern will be examined now in conjunction with the block diagram shown in Figs. 46 and 47. These figures illustrate the input and output conditions associated with the vertical and horizontal deflection plate circuits. The current adders and their associated And circuits are represented by the various rectangular blocks 4111–4113 and 4120–4124. Rectangular block 4110 corresponds to the stabilizing circuit including tubes 4827L and 4827R in the vertical section, and block 4125 corresponds to the stabilizing circuit including tubes 4774L and 4774R in the horizontal section. Blocks 4113 and 4120 represent the sawtooth forming current adders of the vertical and horizontal circuits respectively. The various And and Or circuits 4116–4119 form part of the sawtooth generator with a group of cathode followers which are not shown.

At the end of the 32 microseconds of writing, a two microsecond signal is again developed at input terminal 169 for returning the beam to the right edge of the writing area. The signal at input terminal 169 energizes Or circuits 4118 and 4119 for two microseconds. Since input terminal 120 is Up at the start of the third line writing operation and stays Up for another 16 microseconds, Or circuit 4118 is caused to be energized for the entire 16 microseconds. It will be recalled that input terminal 130 was Up throughout the first and second line writing operations. Energization of Or circuit 4118 throughout this period of time operates And circuit 4116 and continues to maintain the sawtooth forming capacitor charged at its maximum level and the associated current adders to be conductive. The rectangular block 4113 represents the sawtooth forming current adder circuit of the vertical section. Although one line is shown going from block 4113 to the stabilizing circuit indicated by block 4110, actually current is carried on two lines from a right and left current adder to the stabilizing circuit 4110.

Reference to the time chart will show that during the writing of the third line of the basic pattern, input terminals 161 and 160 are Up simultaneously for this time duration. Thus the left current adders 4815L and 4816L of circuits 4111 and 4112 respectively are conducting. Since the right and left current adders of circuit 4113 have been shown to be conducting relatively evenly during this 16 microsecond writing interval, the current developed by the left group of current adders will be 12 ma. and the current developed by the right group of adders in the vertical section will be 7 ma. This means that the voltage developed at output terminal 4836 of the vertical deflection circuit will be in the order of 314 volts, and the potential at output terminal 4837 will be approximately 293 volts. The signals developed at output terminals 4836 and 4837 operate cathode followers 4126 and 4127 respectively in order to control output terminals 165 and 166, which are connected directly to the vertical deflection plates. Thus the beam is moved to the lowest level of the writing area in order that the third horizontal line of the basic pattern might be written.

The input conditions of the horizontal deflection circuit are exactly the same during the third line writing operation as they were in the first two line writing operations. That is, input terminal 121 is Up and input terminals 162 and 163 are Down. Of course, input terminals 118 and 117 will also be Down at this time because it has been assumed that the figure is to be written in the first position of one of the cathode ray tubes, there being four positions for digit display on the face of any one of the 20 cathode ray tubes. When the four input terminals mentioned above are Down simultaneously, as is the case during the first, second and third line writing operations of any digit in position 1 of any cathode ray tube, the right current adders in the horizontal deflection circuit are caused to be Down and the left current adders are caused to be Up.

When input terminal 121 is Down, it causes Or circuit 4119 to be Down. However, since the two microsecond pull-up pulse appearing at input terminal 169 operates And circuit 4115, Or circuit 4119 and And circuit 4117 in order to recharge capacitors 4779 in the horizontal deflection circuit, this causes the voltage at the left deflection plate to go Down at the same time that the potential on the right deflection plate is raised. This puts the beam at the right edge of the writing area. Since the vertical plate voltages have been changed sufficiently for the beam to be lowered to the lowest writing level, the beam is thus seen to be at the right bottom edge of the writing area at the start of the third line writing operation. By maintaining the voltage on the vertical deflection plates at a steady level and by swinging the voltage on the left horizontal plate Up at the same time that the voltage on the right horizontal plate is brought Down, the beam is caused to be moved across the bottom of the writing area.

Referring to the time chart, it will be seen that a line is written for the entire 14 microseconds during the third line forming operation associated with displaying the digit 1. On the other hand, the bottom horizontal line of the basic pattern is not written in the case of digits 4 and 7. It may be seen during which interval of the third 14 microsecond line writing operation the control grid of the operating cathode ray tube is unblanked.

The diagonal line, or fourth line shown on the basic pattern, is formed by gradually reducing the voltages on both the right horizontal plate and the top vertical plate. This is accomplished in the following manner. The input terminals 120 and 121 are Down simultaneously during the fourth line writing operation. This means that the two microsecond signal appearing at input terminal 169 at the start of the fourth 16 microsecond interval will charge the sawtooth-forming capacitors of both the vertical and horizontal deflection circuits for two microseconds after which they will discharge and the current flowing through their respective current adders will be decreased. This means that the current flowing through the two left current adders 4817L and 4801L is decreased so that the voltage available at the bottom vertical plate and the left horizontal plate is progressively increased during the discharge of the capacitors.

Again, it may be seen that during the fourth line writing operation, input terminals 161, 160, 162 and 163 are Down. Input terminals 118 and 117 are also Down throughout the writing period associated with the display of each first position digit. When all the input terminals mentioned above are Down the left current adders associated with them in both the horizontal and vertical deflection circuits are Down and the right current adders are Up. This means that initially during the time that the respective capacitors are being charged maximum current will be developed by the right current adders and minimum current will be developed by the left current adders thereby causing a minimum voltage to occur at the left and bottom deflection plates and a maximum voltage to occur at the top and right deflection plates, viewing the C. R. T. from its face.

However, as the sawtooth-forming capacitor in the vertical deflection circuit is discharged, the overall current developed by the right current adders is gradually reduced and a potential across the bottom deflection plate is similarly increased as the current developed by the left current adders is increased and the potential developed across the top horizontal deflection plate is decreased. The same condition occurs in the case of the horizontal circuit, with the discharging capacitor reducing the overall current developed by the right current adders at the same time that the current developed by the left current adders is relatively similarly increased. Thus the beam which originated in the top right corner of the writing area in position 1 is thereby moved diagonally to the bottom left corner of the writing area, as may be seen by referring to the basic pattern shown in Fig. 5. Referring to the time chart, it may be seen that the operating C. R. T. does not have its control grid Up during the fourth 16 microsecond writing interval when the digits 0, 1, 2, 4, 5, 6, 8 and 9 are being written. The tube is unblanked only for the first 7 microseconds of this writing interval when a digit 3 is being written and for the entire 14 microsecond period when the digit 7 is written.

Thus it has been shown how the various vertical and horizontal sweep voltages are developed for writing the first four lines of the seven lines which constitute a complete digit writing operation. The writing of the other three lines may be similarly analyzed. The horizontal sweep voltage is maintained at static levels of three magnitudes during the writing of the fifth, sixth and seventh lines of the basic pattern, and the vertical sweep voltage takes the sawtooth waveform as illustrated in Figs. 11 and 12. Actually the waveforms shown in these figures correspond to the potential condition at the upper and right deflection plates only.

Figure 61:
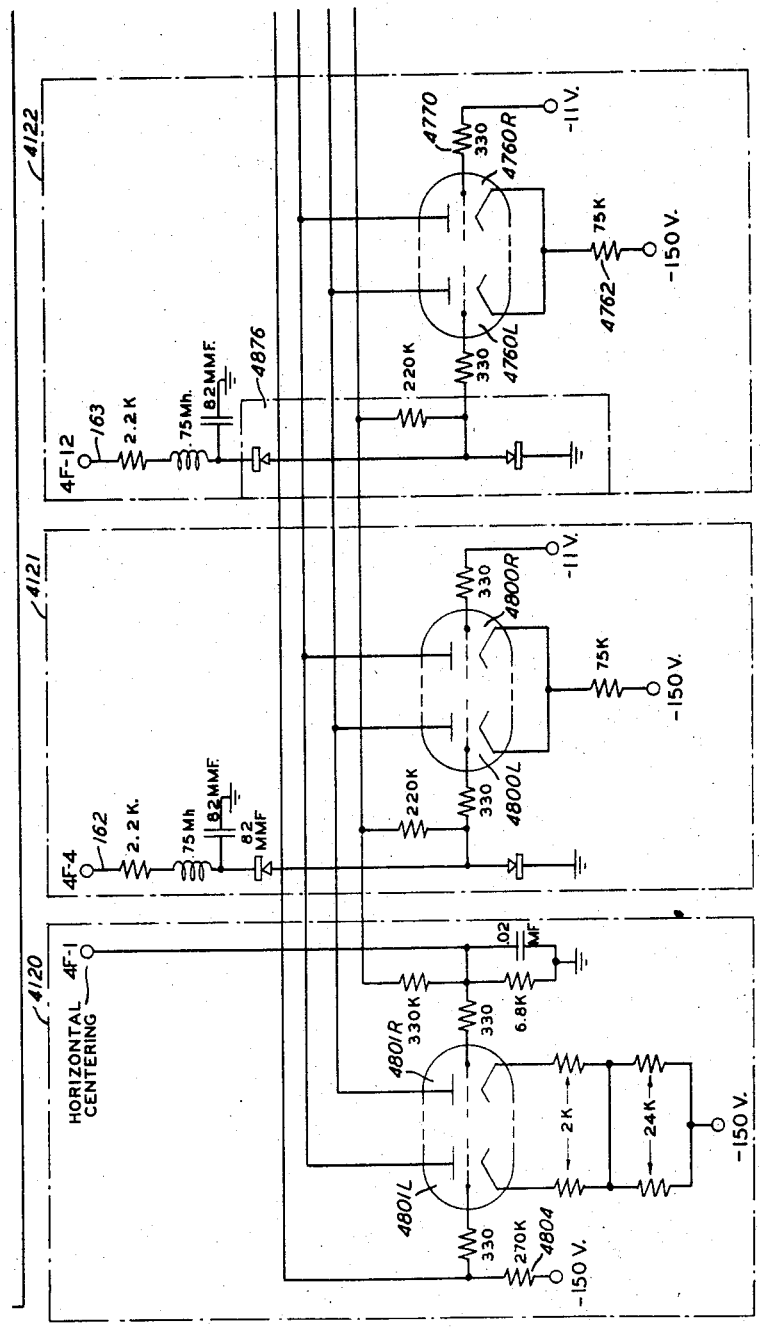

It will be recalled that during the writing of the digit in position 1 of any cathode ray tube, input terminals 118 and 117 were Down. However, when the digit is next to be written in position 2 during the second 400 microsecond cycle, input terminal 118 is Up and input terminal 117 is Down. The condition of these terminals only affects the horizontal deflection circuit. Since input terminal 118 is now Down, the left current adder of circuit 4123, shown in Fig. 61, is now conducting current and the right current adder is not conducting. All the other horizontal and vertical input conditions are exactly as they were when the first line of the digit in position 1 was written, as explained above.

It can be seen that when the left current adder 4803R is conducting, a 7.5 ma. current is made available at the cathode of the stabilizing triode 4774R. This current is added to the approximately 3.8 ma. developed by the right triode 4801R of the sawtooth-forming circuit across the plate resistor 4777 thereby developing approximately a 50 volt drop thereacross. This means that the potential at output terminal 4775 and therefore across the right deflection plate will be in the vicinity of 330 volts. The current developed across plate resistor 4776 of the left stabilizing triode 4774L is about 23.8 ma., which means that the potential at output terminal 4776 and therefore across the left horizontal deflection plate will be in the order of 273 volts. Thus the potential difference between the horizontal plates when the beam is at the top right edge of the second position writing area is in the order of 57 volts. It will be recalled that the voltage difference between the plates at the time that the beam was at the top right end of the first position writing area was approximately 124 volts. The deflection plate voltages will be varied from this new level during the line forming operations associated with displaying the second position digit on any C. R. T.

At the end of the second 400 microsecond cycle, input terminal 118 goes Down and input terminal 117 goes Up. Referring to the logical block diagram shown in Figs. 46 and 47, this means that the left current adder associated with circuit 4124 is conducting whereas the right current adder of circuit 4123 is not conducting. This means that approximately 19 ma. is developed by the right current adders in the horizontal deflection circuit and 16 ma. is developed by the left current adders. Thus for the beam to originate at the top right corner of the third position writing area the approximate potentials across the right and left deflection plates are 295 and 307 volts respectively. Since all the other input conditions to the deflection circuits remain the same during the writing of the digit in the third position of any tube the waveforms will take essentially the same form except for the different magnitude in the case of the horizontal side.

In order to display the fourth and last digit on any tube, input terminals 118 and 117 are Up simultaneously. As seen in Figs. 46 and 47 this means that the left current adders of the constant current forming circuits 4123 and 4124 are operating. Approximately 26 ma. will be developed by the left current adders and 9 ma. by the right current adders. As reflected in the output of the stabilizing triodes, this means that the potential at output terminal 4775 and therefore across the right horizontal deflection plate will be 263 volts, whereas the potential at output terminal 4776 and therefore at the left plate will be in the order of 340 volts. When this voltage difference occurs between the horizontal plates, the beam is set initially at the top right corner of the fourth position writing area. The vertical deflection circuit operates in exactly the same manner during the formation of the fourth position digit as it did in the previous three positions. Except for the magnitude of the horizontal sweep voltage during the various line writing operations associated with displaying, the voltage waveforms will take the form shown in Fig. 5.

What is claimed is:

1. In a register display device for sensing and displaying information registered in a device controlled in part by a periodic timing and counting means at a selected period of a given operation of said device, in which said device may be triggered to repeatedly perform said given operation, a counter operating at the same rate as the said timing and counting means of said device, means for repeatedly starting said counter and simultaneously triggering said device, means for marking said counter to correspond with said selected period of said given operation of said device, said means consisting of a means for establishing a code representative of the number of counts to be taken by both said counter and said timing and counting means of said device to reach said selected period, means controlled by said counter for repeatedly transmitting a code on and representative of each said count made thereby, an inequality detector repeatedly operated under the joint control of said marking code and said timing count codes, said inequality detector responding when said two codes incoming thereto reach equality, and a signal terminal connected to the output of and responsive to said inequality detector.

2. A register display device in which information transiently registered in code in a device such as a calculator is extracted, translated and applied to a bank of cathode ray tubes where it is displayed in the form of Arabic numerals written by frequent repetition and sustained by the long persistence effect of such tubes, in which said transiently registered information is determined to be present in a given calculator register at a given stage of a particular calculator operation, characterized in this, that there is provided a high speed electronic commutator for constantly, repeatedly and successively emitting pulses over a plurality of output terminals, said commutator being employed as a basic control element in said calculator operation, means for producing a signal representative of a given number corresponding to said given stage of said particular calculator operation, a counter controlled by said commutator to repeatedly count over a series of numbers as great as or greater than the number of stages in said particular calculator operation, means to simultaneously and repeatedly start said particular calculator operation and said counter whereby said counter counts off each stage of operation of said calculator operation, means for matching said representative signal against the counts produced by said counter, and means for transmitting a signal responsive to said matching means.

3. A register display device in which information transiently registered in code in a device such as a calculator is extracted, translated and applied to a bank of cathode ray tubes where it is displayed in the form of Arabic numerals written by frequent repetition and sustained by the long persistence effect of such tubes, in which said transiently registered information is determined to be present in a given calculator register at a given stage of a particular calculator operation, characterized in this, that there is provided a high speed electronic commutator for constantly, repeatedly and successively emitting pulses over a plurality of output terminals, said commutator being employed as a basic control element in said calculator operation, means for producing a signal representative of a given number corresponding to said given stage of said particular calculator operation, a counter controlled by said commutator to repeatedly count over a series of numbers as great as or greater than the number of stages in said particular calculator operation, means controlled by said counter to repeatedly produce a start signal at the start of its counting operation, means responsive to said start signal for triggering said particular calculator operation whereby said counter counts off each stage of operation of said calculator operation, means for matching said representative signal against the counts produced by said counter and means for transmitting a signal responsive to said matching means.

4. A register display device in which information transiently registered in code in a device such as a calculator is extracted, translated and applied to a bank of cathode ray tubes where it is displayed in the form of Arabic numerals written by frequent repetition and sustained by the long persistence effect of such tubes, in which said transiently registered information is determined to be present in a given calculator register at a given stage of a particular calculator operation, characterized in this, that there is provided a high speed electronic commutator for constantly, repeatedly and successively emitting pulses over a plurality of output terminals, said commutator being employed as a basic control element in said calculator operation, means for repeatedly producing a start signal to recurrently cause said calculator to perform said particular calculator operation, means for producing a signal representative of a given number corresponding to said given stage of said particular calculator operation, a counter controlled by said commutator to repeatedly count over a series of numbers as great as or greater than the number of stages in said particular calculator operation, means responsive to said start signal for triggering said particular calculator operation whereby said calculator operation proceeds step by step through its various stages and said counter simultaneously counts said stages, a detector responsive to equality between said representative signal and an equal count reached by said counter and means for transmitting a signal produced by said equality detector.

5. A register display device in which information transiently registered in code in a device such as a calculator is extracted, translated and applied to a bank of cathode ray tubes where it is displayed in the form of Arabic numerals written by frequent repetition and sustained by the long persistence effect of such tubes, in which said transiently registered information is determined to be present in a given calculator register at a given stage of a particular calculator operation, characterized in this, that there is provided a master timing device for pacing the various operations of said calculator and the present signal means, a set of manually controlled switches for producing a signal representative of a given number corresponding to said given stage of said particular calculator operation, a counter repeatedly controlled by said master timing device to repeatedly count over a series of numbers as great as or greater than the number of stages in said particular calculator operation, means controlled by said counter to produce a start signal at the start of its counting operation, means responsive to said start signal for triggering said particular calculator operation whereby said calculator operation proceeds step by step through its various stages and said counter simultaneously counts said stages, a detector responsive to equality between said representative signal and an equal count reached by said counter and means for transmitting a signal produced by said equality detector.

6. In a high speed operating device wherein large numbers of programmed operations and suboperations are each serially performed in a continuous succession of steps including the transient registration of information in code at known steps of said suboperations, in which means responsive to an unstandard condition consisting of a miscalculation or failure in the proper registration of said information is provided to halt the operation of said device at the end of the suboperation in which said failure occurred and to bring in a failure signal, characterized in this, that there is provided means for searching out an unstandard condition consisting of a counter to count off the steps of a suboperation, gate means for conditioning a test circuit for operation at a selectively predetermined count of said counter and means for repeatedly, periodically and simultaneously starting said counter and triggering said suboperation whereby conditions in the circuits may be probed at any given step of said suboperation.

7. Means for synchronizing testing means with recurrent signals transmitted in a high speed electronic network at a given interval of a series of the successive intervals of a suboperation of said network, comprising a counter controlled to count at a rate equal to the rate of said successive intervals, a manually operable set of switches to identify a particular count made by said counter, an inequality detector jointly controlled by said manual switches and said counter, means for repeatedly triggering said network to start said suboperation and to simultaneously start said counter and a synchronizing terminal controlled by said inequality detector.

References Cited in the file of this patent

UNITED STATES PATENTS

| | | |
|---|---|---|
| 2,403,873 | Mumma | July 6, 1946 |
| 2,461,412 | Dickinson | Feb. 8, 1949 |
| 2,533,242 | Gridley | Dec. 12, 1950 |
| 2,552,761 | Baker | May 15, 1951 |
| 2,594,731 | Connolly | Apr. 29, 1952 |
| 2,679,638 | Bensky | May 25, 1954 |
| 2,693,593 | Crusman | Nov. 2, 1954 |
| 2,702,380 | Brushman | Feb. 15, 1955 |
| 2,721,990 | McNaney | Oct. 25, 1955 |
| 2,737,342 | Nelson | Mar. 6, 1956 |
| 2,767,908 | Thomas | Oct. 23, 1956 |
| 2,800,278 | Thomas | June 23, 1957 |